(12) United States Patent
Murakami et al.

(10) Patent No.: US 11,497,083 B2
(45) Date of Patent: Nov. 8, 2022

(54) COMMUNICATION SYSTEM AND CONTROL METHOD INCLUDING WIRELESS SUPPLYING OF POWER

(71) Applicant: Panasonic Intellectual Property Corporation of America, Torrance, CA (US)

(72) Inventors: Yutaka Murakami, Kanagawa (JP); Nobuhiko Hashida, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 164 days.

(21) Appl. No.: 16/983,623

(22) Filed: Aug. 3, 2020

(65) Prior Publication Data

US 2020/0367319 A1 Nov. 19, 2020

Related U.S. Application Data

(63) Continuation of application No. PCT/JP2019/003798, filed on Feb. 4, 2019.
(Continued)

(30) Foreign Application Priority Data

Apr. 5, 2018 (JP) .............................. JP2018-072873
Apr. 10, 2018 (JP) .............................. JP2018-075558

(51) Int. Cl.
*H04W 88/16* (2009.01)
*H02J 50/10* (2016.01)
(Continued)

(52) U.S. Cl.
CPC ............. *H04W 88/16* (2013.01); *H02J 50/10* (2016.02); *H04W 84/12* (2013.01); *H04W 92/16* (2013.01)

(58) Field of Classification Search
CPC ... H04W 92/16; H04W 88/16; H04W 84/047; H04W 84/18; H04W 84/12; H04W 4/06; H04L 45/20; H04L 45/74; H04L 12/189
See application file for complete search history.

(56) References Cited

U.S. PATENT DOCUMENTS 9,226,290 B2 * 12/2015 Gaal ................. H04W 56/0045
10,257,077 B1 * 4/2019 Zhu ..................... H04L 12/1877
(Continued)

FOREIGN PATENT DOCUMENTS

JP   2009-5116    1/2009
JP   2011-508578  3/2011
(Continued)

OTHER PUBLICATIONS

Extended European Search Report dated Jun. 28, 2021 in corresponding European Patent Application No. 19748388.6.
(Continued)

*Primary Examiner* — Wei Zhao
(74) *Attorney, Agent, or Firm* — Wenderoth, Lind & Ponack, L.L.P.

(57) ABSTRACT

A communication system includes an outdoor gateway and an indoor gateway. The outdoor gateway includes: a communication IF that connects to an outdoor network; and a communication IF that communicates wirelessly. The indoor gateway includes: a communication IF that connects to an indoor network; and a communication IF that connects, via wireless communication, to the communication IF included in the outdoor gateway.

5 Claims, 83 Drawing Sheets

Related U.S. Application Data

(60) Provisional application No. 62/644,875, filed on Mar. 19, 2018, provisional application No. 62/643,454, filed on Mar. 15, 2018, provisional application No. 62/626,255, filed on Feb. 5, 2018.

(51) Int. Cl.
*H04W 84/12* (2009.01)
*H04W 92/16* (2009.01)

(56) References Cited

U.S. PATENT DOCUMENTS

| | | |
|---|---|---|
| 2008/0267112 A1 | 10/2008 | Lucidarme |
| 2009/0127937 A1 | 5/2009 | Widmer et al. |
| 2012/0113866 A1* | 5/2012 | Tenny .................. H04W 24/10 370/254 |
| 2012/0220239 A1 | 8/2012 | Hosoya et al. |
| 2017/0195054 A1 | 7/2017 | Ashrafi |
| 2018/0019798 A1 | 1/2018 | Khan et al. |
| 2019/0364492 A1* | 11/2019 | Azizi .................. H04W 68/005 |

FOREIGN PATENT DOCUMENTS

| | | |
|---|---|---|
| WO | 2009/065099 | 5/2009 |
| WO | 2011/055536 | 5/2011 |

OTHER PUBLICATIONS

International Search Report dated May 7, 2019 in International (PCT) Application No. PCT/JP2019/003798.

\* cited by examiner

INDOOR GATEWAY AND OUTDOOR GATEWAY CONFIGURATION

COMMUNICATION SYSTEM AND CONTROL METHOD INCLUDING WIRELESS SUPPLYING OF POWER

CROSS REFERENCE TO RELATED APPLICATIONS

This application is a U.S. continuation application of PCT International Patent Application Number PCT/JP2019/003798 filed on Feb. 4, 2019, claiming the benefit of priority of U.S. Provisional Patent Application No. 62/626,255 filed on Feb. 5, 2018, U.S. Provisional Patent Application No. 62/643,454 filed on Mar. 15, 2018, U.S. Provisional Patent Application No. 62/644,875 filed on Mar. 19, 2018, Japanese Patent Application Number 2018-072873 filed on Apr. 5, 2018, and Japanese Patent Application Number 2018-075558 filed on Apr. 10, 2018, the entire contents of which are hereby incorporated by reference.

BACKGROUND

1. Technical Field

The present disclosure relates to a communication system and a control method.

2. Description of the Related Art

Conventionally, a variety of services and device functions have been provided using communication technology. Communication between terminals and communication between a terminal and a server, which are necessary in order to provide such services and device functions, are performed via a network of a plurality of communication devices. Here, in order to answer the demands for, for example, improvement in the performance of systems that use communication, improvement in the quality of services that use communication, and support for new forms of services that use communication, it is necessary to construct a communication system taking into consideration the improvement of communication methods used between specific communication devices, and the unique characteristics of the communication methods used between devices that form the network.

For example, in multi-antenna communication typified by multiple-input multiple-output (MIMO), which is a communication method performed using a plurality of antennas, data reception quality and/or a data communication rate (per unit time) can be enhanced by modulating transmission data of a plurality of streams and simultaneously transmitting modulated signals from different antennas using the same frequency (common frequency). For example, WO2011/055536 discloses, in performing multicast/broadcast in such multi-antenna communication, the transmission of a modulated signal by a transmitting device that uses an antenna having a quasi-omni pattern which allows the transmitting device to have a substantially constant antenna gain in various directions in a space.

SUMMARY

However, in order to answer the demands for, for example, improvement in the performance of systems, improvement in the quality of services, and support for new forms of services, it is necessary to construct a communication system taking into consideration the improvement of communication methods used between specific communication devices, and the unique characteristics of the communication methods used between devices that form the network. For example, when sufficient transmission quality cannot be achieved in multicast/broadcast that uses an antenna having a quasi-omni pattern, further improvements in communication methods used between specific communication devices are needed. Moreover, for example, even when high data transmission speeds are achieved in part of the communication route, when data transmission speeds slow down due to the slow data transmission characteristics of a surrounding network, the method used to construct the network requires further improvement. In view of this, the present disclosure provides various aspects that can contribute to answering the demands for, for example, improvement in the performance of systems that use communication, improvement in the quality of services that use communication, and support for new forms of services that use communication. Some of the aspects included in the present disclosure are exemplified below.

A communication system according to one aspect of the present disclosure includes a first communication device and a second communication device. The first communication device includes a first communication interface that connects to a first network and a second communication interface that communicates wirelessly. The second communication device includes a third communication interface that connects to a second network and a fourth communication interface that connects, via wireless communication, to the second communication interface included in the first communication device.

General and specific aspect(s) disclosed above may be implemented using a system, a method, an integrated circuit, a computer program, or a computer-readable recording medium such as a CD-ROM, or any combination thereof.

The present disclosure can facilitate improvement in the performance of systems that use communication, improvement in the quality of services that use communication, and support for new forms of services that use communication.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
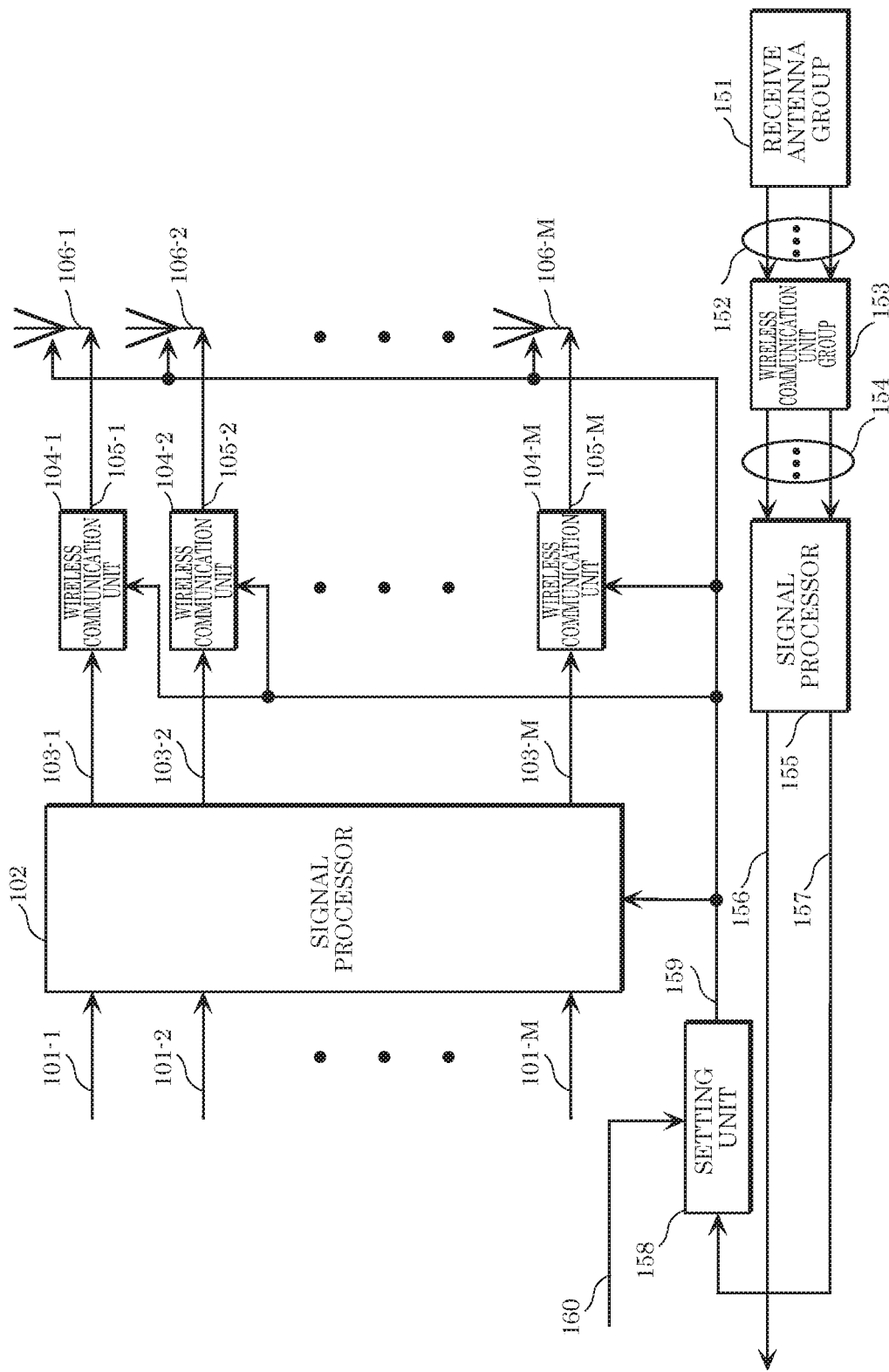
FIG. 1 is a diagram illustrating an example of a configuration of a base station.

First, examples of some of the plurality of aspects included in the present disclosure will be given. A communication system according to one aspect of the present disclosure includes a first communication device and a second communication device. The first communication device includes a first communication interface that connects to a first network and a second communication interface that communicates wirelessly. The second communication device includes a third communication interface that connects to a second network and a fourth communication interface that connects, via wireless communication, to the second communication interface included in the first communication device.

According to this aspect, the communication system can connect the first network and the second network using the first communication device and the second communication device that are connected to one another via wireless communication. This enables the communication system to improve the network construction method.

For example, the first communication device may be disposed in a first space outdoors, the second communication device may be disposed in a second space indoors, the second space being separated from the first space by a panel, and the second communication interface and the fourth communication interface may connect by wireless communication via radio waves through the panel.

According to this aspect, the communication system connects the first network and the second network by using wireless communication performed between the outdoor space and the indoor space through the panel. This enables the communication system to improve the construction method of the network that connects the outdoor space and the indoor space.

For example, the second communication device may include: a power receiver that receives power for driving the second communication device from a power supply terminal disposed in the second space; and a wireless power supplier that wirelessly supplies power to the first communication device. The first communication device may include a wireless power receiver that wirelessly receives, from the wireless power supplier through the panel, a supply of power for driving the first communication device.

According to this aspect, power for driving the first communication device can be supplied wirelessly between the outdoor space and the indoor space through the panel. Accordingly, it is not necessary to provide, for example, a connector for the first communication device to receive a supply of power. Moreover, the first communication device can be disposed in a location in which there is no power supply equipment.

For example, the first communication interface may communicate using time division multiple access (TDMA), and the third communication interface may communicate using carrier sense multiple access (CSMA).

According to this aspect, the communication system can achieve communication having relatively little spontaneous variation in communication amount due to usage of TDMA in the outdoor space, and can allow communication having relatively high spontaneous variation in communication amount due to usage of CSMA in the indoor space. This enables the communication system to improve the network construction method.

For example, the first communication interface may be a wireless communication interface that connects to the first network, the first network being a wireless network, and the third communication interface may be a wireless communication interface that connects to the second network, the second network being a wireless network.

According to this aspect, the communication system can connect two wireless networks, namely the first network and the second network, together. This enables the communication system to improve the network construction method.

For example, the first communication interface may connect to the first network, the first network being a wireless multihop network, and the third communication interface may connect to the second network, the second network being a wireless multihop network.

According to this aspect, the communication system can connect two wireless multihop networks, namely the first network and the second network, together. This enables the communication system to improve the network construction method.

In order to overcome the problem described above, a control method according to one aspect of the present disclosure is a control method for a communication system including a first communication device and a second communication device. The control method includes: connecting to a first network by the first communication device; wirelessly communicating by the first communication device; connecting to a second network by the second communication device; and connecting to the first communication device by the second communication device via wireless communication.

This aspect also achieves the same advantageous effects as the communication system described above.

These general and specific aspects may be implemented using a system, a method, an integrated circuit, a computer program, or a computer-readable recording medium such as a CD-ROM, or any combination thereof.

Hereinafter, embodiments will be described in detail with reference to the drawings.

Each of the following embodiments describes a general or specific example. The numerical values, shapes, materials, elements, the arrangement and connection of the elements, the steps, the order of the steps, etc., shown in the following embodiments are mere examples, and therefore do not limit the scope of the present disclosure. Moreover, the following embodiments disclose a plurality of aspects from different viewpoints, and elements necessary for one aspect may differ from those for another aspect. Elements not recited in any one of the independent claims are described as optional elements.

Embodiment 1

Hereinafter, first, an example of a communication method that uses a plurality of antennas and can be applied to the communication system (to be described later) according to the present disclosure will be given. FIG. 1 illustrates an example of a configuration of a base station (or an access point, for instance) in the present embodiment.

101-1 denotes #1 information, 101-2 denotes #2 information, ..., and 101-M denotes #M information. 101-$i$ denotes #$i$ information, where i is an integer of 1 or greater and M or smaller. Note that M is an integer greater than or equal to 2. Note that not all the information items from #1 information to #M information are necessarily present.

Signal processor 102 receives inputs of #1 information 101-1, #2 information 101-2, ..., #M information 101-M, and control signal 159. Signal processor 102 performs signal processing based on information included in control signal 159 such as "information on a method of error correction coding (a coding rate, a code length (block length))", "information on a modulation method", "information on precoding", "a transmitting method (multiplexing method)", "whether to perform transmission for multicasting or transmission for unicasting (transmission for multicasting and transmission for unicasting may be carried out simultaneously)", "the number of transmission streams when multicasting is performed", and "a transmitting method performed when transmitting a modulated signal for multicasting (this point will be later described in detail)", and outputs signal 103-1 obtained as a result of the signal processing, signal 103-2 obtained as a result of the signal processing, . . . , and signal 103-M obtained as a result of the signal processing, that is, signal 103-$i$ obtained as a result of the signal processing. Note that not all the signals from signal #1 obtained as a result of the signal processing to signal #M obtained as a result of the signal processing are necessarily present. At this time, signal processor 102 performs error correction coding on #$i$ information 101-$i$, and thereafter maps resultant information according to a modulation method which has been set, thus obtaining a baseband signal.

Signal processor 102 collects baseband signals corresponding to information items, and precodes the baseband signals. For example, orthogonal frequency division multiplexing (OFDM) may be applied.

Wireless communication unit 104-1 receives inputs of signal 103-1 obtained as a result of the signal processing and control signal 159. Wireless communication unit 104-1 performs processing such as band limiting, frequency conversion, and amplification, based on control signal 159, and outputs transmission signal 105-1. Then, transmission signal 105-1 is output as a radio wave from antenna unit 106-1.

Similarly, wireless communication unit 104-2 receives inputs of signal 103-2 obtained as a result of the signal processing and control signal 159. Wireless communication unit 104-2 performs processing such as band limiting, frequency conversion, and amplification, based on control signal 159, and outputs transmission signal 105-2. Then, transmission signal 105-2 is output as a radio wave from antenna unit 106-2. A description of wireless communication unit 104-3 to wireless communication unit 104-(M−1) is omitted.

Wireless communication unit 104-M receives inputs of signal 103-M obtained as a result of the signal processing and control signal 159. Wireless communication unit 104-M performs processing such as band limiting, frequency conversion, and amplification, based on control signal 159, and outputs transmission signal 105-M. Then, transmission signal 105-M is output as a radio wave from antenna unit 106-M.

Note that the wireless communication units may not perform the above processing when a signal obtained as a result of the signal processing is not present.

Wireless communication unit group 153 receives inputs of received signal group 152 received by receive antenna group 151. Wireless communication unit group 153 performs processing such as frequency conversion and outputs baseband signal group 154.

Signal processor 155 receives an input of baseband signal group 154, and performs demodulation and error correction decoding, and thus also performs processing such as time synchronization, frequency synchronization, and channel estimation. At this time, signal processor 155 receives modulated signals transmitted by one or more terminals and performs processing, and thus obtains data transmitted by the one or more terminals and control information transmitted by the one or more terminals. Accordingly, signal processor 155 outputs data group 156 corresponding to the one or more terminals, and control information group 157 corresponding to the one or more terminals.

Setting unit 158 receives inputs of control information group 157 and setting signal 160. Setting unit 158 determines, based on control information group 157, "a method of error correction coding (a coding rate, a code length (block length))", "a modulation method", "a precoding method", "a transmitting method", "antenna settings", "whether to perform transmission for multicasting or transmission for unicasting (transmission for multicasting and transmission for unicasting may be carried out simultaneously)", "the number of transmission streams when multicasting is performed", and "a transmitting method performed when transmitting a modulated signal for multicasting", for instance, and outputs control signal 159 that includes such information items determined.

Antenna units 106-1, 106-2, . . . , and 106-M each receive an input of control signal 159. The operation at this time is to be described with reference to FIG. 2.

Figure 2:
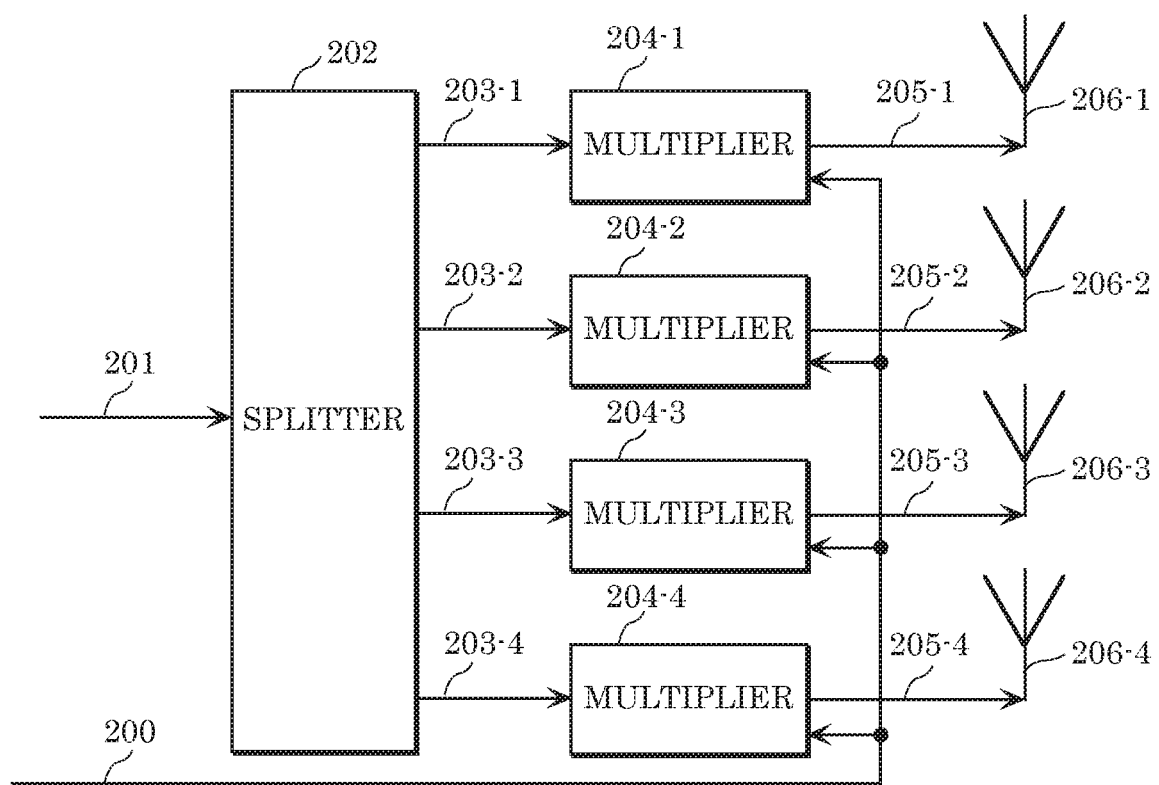
FIG. 2 is a diagram illustrating an example of a configuration of an antenna unit of the base station.

FIG. 2 illustrates an example of a configuration of antenna units 106-1, 106-2, . . . , and 106-M. Each antenna unit includes a plurality of antennas, as illustrated in FIG. 2. Note that FIG. 2 illustrates four antennas, yet each antenna unit may include at least two antennas. Note that the number of antennas is not limited to 4.

FIG. 2 illustrates a configuration of antenna unit 106-$i$, where $i$ is an integer of 1 or greater and M or smaller.

Splitter 202 receives an input of transmission signal 201 (corresponding to transmission signal 105-$i$ in FIG. 1). Splitter 202 splits transmission signal 201, and outputs signals 203-1, 203-2, 203-3, and 203-4.

Multiplier 204-1 receives inputs of signal 203-1 and control signal 200 (corresponding to control signal 159 in FIG. 1). Multiplier 204-1 multiplies signal 203-1 by coefficient W1, based on information on a multiplication coefficient included in control signal 200, and outputs signal 205-1 obtained as a result of the multiplication. Note that coefficient W1 can be defined by a complex number. Accordingly, W1 can also be a real number. Thus, if signal 203-1 is v1($t$), signal 205-1 obtained as a result of the multiplication can be expressed by W1×v1($t$) ($t$ denotes time). Then, signal 205-1 obtained as a result of the multiplication is output as a radio wave from antenna 206-1.

Similarly, multiplier 204-2 receives inputs of signal 203-2 and control signal 200. Multiplier 204-2 multiplies signal 203-2 by coefficient W2, based on information on a multiplication coefficient included in control signal 200, and outputs signal 205-2 obtained as a result of the multiplication. Note that coefficient W2 can be defined by a complex number. Accordingly, W2 can also be a real number. Thus, if signal 203-2 is v2(t), signal 205-2 obtained as a result of the multiplication can be expressed by W2×v2($t$) ($t$ denotes time). Then, signal 205-2 obtained as a result of the multiplication is output as a radio wave from antenna 206-2.

Multiplier 204-3 receives inputs of signal 203-3 and control signal 200. Multiplier 204-3 multiplies signal 203-3 by coefficient W3, based on information on a multiplication coefficient included in control signal 200, and outputs signal 205-3 obtained as a result of the multiplication. Note that coefficient W3 can be defined by a complex number. Accordingly, W3 can also be a real number. Thus, if signal 203-3 is expressed by v3(t), signal 205-3 obtained as a result of the multiplication can be expressed by W3×v3($t$) ($t$ denotes time). Then, signal 205-3 obtained as a result of the multiplication is output as a radio wave from antenna 206-3.

Multiplier 204-4 receives inputs of signal 203-4 and control signal 200. Multiplier 204-2 multiplies signal 203-4 by coefficient W4, based on information on a multiplication coefficient included in control signal 200, and outputs signal 205-4 obtained as a result of the multiplication. Note that coefficient W4 can be defined by a complex number. Accordingly, W4 can also be a real number. Thus, if signal 203-4 is v4(t), signal 205-4 obtained as a result of the multiplication can be expressed by W4×v4(t) (t denotes time). Then, signal 205-4 obtained as a result of the multiplication is output as a radio wave from antenna 206-4.

Note that the absolute value of W1, the absolute value of W2, the absolute value of W3, and the absolute value of W4 may be equal to one another.

Figure 3:
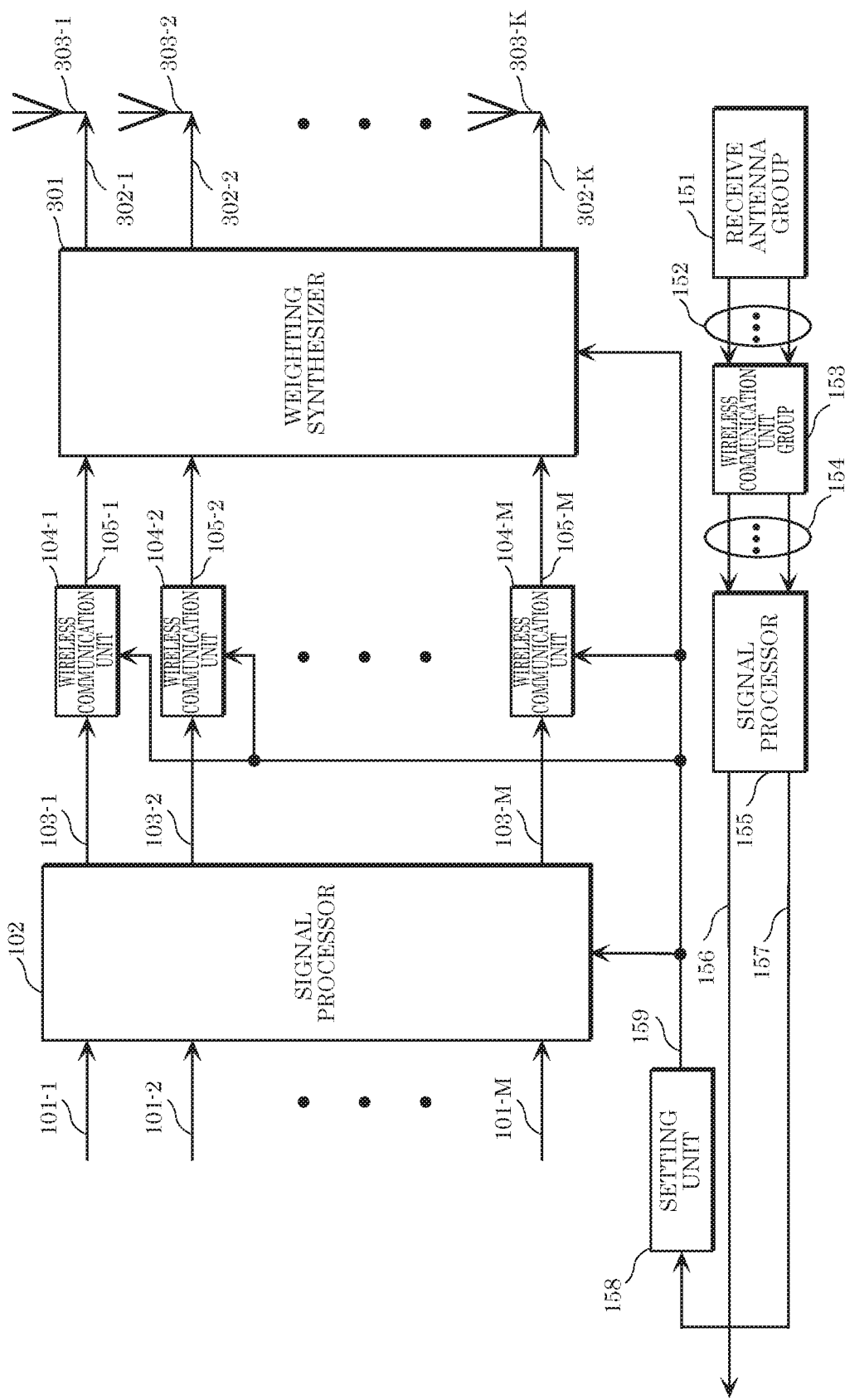
FIG. 3 is a diagram illustrating an example of a configuration of the base station.

FIG. 3 illustrates a configuration of the base station different from the configuration of the base station in FIG. 1 in the present embodiment. In FIG. 3, the same reference numerals are assigned to elements which operate in the same manner as those in FIG. 1, and a description thereof is omitted below.

Weighting synthesizer 301 receives inputs of modulated signal 105-1, modulated signal 105-2, . . . , modulated signal 105-M, and control signal 159. Then, weighting synthesizer 301 weighting synthesizes modulated signal 105-1, modulated signal 105-2, . . . , and modulated signal 105-M, based on information on weighting synthesis included in control signal 159, and outputs signals 302-1, 302-2, . . . , and 302-K obtained as a result of the weighting synthesis. K is an integer of 1 or greater. Signal 302-1 obtained as a result of the weighting synthesis is output as a radio wave from antenna 303-1, signal 302-2 obtained as a result of the weighting synthesis is output as a radio wave from antenna 303-2, . . . , and signal 302-K obtained as a result of the weighting synthesis is output as a radio wave from antenna 303-K.

Signal $y_i(t)$ 302-$i$ (i is an integer of 1 or greater and K or smaller) obtained as a result of the weighting synthesis is expressed as follows (t denotes time).

[Math. 1]

$$y_i(t) = A_{i1} \times x_1(t) + A_{i2} \times x_2(t) + \ldots + A_{iM} \times x_M(t) = \sum_{j=1}^{M} A_{ij} \times x_j(t)$$

Expression (1)

Note that in Expression (1), $A_{ij}$ is a value which can be defined by a complex number. Accordingly, $A_{ij}$ can also be a real number, and $x_j(t)$ is modulated signal 105-$j$, where j is an integer of 1 or greater and M or smaller.

Figure 4:
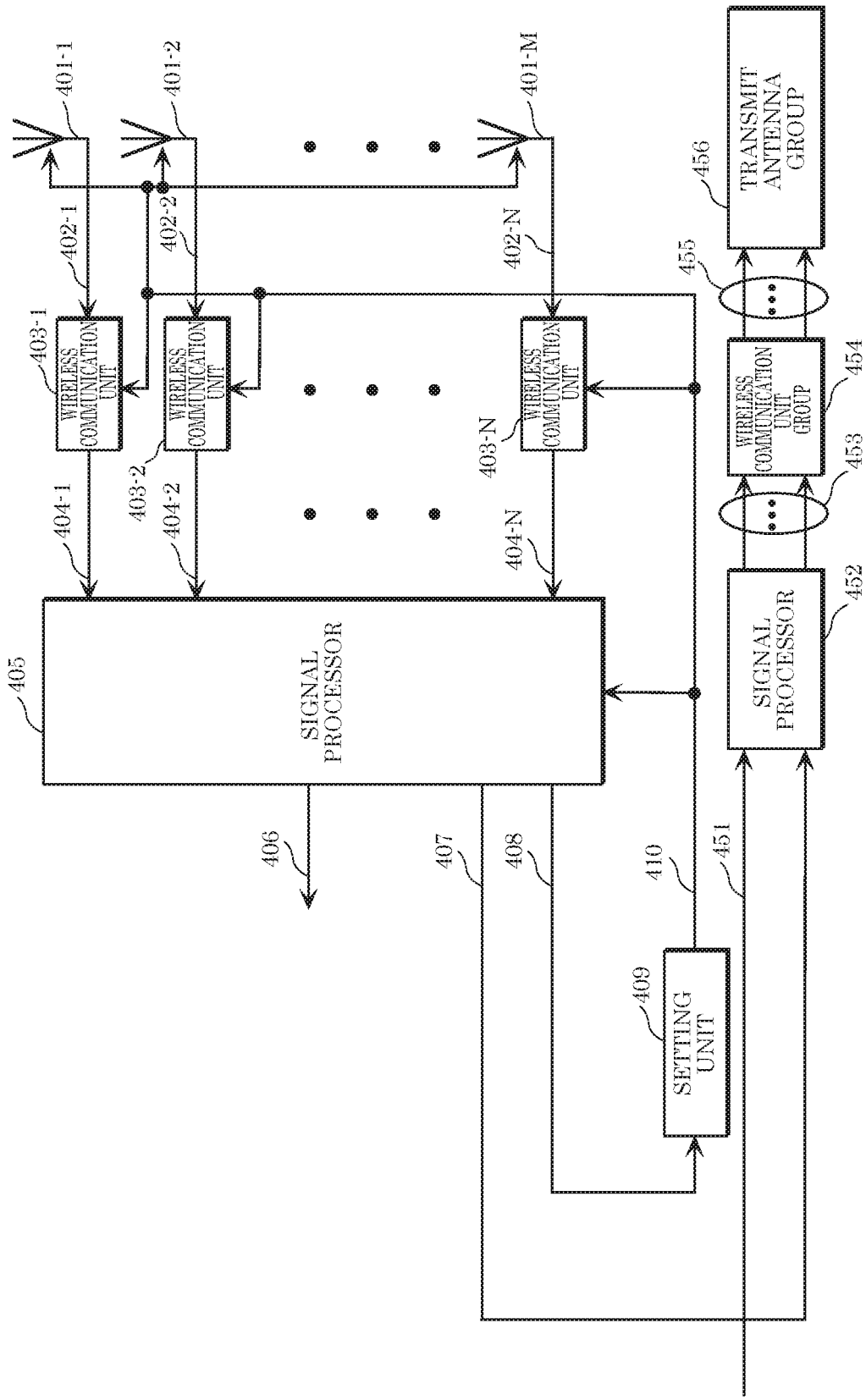
FIG. 4 is a diagram illustrating an example of a configuration of a terminal.

FIG. 4 illustrates an example of a configuration of a terminal. Antenna units 401-1, 401-2, . . . , and 401-N each receive an input of control signal 410, where N is an integer of 1 or greater.

Wireless communication unit 403-1 receives inputs of received signal 402-1 received by antenna unit 401-1 and control signal 410. Based on control signal 410, wireless communication unit 403-1 performs processing such as frequency conversion on received signal 402-1, and outputs baseband signal 404-1.

Similarly, wireless communication unit 403-2 receives inputs of received signal 402-2 received by antenna unit 401-2 and control signal 410. Based on control signal 410, wireless communication unit 403-2 performs processing such as frequency conversion on received signal 402-2, and outputs baseband signal 404-2. Note that a description of wireless communication units 403-3 to 403-(N−1) is omitted.

Wireless communication unit 403-N receives inputs of received signal 402-N received by antenna unit 401-N and control signal 410. Based on control signal 410, wireless communication unit 403-N performs processing such as frequency conversion on received signal 402-N, and outputs baseband signal 404-N.

Note that not all of wireless communication units 403-1, 403-2, . . . , and 403-N may operate. Accordingly, not all of baseband signals 404-1, 404-2, . . . , and 404-N are necessarily present.

Signal processor 405 receives inputs of baseband signals 404-1, 404-2, . . . , 404-N, and control signal 410. Based on control signal 410, signal processor 405 performs demodulation and error correction decoding processing, and outputs data 406, control information 407 for transmission, and control information 408. Specifically, signal processor 405 also performs processing such as time synchronization, frequency synchronization, and channel estimation.

Setting unit 409 receives an input of control information 408. Setting unit 409 performs setting with regard to a receiving method, and outputs control signal 410.

Signal processor 452 receives inputs of information 451 and control information 407 for transmission. Signal processor 452 performs processing such as error correction coding and mapping according to a modulation method which has been set, and outputs baseband signal group 453.

Wireless communication unit group 454 receives an input of baseband signal group 453. Wireless communication unit group 454 performs processing such as band limiting, frequency conversion, and amplification, and outputs transmission signal group 455. Transmission signal group 455 is output as a radio wave from transmit antenna group 456.

Figure 5:
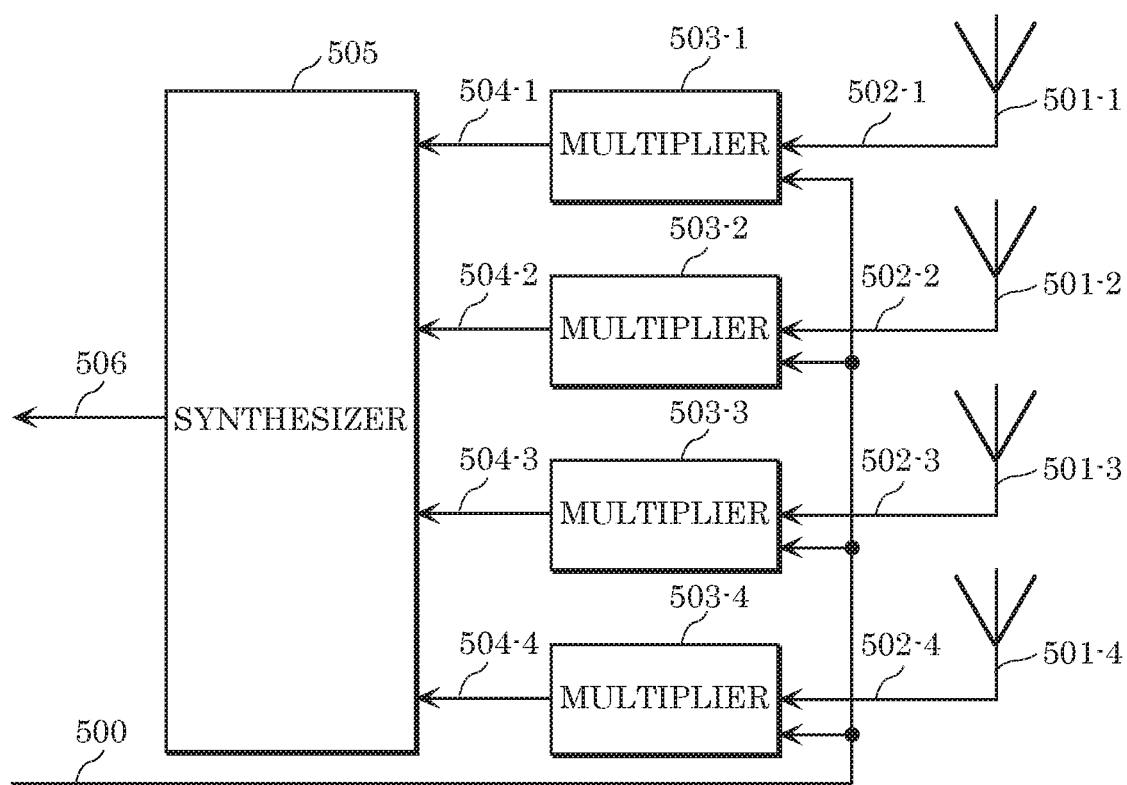
FIG. 5 is a diagram illustrating an example of a configuration of an antenna unit of a terminal.

FIG. 5 illustrates an example of a configuration of antenna units 401-1, 401-2, . . . , and 401-N. Each antenna unit includes a plurality of antennas, as illustrated in FIG. 5. Note that FIG. 5 illustrates four antennas, yet each antenna unit may include at least two antennas. Note that the number of antennas included in each antenna unit is not limited to 4.

FIG. 5 illustrates a configuration of antenna unit 401-$i$, where i is an integer of 1 or greater and N or smaller.

Multiplier 503-1 receives inputs of received signal 502-1 received by antenna 501-1 and control signal 500 (corresponding to control signal 410 in FIG. 4). Multiplier 503-1 multiplies received signal 502-1 by coefficient D1, based on information on a multiplication coefficient included in control signal 500, and outputs signal 504-1 obtained as a result of the multiplication. Note that coefficient D1 can be defined by a complex number. Accordingly, D1 can also be a real number. Thus, if received signal 502-1 is expressed by e1(t), signal 504-1 obtained as a result of the multiplication can be expressed by D1×e1(t) (t denotes time).

Similarly, multiplier 503-2 receives inputs of received signal 502-2 received by antenna 501-2 and control signal 500. Based on information on a multiplication coefficient included in control signal 500, multiplier 503-2 multiplies received signal 502-2 by coefficient D2, and outputs signal 504-2 obtained as a result of the multiplication. Note that coefficient D2 can be defined by a complex number. Accordingly, D2 can also be a real number. Thus, if received signal 502-2 is expressed by e2(t), signal 504-2 obtained as a result of the multiplication can be expressed by D2×e2(t) (t denotes time).

Multiplier 503-3 receives inputs of received signal 502-3 received by antenna 501-3 and control signal 500. Based on information on a multiplication coefficient included in control signal 500, multiplier 503-3 multiplies received signal 502-3 by coefficient D3, and outputs signal 504-3 obtained as a result of the multiplication. Note that coefficient D3 can be defined by a complex number. Accordingly, D3 can also be a real number. Thus, if received signal 502-3 is expressed by e3(t), signal 504-3 obtained as a result of the multiplication can be expressed by D3×e3(t) (t denotes time).

Multiplier 503-4 receives inputs of received signal 502-4 received by antenna 501-4 and control signal 500. Based on information on a multiplication coefficient included in control signal 500, multiplier 503-4 multiplies received signal 502-4 by coefficient D4, and outputs signal 504-4 obtained as a result of the multiplication. Note that coefficient D4 can be defined by a complex number. Accordingly, D4 can also be a real number. Thus, if received signal 502-4 is expressed by e4 (t), signal 504-4 obtained as a result of the multiplication can be expressed by D4×e4(t) (t denotes time).

Synthesizer 505 receives inputs of signals 504-1, 504-2, 504-3, and 504-4 obtained as a result of the multiplication. Synthesizer 505 adds signals 504-1, 504-2, 504-3, and 504-4 obtained as a result of the multiplication, and outputs synthesized signal 506 (corresponding to received signal 402-*i* in FIG. 4). Thus, synthesized signal 506 is expressed by D1×e1(t)+D2×e2(t)+D3×e3(t)+D4×e4(t).

Figure 6:
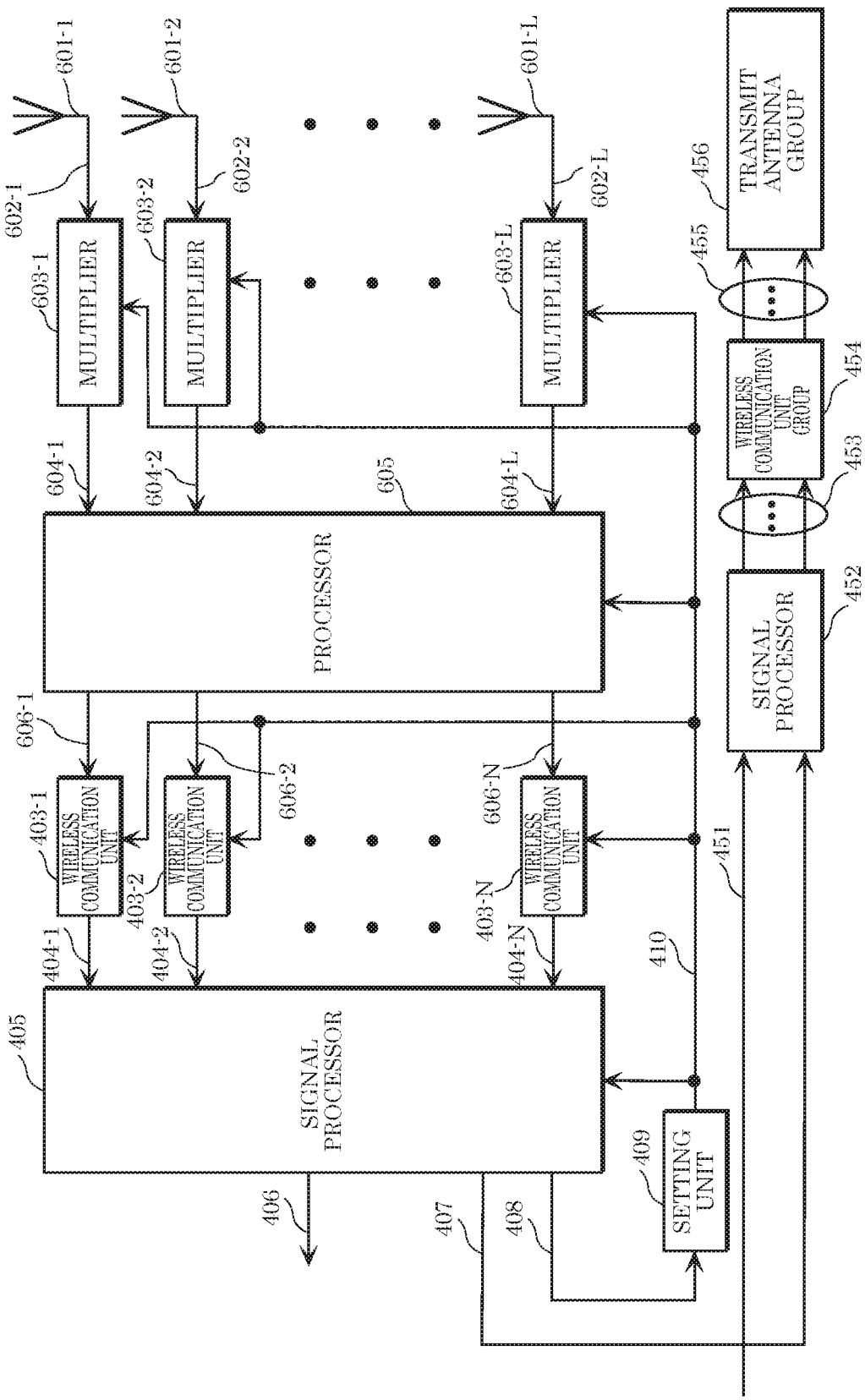
FIG. 6 is a diagram illustrating an example of a configuration of a terminal.

FIG. 6 illustrates a configuration of a terminal different from the configuration of the terminal in FIG. 4 in the present embodiment. Elements which operate in the same manner as those in FIG. 4 are assigned the same reference numerals in FIG. 6, and a description thereof is omitted below.

Multiplier 603-1 receives inputs of received signal 602-1 received by antenna 601-1 and control signal 410. Based on information on a multiplication coefficient included in control signal 410, multiplier 603-1 multiplies received signal 602-1 by coefficient G1, and outputs signal 604-1 obtained as a result of the multiplication. Note that coefficient G1 can be defined by a complex number. Accordingly, G1 can also be a real number. Thus, if received signal 602-1 is expressed by c1(t), signal 604-1 obtained as a result of the multiplication can be expressed by G1×c1(t) (t denotes time).

Similarly, multiplier 603-2 receives inputs of received signal 602-2 received by antenna 601-2 and control signal 410. Based on information on a multiplication coefficient included in control signal 410, multiplier 603-2 multiplies received signal 602-2 by coefficient G2, and outputs signal 604-2 obtained as a result of the multiplication. Note that coefficient G2 can be defined by a complex number. Accordingly, G2 can also be a real number. Thus, if received signal 602-2 is expressed by c2(t), signal 604-2 obtained as a result of the multiplication can be expressed by G2×c2(t) (t denotes time). A description of multiplier 603-3 to multiplier 603-(L−1) is omitted.

Multiplier 603-L receives inputs of received signal 602-L received by antenna 601-L and control signal 410. Based on information on a multiplication coefficient included in control signal 410, multiplier 603-L multiplies received signal 602-L by coefficient GL, and outputs signal 604-L obtained as a result of the multiplication. Note that coefficient GL can be defined by a complex number. Accordingly, GL can also be a real number. Thus, if received signal 602-L is expressed by cL(t), signal 604-L obtained as a result of the multiplication can be expressed by GL×cL(t) (t denotes time).

Accordingly, multiplier 603-*i* receives inputs of received signal 602-*i* received by antenna 601-*i* and control signal 410. Based on information on a multiplication coefficient included in control signal 410, multiplier 603-*i* multiplies received signal 602-*i* by coefficient Gi, and outputs signal 604-*i* obtained as a result of the multiplication. Note that coefficient Gi can be defined by a complex number. Accordingly, Gi can also be a real number. Thus, if received signal 602-*i* is expressed by ci(t), signal 604-*i* obtained as a result of the multiplication can be expressed by Gi×ci(t) (t denotes time). Note that i is an integer of 1 or greater and L or smaller, and L is an integer of 2 or greater.

Processor 605 receives inputs of signals 604-1, 604-2, ..., and 604-L obtained as a result of the multiplication and control signal 410. Based on control signal 410, processor 605 performs signal processing, and outputs signals 606-1, 606-2, ..., and 606-N obtained as a result of the signal processing, where N is an integer of 2 or greater. At this time, signal 604-*i* obtained as a result of the multiplication is expressed by $p_i(t)$ (i is an integer of 1 or greater and L or smaller). Then, signal 606-*j* ($r_j(t)$) as a result of the processing is expressed as follows (j is an integer of 1 or greater and N or smaller).

[Math. 2]

$$r_j(t) = B_{j1} \times p_1(t) + B_{j2} \times p_2(t) + \ldots + B_{jL} \times p_L(t) = \sum_{i=1}^{L} B_{ji} \times p_i(t)$$ Expression (2)

Note that in Expression (2), $B_{ji}$ is a value which can be defined by a complex number. Accordingly, $B_{ji}$ can also be a real number.

Figure 7:
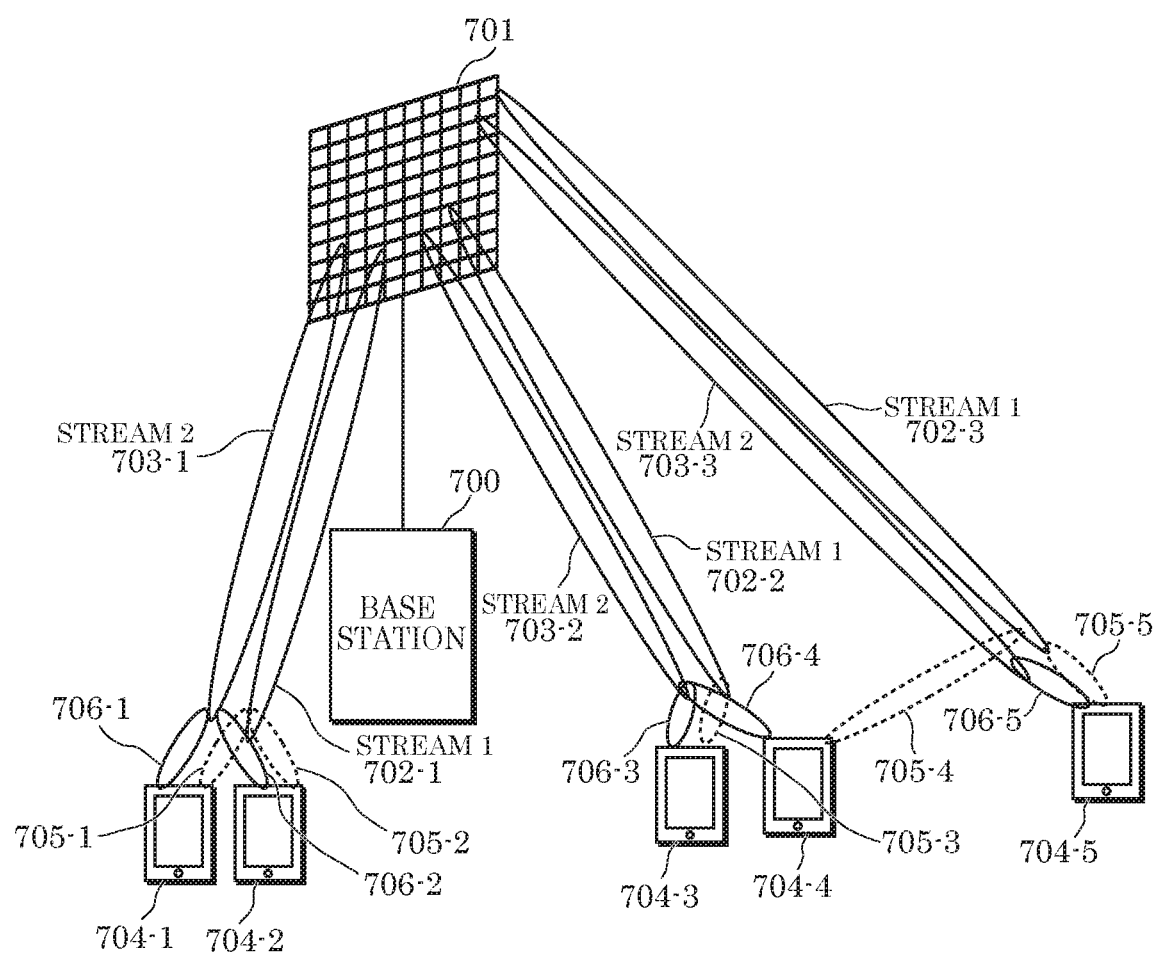
FIG. 7 is a diagram illustrating an example of a state of communication between the base station and terminals.

FIG. 7 illustrates an example of a state of communication between the base station and terminals. Note that the base station may be referred to as an access point or a broadcast station, for instance.

Base station 700 includes a plurality of antennas, and transmits a plurality of transmission signals from antenna 701 for transmission. At this time, base station 700 has a configuration as illustrated in FIG. 1 or 3, for example, and performs transmission beamforming (directivity control) by signal processor 102 (and/or weighting synthesizer 301) performing precoding (weighting synthesis).

FIG. 7 illustrates transmission beam 702-1 for transmitting data of stream 1, transmission beam 702-2 for transmitting data of stream 1, and transmission beam 702-3 for transmitting data of stream 1.

FIG. 7 illustrates transmission beam 703-1 for transmitting data of stream 2, transmission beam 703-2 for transmitting data of stream 2, and transmission beam 703-3 for transmitting data of stream 2.

Note that in FIG. 7, the number of transmission beams for transmitting data of stream 1 is 3 and the number of transmission beams for transmitting data of stream 2 is 3, yet the present disclosure is not limited to such numbers. The number of transmission beams for transmitting data of stream 1 may be at least two, and the number of transmission beams for transmitting data of stream 2 may be at least two.

FIG. 7 includes terminals 704-1, 704-2, 704-3, 704-4, and 704-5, and the terminals have the configuration same as the configuration of the terminals illustrated in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 702-1 for transmitting data of stream 1, and receiving directivity 706-1 allows terminal 704-1 to receive and demodulate transmission beam 703-1 for transmitting data of stream 2.

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 702-1 for transmitting data of stream 1, and receiving directivity 706-2 allows terminal 704-2 to receive and demodulate transmission beam 703-1 for transmitting data of stream 2.

Terminal 704-3 performs directivity control for receiving, via "signal processor 405" and/or "antennas 401-1 to 401-N" and/or "multipliers 603-1 to 603-L and processor 605", and forms receiving directivity 705-3 and receiving directivity 706-3.

Receiving directivity 705-3 allows terminal 704-3 to receive and demodulate transmission beam 702-2 for transmitting data of stream 1, and receiving directivity 706-3 allows terminal 704-3 to receive and demodulate transmission beam 703-2 for transmitting data of stream 2.

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 702-3 for transmitting data of stream 1, and receiving directivity 706-4 allows terminal 704-4 to receive and demodulate transmission beam 703-2 for transmitting data of stream 2.

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 702-3 for transmitting data of stream 1, and receiving directivity 706-5 allows terminal 704-5 to receive and demodulate transmission beam 703-2 for transmitting data of stream 2.

In FIG. 7, a terminal selects, according to a spatial position, at least one transmission beam from among transmission beams 702-1, 702-2, and 702-3 for transmitting data of stream 1, and can obtain data of stream 1 with high quality by directing a receiving directivity to the selected transmission beam(s). Furthermore, the terminal selects, according to a spatial position, at least one transmission beam from among transmission beams 703-1, 703-2, and 703-3 for transmitting data of stream 2, and can obtain data of stream 2 with high quality by directing a receiving directivity to the selected transmission beam(s).

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band) or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 7, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 7, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 7, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data. A configuration of a control information symbol will be later described in detail.

Figure 8:
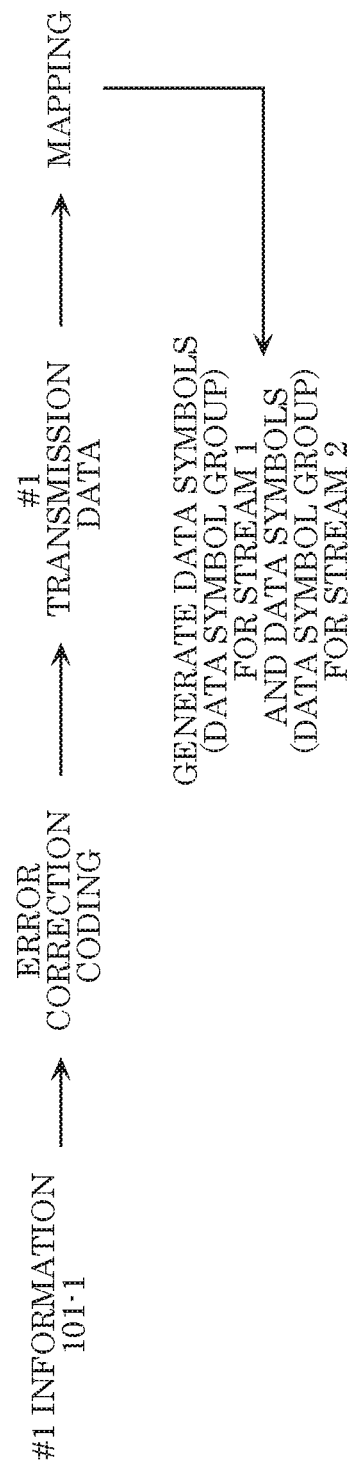
FIG. 8 is a diagram for describing a relation of a plurality of streams.

FIG. 8 is a drawing for describing a relation between #i information 101-i in FIGS. 1 and 3 and "stream 1" and "stream 2" described with reference to FIG. 7. For example, processing such as error correction coding is performed on #1 information 101-1, and data obtained as a result of the error correction coding is obtained. The data obtained as a result of the error correction coding is named #1 transmission data. Data symbols are obtained by mapping #1 transmission data. By separating data symbols into data symbols for stream 1 and data symbols for stream 2, data symbols (data symbol group) for stream 1 and data symbols (data symbol group) for stream 2 are obtained. The symbol group for stream 1 includes data symbols (data symbol group) for stream 1, and is transmitted from the base station in FIGS. 1 and 3. The symbol group for stream 2 includes data symbols (data symbol group) for stream 2, and is transmitted from the base station in FIGS. 1 and 3.

Figure 9:
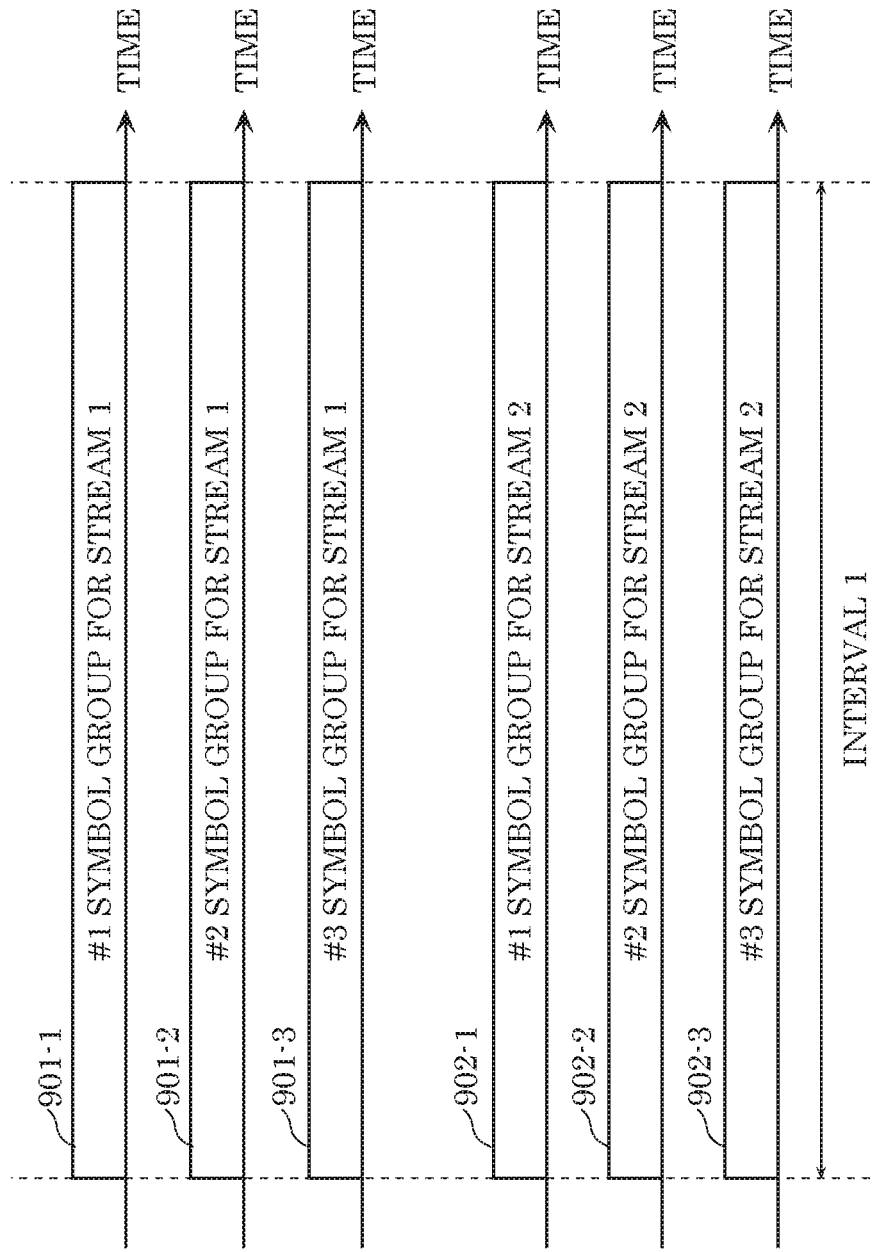
FIG. 9 is a diagram illustrating an example of a frame configuration.

FIG. 9 illustrates an example of a frame configuration when the horizontal axis indicates time.

1 symbol group 901-1 for stream 1 in FIG. 9 is a symbol group for transmission beam 702-1 for transmitting data of stream 1 in FIG. 7.

2 symbol group 901-2 for stream 1 in FIG. 9 is a symbol group for transmission beam 702-2 for transmitting data of stream 1 in FIG. 7.

3 symbol group 901-3 for stream 1 in FIG. 9 is a symbol group for transmission beam 702-3 for transmitting data of stream 1 in FIG. 7.

1 symbol group 902-1 for stream 2 in FIG. 9 is a symbol group for transmission beam 703-1 for transmitting data of stream 2 in FIG. 7.

2 symbol group 902-2 for stream 2 in FIG. 9 is a symbol group for transmission beam 703-2 for transmitting data of stream 2 in FIG. 7.

3 symbol group 902-3 for stream 2 in FIG. 9 is a symbol group for transmission beam 703-3 for transmitting data of stream 2 in FIG. 7.

1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are present in time interval 1, for example.

As described above, #1 symbol group 901-1 for stream 1 and #2 symbol group 902-1 for stream 2 are transmitted using the same frequency (the same frequency band), #2 symbol group 901-2 for stream 1 and #2 symbol group 902-2 for stream 2 are transmitted using the same frequency (the same frequency band), and #3 symbol group 901-3 for stream 1 and #3 symbol group 902-3 for stream 2 are transmitted using the same frequency (the same frequency band).

For example, "data symbol group A for stream 1" and "data symbol group A for stream 2" are generated from information, following the procedure in FIG. 8. The symbol group, namely "data symbol group A-1 for stream 1" which includes the same symbols as symbols included in "data symbol group A for stream 1", the symbol group, namely "data symbol group A-2 for stream 1" which includes the same symbols as symbols included in "data symbol group A for stream 1", and the symbol group, namely "data symbol group A-3 for stream 1" which includes the same symbols as symbols included in "data symbol group A for stream 1" are prepared.

Thus, the symbols included in "data symbol group A-1 for stream 1", the symbols included in "data symbol group A-2 for stream 1", and the symbols included in "data symbol group A-3 for stream 1" are the same.

At this time, #1 symbol group 901-1 for stream 1 in FIG. 9 includes "data symbol group A-1 for stream 1", #2 symbol group 901-2 for stream 1 in FIG. 9 includes "data symbol group A-2 for stream 1", and #3 symbol group 901-3 for stream 1 in FIG. 9 includes "data symbol group A-3 for stream 1". Accordingly, #1 symbol group 901-1 for stream 1, #2 symbol group 901-2 for stream 1, and #3 symbol group 901-3 for stream 1 include the same data symbol group.

The symbol group, namely "data symbol group A-1 for stream 2" which includes the same symbols as symbols included in "data symbol group A for stream 2", the symbol group, namely "data symbol group A-2 for stream 2" which includes the same symbols as symbols included in "data symbol group A for stream 2", and the symbol group, namely "data symbol group A-3 for stream 2" which includes the same symbols as symbols included in "data symbol group A for stream 2" are prepared.

Accordingly, the symbols included in "data symbol group A-1 for stream 2", the symbols included in "data symbol group A-2 for stream 2", and the symbols included in "data symbol group A-3 for stream 2" are the same.

At this time, #1 symbol group 902-1 for stream 2 in FIG. 9 includes "data symbol group A-1 for stream 2", #2 symbol group 902-2 for stream 2 in FIG. 9 includes "data symbol group A-2 for stream 2", and #3 symbol group 902-3 for stream 2 in FIG. 9 includes "data symbol group A-3 for stream 2". Accordingly, #1 symbol group 902-1 for stream 2, #2 symbol group 902-2 for stream 2, and #3 symbol group 902-3 for stream 2 include the same data symbol group.

Figure 10:
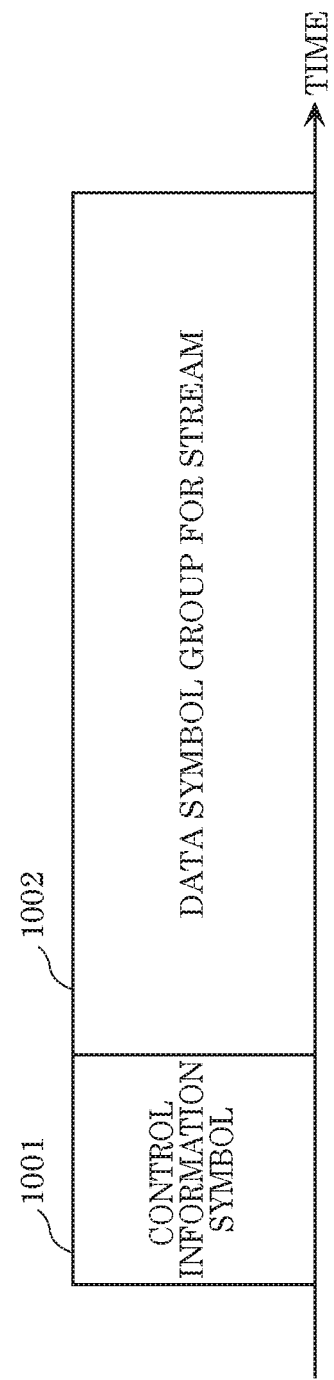
FIG. 10 is a diagram illustrating an example of a frame configuration.

FIG. 10 illustrates an example of a frame configuration of "symbol group #Y for stream X" (X=1, 2; Y=1, 2, 3) described with reference to FIG. 9. In FIG. 10, while the horizontal axis indicates time, 1001 denotes a control information symbol and 1002 denotes a data symbol group for a stream. At this time, data symbol group 1002 for the stream includes symbols for transmitting "data symbol group A for stream 1" or "data symbol group A for stream 2" described with reference to FIG. 9.

Note that a multi-carrier method such as the orthogonal frequency division multiplexing (OFDM) method may be used for the frame configuration in FIG. 10, and symbols may be present in the direction of the frequency axis, in this case. The symbols may include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 10, and control information symbol 1001 and data symbol group 1002 for a stream may be arranged in any manner. Note that the reference symbol may be referred to as a preamble and a pilot symbol.

The following describes a configuration of control information symbol 1001.

Figure 11:
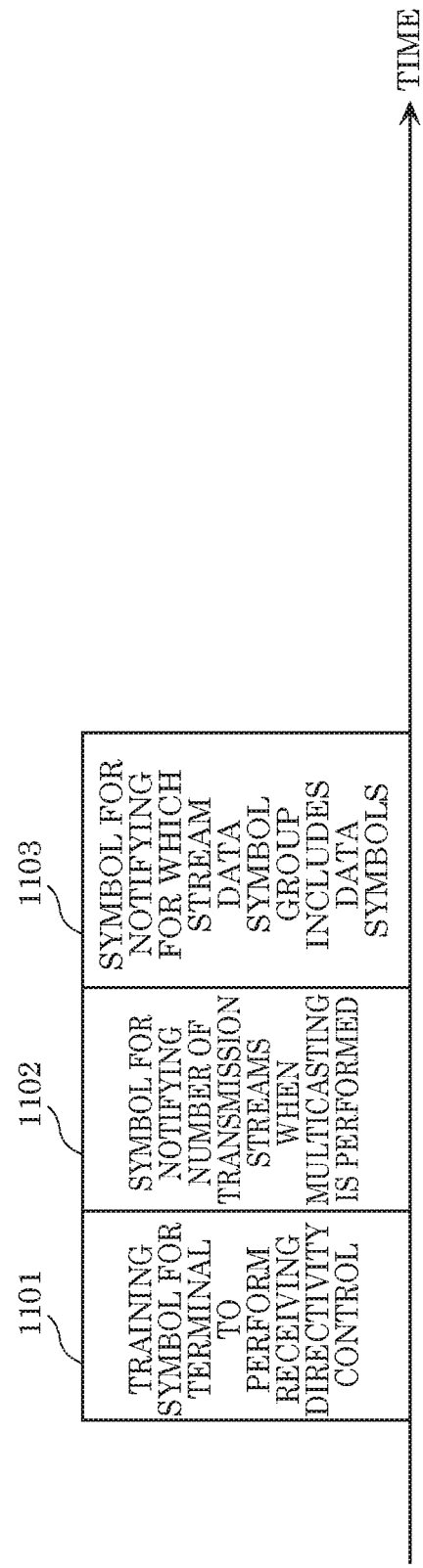
FIG. 11 is a diagram illustrating an example of a symbol configuration.

FIG. 11 illustrates an example of a configuration of symbols transmitted as a control information symbol in FIG. 10, and the horizontal axis indicates time. In FIG. 11, a terminal receives "training symbol for a terminal to perform receiving directivity control" 1101 to determine a signal processing method for the directivity control for receiving, which is implemented by "signal processor 405" and/or "antennas 401-1 to 401-N" and/or "multipliers 603-1 to 603-L and processor 605".

A terminal receives "symbol for notifying the number of transmission streams when multicasting is performed" 1102 so that the terminal is informed of the number of streams to be obtained.

A terminal receives "symbol for notifying for which stream data symbols are" 1103 so that the terminal can be informed which stream has been successfully received among the streams which the base station is transmitting.

A description of an example with regard to the above is to be given.

The case where the base station transmits streams using transmission beams as illustrated in FIG. 7 is to be described. Specific information indicated by a control information symbol in #1 symbol group 901-1 for stream 1 in FIG. 9 is to be described.

In the case of FIG. 7, since the base station is transmitting "stream 1" and "stream 2", information indicated by "symbol for notifying the number of transmission streams when multicasting is performed" 1102 indicates "2".

1 symbol group 901-1 for stream 1 in FIG. 9 is for transmitting data symbols for stream 1, and thus information indicated by "symbol for notifying for which stream data symbols are" 1103 indicates "stream 1".

The case where, for example, a terminal receives #1 symbol group 901-1 for stream 1 in FIG. 9 is to be described. At this time, the terminal becomes aware that "the number of transmission streams is 2" from "symbol for notifying the number of transmission streams when multicasting is performed" 1102, and that the terminal has obtained "data symbols for stream 1" from "symbol 1103 for notifying for which stream data symbol group includes data symbols".

After that, since the terminal becomes aware that "the number of transmission streams is 2" and the obtained data symbols are "data symbols for stream 1", the terminal is aware that the terminal is to obtain "data symbols for stream 2". Thus, the terminal can start operation for searching for a symbol group for stream 2. For example, the terminal searches for one of transmission beams for transmitting #1 symbol group 902-1 for stream 2, #2 symbol group 902-2 for stream 2, and #3 symbol group 902-3 for stream 2 in FIG. 9.

Then, the terminal obtains one of transmission beams for transmitting #1 symbol group 902-1 for stream 2, #2 symbol group 902-2 for stream 2, and #3 symbol group 902-3 for stream 2, to obtain data symbols for both streams 1 and 2.

Configuring control information symbols in this manner yields an advantageous effect that a terminal can obtain data symbols precisely.

As described above, the base station transmits data symbols using a plurality of transmission beams, and a terminal selectively receives a transmission beam with good quality among the plurality of transmission beams in multicast transmission and broadcast data transmission, and furthermore, transmission directivity control and receiving directivity control have been performed on modulated signals transmitted by the base station, thus achieving advantageous effects of increasing an area where high data receiving quality is achieved.

In the above description, a terminal performs receiving directivity control, yet advantageous effects can be obtained as mentioned above without the terminal performing receiving directivity control.

Note that the modulating method for "data symbol group for a stream" 1002 in FIG. 10 may be any modulating method, and a mapping method according to the modulating method for "data symbol group for a stream" 1002 may be changed for each symbol. Accordingly, a phase of a constellation may be changed for each symbol on an in-phase I-quadrature Q plane after mapping.

Figure 12:
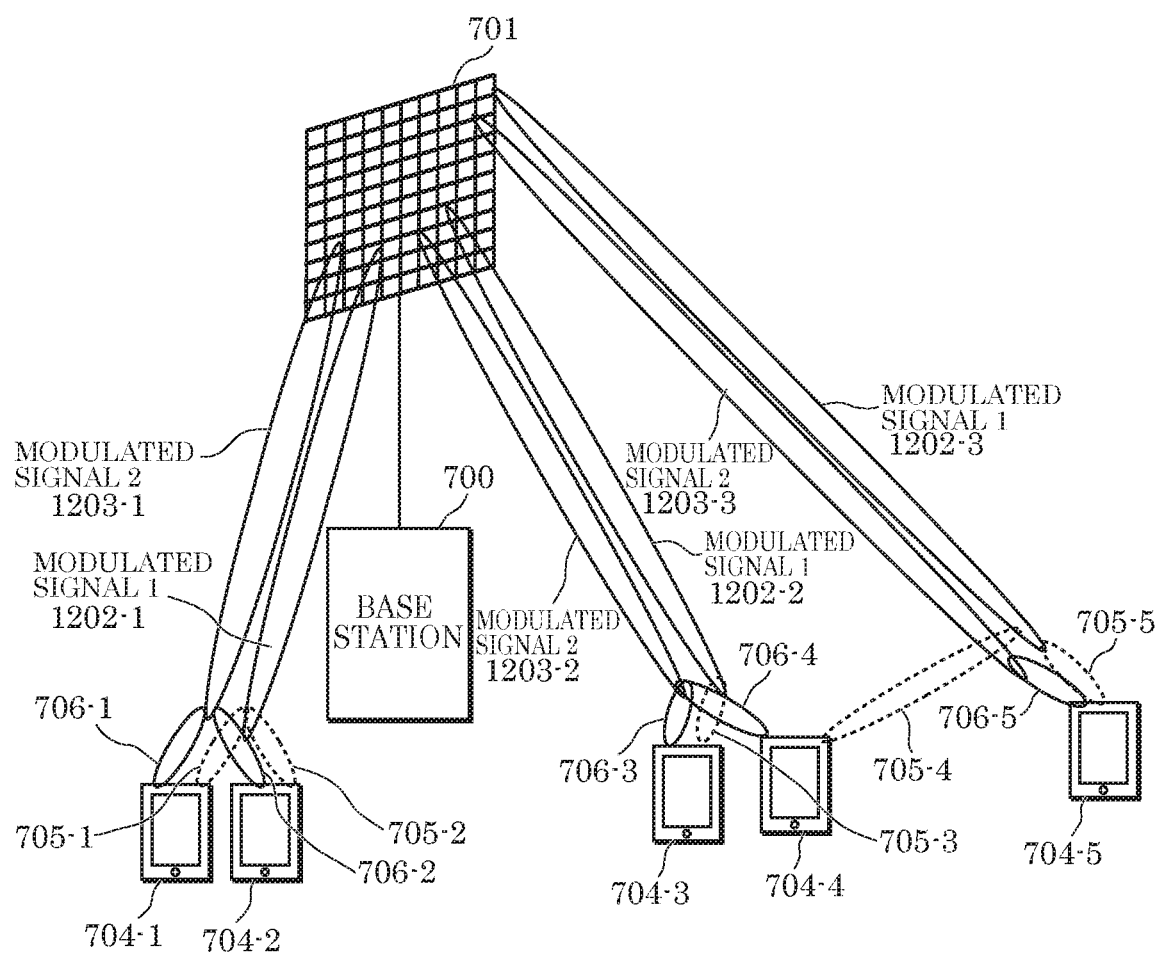
FIG. 12 is a diagram illustrating an example of a state of communication between the base station and terminals.

FIG. 12 illustrates an example of a state of communication between a base station and terminals different from the example in FIG. 7. Note that elements which operate in the same manner as those in FIG. 7 are assigned the same reference numerals in FIG. 12.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

FIG. 12 illustrates transmission beam 1202-1 for transmitting "modulated signal 1", transmission beam 1202-2 for transmitting "modulated signal 1", and transmission beam 1202-3 for transmitting "modulated signal 1".

FIG. 12 illustrates transmission beam 1203-1 for transmitting "modulated signal 2", transmission beam 1203-2 for transmitting "modulated signal 2", and transmission beam 1203-3 for transmitting "modulated signal 2".

Note that although in FIG. 12, the number of transmission beams for transmitting "modulated signal 1" is 3 and the number of transmission beams for transmitting "modulated signal 2" is 3, the present disclosure is not limited to such numbers, and the number of transmission beams for transmitting "modulated signal 1" may be at least 2 and the number of transmission beams for transmitting "modulated signal 2" may be at least 2. A detailed description of "modulated signal 1" and "modulated signal 2" will be given later.

FIG. 12 includes terminals 704-1, 704-2, 704-3, 704-4, and 704-5, and the terminals have the same configuration as those in FIGS. 4 and 5, for example.

For example, terminal 704-1 performs directivity control for receiving, via "signal processor 405" and/or "antennas 401-1 to 401-N" and/or "multipliers 603-1 to 603-L and processor 605", and forms receiving directivity 705-1 and receiving directivity 706-1. Receiving directivity 705-1 allows terminal 704-1 to receive and demodulate transmission beam 1202-1 for transmitting "modulated signal 1", and receiving directivity 706-1 allows terminal 704-1 to receive and demodulate transmission beam 1203-1 for transmitting "modulated signal 2".

Similarly, terminal 704-2 performs directivity control for receiving, via "signal processor 405" and/or "antennas 401-1 to 401-N" and/or "multipliers 603-1 to 603-L and processor 605", and forms receiving directivity 705-2 and receiving directivity 706-2. Receiving directivity 705-2 allows terminal 704-2 to receive and demodulate transmission beam 1202-1 for transmitting "modulated signal 1", and receiving directivity 706-2 allows terminal 704-2 to receive and demodulate transmission beam 1203-1 for transmitting "modulated signal 2".

Terminal 704-3 performs directivity control for receiving, via "signal processor 405" and/or "antennas 401-1 to 401-N" and/or "multipliers 603-1 to 603-L and processor 605", and forms receiving directivity 705-3 and receiving directivity 706-3.

Receiving directivity 705-3 allows terminal 704-3 to receive and demodulate transmission beam 1202-2 for transmitting "modulated signal 1", and receiving directivity 706-3 allows terminal 704-3 to receive and demodulate transmission beam 1203-2 for transmitting "modulated signal 2".

Terminal 704-4 performs directivity control for receiving, via "signal processor 405" and/or "antennas 401-1 to 401-N" and/or "multipliers 603-1 to 603-L and processor 605", and forms receiving directivity 705-4 and receiving directivity 706-4. Receiving directivity 705-4 allows terminal 704-4 to receive and demodulate transmission beam 1202-3 for transmitting "modulated signal 1", and receiving directivity 706-4 allows terminal 704-4 to receive and demodulate transmission beam 1203-2 for transmitting "modulated signal 2".

Terminal 704-5 performs directivity control for receiving, via "signal processor 405" and/or "antennas 401-1 to 401-N" and/or "multipliers 603-1 to 603-L and processor 605", and forms receiving directivity 705-5 and receiving directivity 706-5. Receiving directivity 705-5 allows terminal 704-5 to receive and demodulate transmission beam 1202-3 for transmitting "modulated signal 1", and receiving directivity 706-5 allows terminal 704-5 to receive and demodulate transmission beam 1203-3 for transmitting "modulated signal 2".

Distinguishing points in FIG. 12 are that a terminal selects, based on a spatial position, at least one transmission beam from among transmission beams 1202-1, 1202-2, and 1202-3 for transmitting "modulated signal 1", and can obtain "modulated signal 1" with high quality by directing a receiving directivity to the selected transmission beam(s). Further, the terminal selects, based on a spatial position, at least one transmission beam from among transmission beams 1203-1, 1203-2, and 1203-3 for transmitting "modulated signal 2", and can obtain "modulated signal 2" with high quality by directing a receiving directivity to the selected transmission beam(s).

Note that base station 700 transmits transmission beam 1202-1 for transmitting "modulated signal 1" and transmission beam 1203-1 for transmitting "modulated signal 2" using the same frequency (the same frequency band) at the same time. Then, base station 700 transmits transmission beam 1202-2 for transmitting "modulated signal 1" and transmission beam 1203-2 for transmitting "modulated signal 2" using the same frequency (the same frequency band) at the same time. Further, base station 700 transmits transmission beam 1202-3 for transmitting "modulated signal 1" and transmission beam 1203-3 for transmitting "modulated signal 2" using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

A description of operation of setting unit 158 of the base station in FIGS. 1 and 3 is to be given.

Setting unit 158 receives an input of setting signal 160. Setting signal 160 includes information with regard to "whether to perform transmission for multicasting or transmission for unicasting", and if the base station performs transmission as illustrated in FIG. 12, information indicating "to perform transmission for multicasting" is input to setting unit 158 according to setting signal 160.

Setting signal 160 includes information with regard to "the number of transmission modulated signals when multicasting is performed" and if the base station performs transmission as illustrated in FIG. 12, information indicating that "the number of transmission modulated signals is 2" is input to setting unit 158 according to setting signal 160.

Setting signal 160 may include information with regard to "how many transmission beams are to be used to transmit each modulated signal". If the base station performs transmission as illustrated in FIG. 12, information indicating that "the number of transmission beams for transmitting modulated signal 1 is 3 and the number of transmission beams for transmitting modulated signal 2 is 3" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission modulated signals when multicasting is performed", information with regard to "how many transmission beams are to be used to transmit each modulated signal". Accordingly, a terminal can appropriately receive data. A configuration of a control information symbol will be later described in detail.

Figure 13:
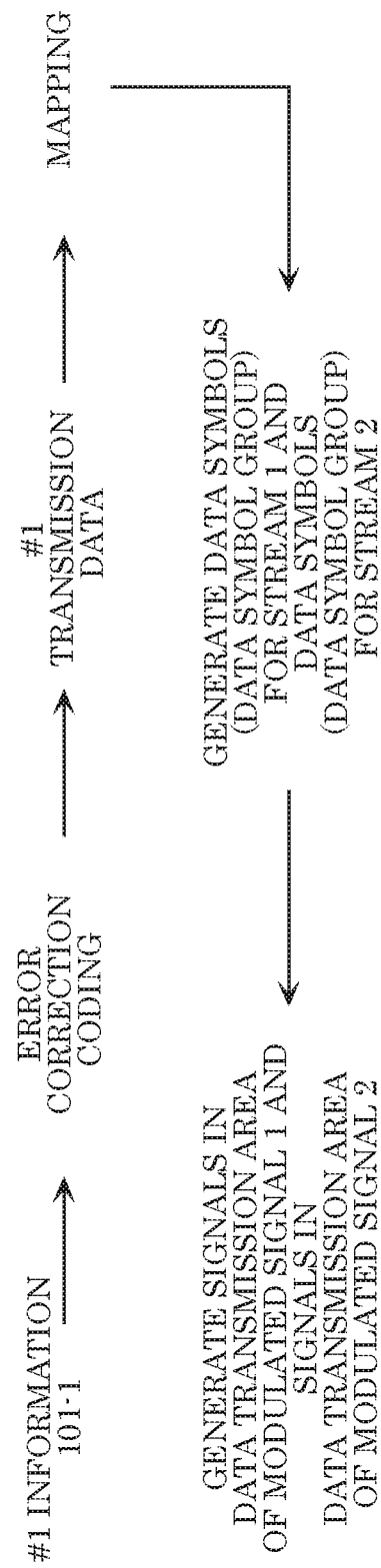
FIG. 13 is a diagram illustrating a relation of a plurality of modulated signals.

FIG. 13 is a drawing for describing a relation between #i information 101-i in FIGS. 1 and 3 and "modulated signal 1" and "modulated signal 2" described with reference to FIG. 12.

For example, #1 information 101-1 is subjected to error correction coding, for instance, and data obtained as a result of the error correction coding is obtained. The data obtained as a result of the error correction coding is named #1 transmission data. Data symbols are obtained by mapping #1 transmission data. The data symbols are separated into data symbols for stream 1 and data symbols for stream 2, so that data symbols (data symbol group) for stream 1 and data symbols (data symbol group) for stream 2 are obtained. At this time, a data symbol having symbol number i for stream 1 is s1($i$) and a data symbol having symbol number i for stream 2 is s2($i$). Then, "modulated signal 1" tx1($i$) having symbol number i is expressed as follows, for example.

[Math. 3]

$$tx1(i)=\alpha(i)\times s1(i)+\beta(i)\times s2(i) \quad \text{Expression (3)}$$

Then, "modulated signal 2" tx2($i$) having symbol number i is expressed as follows, for example.

[Math. 4]

$$tx2(i)=\gamma(i)\times s1(i)+\delta(i)\times s2(i) \quad \text{Expression (4)}$$

Note that in Expressions (3) and (4), $\alpha(i)$ can be defined by a complex number (and thus may be a real number), $\beta(i)$ can be defined by a complex number (and thus may be a real number), $\gamma(i)$ can be defined by a complex number (and thus may be a real number), and $\delta(i)$ can be defined by a complex number (and thus may be a real number). Furthermore, although $\alpha(i)$ is indicated, $\alpha(i)$ may not be a function of symbol number i (may be a fixed value), although $\beta(i)$ is indicated, $\beta(i)$ may not be a function of symbol number i (may be a fixed value), although $\gamma(i)$ is indicated, $\gamma(i)$ may not be a function of symbol number i (may be a fixed value), and although $\delta(i)$ is indicated, $\delta(i)$ may not be a function of symbol number i (may be a fixed value).

Then, "a symbol group for modulated signal 1" which includes "signals in a data transmission area of modulated signal 1" which are constituted by data symbols is transmitted from the base station in FIG. 1 or 3. Further, "a symbol group for modulated signal 2" which includes "signals in a data transmission area of modulated signal 2" which are constituted by data symbols is transmitted from the base station in FIG. 1 or 3.

Note that signal processing such as phase modification and cyclic delay diversity (CDD) may be performed on "modulated signal 1" and "modulated signal 2". Note that the method for signal processing is not limited to those.

Figure 14:
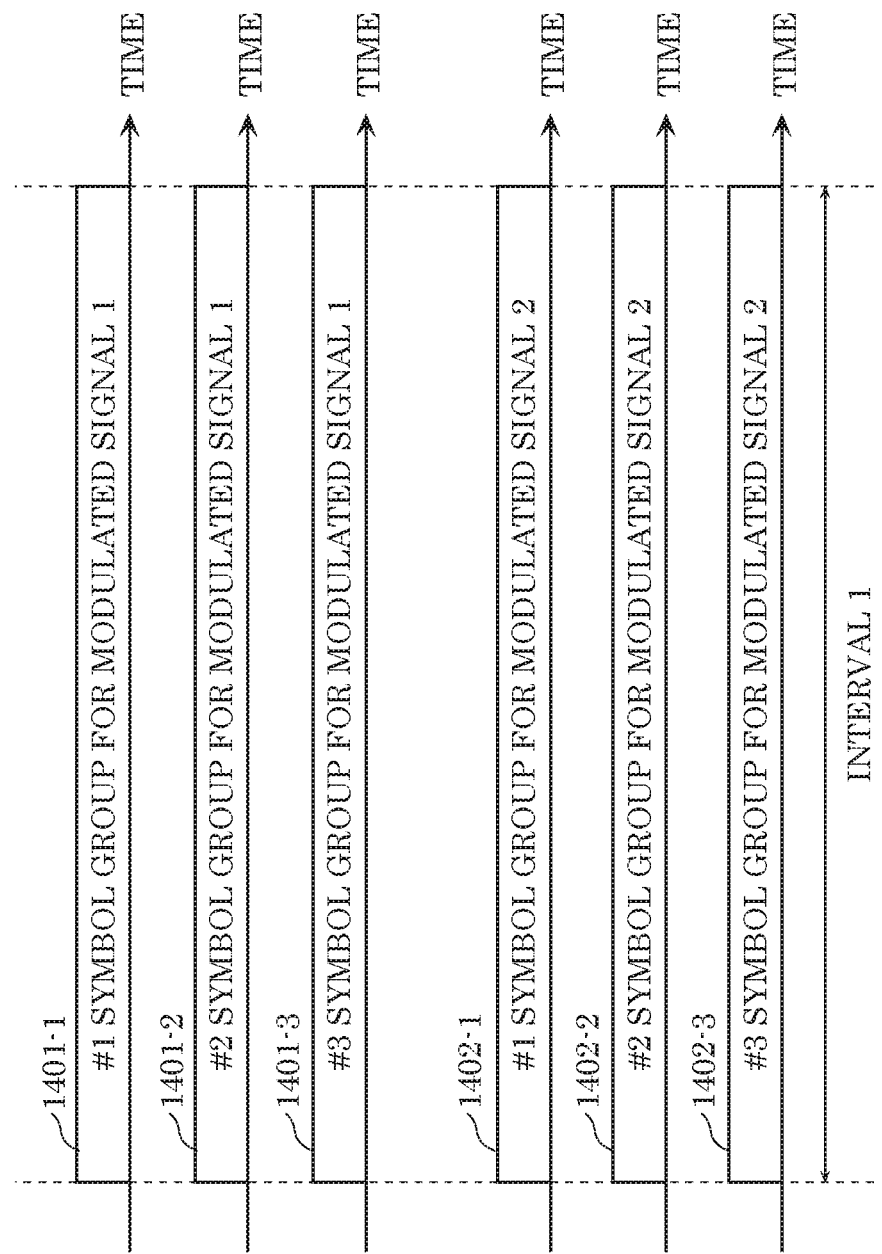
FIG. 14 is a diagram illustrating an example of a frame configuration.

FIG. 14 illustrates an example of a frame configuration when the horizontal axis indicates time.

1 symbol group (1401-1) for modulated signal 1 in FIG. 14 is a symbol group for transmission beam 1202-1 for transmitting data of modulated signal 1 in FIG. 12.

2 symbol group (1401-2) for modulated signal 1 in FIG. 14 is a symbol group for transmission beam 1202-2 for transmitting data of modulated signal 1 in FIG. 12.

3 symbol group (1401-3) for modulated signal 1 in FIG. 14 is a symbol group for transmission beam 1202-3 for transmitting data of modulated signal 1 in FIG. 12.

1 symbol group (1402-1) for modulated signal 2 in FIG. 14 is a symbol group for transmission beam 1203-1 for transmitting data of modulated signal 2 in FIG. 12.

2 symbol group (1402-2) for modulated signal 2 in FIG. 14 is a symbol group for transmission beam 1203-2 for transmitting data of modulated signal 2 in FIG. 12.

3 symbol group (1402-3) for modulated signal 2 in FIG. 14 is a symbol group for transmission beam 1203-3 for transmitting data of modulated signal 2 in FIG. 12.

1 symbol group (1401-1) for modulated signal 1, #2 symbol group (1401-2) for modulated signal 1, #3 symbol group (1401-3) for modulated signal 1, #1 symbol group (1402-1) for modulated signal 2, #2 symbol group (1402-2) for modulated signal 2, and #3 symbol group (1402-3) for modulated signal 2 are present in time interval 1, for example.

As previously described, #1 symbol group (1401-1) for modulated signal 1 and #1 symbol group (1402-1) for modulated signal 2 are transmitted using the same frequency (the same frequency band), #2 symbol group (1401-2) for modulated signal 1 and #2 symbol group (1402-2) for modulated signal 2 are transmitted using the same frequency (the same frequency band), and #3 symbol group (1401-3) for modulated signal 1 and #3 symbol group (1402-3) for modulated signal 2 are transmitted using the same frequency (the same frequency band).

For example, "signal A in the data transmission area of modulated signal 1" and "signal A in the data transmission area of modulated signal 2" are generated from information in accordance with the procedure in FIG. 13.

"Signal A-1 in the data transmission area of modulated signal 1" which is a signal constituted by a signal equivalent to a signal which constitutes "signal A in the data transmission area of modulated signal 1", "signal A-2 in the data transmission area of modulated signal 1" which is a signal constituted by a signal equivalent to a signal which constitutes "signal A in the data transmission area of modulated signal 1", and "signal A-3 in the data transmission area of modulated signal 1" which is a signal constituted by a signal equivalent to a signal which constitutes "signal A in the data transmission area of modulated signal 1" are prepared (thus, the signal which constitutes "signal A-1 in the data transmission area of modulated signal 1", the signal which constitutes "signal A-2 in the data transmission area of modulated signal 1", and the signal which constitutes "signal A-3 in the data transmission area of modulated signal 1" are the same).

At this time, #1 symbol group (1401-1) for modulated signal 1 in FIG. 14 includes "signal A-1 in the data transmission area of modulated signal 1", #2 symbol group (1401-2) for modulated signal 1 in FIG. 14 includes "signal A-2 in the data transmission area of modulated signal 1", and #3 symbol group (1401-3) for modulated signal 1 in FIG. 14 includes "signal A-3 in the data transmission area of modulated signal 1". Specifically, #1 symbol group (1401-1) for modulated signal 1, #2 symbol group (1401-2) for modulated signal 1, and #3 symbol group (1401-3) for modulated signal 1 include equivalent signals.

Further, "signal A-1 in the data transmission area of modulated signal 2" which is a signal constituted by a signal equivalent to a signal which constitutes "signal A in the data transmission area of modulated signal 2", "signal A-2 in the data transmission area of modulated signal 2" which is a signal constituted by a signal equivalent to a signal which constitutes "signal A in the data transmission area of modulated signal 2", and "signal A-3 in the data transmission area of modulated signal 2" which is a signal constituted by a signal equivalent to a signal which constitutes "signal A in the data transmission area of modulated signal 2" are prepared (thus, the signal which constitutes "signal A-1 in the data transmission area of modulated signal 2", the signal which constitutes "signal A-2 in the data transmission area of modulated signal 2", and the signal which constitutes "signal A-3 in the data transmission area of modulated signal 2" are the same).

At this time, #1 symbol group (1402-1) for modulated signal 2 in FIG. 14 includes "signal A-1 in the data transmission area of modulated signal 2", #2 symbol group (1402-2) for stream 2 in FIG. 14 includes "signal A-2 in the data transmission area of modulated signal 2", and #3 symbol group (1402-3) for modulated signal 2 in FIG. 14 includes "signal A-3 in the data transmission area of modulated signal 2". Specifically, #1 symbol group (1402-1) for modulated signal 2, #2 symbol group (1402-2) for modulated signal 2, and #3 symbol group (1402-3) for modulated signal 2 include equivalent signals.

Figure 15:
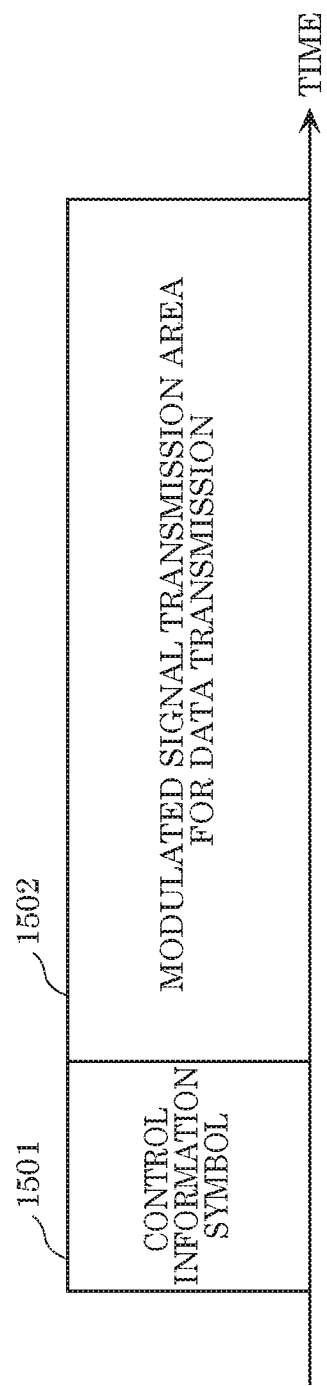
FIG. 15 is a diagram illustrating an example of a frame configuration.

FIG. 15 illustrates an example of a frame configuration of "symbol group #Y for modulated signal X" (X=1, 2; Y=1, 2, 3) described with reference to FIG. 14. In FIG. 15, the horizontal axis indicates time, 1501 indicates a control information symbol, and 1502 indicates a modulated signal transmission area for data transmission. At this time, modulated signal transmission area 1502 for data transmission includes symbols for transmitting "signal A in the data transmission area of modulated signal 1" or "signal A in the data transmission area of modulated signal 2" described with reference to FIG. 14.

Note that in the frame configuration in FIG. 15, a multicarrier method such as an orthogonal frequency division multiplexing (OFDM) method may be used, and in this case, symbols may be present in the direction of the frequency axis. The symbols may each include a reference symbol for a receiving device to perform time synchronization and frequency synchronization, a reference symbol for a receiving device to detect a signal, and a reference symbol for a receiving device to perform channel estimation, for instance. The frame configuration is not limited to the configuration in FIG. 15, and control information symbol 1501 and modulated signal transmission area 1502 for data transmission may be arranged in any manner. A reference symbol may also be called a preamble and a pilot symbol, for example.

Next is a description of a configuration of control information symbol 1501.

Figure 16:
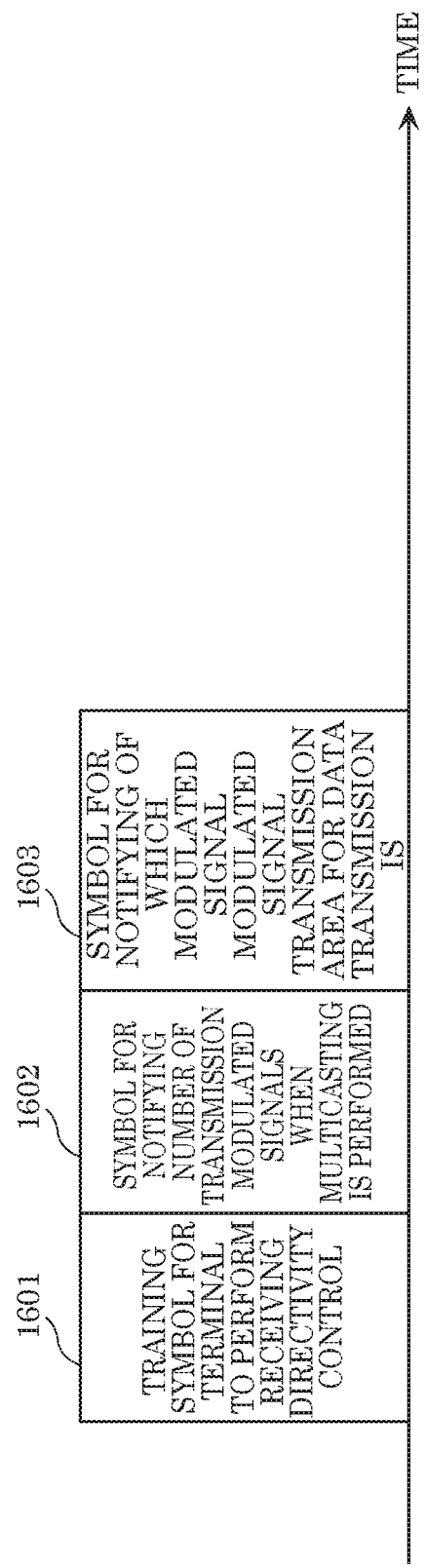
FIG. 16 is a diagram illustrating an example of a symbol configuration.

FIG. 16 illustrates an example of a configuration of symbols which are to be transmitted as a control information symbol in FIG. 15, and the horizontal axis indicates time. In FIG. 16, 1601 denotes "a training symbol for a terminal to perform receiving directivity control", and the terminal determines a signal processing method for the directivity control for receiving, which is performed by "signal processor 405" and/or "antennas 401-1 to 401-N" and/or "multipliers 603-1 to 603-L and processor 605", by receiving "training symbol for a terminal to perform receiving directivity control" 1601.

1602 denotes "a symbol for notifying the number of transmission modulated signals when multicasting is performed", and the terminal is informed of the number of modulated signals which are to be obtained, by receiving "symbol for notifying the number of transmission modulated signals when multicasting is performed" 1602.

1603 denotes "a symbol for notifying of which modulated signal a modulated signal transmission area for data transmission is", and the terminal can be informed of which modulated signal has been successfully received among modulated signals which the base station is transmitting, by receiving "symbol for notifying of which modulated signal a modulated signal transmission area for data transmission is" 1603.

An example of the above is to be described.

Now consider the case where the base station is transmitting "modulated signals" using transmission beams as illustrated in FIG. 12. Specific information on a control information symbol in #1 symbol group 1401-1 for modulated signal 1 in FIG. 14 is to be described.

In the case of FIG. 12, the base station is transmitting "modulated signal 1" and "modulated signal 2", and thus information indicated by "symbol for notifying the number of transmission modulated signals when multicasting is performed" 1602 is "2".

1 symbol group 1401-1 for modulated signal 1 in FIG. 14 is for transmitting a signal in the data transmission area of modulated signal 1, and thus information indicated by "symbol for notifying of which modulated signal a modulated signal transmission area for data transmission is" 1603 indicates "modulated signal 1".

For example, a terminal is assumed to receive #1 symbol group 1401-1 for modulated signal 1 in FIG. 14. At this time, the terminal becomes aware that "the number of modulated signals is 2" is obtained from "symbol for notifying the number of transmission modulated signals when multicasting is performed" 1602, and that "modulated signal 1" from "symbol for notifying of which modulated signal a modulated signal transmission area for data transmission is" 1603.

The terminal then becomes aware that "the number of present modulated signals is 2" and that the obtained modulated signal is "modulated signal 1", and thus the terminal is aware that "modulated signal 2" is to be obtained. Accordingly, the terminal can start operation of searching for "modulated signal 2". The terminal searches for one of transmission beams for any of "#1 symbol group 1402-1 for modulated signal 2", "#2 symbol group 1402-2 for modulated signal 2", "#3 symbol group 1402-3 for modulated signal 2" in FIG. 14, for example.

The terminal obtains both "modulated signal 1" and "modulated signal 2", and can obtain data symbols for stream 1 and data symbols for stream 2 with high quality, by obtaining one transmission beam for "#1 symbol group 1402-1 for modulated signal 2", "#2 symbol group 1402-2 for modulated signal 2", and "#3 symbol group 1402-3 for modulated signal 2".

Configuring a control information symbol in the above manner yields advantageous effects that the terminal can precisely obtain data symbols.

As described above, in multicast data transmission and broadcast data transmission, the base station transmits data symbols using a plurality of transmission beams, and a terminal selectively receives a transmission beam with good quality among the plurality of transmission beams, thus achieving advantageous effects that a modulated signal which the base station has transmitted increases an area where high data receiving quality is achieved. This is because the base station performs transmission directivity control and receiving directivity control.

In the above description, a terminal performs receiving directivity control, yet advantageous effects can be obtained as mentioned above without the terminal performing receiving directivity control.

Note that the case where each terminal obtains both a modulated signal of stream 1 and a modulated signal of stream 2 is described with reference to FIG. 7, yet the present disclosure is not limited to such an embodiment. For example, an embodiment in which a modulated signal desired to be obtained varies depending on a terminal may be achieved as in a case where there are a terminal which desires to obtain a modulated signal of stream 1, a terminal which desires to obtain a modulated signal of stream 2, and a terminal which desires to obtain both a modulated signal of stream 1 and a modulated signal of stream 2.

Embodiment 2

Embodiment 1 has described a method in which a base station transmits data symbols using a plurality of transmission beams in multicast data transmission and broadcast data transmission. The present embodiment describes, as a variation of Embodiment 1, the case where a base station performs unicast data transmission as well as multicast data transmission and broadcast data transmission.

Figure 17:
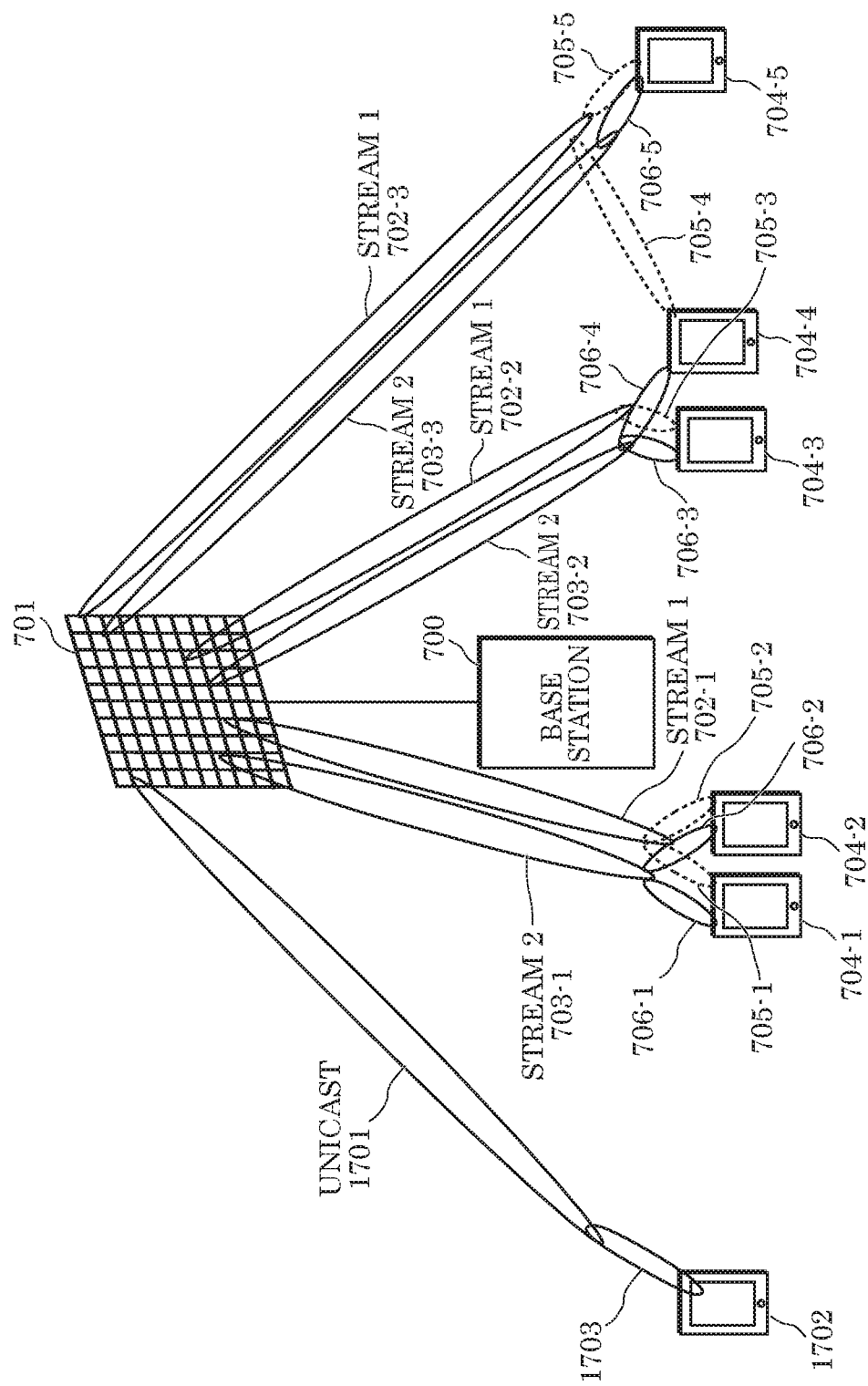
FIG. 17 is a diagram illustrating an example of a state of communication between the base station and terminals.

FIG. 17 illustrates an example of a state of communication between the base station (or an access point, for instance) and terminals. Elements which operate in the same manner as those in FIG. 7 are assigned the same reference numerals, and a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

Then, transmission beams 702-1, 702-2, 702-3, 703-1, 703-2, and 703-3 are as described with reference to FIG. 7, and thus a description thereof is omitted.

Terminals 704-1, 704-2, 704-3, 704-4, and 704-5, and receiving directivities 705-1, 705-2, 705-3, 705-4, 705-5, 706-1, 706-2, 706-3, 706-4, and 706-5 are as described with reference to FIG. 7, and thus a description thereof is omitted.

In FIG. 17, a distinguishing point is that the base station performs multicasting, as described with reference to FIG. 7, and also base station 700 and a terminal (for example, 1702) perform unicast communication.

In addition to transmission beams for multicasting 702-1, 702-2, 702-3, 703-1, 703-2, and 703-3, in FIG. 17, base station 700 generates transmission beam 1701 for unicasting, and transmits to terminal 1702 data therefor. Note that FIG. 17 illustrates an example in which base station 700 transmits one transmission beam 1701 to terminal 1702. Yet, the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. This allows terminal 1702 to receive and demodulate transmission beam 1701.

Note that in order to generate transmission beams which include transmission beam 1701, the base station performs precoding (weighting synthesis) using signal processor 102 (and/or weighting synthesizer 301) in the configuration as illustrated in FIG. 1 or 3, for example.

On the contrary, when terminal 1702 transmits a modulated signal to base station 700, terminal 1702 performs precoding (or weighting synthesis), and transmits transmission beam 1703. Base station 700 performs directivity control for receiving and forms receiving directivity 1701. Accordingly, base station 700 can receive and demodulate transmission beam 1703.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Then, transmission beam 1701 for unicasting may be a beam having the same frequency (the same frequency band) as or a different frequency (a different frequency band) from those of transmission beams 702-1, 702-2, 702-3, 703-1, 703-2, and 703-3.

A description has been given with reference to FIG. 17, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 17, information indicating "to perform both transmission for multicasting and transmission for unicasting" is input to setting unit 158 according to setting signal 160.

Also, setting signal 160 includes information with regard to "the number of transmission streams when multicasting is performed" and if the base station performs transmission as illustrated in FIG. 17, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 17, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", information with regard to "how many transmission beams are to be used to transmit each stream", and others. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

Figure 18:
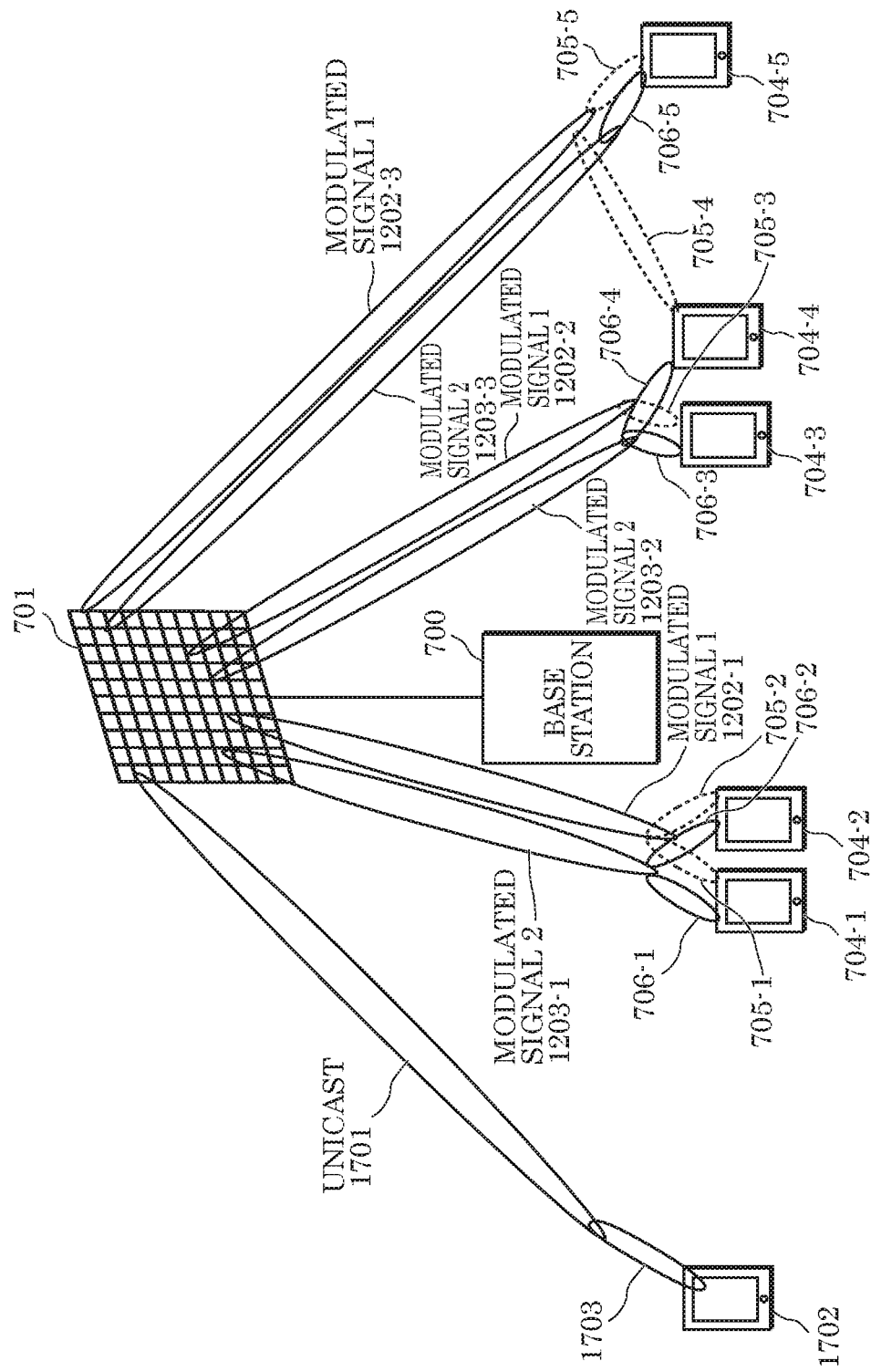
FIG. 18 is a diagram illustrating an example of a state of communication between the base station and terminals.

FIG. 18 illustrates an example of a state of communication between a base station (or an access point or the like) and terminals, and elements which operate in the same manner as those in FIGS. 7 and 12 are assigned the same reference numerals in FIG. 18, and a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 is as described with reference to FIG. 12, and thus a description thereof is omitted.

A description of terminals 704-1, 704-2, 704-3, 704-4, and 704-5, and receiving directivities 705-1, 705-2, 705-3, 705-4, 705-5, 706-1, 706-2, 706-3, 706-4, and 706-5 is as given with reference to FIG. 12, and thus a description thereof is omitted.

A distinguishing point in FIG. 18 is that while the base station performs multicasting, as described with reference to FIG. 12, base station 700 and a terminal (for example, 1702) perform unicast communication.

In FIG. 18, base station 700 generates transmission beam 1701 for unicasting in addition to transmission beams 1202-1, 1202-2, 1202-3, 1203-1, 1203-2, and 1203-3 for multicasting, and transmits to terminal 1702 data therefor. Note that FIG. 18 illustrates an example in which base station 700 transmits one transmission beam 1701 to terminal 1702, yet the number of transmission beams is not limited to one, and base station 700 may transmit a plurality of transmission beams to terminal 1702 (may transmit a plurality of modulated signals).

Terminal 1702 performs directivity control for receiving, via "signal processor 405" and/or "antennas 401-1 to 401-N" and/or "multipliers 603-1 to 603-L and signal processor 605", and forms receiving directivity 1703. Accordingly, terminal 1702 can receive and demodulate transmission beam 1701.

Note that in order to generate transmission beams which include transmission beam 1701, the base station performs precoding (weighting synthesis) in signal processor 102 (and/or, weighting synthesizer 301) in the configuration as illustrated in, for example, FIG. 1 or 3.

On the contrary, when terminal 1702 transmits a modulated signal to base station 700, terminal 1702 performs precoding (or weighting synthesis), and transmits transmission beam 1703, and base station 700 performs directivity control for receiving, and forms receiving directivity 1701. Accordingly, base station 700 can receive and demodulate transmission beam 1703.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time. Further, base station 700 transmits transmission beam 1202-3 for transmitting "modulated signal 1" and transmission beam 1203-3 for transmitting "modulated signal 2", using the same frequency (the same frequency band) at the same time.

Transmission beams 1202-1, 1202-2, and 1202-3 for transmitting "modulated signal 1" may be beams having the same frequency (the same frequency band) or may be beams having different frequencies (different frequency bands). Transmission beams 1203-1, 1203-2, and 1203-3 for transmitting "modulated signal 2" may be beams having the same frequency (the same frequency band) or may be beams having different frequencies (different frequency bands).

Transmission beam 1701 for unicasting may be a beam having the same frequency (the same frequency band) as or a different frequency (different frequency band) from those of transmission beams 1202-1, 1202-2, 1202-3, 1203-1, 1203-2, and 1203-3.

A description has been given with reference to FIG. 18, assuming that a terminal which performs unicast communication is a single terminal, yet the number of terminals which perform unicast communication with the base station may be two or more.

Operation of setting unit 158 at this time in the base station having the configuration illustrated in FIG. 1 or 3 is described.

Setting unit 158 receives an input of setting signal 160. Setting signal 160 includes information with regard to "whether to perform transmission for multicasting or transmission for unicasting", and if the base station performs transmission as illustrated in FIG. 18, information indicating "to perform both transmission for multicasting and transmission for unicasting" is input to setting unit 158 according to setting signal 160.

Setting signal 160 also includes information with regard to "the number of transmission streams when multicasting is performed" and if the base station performs transmission as illustrated in FIG. 18, information indicating that "the number of transmission streams is 2" is input to setting unit 158 according to setting signal 160.

Setting signal 160 may include information with regard to "how many transmission beams are to be used to transmit each stream". If the base station performs transmission as illustrated in FIG. 18, information indicating that "the number of transmission beams for transmitting stream 1 is 3 and the number of transmission beams for transmitting stream 2 is 3" is input to setting unit 158 according to setting signal 160.

Note that the base station in FIGS. 1 and 3 may transmit a control information symbol which includes information with regard to "whether to perform transmission for multicasting or transmission for unicasting", information with regard to "the number of transmission streams when multicasting is performed", and information with regard to "how many transmission beams are to be used to transmit each stream", for instance. Accordingly, a terminal can appropriately receive data.

Furthermore, the base station may transmit, to a terminal with which the base station performs unicast communication, a control information symbol for training for the base station to perform directivity control, and a control information symbol for training for a terminal to perform directivity control.

The following describes the case where the base station transmits a plurality of data by multicasting, as a variation of Embodiment 1.

Figure 19:
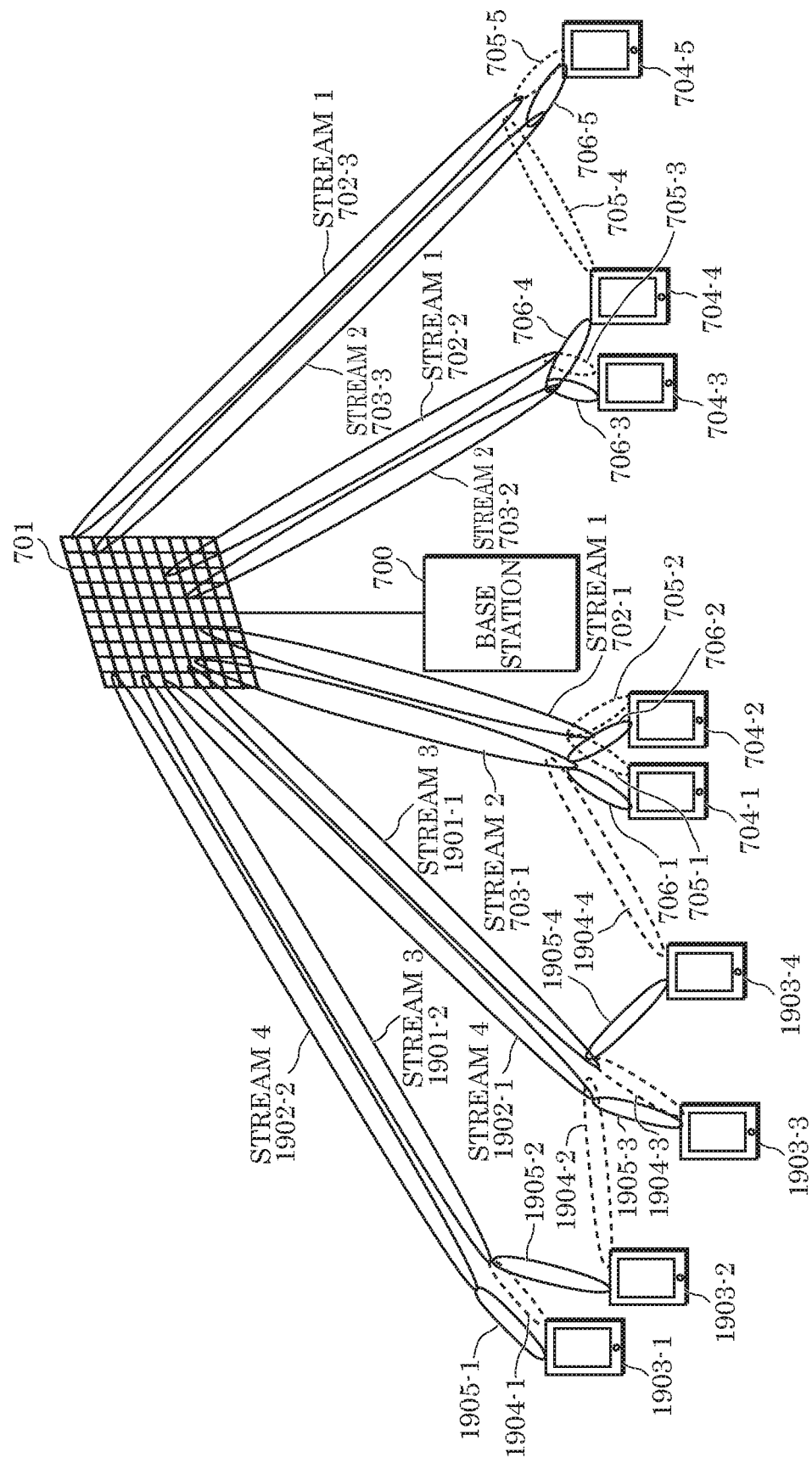
FIG. 19 is a diagram illustrating an example of a state of communication between the base station and terminals.

FIG. 19 illustrates an example of a state of communication between the base station (or an access point, for instance) and terminals, and elements which operate in the same manner as those in FIG. 7 are assigned the same reference numerals in FIG. 19, so that a detailed description thereof is omitted.

Base station 700 includes a plurality of antennas, and transmits a plurality of transmission signals through antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 702-1, 702-2, 702-3, 703-1, 703-2, and 703-3 is as given with reference to FIG. 7, and thus a description thereof is omitted.

A description of terminals 704-1, 704-2, 704-3, 704-4, and 704-5 and receiving directivities 705-1, 705-2, 705-3, 705-4, 705-5, 706-1, 706-2, 706-3, 706-4, and 706-5 is as described with reference to FIG. 7, and thus a description thereof is omitted.

Base station 700 transmits transmission beams 1901-1, 1901-2, 1902-1, and 1902-2, in addition to transmission beams 702-1, 702-2, 702-3, 703-1, 703-2, and 703-3.

Transmission beam 1901-1 is a transmission beam for transmitting data of stream 3. Transmission beam 1901-2 is also a transmission beam for transmitting data of stream 3.

Transmission beam 1902-1 is a transmission beam for transmitting data of stream 4. Transmission beam 1902-2 is also a transmission beam for transmitting data of stream 4.

Reference numerals 704-1, 704-2, 704-3, 704-4, 704-5, 1903-1, 1903-2, and 1903-3 denote terminals, and each have a configuration as illustrated in FIGS. 4 and 5, for example. Note that operation of terminals 704-1, 704-2, 704-3, 704-4, and 704-5 is as described with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 1901-2 for transmitting data of stream 3, and receiving directivity 1905-1 allows terminal 1903-1 to receive and demodulate transmission beam 1902-2 for transmitting data of stream 4.

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 1902-1 for transmitting data of stream 4, and receiving directivity 1905-2 allows terminal 1903-2 to receive and demodulate transmission beam 1901-2 for transmitting data of stream 3.

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 1901-1 for transmitting data of stream 3, and receiving directivity 1905-3 allows terminal 1903-3 to receive and demodulate transmission beam 1902-1 for transmitting data of stream 4.

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 703-1 for transmitting data of stream 2, and receiving directivity 1905-4 allows terminal 1903-4 to receive and demodulate transmission beam 1901-1 for transmitting data of stream 3.

In FIG. 19, a distinguishing point is that the base station transmits a plurality of streams each including data for multicasting, and also transmits each stream using a plurality of transmission beams, and each terminal selectively receives one or more transmission beams for one or more streams among a plurality of streams.

Note that base station 700 transmits transmission beam 702-1 for transmitting data of stream 1 and transmission beam 703-1 for transmitting data of stream 2, using the same frequency (the same frequency band) at the same time. Base station 700 transmits transmission beam 702-2 for transmitting data of stream 1 and transmission beam 703-2 for transmitting data of stream 2, using the same frequency (the same frequency band) at the same time. Further, base station 700 transmits transmission beam 702-3 for transmitting data of stream 1 and transmission beam 703-3 for transmitting data of stream 2, using the same frequency (the same frequency band) at the same time.

Base station 700 transmits transmission beam 1901-1 for transmitting data of stream 3 and transmission beam 1902-1 for transmitting data of stream 4, using the same frequency (the same frequency band) at the same time. Base station 700 transmits transmission beam 1901-2 for transmitting data of stream 3 and transmission beam 1902-2 for transmitting data of stream 4, using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 1901-1 and 1901-2 for transmitting data of stream 3 may be beams having the same frequency (the same frequency band), or may be beams having different frequencies (different frequency bands). Transmission beams 1902-1 and 1902-2 for transmitting data of stream 4 may be beams having the same frequency (the same frequency band), or may be beams having different frequencies (different frequency bands).

Then, data symbols for stream 1 and data symbols for stream 2 may be generated from #1 information 101-1 in FIG. 1, and data symbols for stream 3 and data symbols for stream 4 may be generated from #2 information 101-2. Note that error correction coding may be performed on each of #1 information 101-1 and #2 information 101-2, and thereafter data symbols may be generated therefrom.

Data symbols for stream 1 may be generated from #1 information 101-1 in FIG. 1, data symbols for stream 2 may be generated from #2 information 101-2 in FIG. 1, data symbols for stream 3 may be generated from #3 information 101-3 in FIG. 1, and data symbols for stream 4 may be generated from #4 information 101-4 in FIG. 1. Note that error correction coding may be performed on each of #1 information 101-1, #2 information 101-2, #3 information 101-3, and #4 information 101-4, and thereafter data symbols may be generated therefrom.

Specifically, data symbols for streams may be generated from any of the information in FIG. 1. This yields advantageous effect that a terminal can selectively obtain a stream for multicasting.

Operation of setting unit 158 at this time in the base station having the configuration illustrated in FIG. 1 or 3 is to be described. Setting unit 158 receives an input of setting signal 160. Setting signal 160 includes information with regard to "whether to perform transmission for multicasting or transmission for unicasting", and if the base station performs transmission as illustrated in FIG. 19, information indicating "to perform transmission for multicasting" is input to setting unit 158 according to setting signal 160.

Setting signal 160 includes information with regard to "the number of transmission streams when multicasting is performed" and if the base station performs transmission as illustrated in FIG. 19, information indicating that "the number of transmission streams is 4" is input to setting unit 158 according to setting signal 160.

Setting signal 160 may include information with regard to "how many transmission beams are to be used to transmit each stream". If the base station performs transmission as illustrated in FIG. 19, information indicating that "the number of transmission beams for transmitting stream 1 is 3, the number of transmission beams for transmitting stream 2 is 3, the number of transmission beams for transmitting stream 3 is 2, and the number of transmission beams for transmitting stream 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", and information with regard to "how many transmission beams are to be used to transmit each stream". Accordingly, a terminal can appropriately receive data.

The following describes the case where the base station transmits a plurality of data by multicasting, as a variation of Embodiment 1.

Figure 20:
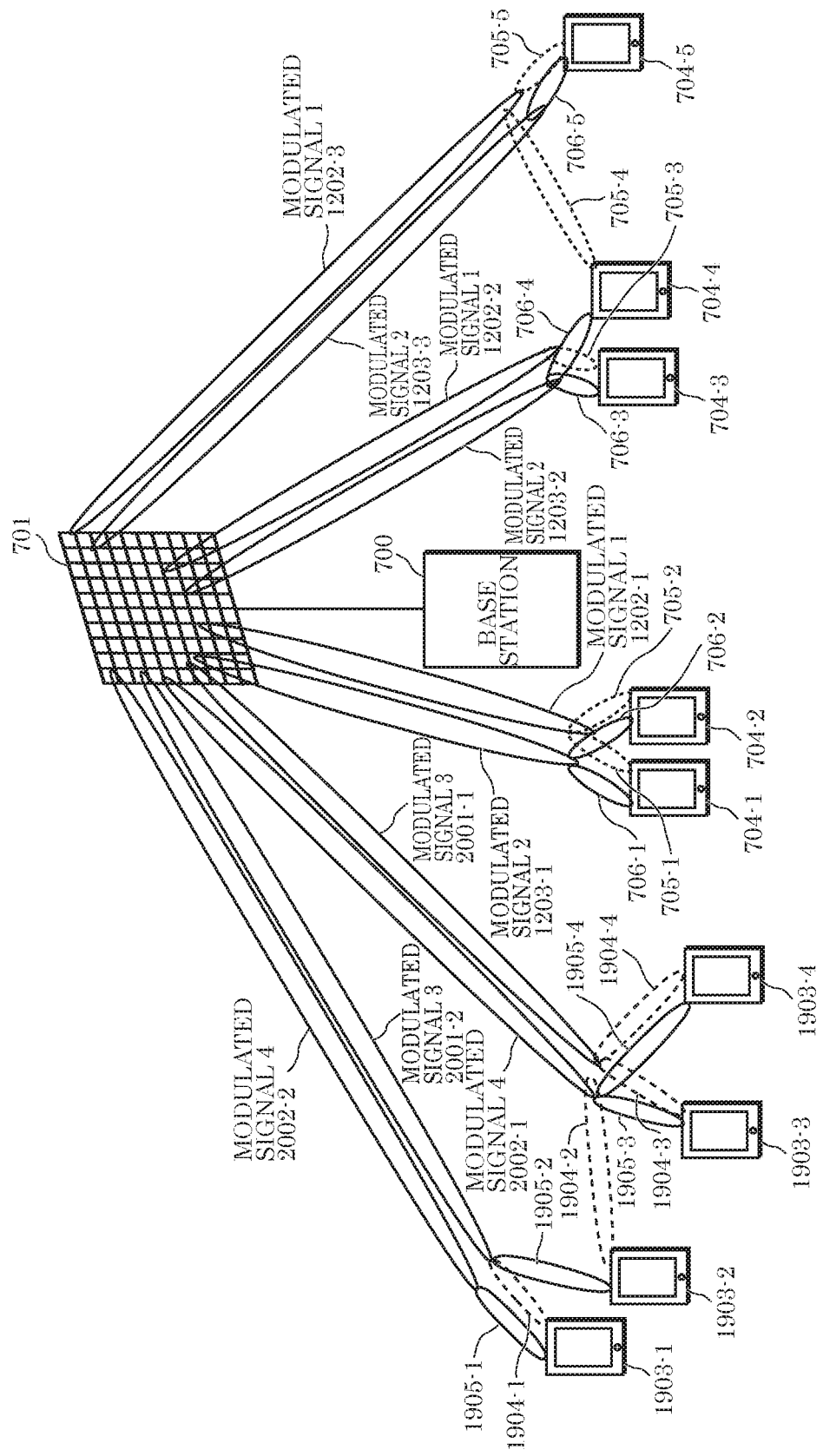
FIG. 20 is a diagram illustrating an example of a state of communication between the base station and terminals.

FIG. 20 illustrates an example of a state of communication between the base station (or an access point, for instance) and terminals, and elements which operate in the same manner as those in FIGS. 7, 12, and 19 are assigned the same reference numerals in FIG. 20, so that a detailed description thereof is omitted.

Base station 700 includes a plurality of antennas, and transmits a plurality of transmission signals from antenna 701 for transmission. At this time, base station 700 has a configuration as illustrated in, for example, FIG. 1 or 3, and performs transmission beamforming (directivity control) by signal processor 102 (and/or weighting synthesizer 301) performing precoding (weighting synthesis).

A description of transmission beams 1202-1, 1202-2, 1202-3, 1203-1, 1203-2, and 1203-3 overlaps a description given with reference to FIG. 12, and thus a description thereof is omitted.

A description of terminals 704-1, 704-2, 704-3, 704-4, and 704-5, and receiving directivity 705-1, 705-2, 705-3, 705-4, 705-5, 706-1, 706-2, 706-3, 706-4, and 706-5 overlaps a description given with reference to FIG. 12, and thus a description thereof is omitted.

Base station 700 transmits transmission beams 2001-1, 2001-2, 2002-1, and 2002-2, in addition to transmission beams 1202-1, 1202-2, 1202-3, 1203-1, 1203-2, and 1203-3.

Transmission beam 2001-1 is a transmission beam for transmitting "modulated signal 3". Transmission beam 2001-2 is also a transmission beam for transmitting "modulated signal 3".

Transmission beam 2002-1 is a transmission beam for transmitting "modulated signal 4". Transmission beam 2002-2 is also a transmission beam for transmitting "modulated signal 4".

Terminals 704-1, 704-2, 704-3, 704-4, 704-5, 1903-1, 1903-2, and 1903-3 have the same configuration as those illustrated in FIGS. 4 and 5, for example. Note that operation of terminals 704-1, 704-2, 704-3, 704-4, and 704-5 is the same as a description given with reference to FIG. 7.

Terminal 1903-1 performs directivity control for receiving, via "signal processor 405" and/or "antennas 401-1 to 401-N" and/or "multipliers 603-1 to 603-L and processor 605", and forms receiving directivity 1904-1 and receiving directivity 1905-1. Receiving directivity 1904-1 allows terminal 1903-1 to receive and demodulate transmission beam 2001-2 for transmitting "modulated signal 3", and receiving directivity 1905-1 allows terminal 1903-1 to receive and demodulate transmission beam 2002-2 for transmitting "modulated signal 4".

Terminal 1903-2 performs directivity control for receiving, via "signal processor 405" and/or "antennas 401-1 to 401-N" and/or "multipliers 603-1 to 603-L and processor 605", and forms receiving directivity 1904-2 and receiving directivity 1905-2. Receiving directivity 1904-2 allows terminal 1903-2 to receive and demodulate transmission beam 2002-1 for transmitting "modulated signal 4", and receiving directivity 1905-2 allows terminal 1903-2 to receive and demodulate transmission beam 2001-2 for transmitting "modulated signal 3".

Terminal 1903-3 performs directivity control for receiving, via "signal processor 405" and/or "antennas 401-1 to 401-N" and/or "multipliers 603-1 to 603-L and processor 605", and forms receiving directivity 1904-3 and receiving directivity 1905-3. Receiving directivity 1904-3 allows terminal 1903-3 to receive and demodulate transmission beam 2001-1 for transmitting "modulated signal 3", and receiving directivity 1905-3 allows terminal 1903-3 to receive and demodulate transmission beam 2002-1 for transmitting "modulated signal 4".

Terminal 1903-4 performs directivity control for receiving, via "signal processor 405" and/or "antennas 401-1 to 401-N" and/or "multipliers 603-1 to 603-L and processor 605", and forms receiving directivity 1904-4 and receiving directivity 1905-4. Receiving directivity 1904-4 allows terminal 1903-4 to receive and demodulate transmission beam 2001-1 for transmitting "modulated signal 3", and receiving directivity 1905-4 allows terminal 1903-4 to receive and demodulate transmission beam 2002-1 for transmitting "modulated signal 4".

In FIG. 20, the base station transmits a plurality of modulated signals each including data for multicasting, and transmits each modulated signal using a plurality of transmission beams. Each terminal selectively receives one or more transmission beams used to transmit one or more streams among the plurality of modulated signals.

Note that base station 700 transmits transmission beam 1202-1 for transmitting "modulated signal 1" and transmission beam 1203-1 for transmitting "modulated signal 2", using the same frequency (the same frequency band) at the same time. Then, base station 700 transmits transmission beam 1202-2 for transmitting "modulated signal 1" and transmission beam 1203-2 for transmitting "modulated signal 2", using the same frequency (the same frequency band) at the same time. Further, base station 700 transmits transmission beam 1202-3 for transmitting "modulated signal 1" and transmission beam 1203-3 for transmitting "modulated signal 2", using the same frequency (the same frequency band) at the same time.

Base station 700 transmits transmission beam 2001-1 for transmitting "modulated signal 3" and transmission beam 2002-1 for transmitting "modulated signal 4", using the same frequency (the same frequency band) at the same time. Then, base station 700 transmits transmission beam 2001-2 for transmitting "modulated signal 3" and transmission beam 2002-2 for transmitting "modulated signal 4", using the same frequency (the same frequency band) at the same time.

Transmission beams 702-1, 702-2, and 702-3 for transmitting data of stream 1 may be beams having the same frequency (the same frequency band), or may be beams having different frequencies (different frequency bands). Transmission beams 703-1, 703-2, and 703-3 for transmitting data of stream 2 may be beams having the same frequency (the same frequency band), or may be beams having different frequencies (different frequency bands).

Transmission beams 2001-1 and 2001-2 for transmitting "modulated signal 3" may be beams having the same frequency (the same frequency band) or may be beams having different frequencies (different frequency bands). Transmission beams 2002-1 and 2002-2 for transmitting "modulated signal 4" may be beams having the same frequency (the same frequency band) or may be beams having different frequencies (different frequency bands).

Operation of setting unit 158 at this time in the base station having the configuration illustrated in FIG. 1 or 3 is to be described. Setting unit 158 receives an input of setting signal 160. Setting signal 160 includes information with regard to "whether to perform transmission for multicasting or transmission for unicasting", and if the base station performs transmission illustrated in FIG. 19, information indicating "to perform transmission for multicasting" is input to setting unit 158 according to setting signal 160.

Setting signal 160 includes information with regard to "the number of transmission modulated signals when multicasting is performed", and if the base station performs transmission illustrated in FIG. 20, information indicating "the number of transmission modulated signals is 4" is input to setting unit 158 according to setting signal 160.

Setting signal 160 may include information with regard to "how many transmission beams are to be used to transmit each modulated signal". When the base station performs transmission illustrated in FIG. 20, information indicating that "the number of transmission beams for transmitting modulated signal 1 is 3, the number of transmission beams for transmitting modulated signal 2 is 3, the number of transmission beams for transmitting modulated signal 3 is 2, and the number of transmission beams for transmitting modulated signal 4 is 2" is input to setting unit 158 according to setting signal 160.

Note that the base station in FIGS. 1 and 3 may transmit a control information symbol which includes, for instance, information with regard to "whether to perform transmission for multicasting or transmission for unicasting", information with regard to "the number of transmission streams when multicasting is performed", information with regard to "how many transmission beams are to be used to transmit each stream". Accordingly, a terminal can appropriately receive data.

Note that in FIG. 20, if a terminal receives both a transmission beam for "modulated signal 1", and a transmission beam for "modulated signal 2", the terminal can obtain data of stream 1 and data of stream 2 with high receiving quality.

Similarly, if a terminal receives both a transmission beam for "modulated signal 3", and a transmission beam for "modulated signal 4", the terminal can obtain data of stream 3 and data of stream 4 with high receiving quality.

FIG. 20 illustrates an example in which the base station transmits "modulated signal 1", "modulated signal 2", "modulated signal 3", and "modulated signal 4", yet the base station may transmit "modulated signal 5" and "modulated signal 6" for transmitting data of stream 5 and data of stream 6, respectively, and may transmit more modulated signals in order to transmit more streams. Note that the base station transmits each of the modulated signals using one or more transmission beams.

Furthermore, as described with reference to FIGS. 17 and 18, one or more transmission beams for unicasting (or receiving directivity control) may be present.

Figure 21:
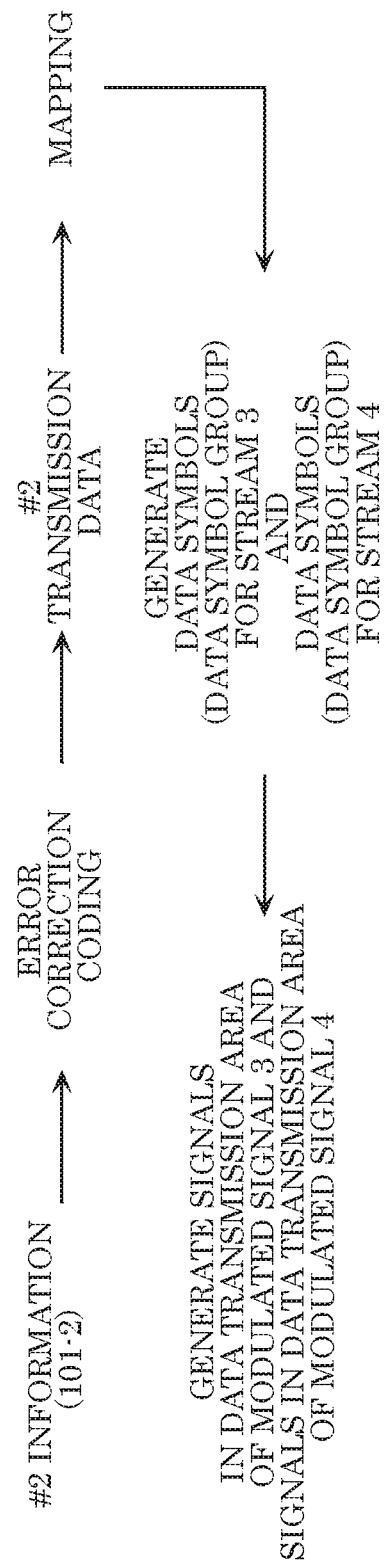
FIG. 21 is a diagram illustrating a relation of a plurality of modulated signals.

A description of a relation between "modulated signal 1" and "modulated signal 2" overlaps a description with reference to FIG. 13, and thus the description thereof is omitted. Here, a description of a relation between "modulated signal 3" and "modulated signal 4" is given with reference to FIG. 21.

For example, #2 information 101-2 is subjected to processing such as error correction coding, and data obtained as a result of the error correction coding is obtained. The data obtained as a result of the error correction coding is named #2 transmission data. Data symbols are obtained by mapping #2 transmission data. The data symbols are separated into data symbols for stream 3 and data symbols for stream 4, so that data symbols (data symbol group) for stream 3 and data symbols (data symbol group) for stream 4 are obtained. At this time, a data symbol having symbol number i for stream 3 is s3(i), and a data symbol having symbol number i for stream 4 is s4(i). Then, "modulated signal 3" tx3(i) having symbol number i is expressed as follows, for example.

[Math. 5]

$$tx3(i)=e(i) \times s3(i)+f(i) \times s4(i) \qquad \text{Expression (5)}$$

Then, "modulated signal 4" tx4(i) having symbol number i is expressed as follows, for example.

[Math. 6]

$$tx4(i)=g(i) \times s3(i)+h(i) \times s4(i) \qquad \text{Expression (6)}$$

Note that e(i), f(i), g(i), and h(i) in Expressions (5) and (6) can be defined by complex numbers, and thus may be real numbers.

Although e(i), f(i), g(i), and h(i) are indicated, e(i), f(i), g(i), and h(i) may not be functions of symbol number i and may be fixed values.

Then, the base station in FIG. 1 or 3 transmits "a symbol group for modulated signal 3" which includes "signals in a data transmission area of modulated signal 3" which are constituted by data symbols. Then, the base station in FIG. 1 or 3 transmits "a symbol group for modulated signal 4" which includes "signals in a data transmission area of modulated signal 4" which are constituted by data symbols.

Supplementary Note

As a matter of course, the present disclosure may be carried out by combining a plurality of the exemplary embodiments and other contents described herein.

Moreover, each exemplary embodiment and the other contents are only examples. For example, while a "modulating method, an error correction coding method (an error correction code, a code length, a coding rate and the like to be used), control information and the like" are exemplified, it is possible to carry out the present disclosure with the same configuration even when other types of a "modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, amplitude phase shift keying (APSK), pulse amplitude modulation (PAM), phase shift keying (PSK), and quadrature amplitude modulation (QAM) may be applied, or in each modulating method, uniform mapping or non-uniform mapping may be performed. APSK includes 16APSK, 64APSK, 128APSK, 256APSK, 1024APSK, and 4096APSK, for example. PAM includes 4PAM, 8PAM, 16PAM, 64PAM, 128PAM, 256PAM, 1024PAM, and 4096PAM, for example. PSK includes BPSK, QPSK, 8PSK, 16PSK, 64PSK, 128PSK, 256PSK, 1024PSK, and 4096PSK, for example. QAM includes 4QAM, 8QAM, 16QAM, 64QAM, 128QAM, 256QAM, 1024QAM, and 4096QAM, for example.

A method for arranging signal points, such as 2 signal points, 4 signal points, 8 signal points, 16 signal points, 64 signal points, 128 signal points, 256 signal points, and 1024 signal points on an I-Q plane (a modulating method having 2 signal points, 4 signal points, 8 signal points, 16 signal points, 64 signal points, 128 signal points, 256 signal points, and 1024 signal points, for instance) is not limited to a signal point arranging method according to the modulating methods described herein.

The "base station" described herein may be a broadcast station, a base station, an access point, a terminal, or a mobile phone, for example. Then, the "terminal" described herein may be a television, a radio, a terminal, a personal computer, a mobile phone, an access point, or a base station, for instance. The "base station" and the "terminal" in the present disclosure may be devices having a communication function, and such devices may be configured to be connected with devices for running applications such as a television, a radio, a personal computer, and a mobile phone, via a certain interface. Furthermore, in the present embodiment, symbols other than data symbols, such as, for example, a pilot symbol and a symbol for control information may be arranged in any manner in frames.

Then, any names may be given to a pilot symbol and a symbol for control information, and such symbols may be, for example, known symbols modulated using PSK modulation in a transmitting device or a receiving device. Alternatively, the receiving device may be able to learn a symbol transmitted by the transmitting device by establishing synchronization. The receiving device performs, using the symbol, frequency synchronization, time synchronization, channel estimation of each modulated signal (estimation of channel state information (CSI)), and signal detection, for instance. Note that a pilot symbol may be referred to as a preamble, a unique word, a postamble, or a reference symbol, for instance.

Moreover, the control information symbol is a symbol for transmitting information that is used for realizing communication other than communication for data (data of an application, for instance) and that is to be transmitted to a communicating party (for example, a modulating method used for communication, an error correction coding method, a coding rate of the error correction coding method, setting information in an upper layer, and the like).

Note that the present disclosure is not limited to each exemplary embodiment, and can be carried out with various modifications. For example, the case where the present disclosure is performed as a communication device is described in each exemplary embodiment. However, the present disclosure is not limited to this case, and this communication method can also be used as software.

Note that a program for executing the above-described communication method may be stored in a ROM (Read Only Memory) in advance, and a CPU (Central Processing Unit) may be caused to operate this program.

Moreover, the program for executing the above-described communication method may be stored in a computer-readable storage medium, the program stored in the recording medium may be recorded in a RAM (Random Access Memory) of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Embodiment 3

The present embodiment describes a multicast communication method when beamforming different from the beamforming in Embodiments 1 and 2 is applied.

The configuration of the base station is as described with reference to FIGS. 1 to 3 in Embodiment 1, and thus a description of portions which operate in the same manner as those in Embodiment 1 is omitted. Also, the configuration of a terminal which communicates with a base station is as described with reference to FIGS. 4 to 6 in Embodiment 1, and thus a description of portions which operate in the same manner as those in Embodiment 1 is omitted.

The following describes an example of operation of a base station and a terminal in the present embodiment.

Figure 22:
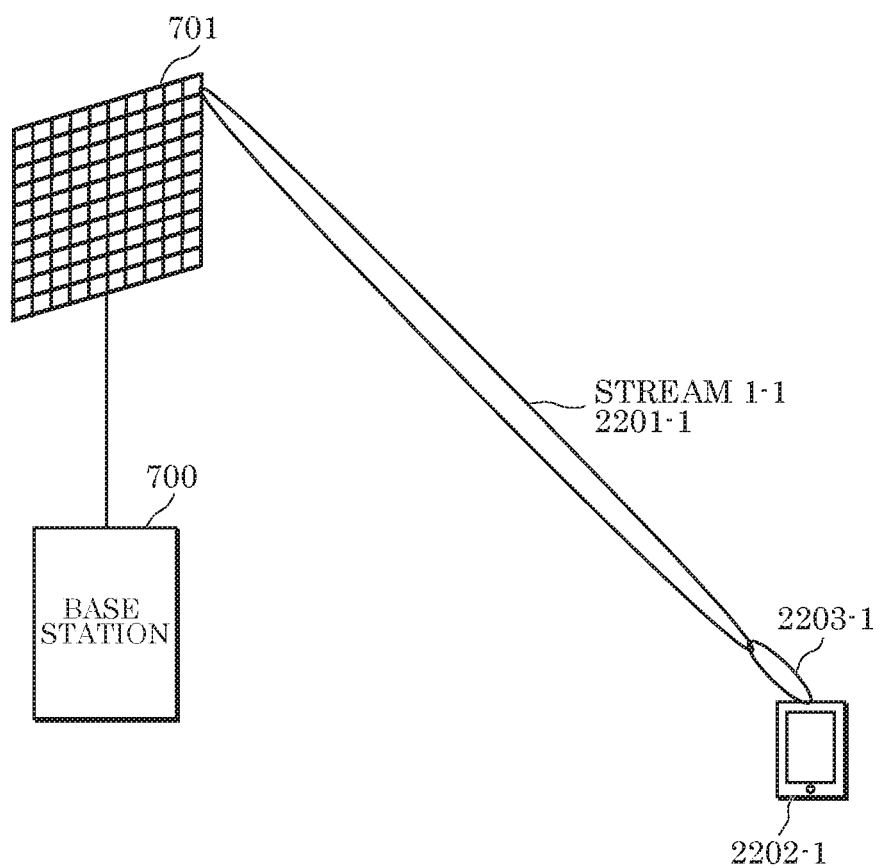
FIG. 22 is a diagram illustrating an example of a state of communication between the base station and a terminal.

FIG. 22 illustrates the case where the base station transmits a transmission stream for multicasting to one terminal.

In FIG. 22, base station 700 transmits transmission beam 2201-1 for "stream 1-1 (a first beam for stream 1) (for multicasting)" from an antenna for transmission to terminal 2202-1, and terminal 2202-1 performs directivity control to generate receiving directivity 2203-1, and receives transmission beam 2201-1 for "stream 1-1".

Figure 23:
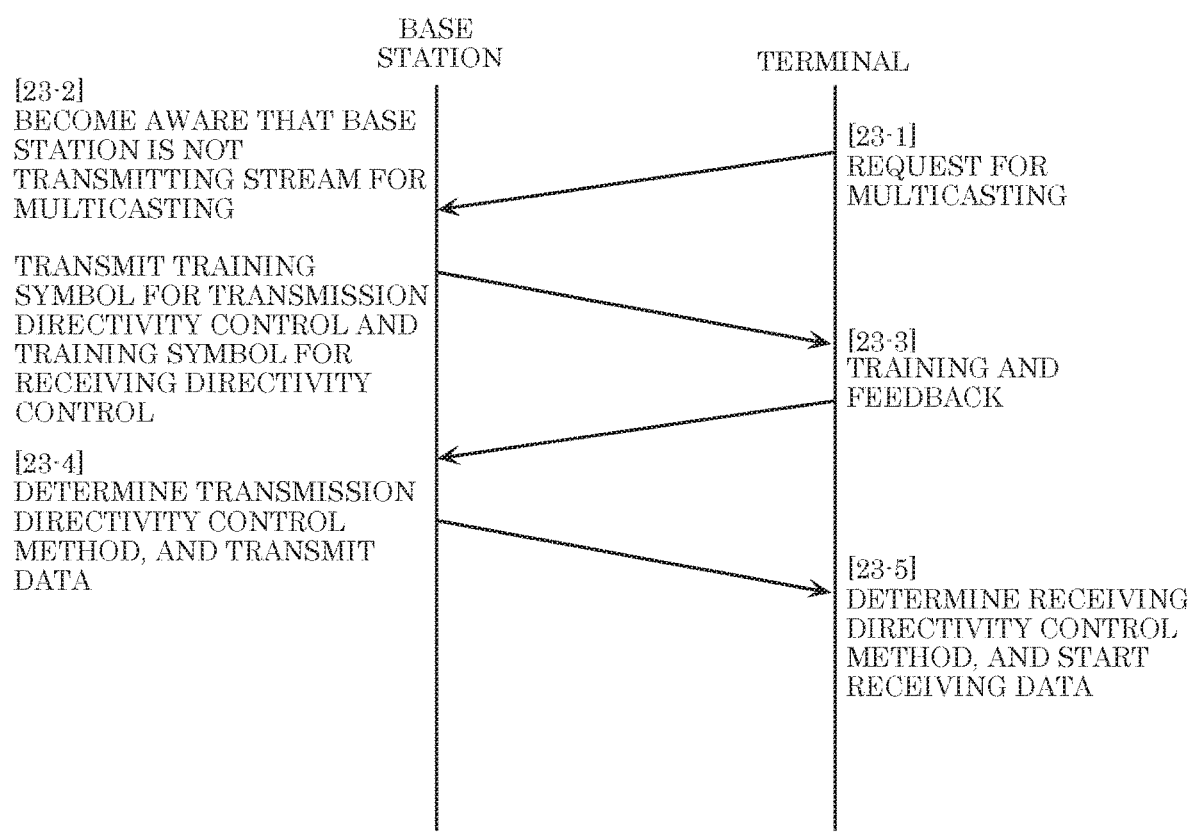
FIG. 23 is a diagram illustrating a procedure of performing communication between the base station and a terminal.

FIG. 23 is for describing a "procedure for performing communication between a base station and a terminal" to achieve the state of communication between the base station and the terminal as illustrated in FIG. 22.

[23-1] First, the terminal transmits a "request to transmit stream 1 by multicasting" to a base station.

[23-2] Upon receiving [23-1], the base station becomes aware that the base station "is not transmitting stream 1 by multicasting". Then, the base station transmits, to the terminal, a training symbol for transmission directivity control, and a training symbol for receiving directivity control, in order to transmit stream 1 by multicasting.

[23-3] The terminal receives the training symbol for transmission directivity control and the training symbol for receiving directivity control transmitted by the base station, and transmits feedback information to the base station in order that the base station performs transmission directivity control and the terminal performs receiving directivity control.

[23-4] The base station determines a method for transmission directivity control (determines, for instance, a weighting factor to be used for directivity control), based on the feedback information transmitted by the terminal, performs transmission directivity control, and transmits data symbols for stream 1.

[23-5] The terminal determines a receiving directivity control method (determines, for instance, a weighting factor to be used for directivity control), and starts receiving the data symbols for stream 1 transmitted by the base station.

Note that the "procedure for a base station and a terminal to communicate" in FIG. 23 is an example, and the order of transmitting information items is not limited to the order in FIG. 23, and communication between the base station and the terminal can be similarly established even if the order of transmitting information items has changed. FIG. 23 illustrates, as an example, the case in which the terminal performs receiving directivity control, yet the terminal may not perform receiving directivity control. In such a case, the base station may not transmit a training symbol for receiving directivity control and the terminal does not determine a receiving directivity control method, in FIG. 23.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "1" in FIG. 22, yet the present disclosure is not limited to this.

When the terminal performs receiving directivity control, if the terminal has a configuration in FIG. 4, for example, multiplication coefficients for multipliers 503-1, 503-2, 503-3, and 503-4 in FIG. 5 are determined, whereas when the terminal has the configuration in FIG. 6, multiplication coefficients for multipliers 603-1, 603-2, . . . , and 603-L, for example, are determined.

Figure 24:
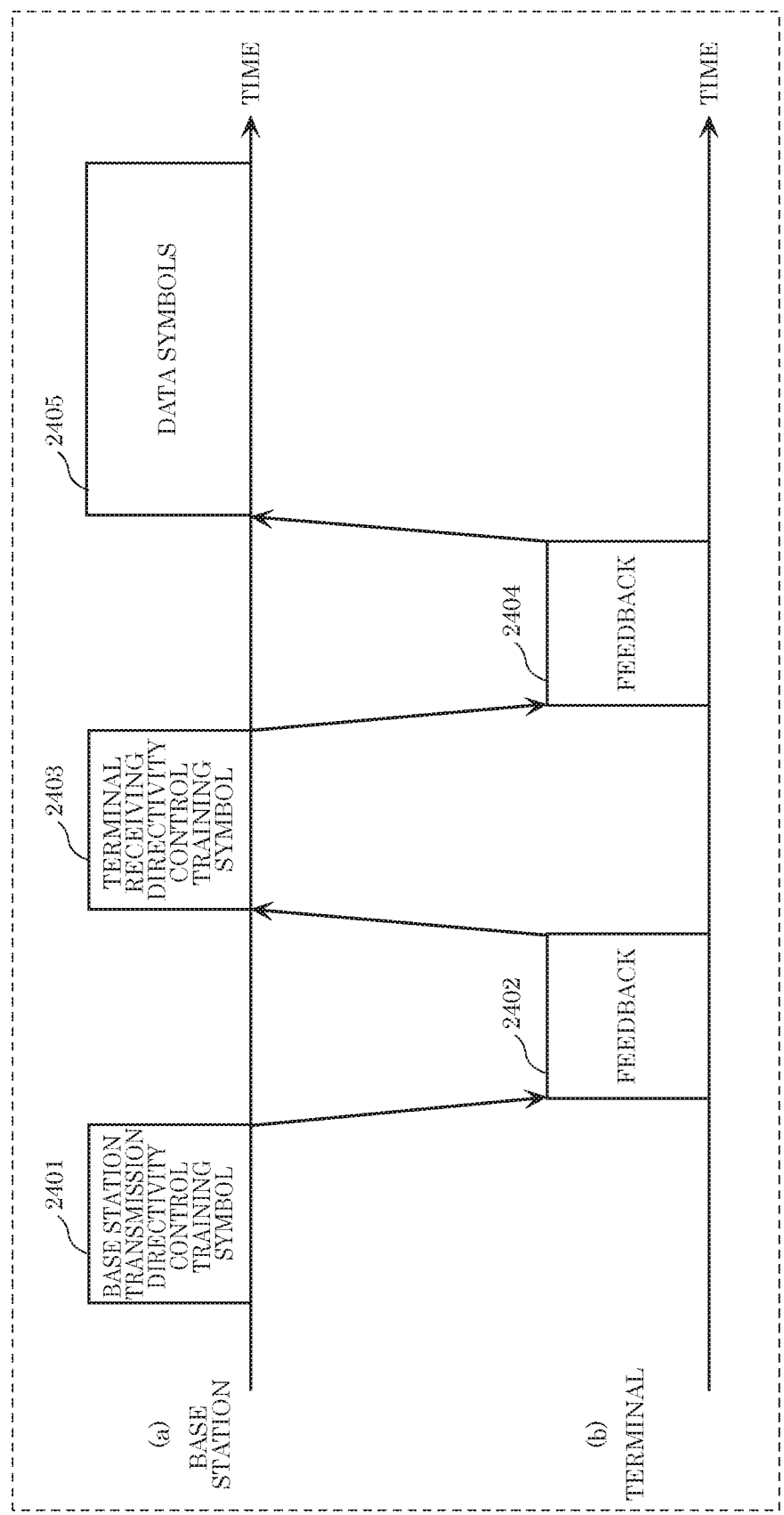
FIG. 24 is a diagram illustrating examples of symbols which the base station and a terminal transmit.

FIG. 24 is a diagram illustrating examples of symbols which the base station transmits and symbols which a terminal transmits along a time-axis, when the base station in FIG. 23 transmits a symbol for transmission directivity control, a symbol for receiving directivity control, and data symbols. In FIG. 24, (a) is a diagram illustrating examples of symbols which the base station transmits, along the time-axis, and (b) is a diagram illustrating examples of symbols which the terminal transmits along the time-axis, while the horizontal axis indicates time in both of (a) and (b).

When the base station and the terminal communicate with each other as illustrated in FIG. 23, first, the base station transmits "base station transmission directivity control training symbol" 2401 as illustrated in FIG. 24. For example, "base station transmission directivity control training symbol" 2401 includes a control information symbol and a known PSK symbol.

Then, the terminal receives "base station transmission directivity control training symbol" 2401 transmitted by the base station, and transmits, as feedback information symbol 2402, information on an antenna to be used by the base station for transmission and information on multiplication coefficients (or weighting factors) to be used for directivity control, for example.

The base station receives "feedback information symbol" 2402 transmitted by the terminal, determines an antenna to be used for transmission from feedback information symbol 2402, and determines a coefficient to be used for transmission directivity control from feedback information symbol 2402. After that, the base station transmits "terminal receiving directivity control training symbol" 2403. For example, "terminal receiving directivity control training symbol" 2403 includes a control information symbol and a known PSK symbol.

Then, the terminal receives "terminal receiving directivity control training symbol" 2403 transmitted by the base station, and determines an antenna which the terminal is to use for receiving and a multiplication coefficient which the terminal is to use for receiving directivity control, for example. Then, the terminal transmits feedback information symbol 2404, notifying that preparation for receiving data symbols is completed.

Then, the base station receives "feedback information symbol" 2404 transmitted by the terminal, and outputs data symbols 2405 based on feedback information symbol 2404.

Note that communication between the base station and the terminal in FIG. 24 is an example, and the order of transmitting symbols and the order in which the base station and the terminal transmit symbols are not limited to those illustrated therein. "Base station transmission directivity control training symbol" 2401, "feedback information symbol" 2402, "terminal receiving directivity control training symbol" 2403, "feedback information symbol" 2404, and "data symbols" 2405 may each include: a preamble for signal detection, time synchronization, frequency synchronization, frequency offset estimation, and channel estimation, a reference symbol, a pilot symbol, and a symbol for transmitting control information, for instance.

Figure 25:
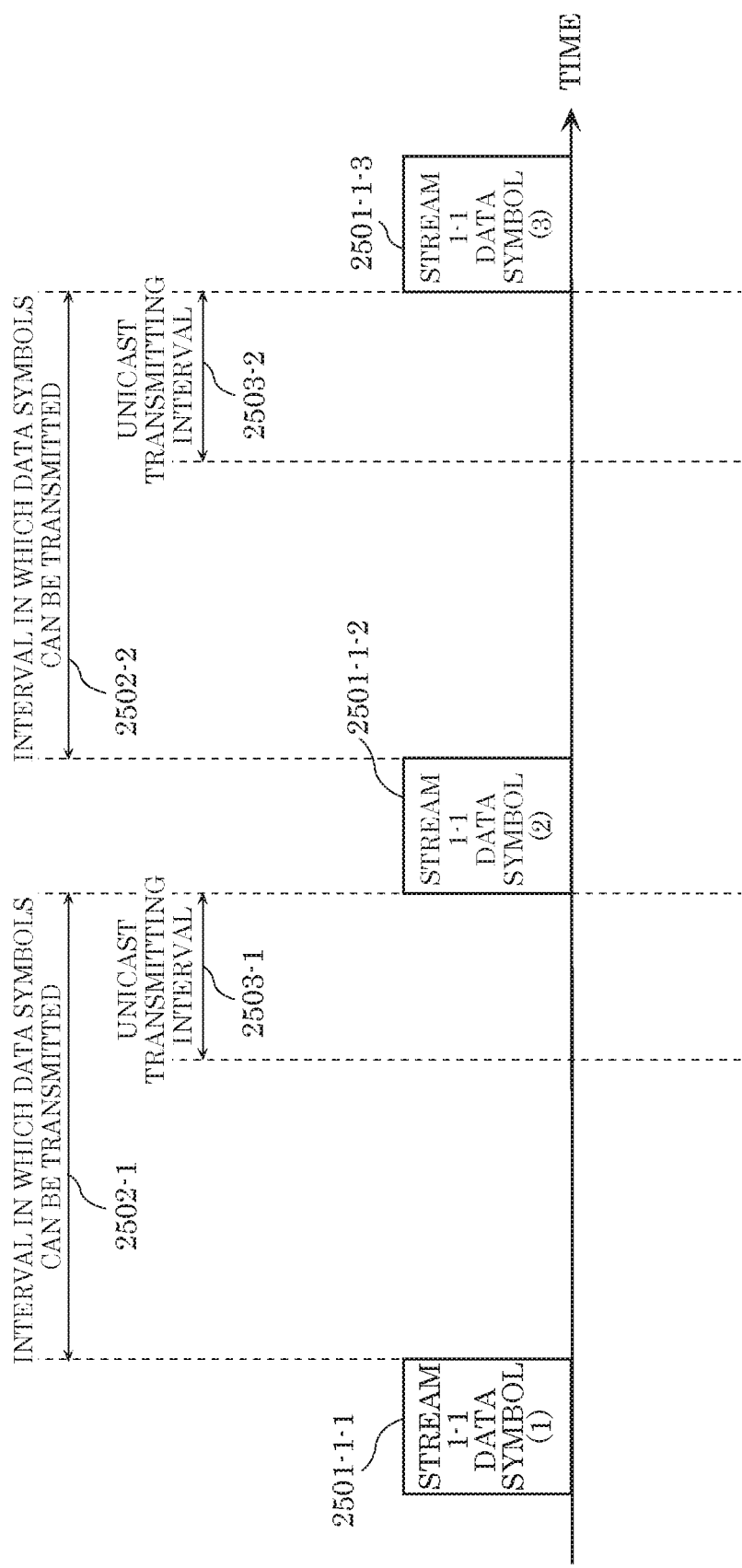
FIG. 25 is a diagram illustrating examples of symbols which the base station transmits.

FIG. 25 illustrates examples of symbols which the base station transmits when the base station transmits data symbols for stream 1 after communication between the base station and the terminal in FIG. 23 is completed, while the horizontal axis indicates time.

In FIG. 25, the base station transmits a first data symbol for transmission beam 1 for stream 1 as "stream 1-1 data symbol (1) (for multicasting)" 2501-1-1. After that, interval 2502-1 in which data symbols can be transmitted is arranged.

After that, the base station transmits a second data symbol for transmission beam 1 for stream 1 (for multicasting) as "stream 1-1 data symbol (2) (for multicasting)" 2501-1-2. After that, interval 2502-2 in which data symbols can be transmitted is arranged.

After that, the base station transmits a third data symbol for transmission beam 1 for stream 1 (for multicasting) as "stream 1-1 data symbol (3) (for multicasting)" 2501-1-3.

Accordingly, the base station transmits data symbols for "stream (for multicasting) 1-1" 2201-1 illustrated in FIG. 22. Note that in FIG. 25, "stream 1-1 data symbol (1) (for multicasting)" 2501-1-1, "stream 1-1 data symbol (2) (for multicasting)" 2501-1-2, "data symbol 1-1 data symbol (3) (for multicasting)" 2501-1-3, and so on may each include, other than a data symbol, a preamble for signal detection, time synchronization, frequency synchronization, frequency offset estimation, and channel estimation, a reference symbol, a pilot symbol, and a symbol for transmitting control information, for instance.

Note that in FIG. 25, interval 2502-1 in which data symbols can be transmitted includes unicast transmitting interval 2503-1, and interval 2502-2 in which data symbols can be transmitted includes unicast transmitting interval 2503-2.

In FIG. 25, a frame includes unicast transmitting intervals 2503-1 and 2503-2. For example, in FIG. 25, the base station may transmit symbols for multicasting in an interval within interval 2502-1 in which data symbols can be transmitted and other than unicast transmitting interval 2503-1, and an interval within interval 2502-2 in which data symbols can be transmitted and other than unicast transmitting interval 2503-2. This point will be described later using an example.

Thus, including a unicast transmitting interval in a frame is a useful feature for stably operating a wireless communication system. This point will be later described using an example. Note that the unicast transmitting intervals may not be in the temporal positions as illustrated in FIG. 25, and may be arranged in any temporal positions. Note that in the unicast transmitting intervals, the base station may transmit symbols or the terminal may transmit symbols.

Furthermore, a configuration may be adopted in which the base station can directly set a unicast transmitting interval, or as another method, the base station may set the maximum transmission-data transmission speed for transmitting symbols for multicasting.

For example, when the transmission speed at which the base station can transmit data is 2 Gbps (bps: bits per second) and the maximum transmission speed at which the base station can transmit data that can be assigned to transmit symbols for multicasting is 1.5 Gbps, a unicast transmitting interval corresponding to 500 Mbps can be set.

Accordingly, a configuration may be adopted in which the base station can indirectly set a unicast transmitting interval. Note that another specific example will be described later.

Note that in accordance with the state in FIG. 22. FIG. 25 illustrates a frame configuration in which "stream 1-1 data symbol (1) (for multicasting)" 2501-1-1, "stream 1-1 data symbol (2) (for multicasting)" 2501-1-2, and "stream 1-1 data symbol (3) (for multicasting)" 2501-1-3 are present, yet the present disclosure is not limited to such a frame configuration. For example, a data symbol for a stream for multicasting other than stream 1 (stream 1-1) may be present, a data symbol for stream 1-2 which is a second transmission beam for stream 1, and a data symbol for stream 1-3 which is a third transmission beam for stream 1 may be present. This point will be described later.

Figure 26:
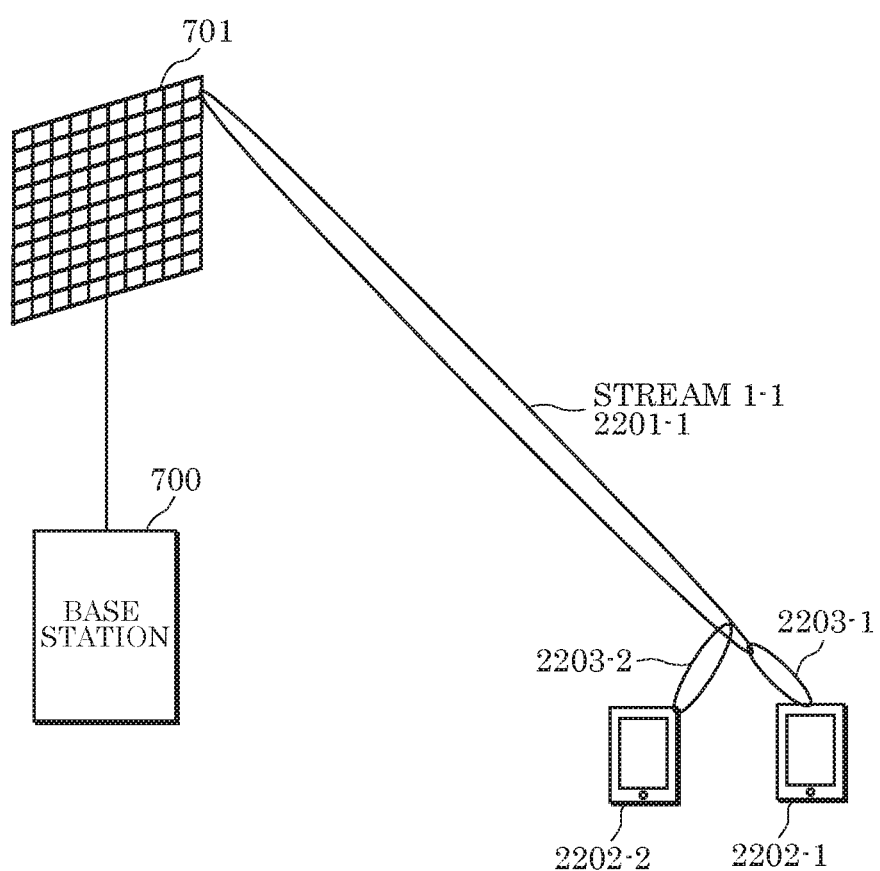
FIG. 26 is a diagram illustrating an example of a state of communication between the base station and terminals.

FIG. 26 illustrates a state when a terminal is newly added to the state in FIG. 22 in which the base station transmits transmission streams for multicasting to one terminal, and elements which operate in the same manner as those in FIG. 22 are assigned the same reference numerals.

In FIG. 26, the terminal newly added is 2202-2. Terminal 2202-2 generates receiving directivity 2203-2 by performing directivity control, and receives transmission beam 2201-1 for "stream 1-1 (for multicasting)".

The following describes FIG. 26.

Figure 27:
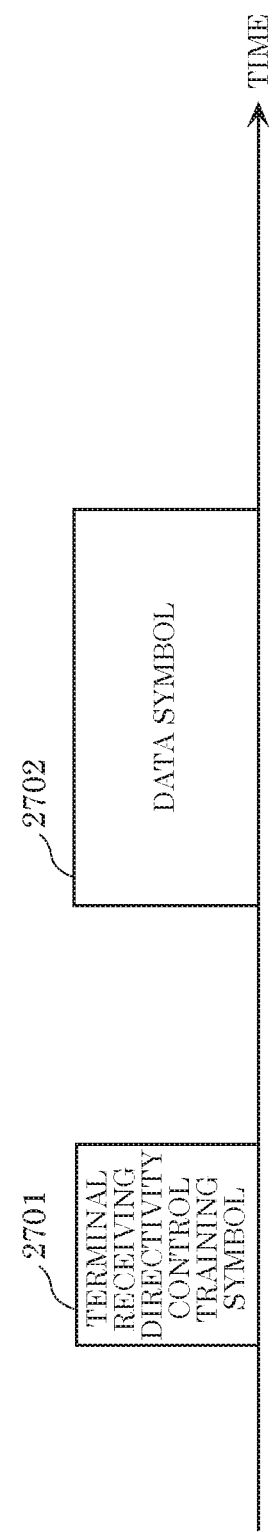
FIG. 27 is a diagram illustrating examples of symbols which the base station transmits.

In the following description, in FIG. 26, terminal 2202-2 newly participates in the multicast communication in a state where base station 700 and terminal 2202-1 are performing multicast communication. Thus, as illustrated in FIG. 27, the base station transmits "terminal receiving directivity control training symbol" 2701 and "data symbol" 2702, and does not transmit "base station transmission training symbol" illustrated in FIG. 24. Note that in FIG. 27, the horizontal axis indicates time.

Figure 28:
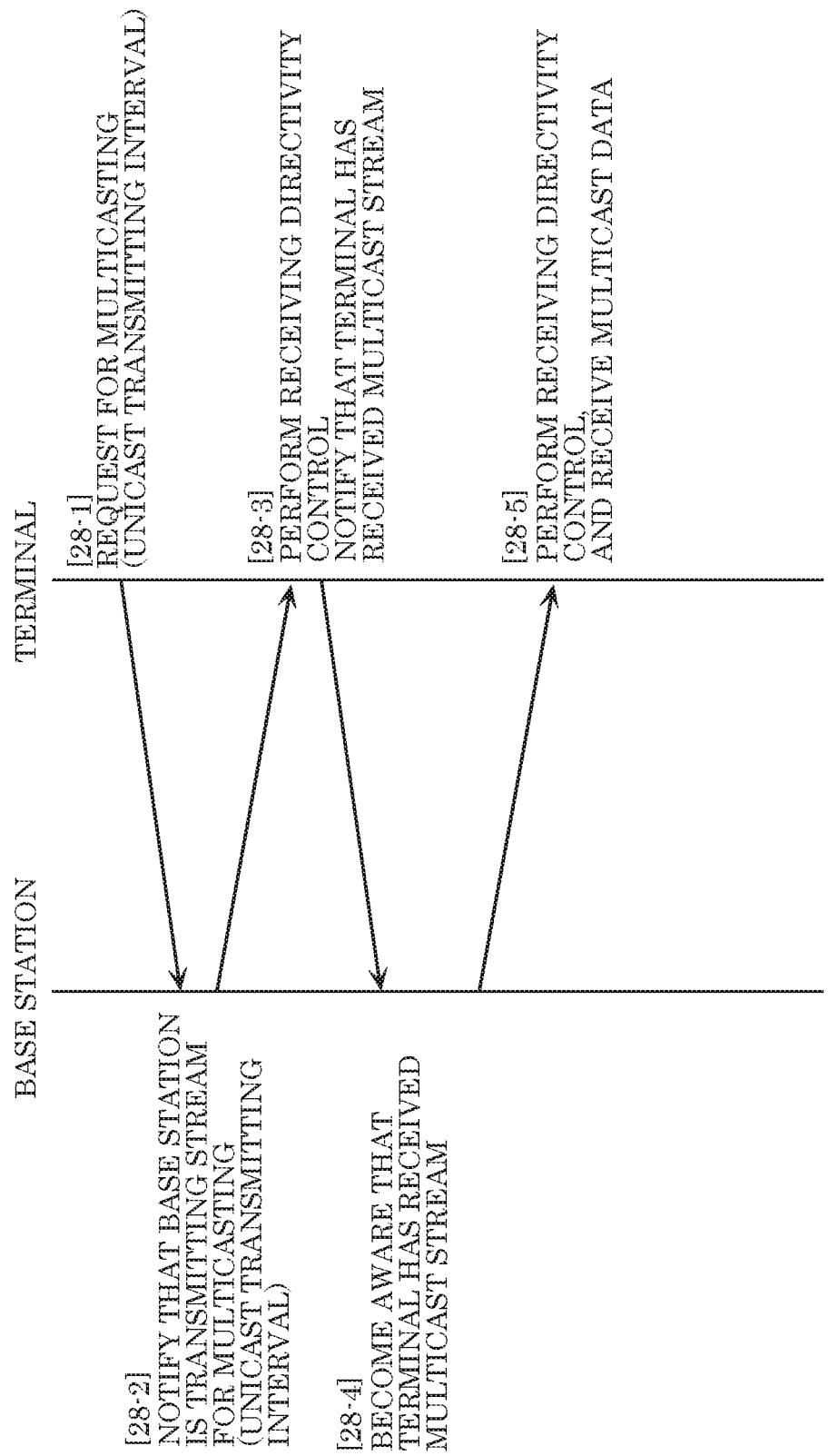
FIG. 28 is a diagram illustrating a procedure of performing communication between the base station and a terminal.

FIG. 28 illustrates an example of operation performed to achieve a state in which the base station transmits transmission beams for multicasting to two terminals as illustrated in FIG. 26.

[28-1] Terminal 2202-2 transmits a "request to transmit stream 1 by multicasting" to the base station. Note that the "request to transmit stream 1 by multicasting" is transmitted in a unicast transmitting interval in FIG. 25.

[28-2] Upon receiving [28-1], the base station notifies terminal 2202-2 that "the base station is transmitting stream 1 for multicasting". Note that the base station transmits a notification indicating that "the base station is transmitting stream 1 for multicasting" in a unicast transmitting interval in FIG. 25.

[28-3] Upon receiving [28-2], terminal 2202-2 performs receiving directivity control, in order to start receiving stream 1 for multicasting. Then, terminal 2202-2 performs receiving directivity control, and notifies the base station that "terminal 2202-2 has successfully received stream 1 for multicasting".

[28-4] Upon receiving [28-3], the base station becomes aware that the terminal has successfully received "stream 1 for multicasting".

[28-5] Terminal 2202-2 performs receiving directivity control, and starts receiving "stream 1 for multicasting".

Figure 29:
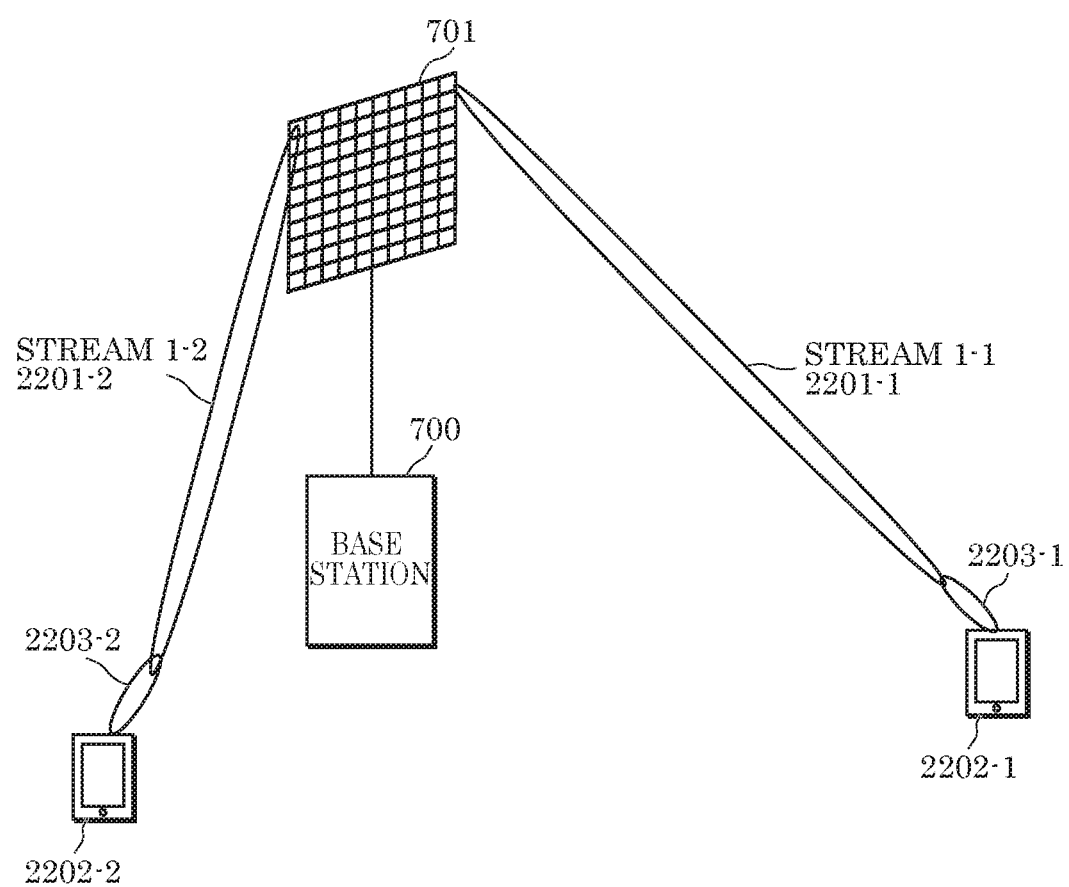
FIG. 29 is a diagram illustrating an example of a state of communication between the base station and terminals.

FIG. 29 illustrates that a terminal is newly added to a state in FIG. 22 in which the base station is transmitting a transmission stream for multicasting to one terminal. Elements which operate in the same manner as those in FIG. 22 are assigned the same reference numerals.

In FIG. 29, the terminal newly added is 2202-2. At this time, different points from FIG. 26 are that base station 700 newly transmits transmission beam 2201-2 for "stream 1-2 (second transmission beam for stream 1) (for multicasting)", and terminal 2202-2 performs directivity control to generate receiving directivity 2203-2, and receives transmission beam 2201-2 for "stream 1-2 (for multicasting)".

The following describes control for achieving the state as in FIG. 29.

In the following description, in FIG. 29, terminal 2202-2 newly participates in multicast communication in a state in which base station 700 and terminal 2202-1 are performing multicast communication.

Figure 30:
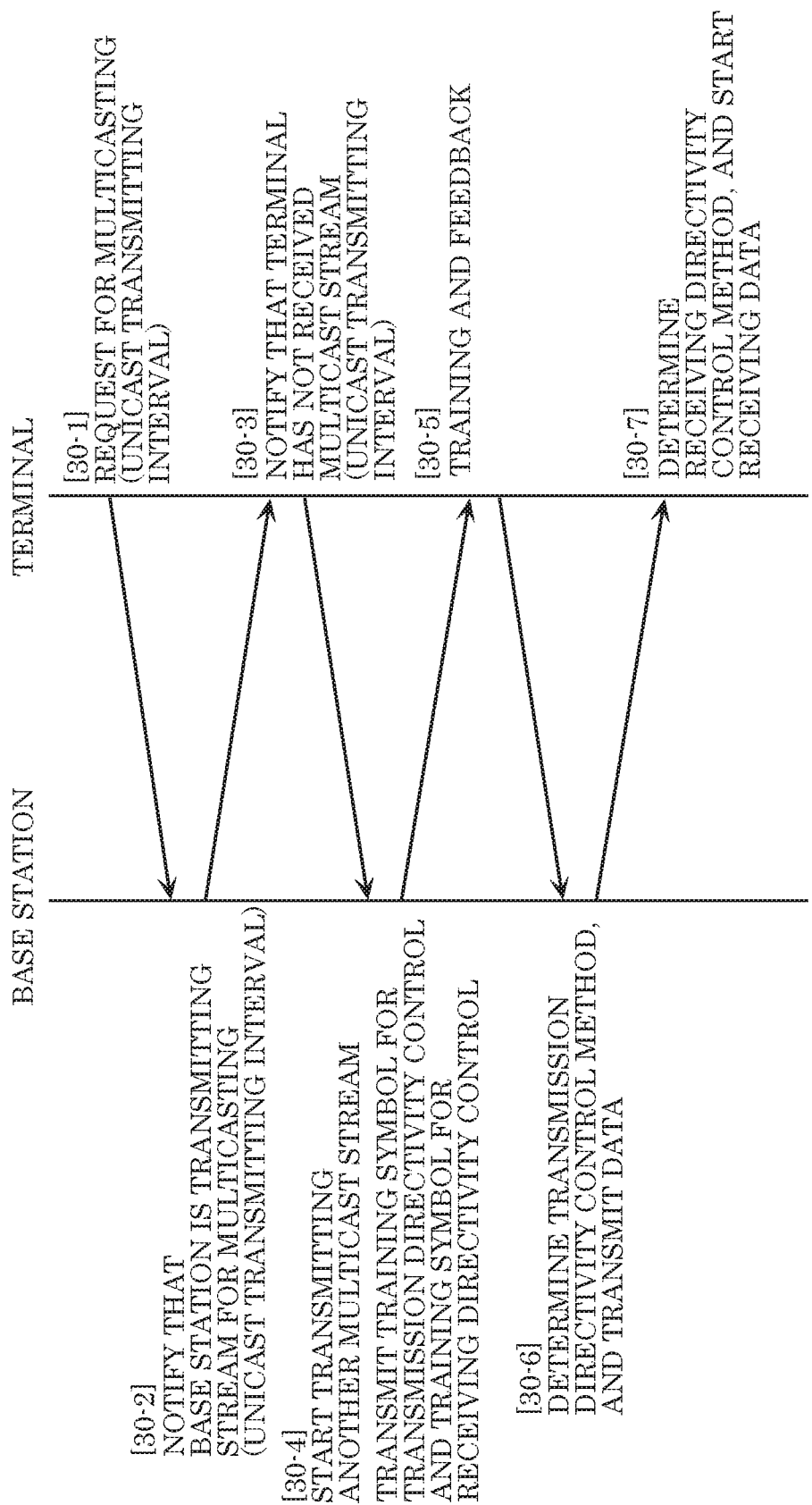
FIG. 30 is a diagram illustrating a procedure of performing communication between the base station and a terminal.

FIG. 30 illustrates an example of operation performed in order to achieve a state in which the base station transmits transmission beams for multicasting to two terminals, as illustrated in FIG. 29.

[30-1] Terminal 2202-2 transmits a "request to transmit stream 1 by multicasting" to the base station. Note that the "request to transmit stream 1 by multicasting" is transmitted in a unicast transmitting interval in FIG. 25.

[30-2] Upon receiving [30-1], the base station notifies terminal 2202-2 that "the base station is transmitting stream 1 for multicasting". Note that the base station transmits a notification indicating that "the base station is transmitting stream 1 for multicasting" in a unicast transmitting interval in FIG. 25.

[30-3] Upon receiving [30-2], terminal 2202-2 notifies the base station that "terminal 2202-2 has not received stream 1 for multicasting". Note that terminal 2202-2 transmits the notification indicating that "stream 1 for multicasting is not received" in a unicast transmitting interval in FIG. 25.

[30-4] Upon receiving [30-3], the base station determines to transmit another transmission beam (specifically, transmission beam 2201-2 in FIG. 29) for stream 1 for multicasting. Note that here, the base station determines to transmit another transmission beam for stream 1 for multicasting, yet the base station may determine not to transmit another transmission beam for stream 1 for multicasting. This point will be later described.

Thus, the base station transmits a training symbol for transmission directivity control and a training symbol for receiving directivity control to terminal 2202-2, in order to transmit stream 1 by multicasting. Note that the base station transmits a transmission beam for stream 1-1 in FIG. 29, separately from transmission of these symbols. This point will be described later.

[30-5] Terminal 2202-2 receives a training symbol for transmission directivity control and a training symbol for receiving directivity control which the base station has transmitted, and transmits feedback information to the base station in order that the base station performs transmission directivity control and terminal 2202-2 performs receiving directivity control.

[30-6] Based on the feedback information transmitted by terminal 2202-2, the base station determines a method for transmission directivity control (determines, for instance, a weighting factor to be used when performing directivity control), and transmits a data symbol for stream 1 (transmission beam 2201-2 for stream 1-2 in FIG. 29).

[30-7] Terminal 2202-2 determines a receiving directivity control method (determines, for instance, a weighting factor to be used when performing directivity control), and starts receiving data symbols for stream 1 (transmission beam 2201-2 for stream 1-2 in FIG. 29) which the base station has transmitted.

Note that the "procedure for a base station and a terminal to communicate" in FIG. 30 is an example, and the order of transmitting information items is not limited to the order in FIG. 30. Thus, communication between the base station and the terminal can be similarly established even if the order of transmitting information items has changed.

FIG. 30 illustrates an example in which the terminal performs receiving directivity control, yet the terminal may not perform receiving directivity control. In such a case, the base station may not transmit a training symbol for receiving directivity control, and the terminal may not determine a receiving directivity control method, in FIG. 30.

When the base station performs transmission directivity control, if the base station has a configuration in FIG. 1, for example, multiplication coefficients for multipliers 204-1, 204-2, 204-3, and 204-4 in FIG. 2 are determined, whereas if the base station has a configuration in FIG. 3, weighting factors for weighting synthesizer 301 are determined, for example. Note that the number of streams to be transmitted is "2" in the case of FIG. 29, yet the present disclosure is not limited to this.

Then, when terminals 2202-1 and 2202-2 perform receiving directivity control, if the terminals have a configuration in FIG. 4, for example, multiplication coefficients for multiplier 503-1, 503-2, 503-3, and 503-4 in FIG. 5 are determined, whereas when the terminals have a configuration in FIG. 6, multiplication coefficients for multipliers 603-1, 603-2, . . . and 603-L are determined, for example.

Figure 31:
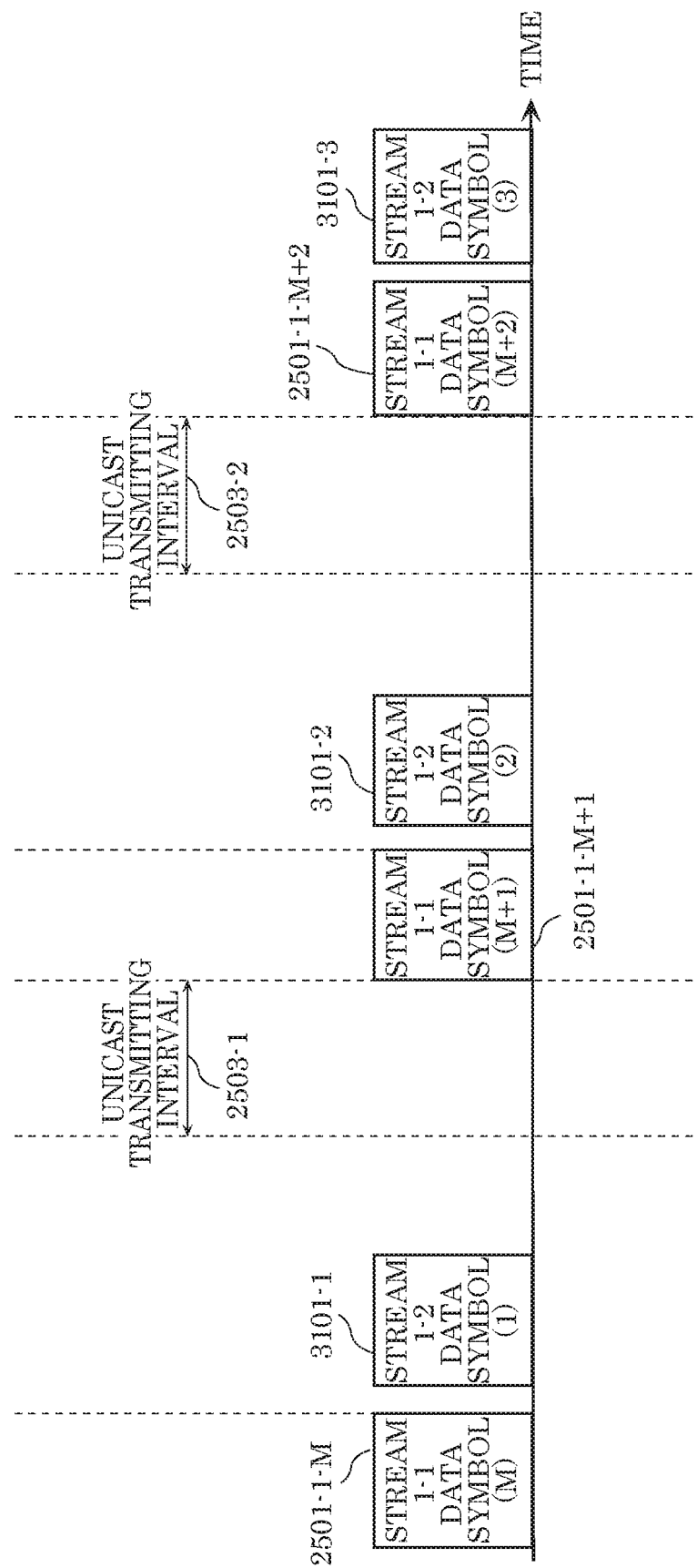
FIG. 31 is a diagram illustrating examples of symbols which the base station transmits.

FIG. 31 illustrates examples of symbols transmitted by the base station when the base station transmits data symbols for stream 1 after communication between the base station and the terminal in FIG. 30 is completed, while the horizontal axis indicates time.

In FIG. 31, "stream 1-1" in FIG. 29 is present, and thus similarly to FIG. 25, "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are present. Note that "(M), (M+1), (M+2)" are illustrated, and this is because stream 1-1 (for multicasting) is already present before stream 1-2 (for multicasting) is present. Accordingly, in FIG. 31, M is assumed to be an integer of 2 or greater.

Then, as illustrated in FIG. 31, "stream 1-2 data symbol (1) (for multicasting)" 3101-1, "stream 1-2 data symbol (2)

(for multicasting)" 3101-2, and "stream 1-2 data symbol (3) (for multicasting)" 3101-3 are present in intervals other than unicast transmitting intervals 2503-1 and 2503-2.

The features are as follows as described above.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

The terminal can obtain "data of stream 1" by obtaining "data symbols for stream 1-1". The terminal can obtain "data of stream 1" by obtaining "data symbols for stream 1-2".

The directivities of transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3. Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

The above allows two terminals to receive multicast streams which the base station has transmitted. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

Figure 32:
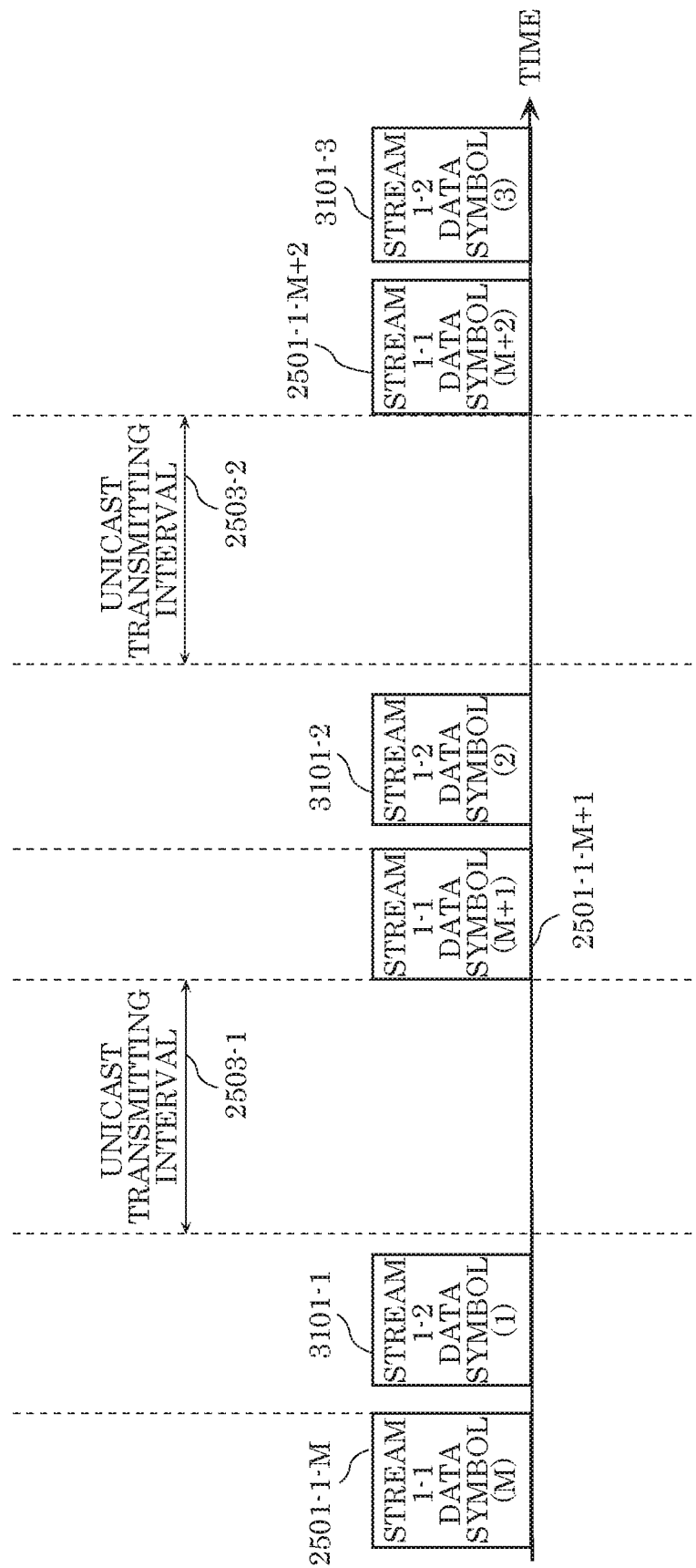
FIG. 32 is a diagram illustrating examples of symbols which the base station transmits.

FIG. 32 illustrates "examples of symbols which the base station transmits when the base station transmits data symbols (for stream 1) after communication between the base station and the terminal in FIG. 30 is completed", which are different from FIG. 31, where the horizontal axis indicates time. Note that elements which operate in the same manner as in FIGS. 25 and 31 are assigned the same reference numerals in FIG. 32.

Different points in FIG. 32 from FIG. 31 are that unicast transmitting intervals 2503-1 and 2503-2 are set to longer time periods, and thus the base station does not further add and transmit symbols for multicasting.

Figure 33:
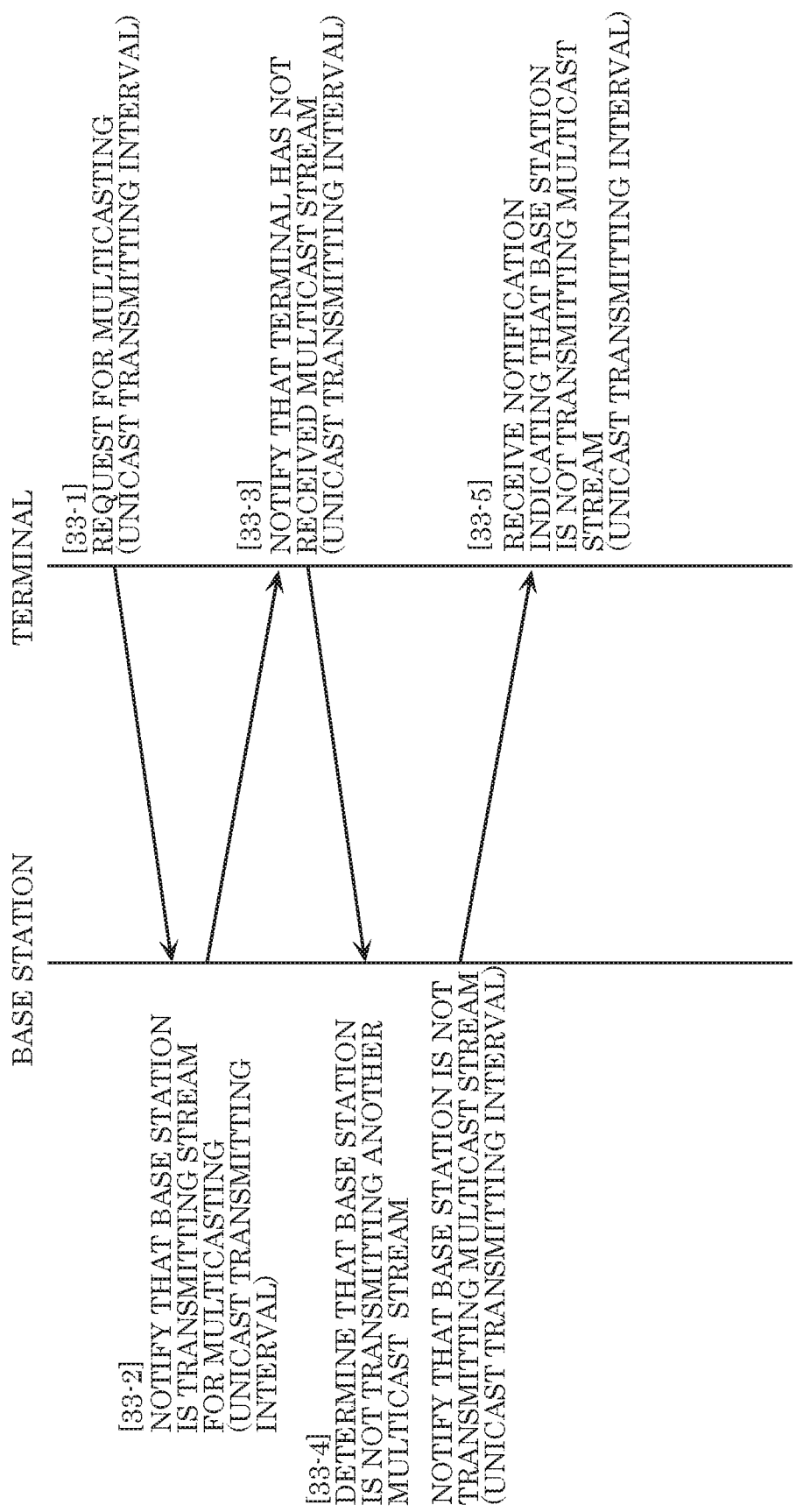
FIG. 33 is a diagram illustrating a procedure of performing communication between the base station and a terminal.

FIG. 33 illustrates an example of operation when new terminal 2202-3 transmits a request to the base station to add a transmission beam, in addition to transmission beams for multicasting transmitted by the base station to two terminals (terminals 2202-1 and 2202-2), as illustrated in FIG. 29.

Note that FIG. 32 illustrates a frame of a modulated signal which the base station transmits.

[33-1] Terminal 2202-3 transmits to the base station a "request to transmit stream 1 by multicasting". Note that terminal 2202-3 transmits the "request to transmit stream 1 by multicasting" in a unicast transmitting interval in FIG. 32.

[33-2] Upon receiving [33-1], the base station notifies terminal 2202-3 that "the base station is transmitting stream 1 for multicasting". Note that the base station transmits the "notification indicating that the base station is transmitting stream 1 for multicasting" in a unicast transmitting interval in FIG. 32.

[33-3] Upon receiving [33-2], terminal 2202-3 notifies the base station that "terminal 2202-3 has not received stream 1 for multicasting". Note that terminal 2202-3 transmits the "notification indicating that stream 1 for multicasting has not been received" in a unicast transmitting interval in FIG. 32.

[33-4] Upon receiving [33-3], the base station determines whether a transmission beam other than the transmission beam for stream 1-1 and the transmission beam for stream 1-2 can be transmitted as a transmission beam for stream 1 for multicasting. At this time, taking into consideration that the frame is as illustrated in FIG. 32, the base station determines not to transmit another transmission beam for stream 1 for multicasting. Accordingly, the base station notifies terminal 2202-3 that "the base station is not to transmit another transmission beam for stream 1 for multicasting". Note that the base station transmits the "notification indicating that the base station is not to transmit another transmission beam for stream 1 for multicasting" in a unicast transmitting interval in FIG. 32.

[33-5] Terminal 2202-3 receives the "notification indicating that the base station is not to transmit another transmission beam for stream 1 for multicasting".

Note that the "procedure for a base station and a terminal to communicate" in FIG. 33 is an example, and the order of transmitting information items is not limited to the order in FIG. 33, so that communication between the base station and the terminal can be similarly established even if the order of transmitting items has changed. In this manner, if there are insufficient communication resources for multicast transmission, a multicast transmission beam may not be added.

Figure 34:
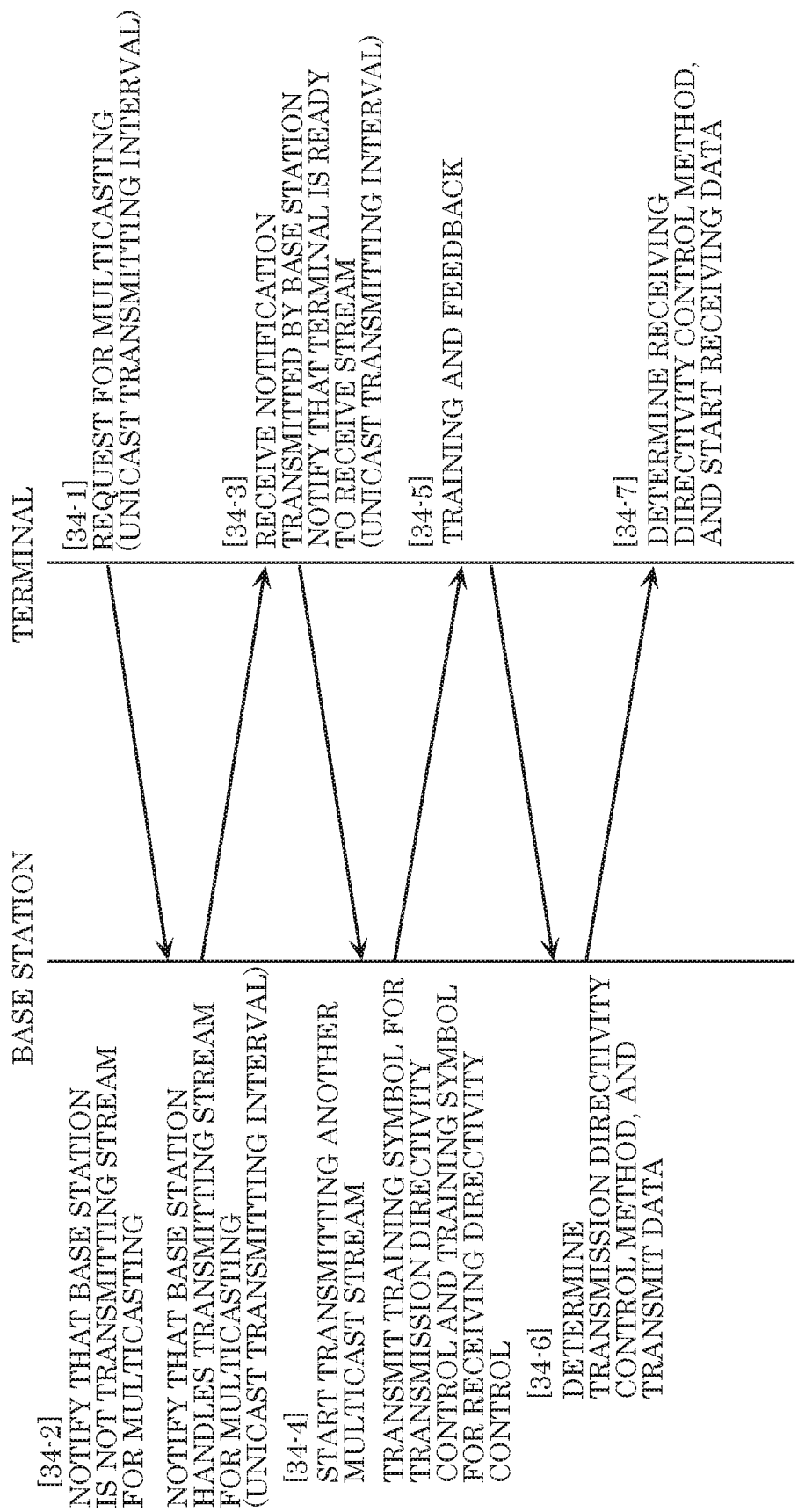
FIG. 34 is a diagram illustrating a procedure of performing communication between the base station and a terminal.

FIG. 34 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), illustrated in FIG. 29. Note that a frame of a modulated signal transmitted by the base station is in the state as illustrated in FIG. 31.

[34-1] Terminal 2202-3 transmits to the base station a "request to transmit stream 2 by multicasting". Note that terminal 2202-3 transmits the "request to transmit stream 2 by multicasting" in unicast transmitting interval 2503 in FIG. 31.

[34-2] Upon receiving [34-1], the base station notifies terminal 2202-3 that "the base station is not transmitting stream 2 for multicasting". In addition, the base station determines "whether the base station can add and transmit a transmission beam for stream 2 for multicasting". At this time, taking into consideration that the frame is in the state as illustrated in FIG. 31, the base station notifies terminal 2202-3 that "the base station is able to transmit a transmission beam for stream 2 for multicasting". Note that the base station transmits the "notification indicating that the base station is not transmitting stream 2 for multicasting" and the "notification indicating that the base station is able to transmit a transmission beam for stream 2 for multicasting" in unicast transmitting interval 2503 in FIG. 31.

[34-3] Upon receiving [34-2], terminal 2202-3 notifies the base station that "terminal 2203-3 is ready to receive stream 2 for multicasting". Note that terminal 2202-3 transmits the notification indicating that "terminal 2202-3 is ready to receive stream 2 for multicasting" in unicast transmitting interval 2503 in FIG. 31.

[34-4] Upon receiving [34-3], the base station determines to transmit a transmission beam for stream 2 for multicasting. Then, the base station transmits a training symbol for transmission directivity control and a training symbol for receiving directivity control, in order to transmit stream 2 to terminal 2202-3 by multicasting. Note that the base station transmits transmission beams for streams 1-1 and 1-2, as illustrated in FIG. 31, separately from transmission of the above symbols. This point will be described later.

[34-5] Terminal 2202-3 receives the training symbol for transmission directivity control and the training symbol for receiving directivity control which the base station has transmitted, and transmits feedback information to the base station in order that the base station performs transmission directivity control and terminal 2202-3 performs receiving directivity control.

[34-6] Based on the feedback information transmitted by terminal 2202-3, the base station determines a method for transmission directivity control (determines a weighting factor used for directivity control, for instance), and transmits data symbols for stream 2.

[34-7] Terminal 2202-3 determines a receiving directivity control method (determines a weighting factor used for directivity control, for instance), and starts receiving the data symbols for stream 2 which the base station has transmitted.

Note that the "procedure for a base station and a terminal to communicate" in FIG. 34 is an example, and the order of transmitting information items is not limited to the order in FIG. 34, and communication between the base station and the terminal can be similarly established even if the order of transmitting information items has changed. FIG. 34 illustrates an example in which the terminal performs receiving directivity control, yet the terminal may not perform receiving directivity control. In such a case, the base station may not transmit a training symbol for receiving directivity control, and the terminal does not determine a receiving directivity control method, in FIG. 34.

When the base station performs transmission directivity control, for example, multiplication coefficients for multipliers 204-1, 204-2, 204-3, and 204-4 in FIG. 2 are determined if the base station has a configuration in FIG. 1.

Then, when terminals 2202-1, 2202-2, and 2202-3 perform receiving directivity control, if the terminals have a configuration in FIG. 4, multiplication coefficients for multipliers 503-1, 503-2, 503-3, and 503-4 in FIG. 5 are determined, for example, whereas if the terminals have a configuration in FIG. 6, multiplication coefficients for multipliers 603-1, 603-2, . . . , and 603-L are determined, for example.

Figure 35:
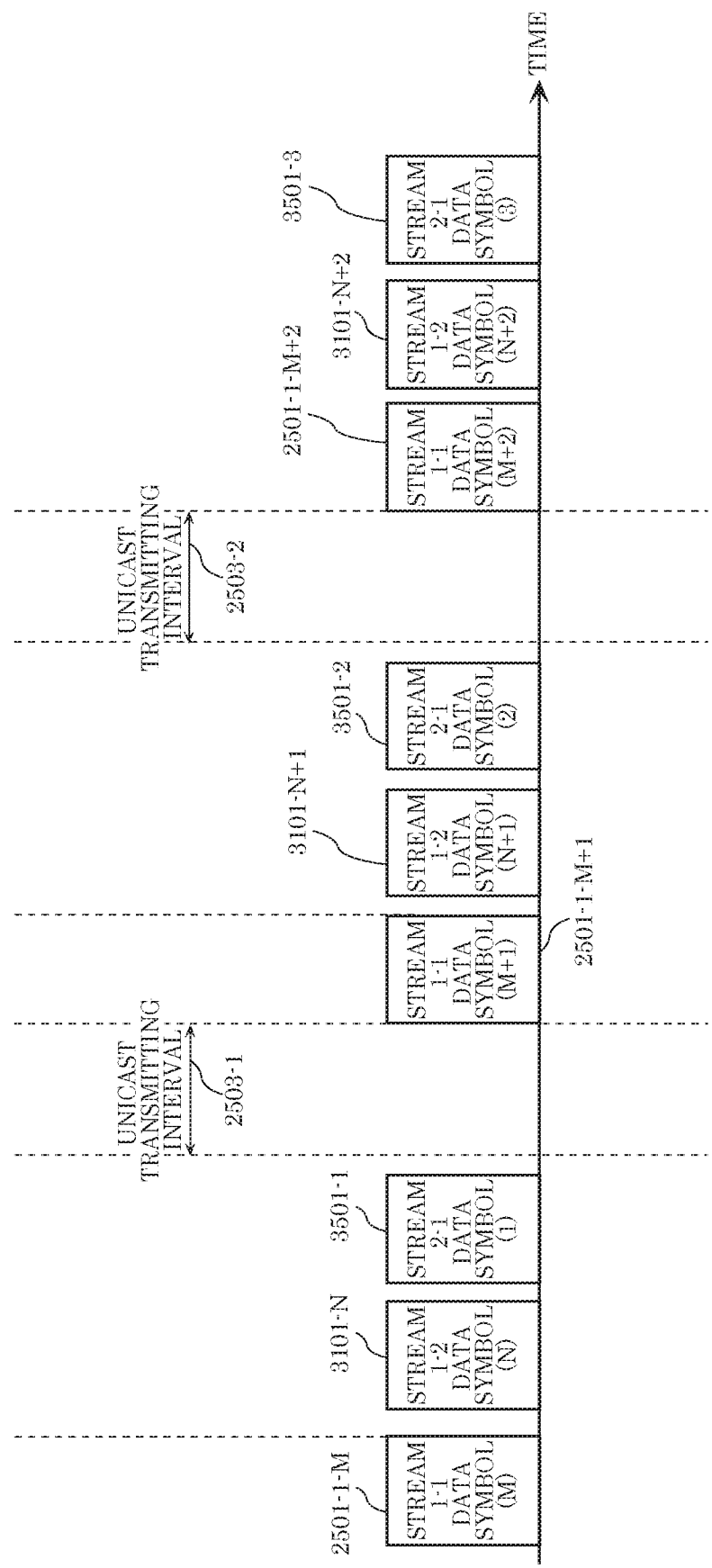
FIG. 35 is a diagram illustrating examples of symbols which the base station transmits.

FIG. 35 illustrates examples of symbols which the base station transmits when the base station transmits data symbols for stream 1 and stream 2 after communication between the base station and a terminal in FIG. 34 is completed, where the horizontal axis indicates time.

In FIG. 35, "stream 1-1" and "stream 1-2" illustrated in FIG. 31 are present, and thus "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are present. In addition, "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are present. Note that N and M are integers of 2 or greater.

As illustrated in FIG. 35, in intervals other than unicast transmitting intervals 2503-1 and 2503-2, "stream 2-1 data symbol (1) (for multicasting)" 3501-1, "stream 2-1 data symbol (2) (for multicasting)" 3501-2, and "stream 2-1 data symbol (3) (for multicasting)" 3501-3 are present.

As described above, the features achieved at this time are as follows.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are all data symbols for transmitting "stream 1".

A terminal obtains "data of stream 1" by obtaining "data symbols for stream 1-1". Further, the terminal obtains "data of stream 1" by obtaining "data symbols for stream 1-2".

The directivities of transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) are different from the directivities of transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

Thus, a set of multiplication coefficients (or weighting factors) for the transmitting device of the base station used in order to generate transmission beams for "stream 1-1 data symbol (M) (for multicasting)" 2501-1-M, "stream 1-1 data symbol (M+1) (for multicasting)" 2501-1-(M+1), and "stream 1-1 data symbol (M+2) (for multicasting)" 2501-1-(M+2) is different from a set of multiplication coefficients (or weighting factors) for the transmitting device of the base station used in order to generate transmission beams for "stream 1-2 data symbol (1) (for multicasting)" 3101-1, "stream 1-2 data symbol (2) (for multicasting)" 3101-2, and "stream 1-2 data symbol (3) (for multicasting)" 3101-3.

"Stream 2-1 data symbol (1) (for multicasting)" 3501-1, "stream 2-1 data symbol (2) (for multicasting)" 3501-2, and "stream 2-1 data symbol (3) (for multicasting)" 3501-3 are data symbols for transmitting "stream 2".

A terminal obtains data of "stream 2" by obtaining "data symbols for stream 2-1". The above allows the terminal to receive a plurality of multicast streams (streams 1 and 2) transmitted by the base station. At this time, directivity control is performed by the transmitting device and the receiving device, and thus an advantageous effect of increasing an area in which streams for multicasting can be received is yielded. Furthermore, streams and transmission beams are added only when necessary, and thus an advantageous effect of effectively utilizing frequency, time, and space resources for transmitting data.

Note that control as described below may be performed. The details of the control are as follows.

FIG. 32 illustrates "examples of symbols which the base station transmits when the base station transmits data symbols (for stream 1)", which is different from FIG. 35, where the horizontal axis indicates time. Note that elements which operate in the same manner as those in FIGS. 25 and 31 are assigned the same reference numerals in FIG. 32.

Different points in FIG. 32 from FIG. 35 are that unicast transmitting intervals 2503-1 and 2503-2 are set to longer time periods, and thus the base station does not add and transmit any more symbols for multicasting, that is, for example, symbols for a new stream.

Figure 36:
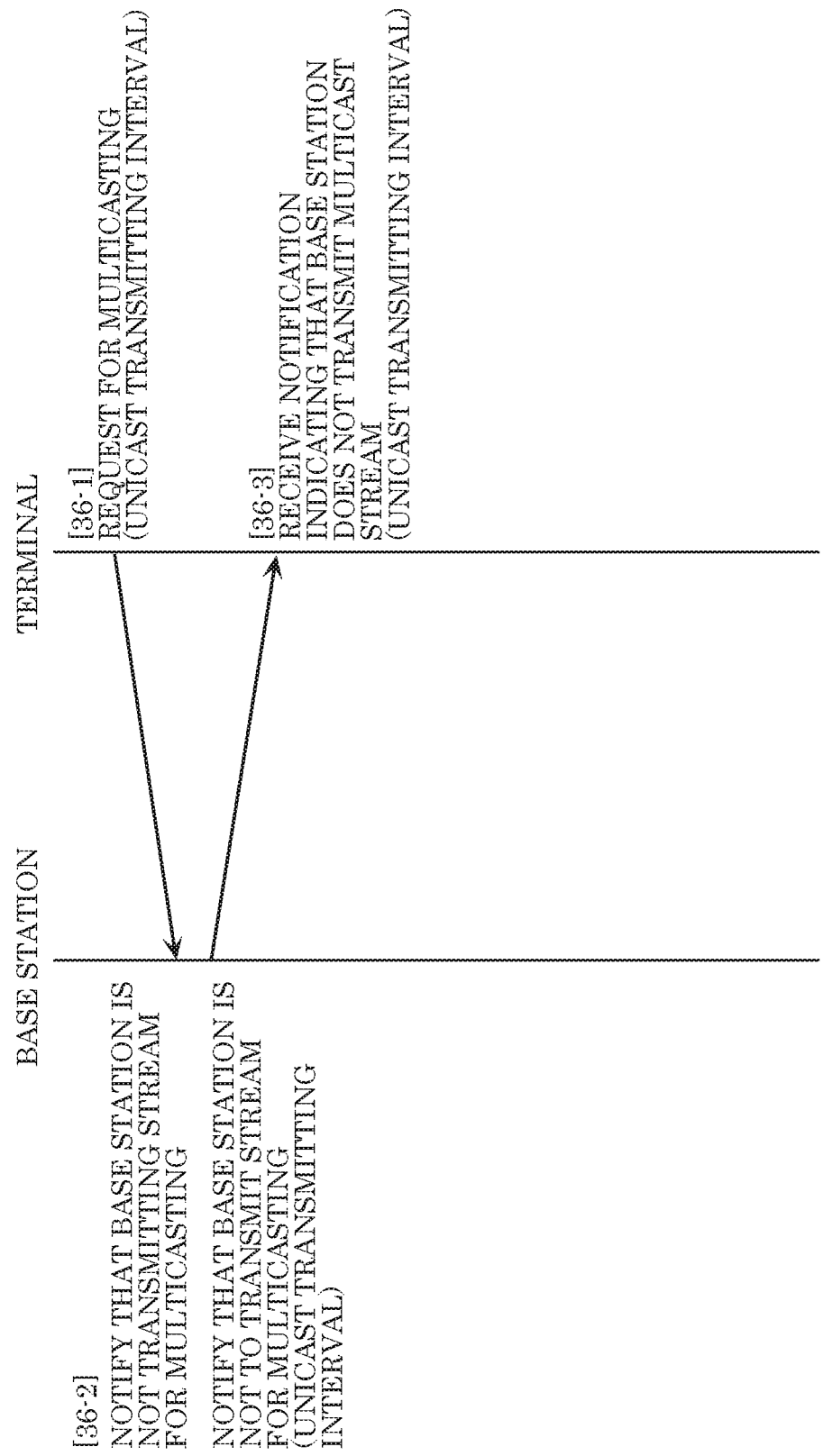
FIG. 36 is a diagram illustrating a procedure of performing communication between the base station and a terminal.

FIG. 36 illustrates an example of operation when new terminal 2202-3 transmits a request to the base station to add a transmission beam for another stream for multicasting (stream 2), in addition to transmission beams for multicasting transmitted by the base station to two terminals (terminals 2202-1 and 2202-2), as illustrated in FIG. 29. Note that FIG. 32 illustrates a frame of a modulated signal which the base station transmits.

[36-1] Terminal 2202-3 transmits to the base station a "request to transmit stream 2 by multicasting". Note that terminal 2202-3 transmits the "request to transmit stream 2 by multicasting" in a unicast transmitting interval in FIG. 32.

[36-2] Upon receiving [36-1], the base station notifies terminal 2202-3 that "the base station is not transmitting stream 2 for multicasting". Note that the base station transmits the notification indicating that "the base station is not transmitting stream 2 for multicasting" in a unicast transmitting interval in FIG. 32. In addition, the base station determines whether a transmission beam for stream 2 for multicasting can be transmitted. Taking the frame illustrated in FIG. 32 into consideration, the base station determines not to transmit a transmission beam for stream 2 for multicasting. Thus, the base station notifies terminal 2202-3 that "the base station is not to transmit stream 2 for multicasting". Note that the base station transmits the "notification indicating that the base station is not to transmit stream 2 for multicasting" in a unicast transmitting interval in FIG. 32.

[36-3] Terminal 2202-3 receives the "notification indicating that the base station is not to transmit stream 2 for multicasting".

Note that the "procedure for a base station and a terminal to communicate" in FIG. 36 is an example, and the order of transmitting information items is not limited to the order in FIG. 36. Communication between the base station and the terminal can be similarly established even if the procedure of transmitting items has changed. In this manner, if there are insufficient communication resources for multicast transmission, a stream and a multicast transmission beam may not be added.

Note that a supplemental description of a method for setting unicast transmitting intervals 2503-1 and 2503-2 illustrated in, for instance, FIG. 35 is now given.

For example, in FIG. 35, the maximum value of the number of transmission beams for multicasting is determined in advance or is set.

In response to requests from the terminals, the base station transmits transmission beams for multicasting, the number of which is smaller than or equal to the maximum value. For example, in the case of FIG. 35, the number of transmission beams for multicasting is 3. Then, the base station transmits a plurality of transmission beams for multicasting, and temporal idle time after transmitting the transmission beams is set as a unicast transmitting interval.

The unicast transmitting intervals may be determined as described above.

Supplementary Note 1

Supplementary Note 1 describes the case where a base station performs unicast communication with a plurality of terminals, or in other words, communicates separately with a plurality of terminals.

At this time, for example, #1 symbol group 901-1 for stream 1, #2 symbol group 901-2 for stream 1, and #3 symbol group 901-3 for stream 1 in FIG. 9 may be control information for broadcast channels, that is, control information which the base station transmits to a plurality of terminals by broadcasting in order to perform data communication with the plurality of terminals. Note that control information is to be used to, for example, establish data communication between the base station and a terminal.

For example, #1 symbol group 901-1 for stream 1, #2 symbol group 901-2 for stream 1, and #3 symbol group 901-3 for stream 1 in FIG. 9 may be common search spaces. Note that a common search space is control information for cell control. Also, a common search space is control information broadcast to a plurality of terminals.

Similarly, for example, #1 symbol group 902-1 for stream 2, #2 symbol group 902-2 for stream 2, and #3 symbol group 902-3 for stream 2 in FIG. 9 may be control information for broadcast channels, that is, control information which the base station transmits to a plurality of terminals by broadcasting in order to perform data communication with the plurality of terminals.

For example, #1 symbol group 902-1 for stream 2, #2 symbol group 902-2 for stream 2, and #3 symbol group 902-3 for stream 2 in FIG. 9 may be common search spaces.

Note that features of #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, and #3 symbol group 1401-3 for modulated signal 1 in FIG. 14 may be control information for broadcast channels, that is, control information which the base station transmits to a plurality of terminals by broadcasting in order to perform data communication with the plurality of terminals.

In addition, for example, #1 symbol group 1401-1 for modulated signal 1, #2 symbol group 1401-2 for modulated signal 1, and #3 symbol group 1401-3 for modulated signal 1 in FIG. 14 may be common search spaces.

For example, #1 symbol group 1402-1 for modulated signal 2, #2 symbol group 1402-2 for modulated signal 2, and #3 symbol group 1402-3 for modulated signal 2 in FIG. 14 may be control information for broadcast channels, that is, control information which the base station transmits to a plurality of terminals by broadcasting in order to perform data communication with the plurality of terminals.

For example, #1 symbol group 1402-1 for modulated signal 2, #2 symbol group 1402-2 for modulated signal 2, and #3 symbol group 1402-3 for modulated signal 2 in FIG. 14 may be common search spaces.

Note that #1 symbol group 1401-1 for modulated signal 1, #2 symbol group 1401-2 for modulated signal 1, and #3 symbol group 1401-3 for modulated signal 1 in FIG. 14 are as described in the above embodiments, and #1 symbol group 1402-1 for modulated signal 2, #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be control information for broadcast channels, that is, control information which the base station transmits to a plurality of terminals by broadcasting in order to perform data communication with the plurality of terminals.

Stream 1-1 data symbol (1) 2501-1-1, stream 1-1 data symbol (2) 2501-1-2, and stream 1-1 data symbol (3) 2501-1-3 in FIG. 25 may be common search spaces.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be control information for broadcast channels, that is, control information which the base station transmits to a plurality of terminals by broadcasting in order to perform data communication with the plurality of terminals.

Further, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be common search spaces.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be control information for broadcast channels, that is, control information which the base station transmits to a plurality of terminals by broadcasting in order to perform data communication with the plurality of terminals.

Further, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be common search spaces.

For example, stream 2-1 data symbol (1) 3501-1, stream 2-1 data symbol (2) 3501-2, and stream 2-1 data symbol (3) 3501-3 in FIG. 35 may be control information for broadcast channels, that is, control information which the base station transmits to a plurality of terminals by broadcasting in order to perform data communication with the plurality of terminals.

Further, stream 2-1 data symbol (1) 3501-1, stream 2-1 data symbol (2) 3501-2, and stream 2-1 data symbol (3) 3501-3 in FIG. 35 may be common search spaces.

Note that in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) are as described in the above embodiments, and stream 2-1 data symbol (1) 3501-1, stream 2-1 data symbol (2) 3501-2, and stream 2-1 data symbol (3) 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Note 2

Supplementary Note 2 describes the case where the base station performs unicast communication with a plurality of terminals, or in other words, communicates separately with a plurality of terminals.

At this time, for example, #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 may be data addressed to the base station or data addressed to a terminal among a plurality of terminals communicating with the base station. At this time, such data may include control information.

Note that #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 in FIG. 9 are as described in the above embodiments.

For example, #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 may be data addressed to the base station or data addressed to a terminal among a plurality of terminals communicating with the base station. At this time, such data may include control information.

Note that #1 symbol group 1401-1 for modulated signal 1, #2 symbol group 1401-2 for modulated signal 1, #3 symbol group 1401-3 for modulated signal 1, #1 symbol group 1401-3 for modulated signal 2, and #2 symbol group 1402-2 for modulated signal 2, and #3 symbol group 1402-3 for modulated signal 2 in FIG. 14 are as described in the above embodiments.

For example, stream 1-1 data symbol (1) 2501-1-1, stream 1-1 data symbol (2) 2501-1-2, and stream 1-1 data symbol (3) 2501-1-3 in FIG. 25 may be data addressed to the base station or data addressed to a terminal among a plurality of terminals communicating with the base station. At this time, such data may include control information.

Note that stream 1-1 data symbol (1) 2501-1-1, stream 1-1 data symbol (2) 2501-1-2, and stream 1-1 data symbol (3) 2501-1-3 in FIG. 25 are as described in the above embodiments.

For example, stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 may be data addressed to the base station or data addressed to a terminal among a plurality of terminals communicating with the base station. At this time, such data may include control information.

Note that stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3 in FIGS. 31 and 32 are as described in the above embodiments.

For example, in FIG. 35, stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2) may be data addressed to the base station or data addressed to a terminal among a plurality of terminals communicating with the base station. At this time, such data may include control information.

For example, stream 2-1 data symbol (1) 3501-1, stream 2-1 data symbol (2) 3501-2, and stream 2-1 data symbol (3) 3501-3 in FIG. 35 may be data addressed to the base station or data addressed to a terminal among a plurality of terminals communicating with the base station. At this time, such data may include control information.

Note that in FIG. 35, stream 1-1 data symbol (M) 2501-1-M, stream 1-1 data symbol (M+1) 2501-1-(M+1), stream 1-1 data symbol (M+2) 2501-1-(M+2), and stream 1-2 data symbol (N) 3101-N, stream 1-2 data symbol (N+1) 3101-(N+1), stream 1-2 data symbol (N+2) 3101-(N+2), stream 2-1 data symbol (1) 3501-1, stream 2-1 data symbol (2) 3501-2, and stream 2-1 data symbol (3) 3501-3 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Supplementary Note 3

In a time period in which the base station transmits #1 symbol group 901-1 for stream 1, #2 symbol group 901-2 for stream 1, #3 symbol group 901-3 for stream 1, #1 symbol group 902-1 for stream 2, #2 symbol group 902-2 for stream 2, and #3 symbol group 902-3 for stream 2 are transmitted as shown in the frame configuration in FIG. 9, the base station may transmit another symbol group using a transmission beam different from "a transmission beam for #1 symbol group 901-1 for stream 1, a transmission beam for #2 symbol group 901-2 for stream 1, a transmission beam for #3 symbol group 901-3 for stream 1, a transmission beam for #1 symbol group 902-1 for stream 2, a transmission beam for #2 symbol group 902-2 for stream 2, and a transmission beam for #3 symbol group 902-3 for stream 2".

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Further, in a time period in which the base station transmits #1 symbol group 1401-1 for modulated signal 1, #2 symbol group 1401-2 for modulated signal 1, #3 symbol group 1401-3 for modulated signal 1, #1 symbol group 1402-1 for modulated signal 2, #2 symbol group 1402-2 for modulated signal 2, and #3 symbol group 1402-3 for modulated signal 2 as shown in the frame configuration in FIG. 14, the base station may transmit another symbol group using a transmission beam different from "a transmission beam for #1 symbol group 1401-1 for modulated signal 1, a transmission beam for #2 symbol group 1401-2 for modulated signal 1, a transmission beam for #3 symbol group 1401-3 for modulated signal 1, a transmission beam for #1 symbol group 1402-1 for modulated signal 2, a transmission beam for #2 symbol group 1402-2 for modulated signal 2, and a transmission beam for #3 symbol group 1402-3 for modulated signal 2".

At this time, the "other symbol group" may be a symbol group which includes a data symbol addressed to a certain terminal, may be a symbol group which includes a control information symbol group, or may be a symbol group which includes another data symbol for multicasting, as described in other portions of the present disclosure.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Supplementary Note 4

In time periods in which a base station transmits stream 1-1 data symbol (1) 2501-1-1, stream 1-1 data symbol (2) 2501-1-2, and stream 1-1 data symbol (3) 2501-1-3 as shown in the frame configuration in FIG. 25, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

Note that the same also applies to the case where the horizontal axis indicates frequency in FIG. 25, and in time periods in which the base station transmits stream 1-1 data symbol (1) 2501-1-1, stream 1-1 data symbol (2) 2501-1-2, and stream 1-1 data symbol (3) 2501-1-3, the base station may transmit another symbol group using a transmission beam different from "transmission beams for transmitting stream 1-1 data symbol (1) 2501-1-1, stream 1-1 data symbol (2) 2501-1-2, and stream 1-1 data symbol (3) 2501-1-3".

In time periods in which the base station transmits stream 1-1 data symbol (M) 2501-1-M, stream 1-1 data symbol (M+1) 2501-1-(M+1), and stream 1-1 data symbol (M+2) 2501-1-(M+2) as shown in the frame configuration in FIGS. 31 and 32, the base station may transmit another symbol group using a transmission beam different from "transmission beams for transmitting stream 1-1 data symbol (M) 2501-1-M, stream 1-1 data symbol (M+1) 2501-1-(M+1), and stream 1-1 data symbol (M+2) 2501-1-(M+2)".

Note that the same also applies to the case where the horizontal axis indicates frequency in FIGS. 31 and 32, and in time periods in which the base station transmits stream 1-1 data symbol (M) 2501-1-M, stream 1-1 data symbol (M+1) 2501-1-(M+1), and stream 1-1 data symbol (M+2) 2501-1-(M+2), the base station may transmit another symbol group using a transmission beam different from "transmission beams for transmitting stream 1-1 data symbol (M)

2501-1-M, stream 1-1 data symbol (M+1) 2501-1-(M+1), and stream 1-1 data symbol (M+2) 2501-1-(M+2)".

In time periods in which the base station transmits stream 1-2 data symbol (1) 3101-1, stream 1-2 data symbol (2) 3101-2, and stream 1-2 data symbol (3) 3101-3 as shown in the frame configuration in FIGS. 31 and 32, the base station may transmit another symbol group using a transmission beam different from "transmission beams for transmitting stream 1-2 data symbol (1) 3101-1, stream 1-2 data symbol (2) 3101-2, and stream 1-2 data symbol (3) 3101-3".

Note that in FIGS. 31 and 32, the same also applies to the case where the horizontal axis indicates frequency in FIGS. 31 and 32, and in time periods in which the base station transmits stream 1-2 data symbol (1) 3101-1, stream 1-2 data symbol (2) 3101-2, and stream 1-2 data symbol (3) 3101-3, the base station may transmit another symbol group using a transmission beam different from transmission beams for transmitting "stream 1-2 data symbol (1) 3101-1, stream 1-2 data symbol (2) 3101-2, and stream 1-2 data symbol (3) 3101-3".

In time periods in which the base station transmits stream 1-1 data symbol (M) 2501-1-M, stream 1-1 data symbol (M+1) 2501-(M+1), and stream 1-1 data symbol (M+2) 2501-(M+2) as shown in the frame configuration in FIG. 35, the base station may transmit another symbol group using a transmission beam different from transmission beams for transmitting "stream 1-1 data symbol (V) 2501-1-M, stream 1-1 data symbol (M+1) 2501-(M+1), and stream 1-1 data symbol (M+2) 2501-(M+2)".

Note that in FIG. 35, the same also applies to the case where the horizontal axis indicates frequency, and in time periods in which the base station transmits stream 1-1 data symbol (M) 2501-1-M, stream 1-1 data symbol (M+1) 2501-(M+1), and stream 1-1 data symbol (M+2) 2501-(M+2), the base station may transmit another symbol group using a transmission beam different from "transmission beams for transmitting stream 1-1 data symbol (M) 2501-1-M, stream 1-1 data symbol (M+1) 2501-(M+1), and stream 1-1 data symbol (M+2) 2501-(M+2)".

In time periods in which the base station transmits stream 1-2 data symbol (N) 3101-N, stream 1-2 data symbol (N+1) 3101-(N+1), and stream 1-2 data symbol (N+2) 3101-(N+2) as shown in the frame configuration in FIG. 35, the base station may transmit another symbol group using a transmission beam different from "transmission beams for transmitting stream 1-2 data symbol (N) 3101-N, stream 1-2 data symbol (N+1) 3101-(N+1), and stream 1-2 data symbol (N+2) 3101-(N+2)".

Note that the same also applies to the case where the horizontal axis indicates frequency in FIG. 35, and in time periods in which the base station transmits stream 1-2 data symbol (N) 3101-N, stream 1-2 data symbol (N+1) 3101-(N+1), and stream 1-2 data symbol (N+2) 3101-(N+2), the base station may transmit another symbol group using a transmission beam different from "transmission beams for transmitting stream 1-2 data symbol (N) 3101-N, stream 1-2 data symbol (N+1) 3101-(N+1), and stream 1-2 data symbol (N+2) 3101-(N+2)".

In time periods in which the base station transmits stream 2-1 data symbol (1) 3501-1, stream 2-1 data symbol (2) 3501-2, and stream 2-1 data symbol (3) 3501-3 as shown in the frame configuration in FIG. 35, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

Note that the same also applies to the case where the horizontal axis indicates frequency in FIG. 35, and in time periods in which the base station transmits stream 2-1 data symbol (1) 3501-1, stream 2-1 data symbol (2) 3501-2, and stream 2-1 data symbol (3) 3501-3, the base station may transmit another symbol group using a transmission beam different from "transmission beams for transmitting stream 2-1 data symbol (1) 3501-1, stream 2-1 data symbol (2) 3501-2, and stream 2-1 data symbol (3) 3501-3".

In the above, the "other symbol group" may be a symbol group which includes a data symbol addressed to a certain terminal, or may be a symbol group which includes a control information symbol or a symbol group which includes another data symbol for multicasting, as described in other portions of the specification.

At this time, the base station in FIG. 1 may generate a transmission beam for the above "other symbol group" through signal processing by signal processor 102, or may generate a transmission beam for the above "other symbol group" by selecting antennas from antenna unit 106-1 to antenna unit 106-M.

The base station in FIG. 3 may generate a transmission beam for the above "other symbol group" through "signal processing by signal processor 102 and signal processing by weighting synthesizer 301" or "signal processing by signal processor 102 or signal processing by weighting synthesizer 301".

Then, unicast transmitting intervals 2503-1 and 2503-2 as illustrated in FIGS. 25, 31, 32, and 35 may not be set.

Supplementary Note 5

A description with regard to FIGS. 31 and 32 includes the statement as follows.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (1) (for multicasting)" 3101-1, "stream 1-2 data symbol (2) (for multicasting)" 3101-2, and "stream 1-2 data symbol (3) (for multicasting)" 3101-3 are all data symbols for transmitting "stream 1".

A terminal can obtain "data of stream 1" by obtaining "data symbols for stream 1-1". Furthermore, a terminal can obtain "data of stream 1" by obtaining "data symbols for stream 1-2".

A description with regard to FIG. 35 includes the following statement.

"Stream 1-1 data symbol (M) (for multicasting)" 2501-1-M, "stream 1-1 data symbol (M+1) (for multicasting)" 2501-1-(M+1), "stream 1-1 data symbol (M+2) (for multicasting)" 2501-1-(M+2), "stream 1-2 data symbol (N) (for multicasting)" 3101-N, "stream 1-2 data symbol (N+1) (for multicasting)" 3101-(N+1), and "stream 1-2 data symbol (N+2) (for multicasting)" 3101-(N+2) are all data symbols to transmit "stream 1".

A terminal can obtain "data of stream 1" by obtaining "data symbols for stream 1-1". Furthermore, a terminal can obtain "data of stream 1" by obtaining "data symbols for stream 1-2".

The following gives a supplementary description with regard to the above. For example, in FIG. 35, the above can be achieved using <method 1-1>, <method 1-2>, <method 2-1>, or <method 2-2> as below.

<Method 1-1>

Stream 1-1 data symbol (M) 2501-1-M and stream 1-2 data symbol (N) 3101-N include the same data.

Then, stream 1-1 data symbol (M+1) 2501-1-(M+1) and stream 1-2 data symbol (N+1) 3101-(N+1) include the same data.

Stream 1-1 data symbol (M+2) 2501-1-(M+2) and stream 1-2 data symbol (N+2) 3101-(N+2) include the same data.

<Method 1-2>

Stream 1-2 data symbol (L) 3101-L which includes the same data as the data included in stream 1-1 data symbol (K) 2501-1-K is present. Note that K and L are integers.

<Method 2-1>

Stream 1-1 data symbol (M) 2501-1-M and stream 1-2 data symbol (N) 3101-N include the same data in part.

Then, stream 1-1 data symbol (M+1) 2501-1-(M+1) and stream 1-2 data symbol (N+1) 3101-(N+1) include the same data in part.

Stream 1-1 data symbol (M+2) 2501-1-(M+2) and stream 1-2 data symbol (N+2) 3101-(N+2) include the same data in part.

<Method 2-2>

Stream 1-2 data symbol (L) 3101-L which includes a part of data included in stream 1-1 data symbol (K) 2501-1-K is present. Note that K and L are integers.

Specifically, a first base station or a first transmission system generates a first packet group which includes data of a first stream, and a second packet group which includes data of the first stream, transmits a packet included in the first packet group in a first period using a first transmission beam, and transmits a packet included in the second packet group in a second period using a second transmission beam different from the first transmission beam. The first period and the second period do not overlap.

Here, the second packet group may include a second packet which includes data same as data included in a first packet included in the first packet group. As a configuration different from the above, the second packet group may include a third packet which includes data same as a part of the data included in the first packet included in the first packet group.

The first transmission beam and the second transmission beam may be transmission beams transmitted using the same antenna unit and having different directivities, or may be transmission beams transmitted using different antenna units.

In addition to the configuration of the first base station or the first transmission system, a second base station or a second transmission system further generates a third packet group which includes data of the first stream, and transmits a packet included in the third packet group in a third period using a third transmission beam different from the first transmission beam and the second transmission beam. The third period does not overlap the first period and the second period.

Here, the second base station or the second transmission system may repeatedly set the first period, the second period, and the third period in a predetermined order.

Further, in addition to the configuration of the first base station or the first transmission system, the third base station or the third transmission system further generates a third packet group which includes data of the first stream, and transmits a packet included in the third packet group in the third period using the third transmission beam different from the first transmission beam and the second transmission beam. At least a portion of the third period overlaps the first period.

Here, the third base station or the third transmission system may repeatedly set the first period, the second period, and the third period, the third periods repeatedly set may each at least partially overlap the first period, or at least one of the third periods repeatedly set may not overlap the first period(s).

Further, in addition to the configuration of the first base station or the first transmission system, a fourth base station or a fourth transmission system further generates a fourth packet which includes data of a second stream, and transmits the fourth packet in a fourth period using a fourth transmission beam different from the first transmission beam. At least a portion of the fourth period overlaps the first period.

Note that the first period and the second period do not overlap in the above description, yet the first period and the second period may partially overlap, the entire first period may overlap the second period, or the entire first period may overlap the entire second period.

A fifth base station or a fifth transmission system may generate one or more packet groups each of which includes data of the first stream, transmit the one or more packet groups using a different transmission beam for each packet group, and increase or decrease the number of packet groups to be generated, based on a signal transmitted from a terminal.

Note that the above describes "streams", yet as described in other portions of the specification, "stream 1-1 data symbol (M) 2501-1-M, stream 1-1 data symbol (M+1) 2501-1-(M+1), stream 1-1 data symbol (M+2) 2501-1-(M+2), stream 1-2 data symbol (1) 3101-1, stream 1-2 data symbol (2) 3101-2, and stream 1-2 data symbol (3) 3101-3" in FIGS. 31 and 32, and "stream 1-1 data symbol (M) 2501-1-M, stream 1-1 data symbol (M+1) 2501-1-(M+1), stream 1-1 data symbol (M+2) 2501-1-(M+2), stream 1-2 data symbol (N) 3101-N, stream 1-2 data symbol (N+1) 3101-(N+1), and stream 1-2 data symbol (N+2) 3101-(N+2)" in FIG. 35 may be symbols which include data symbols addressed to a certain terminal, symbols which include a control information symbol, or symbols which include a data symbol for multicasting.

Embodiment 4

The present embodiment is to describe specific examples of the communication system described in Embodiments 1 to 3.

The communication system according to the present embodiment includes a base station (or a plurality of base stations) and a plurality of terminals. For example, consider a communication system which includes, for instance, base station 700 as illustrated in, for instance, FIGS. 7, 12, 17, 19, 20, 26, and 29 and terminals 704-1 and 704-2.

Figure 37:
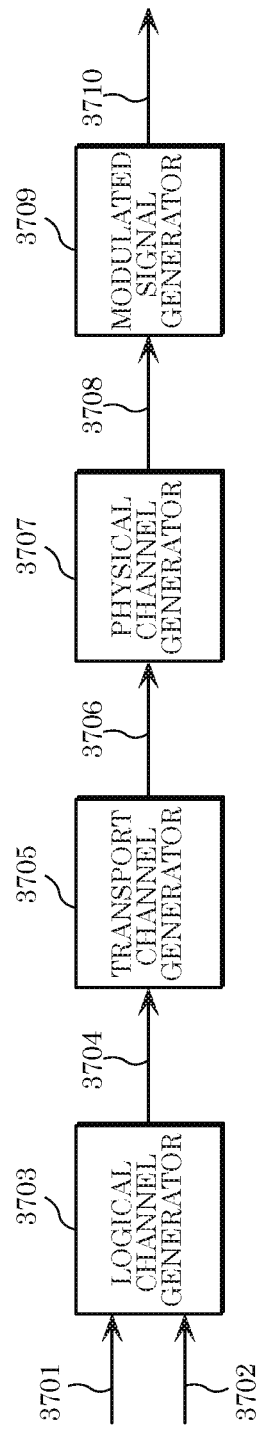
FIG. 37 illustrates an example of a configuration of the base station.

FIG. 37 illustrates an example of a configuration of a base station (700).

Logical channel generator 3703 receives inputs of data 3701 and control data 3702, and outputs logical channel signal 3704. For example, the channel for logical channel signal 3704 is constituted by at least one of "a broadcast control channel (BCCH), a paging control channel (PCCH), a common control channel (CCCH), a multicast control channel (MCCH), and a dedicated control channel (DCCH)" which are logical channels for control, and "a dedicated traffic channel (DTCH) and a multicast traffic channel (MTCH)" which are logical channels for data.

Note that "a BCCH is a downlink channel for informing system control information", "a PCCH is a downlink channel for paging information", "a CCCH is a downlink common control channel used when radio resource control (RRC) connection is not present", "an MCCH is a point-tomultipoint downlink control channel for multicast channel scheduling for multimedia broadcast multicast service (MBMS)", "a DCCH is a downlink dedicated control channel used by a terminal with RRC connection", "a DTCH is a downlink dedicated traffic channel of a user equipment (UE) terminal or a downlink user-data dedicated channel", and "an MTCH is a point-to-multipoint downlink channel for MBMS user data".

Transport channel generator 3705 receives inputs of logical channel signal 3704, and generates and outputs transport channel signal 3706. The channel for transport channel signal 3706 is constituted by, for example, at least one of a broadcast channel (BCH), a downlink shared channel (DL-SCH), a paging channel (PCH), and a multicast channel (MCH), for instance.

Note that "a BCH is a channel for system information notified throughout the entire cell", "a DL-SCH is a channel for which user data, control information, and system information are used", "a PCH is a channel for paging information notified throughout the entire cell", and "an MCH is a control channel for MBMS traffic notified throughout the entire cell".

Physical channel generator 3707 receives inputs of transport channel signal 3706, and generates and outputs physical channel signal 3708. The channel for physical channel signal 3708 is constituted by, for example, at least one of a physical broadcast channel (PBCH), a physical multicast channel (PMCH), a physical downlink shared channel (PDSCH), and a physical downlink control channel (PDCCH), for instance.

Note that "a PBCH is for BCH transport channel transmission", "a PMCH is for MCH transport channel transmission", "a PDSCH is for DL-SCH and transport channel transmission", and "a PDCCH is for transmission of downlink Layer 1 (L1)/Layer 2 (L2) control signal".

Modulated signal generator 3709 receives inputs of physical channel signal 3708, and generates and outputs modulated signal 3710 based on physical channel signal 3708. Then, base station 700 transmits modulated signal 3710 as a radio wave.

First, consider the case where the base station performs unicast communication with the plurality of terminals, or in other words, communicates separately with the plurality of terminals.

At this time, for example, the channels for symbol group #1 for stream 1 indicated by 901-1, symbol group #2 for stream 1 indicated by 901-2, and symbol group #3 for stream 1 indicated by 901-3 in FIG. 9 may be broadcast channels (that is, channels used for control information which the base station transmits to the plurality of terminals by broadcasting in order to perform data communication with the plurality of terminals). Note that control information is to be used to, for example, establish data communication between the base station and a terminal.

Here, broadcast channels are to be described. A broadcast channel corresponds to a "PBCH", a "PMCH", or "a portion of a PD-SCH" among physical channels (for physical channel signal 3708).

A broadcast channel corresponds to a "BCH", "a portion of a DL-SCH", "a PCH", or "a MCH" among transport channels (for transport channel signal 3706).

A broadcast channel corresponds to "a BCCH", "a CCCH", "an MCCH", "a portion of a DTCH", or "an MTCH" among logical channels (for logical channel signal 3704).

Similarly, for example, the channels for symbol group #1 for stream 2 indicated by 902-1, symbol group #2 for stream 2 indicated by 902-2, and symbol group #3 for stream 2 indicated by 902-3 in FIG. 9 may be broadcast channels (that is, channels used for control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among physical channels (for physical channel signal 3708).

Further, a broadcast channel corresponds to "a BCH", "a portion of a DL-SCH", "a PCH", or "an MCH" among transport channels (for transport channel signal 3706).

A broadcast channel corresponds to "a BCCH", "a CCCH", "an MCCH", "a portion of a DTCH", or "an MTCH" among logical channels (for logical channel signal 3704).

At this time, features of symbol group #1 for stream 1 indicated by 901-1, symbol group #2 for stream 1 indicated by 901-2, and symbol group #3 for stream 1 indicated by 901-3 in FIG. 9 are as described in the above embodiments, and furthermore, features of symbol group #1 for stream 2 indicated by 902-1, symbol group #2 for stream 2 indicated by 902-2, and symbol group #3 for stream 2 indicated by 902-3 in FIG. 9 are as described in the above embodiments.

Note that stream 2 may not be transmitted since symbol group #1 for stream 2 (902-1), symbol group #2 for stream 2 (902-2), and symbol group #3 for stream 2 (902-3) in FIG. 9 are not transmitted. In particular, when a signal having a broadcast channel is transmitted, the base station may not transmit a symbol group for stream 2 (at this time, base station 701 does not transmit 703-1, 703-2, and 703-3 in FIG. 7, for example).

For example, symbol group #1 for modulated signal 1 indicated by 1401-1, symbol group #2 for modulated signal 1 indicated by 1401-2, and symbol group #3 for modulated signal 1 indicated by 1401-3 in FIG. 14 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

A broadcast channel corresponds to "a BCH", "a portion of a DL-SCH", "a PCH", or "an MCH" among transport channels (for transport channel signal 3706).

A broadcast channel corresponds to "a BCCH", "a CCCH", "an MCCH", "a portion of a DTCH", or "an MTCH" among the logical channels (for logical channel signal 3704).

For example, symbol group #1 for modulated signal 2 indicated by 1402-1, symbol group #2 for modulated signal 2 indicated by 1402-2, and symbol group #3 for modulated signal 2 indicated by 1402-3 in FIG. 14 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of symbol group #1 for modulated signal 1 indicated by 1401-1, symbol group #2 for modulated signal 1 indicated by 1401-2, and symbol group #3 for modulated signal 1 indicated by 1401-3 in FIG. 14 are as described in the above embodiments, and symbol group #1 for modulated signal 2 indicated by 1402-1, symbol group #2 for modulated signal 2 indicated by 1402-2, and symbol group #3 for modulated signal 2 indicated by 1402-3 in FIG. 14 are as described in the above embodiments.

For example, stream 1-1 data symbol (1) indicated by 2501-1-1, stream 1-1 data symbol (2) indicated by 2501-1-2, and stream 1-1 data symbol (3) indicated by 2501-1-3 in FIG. 25 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of stream 1-1 data symbol (1) indicated by 2501-1-1, stream 1-1 data symbol (2) indicated by 2501-1-2, and stream 1-1 data symbol (3) indicated by 2501-1-3 in FIG. 25 are as described in the above embodiments.

For example, stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (1) indicated by 3101-1, stream 1-2 data symbol (2) indicated by 3101-2, and stream 1-2 data symbol (3) indicated by 3101-3 in FIGS. 31 and 32 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channels corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (1) indicated by 3101-1, stream 1-2 data symbol (2) indicated by 3101-2, and stream 1-2 data symbol (3) indicated by 3101-3 in FIGS. 31 and 32 are as described in the above embodiments.

For example, stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (N) indicated by 3101-N, stream 1-2 data symbol (N+1) indicated by 3101-(N+1), and stream 1-2 data symbol (N+2) indicated by 3101-(N+2) in FIG. 35 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

For example, stream 2-1 data symbol (1) indicated by 3501-1, stream 2-1 data symbol (2) indicated by 3501-2, and stream 2-1 data symbol (3) indicated by 3501-3 in FIG. 35 may be broadcast channels (that is, control information which the base station transmits to the plurality of terminals by broadcasting in order to perform data communication with the plurality of terminals). Note that control information is to be used to, for example, establish data communication between the base station and a terminal.

Note that a broadcast channel corresponds to "a PBCH", "a PMCH", or "a portion of a PD-SCH" among the physical channels (for physical channel signal 3708).

Further, a broadcast channel corresponds to "a BCH", "a portion of a DL-SCH", "a PCH", or "an MCH" among the transport channels (for transport channel signal 3706).

A broadcast channel corresponds to "a BCCH", "a CCCH", "an MCCH", "a portion of a DTCH", or "an MTCH" among the logical channels (for logical channel signal 3704).

Note that features of stream 1-1 data symbol (M) indicated by 2501-1-M, stream 1-1 data symbol (M+1) indicated by 2501-1-(M+1), stream 1-1 data symbol (M+2) indicated by 2501-1-(M+2), stream 1-2 data symbol (N) indicated by 3101-N, stream 1-2 data symbol (N+1) indicated by 3101-(N+1), and stream 1-2 data symbol (N+2) indicated by 3101-(N+2) in FIG. 35 are as described in the above embodiments, and features of stream 2-1 data symbol (1) indicated by 3501-1, stream 2-1 data symbol (2) indicated by 3501-2, and stream 2-1 data symbol (3) indicated by 3501-3 in FIG. 35 are as described in the above embodiments.

In FIGS. 9, 14, 25, 31, 32, and 35, when data symbols are transmitted, a single carrier transmission method may be used, or a multi-carrier transmission method such as OFDM may be used. In addition, temporal positions of data symbols are not limited to the positions in FIGS. 9, 14, 25, 31, 32, and 35.

Although a description is given with reference to FIGS. 25, 31, 32, and 35, assuming that the horizontal axis indicates time, similar data transmission can be carried out even if the horizontal axis indicates frequency (carrier). Note that when the horizontal axis indicates frequency (carrier), the base station transmits data symbols using one or more carriers or subcarriers.

Note that the symbol groups for stream 1 in FIG. 9 may include data to be transmitted to a single terminal (unicast data) (or one or more symbols). Similarly, the symbol groups for stream 2 in FIG. 9 may include data to be transmitted to a single terminal (unicast data) (or one or more symbols).

Note that the symbol groups for stream 1 in FIG. 14 may include data to be transmitted to a single terminal (unicast data) (or one or more symbols). Similarly, the symbol groups for stream 2 in FIG. 14 may include data to be transmitted to a single terminal (unicast data) (or one or more symbols).

Note that the symbols for stream 1-1 in FIG. 25 may include data to be transmitted to a single terminal (unicast data) (or one or more symbols). The symbols for stream 1-1 and stream 1-2 in FIGS. 31 and 32 may include data to be transmitted to a single terminal (unicast data) (or one or more symbols).

A PBCH may have a configuration of "being used to transmit minimum information (including a system bandwidth, a system frame number, and the number of transmission antennas) which a UE is to read first after cell searching", for example.

A PMCH may have a configuration of "being used to utilize a multicast-broadcast single-frequency network (MBSFN), for example".

A PDSCH may have a configuration of "being, for example, a shared downlink data channel for transmitting user data and for collectively transmitting all data, irrespective of C-plane (control plane) and U-plane (user plane)".

A PDCCH may have a configuration of "being used to notify, for example, a user selected by eNodeB (gNodeB) (base station) through scheduling of information indicating allocation of radio resources".

Through the above implementation, in multicast and broadcast data transmission, the base station transmits data symbols and control information symbols using a plurality of transmission beams, and a terminal selectively receives a transmission beam with good quality among the plurality of transmission beams and receives data symbols based on the received transmission beam, thus achieving advantageous effects that the terminal can achieve high data receiving quality.

Embodiment 5

The present embodiment gives a supplemental description of configurations of the symbol groups for stream 1 and the symbol groups for stream 2 in FIG. 9 which a base station (700) transmits.

Figure 38:
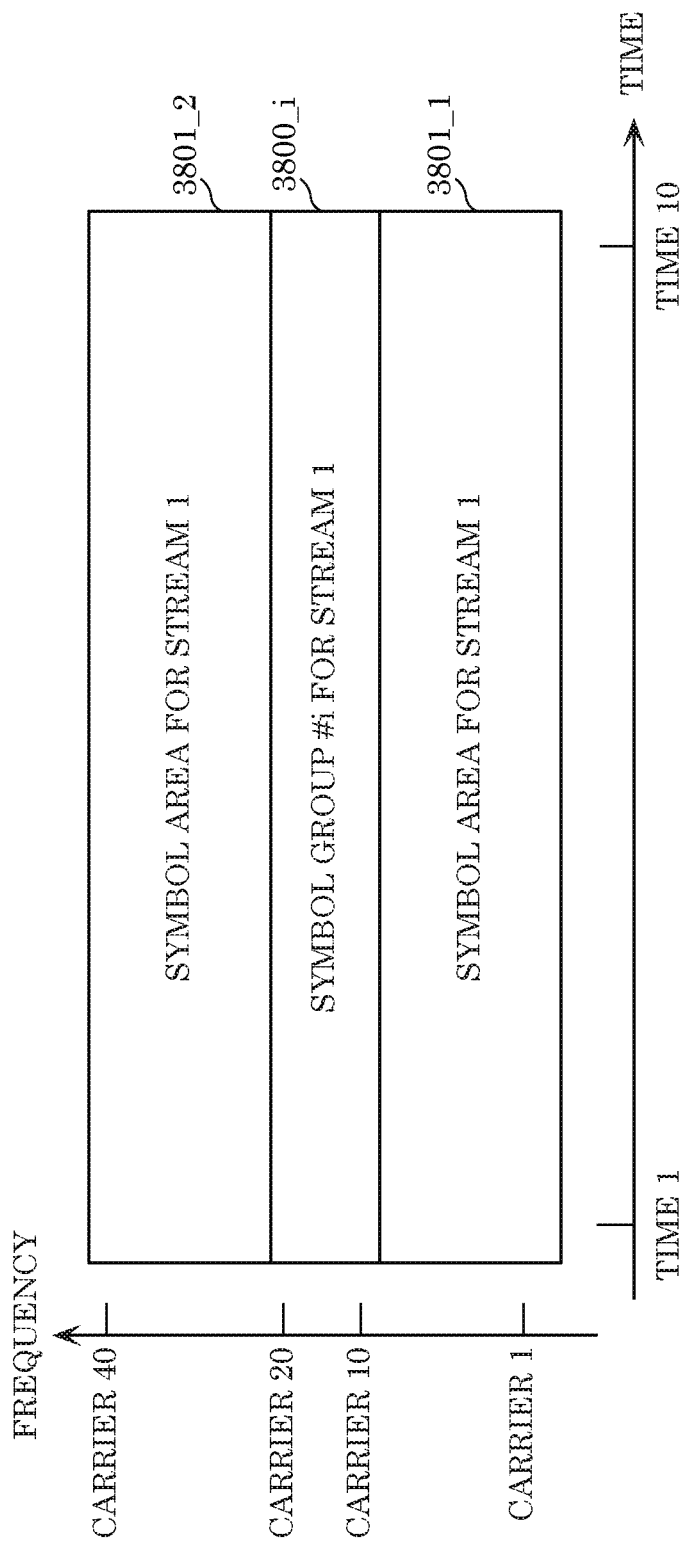
FIG. 38 illustrates an example of a frame configuration.

FIG. 38 illustrates an example of a frame configuration for stream 1 which the base station (700) transmits, the horizontal axis indicates time and the vertical axis indicates frequency in the frame configuration in FIG. 38, and the frame configuration from time 1 to time 10 and carrier 1 to carrier 40 is illustrated. Accordingly, FIG. 38 illustrates a frame configuration according to a multi-carrier transmission method such as the orthogonal frequency division multiplexing (OFDM) method.

Symbol area 3801_1 for stream 1 in FIG. 38 is present from time 1 to time 10 and from carrier 1 to carrier 9.

Symbol group #i (3800_*i*) for stream 1 is present from time 1 to time 10 and from carrier 10 to carrier 20. Note that symbol group #i (3800_*i*) for stream 1 corresponds to symbol group #i (901-*i*) for stream 1 in FIG. 9.

Symbol area 3801_2 for stream 1 is present from time 1 to time 10 and from carrier 21 to carrier 40.

At this time, for example, as described in Embodiment 4, for instance, when the base station transmits (unicasts), to one or more terminals, data therefor, symbol areas 3801_1 and 3801_2 for stream 1 in FIG. 38 can be used.

Symbol group #i (3800_*i*) for stream 1 in FIG. 38 is to be used by the base station to transmit data for multicasting, as described in, for instance, Embodiments 1 and 4.

Figure 39:
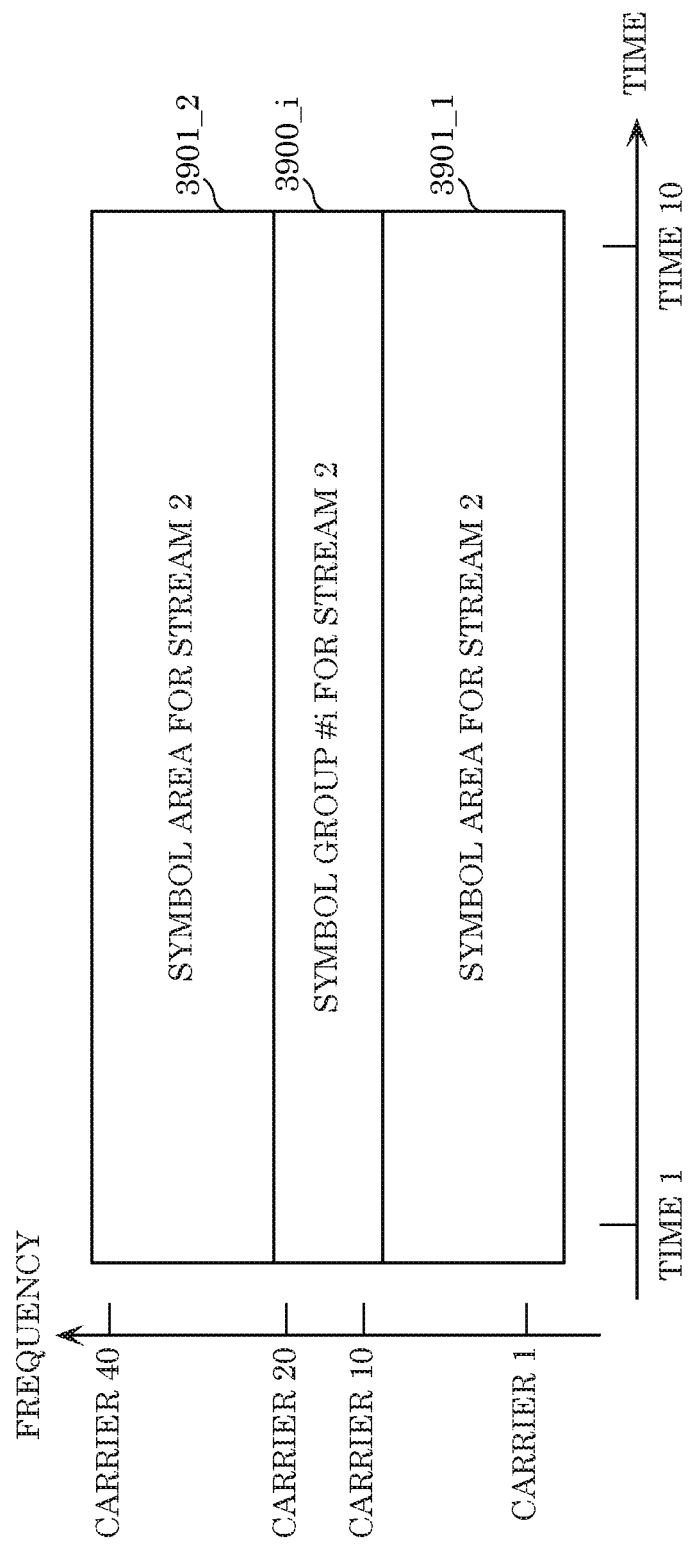
FIG. 39 illustrates an example of a frame configuration.

FIG. 39 illustrates an example of a frame configuration for stream 2 which the base station (700) transmits, the horizontal axis indicates time and the vertical axis indicates frequency in the frame configuration in FIG. 39, and the frame configuration from time 1 to time 10 and carrier 1 to carrier 40 is illustrated. Accordingly, FIG. 39 illustrates a frame according to a multi-carrier transmission method such as the OFDM method.

Symbol area 3901_1 for stream 2 in FIG. 39 is present from time 1 to time 10 and from carrier 1 to carrier 9.

Symbol group #i (3900_*i*) for stream 2 is present from time 1 to time 10 and from carrier 10 to carrier 20. Note that symbol group #i (3900_*i*) for stream 2 corresponds to symbol group #i (902-*i*) for stream 2 in FIG. 9.

Symbol area 3901_2 for stream 2 is present from time 1 to time 10 and from carrier 21 to carrier 40.

At this time, for example, as described in Embodiment 4, for instance, when the base station transmits (unicasts), to one or more terminals, data therefor, symbol areas 3901_1 and 3901_2 for stream 2 in FIG. 39 can be used.

Symbol group #i (3900_*i*) for stream 2 in FIG. 39 is to be used by the base station to transmit data for multicasting, as described in Embodiments 1 and 4, for instance.

Note that the base station transmits, using the same frequency at the same time, a symbol at time X (in the case of FIG. 38, X is an integer in a range from 1 to 10) and carrier Y (in the case of FIG. 38, Y is an integer in a range from 1 to 40) in FIG. 38, and a symbol at time X and carrier Y in FIG. 39.

Features of symbol group #1 for stream 1 indicated by 901-1, symbol group #2 for stream 1 indicated by 901-2, and symbol group #3 for stream 1 indicated by 901-3 in FIG. 9 are as described in the above embodiments. Thus, the features of symbol group #i for stream 1 in FIG. 38 are the same as the features of the symbol groups for stream 1 in FIG. 9, and are as described in the above embodiments.

Further, features of symbol group #1 for stream 2 indicated by 902-1, symbol group #2 for stream 2 indicated by 902-2, and symbol group #3 for stream 2 indicated by 902-3 in FIG. 9 are as described in the above embodiments. Specifically, the features of symbol group #i for stream 2 in FIG. 39 are the same as the features of the symbol groups for stream 2 in FIG. 9, and are as described in the above embodiments.

Note that if symbols are present after time 11 from carrier 10 to carrier 20 in the frame configuration in FIGS. 38 and 39, the symbols may be used for multicast transmission or dedicated data transmission (unicast transmission).

If the base station transmits a frame as in FIG. 9 using the frame configuration in FIG. 38 or 39, implementation described in Embodiments 1 and 4 may be performed similarly.

Through the above implementation, in multicast and broadcast data transmission, the base station transmits data symbols and control information symbols using a plurality of transmission beams, and a terminal selectively receives a beam with good quality among the plurality of transmission beams and receives data symbols based on the received transmission beam, thus achieving advantageous effects that the terminal can achieve high data receiving quality.

Embodiment 6

The present embodiment gives a supplemental description of the configurations of the symbol groups for modulated signal 1 and the symbol groups for modulated signal 2 in FIG. 14 that a base station (700) transmits.

Figure 40:
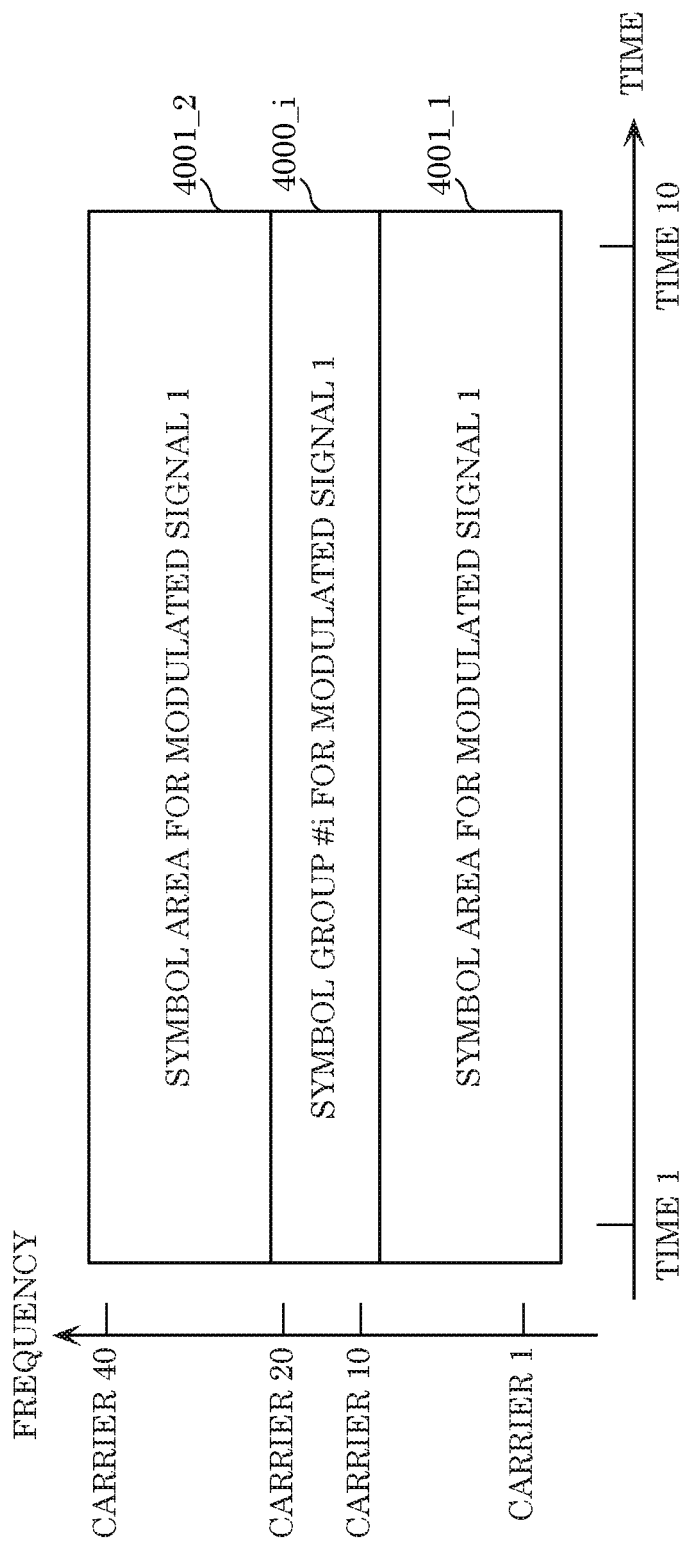
FIG. 40 illustrates an example of a frame configuration.

FIG. 40 illustrates an example of a frame configuration for modulated signal 1 which the base station (700) transmits, the horizontal axis indicates time and the vertical axis indicates frequency in the frame configuration in FIG. 40, and the frame configuration from time 1 to time 10 and carrier 1 to carrier 40 is illustrated. Accordingly, FIG. 40 illustrates a frame configuration according to a multi-carrier transmission method such as the orthogonal frequency division multiplexing (OFDM) method.

Symbol area 4001_1 for modulated signal 1 in FIG. 40 is present from time 1 to time 10 and from carrier 1 to carrier 9.

Symbol group #i (4000_i) for modulated signal 1 is present from time 1 to time 10 and from carrier 10 to carrier 20. Note that symbol group #i (4000_i) for modulated signal 1 corresponds to symbol group #i (1401-i) for modulated signal 1 in FIG. 14.

Symbol area 4001_2 for modulated signal 1 is present from time 1 to time 10 and from carrier 21 to carrier 40.

At this time, for example, as described in Embodiment 4, for instance, when the base station transmits (unicasts), to one or more terminals, data therefor, symbol areas 4001_1 and 4001_2 for stream 1 in FIG. 40 can be used.

Then, symbol group #i (4000_i) for modulated signal 1 in FIG. 40 is to be used by the base station to transmit data for multicasting, as described in Embodiments 1 and 4, for instance.

Figure 41:
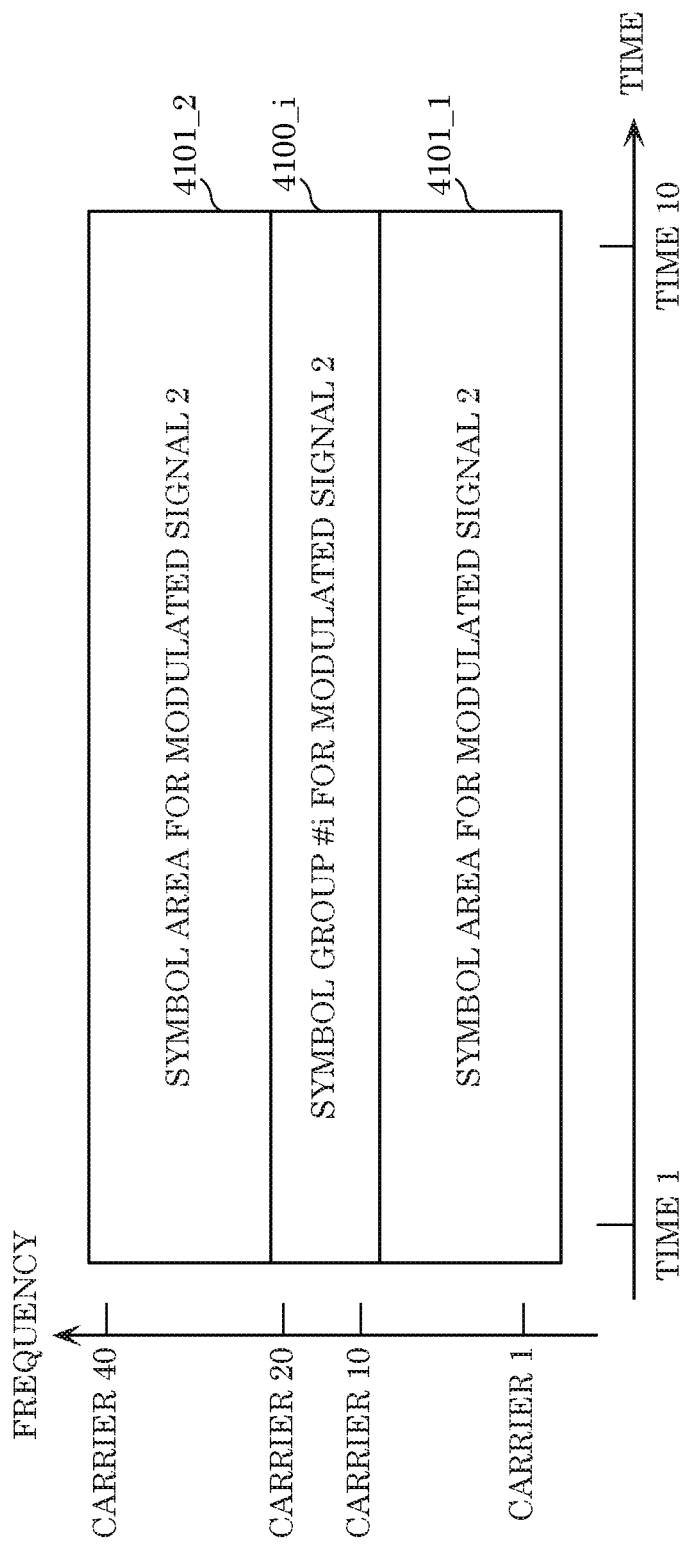
FIG. 41 illustrates an example of a frame configuration.

FIG. 41 illustrates an example of a frame configuration for modulated signal 2 which the base station (700) transmits, the horizontal axis indicates time and the vertical axis indicates frequency in the frame configuration in FIG. 41, and the frame configuration from time 1 to time 10 and carrier 1 to carrier 40 is illustrated. Accordingly, FIG. 41 illustrates a frame according to a multi-carrier transmission method such as the OFDM system.

Symbol area 4101_1 for modulated signal 2 in FIG. 41 is present from time 1 to time 10 and from carrier 1 to carrier 9.

Symbol group #i (4100_) for modulated signal 2 is present from time 1 to time 10 and from carrier 10 to carrier 20. Note that symbol group #i (4100_i) for modulated signal 2 corresponds to symbol group #i (1402-i) for modulated signal 2 in FIG. 14.

Symbol area 4101_2 for modulated signal 2 is present from time 1 to time 10 and from carrier 21 to carrier 40.

At this time, for example, as described in Embodiment 4, for instance, when the base station transmits (unicasts), to one or more terminals, data therefor, symbol areas 4101_1 and 4101_2 for modulated signal 2 in FIG. 41 can be used.

Then, symbol group #i (4100_i) for modulated signal 2 in FIG. 41 is to be used by the base station to transmit data for multicasting, as described in Embodiments 1 and 4, for instance.

Note that the base station transmits, using the same frequency at the same time, a symbol at time X (in the case of FIG. 40, X is an integer in a range from 1 to 10) and carrier Y (in the case of FIG. 40, Y is an integer in a range from 1 to 40) in FIG. 40, and a symbol at time X and carrier Y in FIG. 41.

Then, features of symbol group #1 for stream 1 indicated by 14011, symbol group #2 for modulated signal 1 indicated by 14012, and symbol group #3 for modulated signal 1 indicated by 14013 in FIG. 14 are as described in the above embodiments. Specifically, the features of symbol group #i for modulated signal 1 in FIG. 40 are the same as the features of the symbol groups for modulated signal 1 in FIG. 14, and are as described in the above embodiments.

Symbol group #1 for modulated signal 2 indicated by 1402_1, symbol group #2 for modulated signal 2 indicated by 14022, and symbol group #3 for modulated signal 2 indicated by 1402_3 in FIG. 14 are as described in the above embodiments. Specifically, the features of symbol group #i for modulated signal 2 in FIG. 41 are the same as the features of the symbol groups for modulated signal 2 in FIG. 14, and are as described in the above embodiments.

Note that if symbols are present after time 11 from carrier 10 to carrier 20 in the frame configuration in FIGS. 40 and 41, the symbols may be used for multicast transmission or dedicated data transmission (unicast transmission).

When the base station transmits a frame as in FIG. 14 using the frame configuration in FIG. 40 or 41, data transmission described in Embodiments 1 and 4 may be similarly carried out.

Examples of use of symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41 in the above description are to be described.

Figure 42:
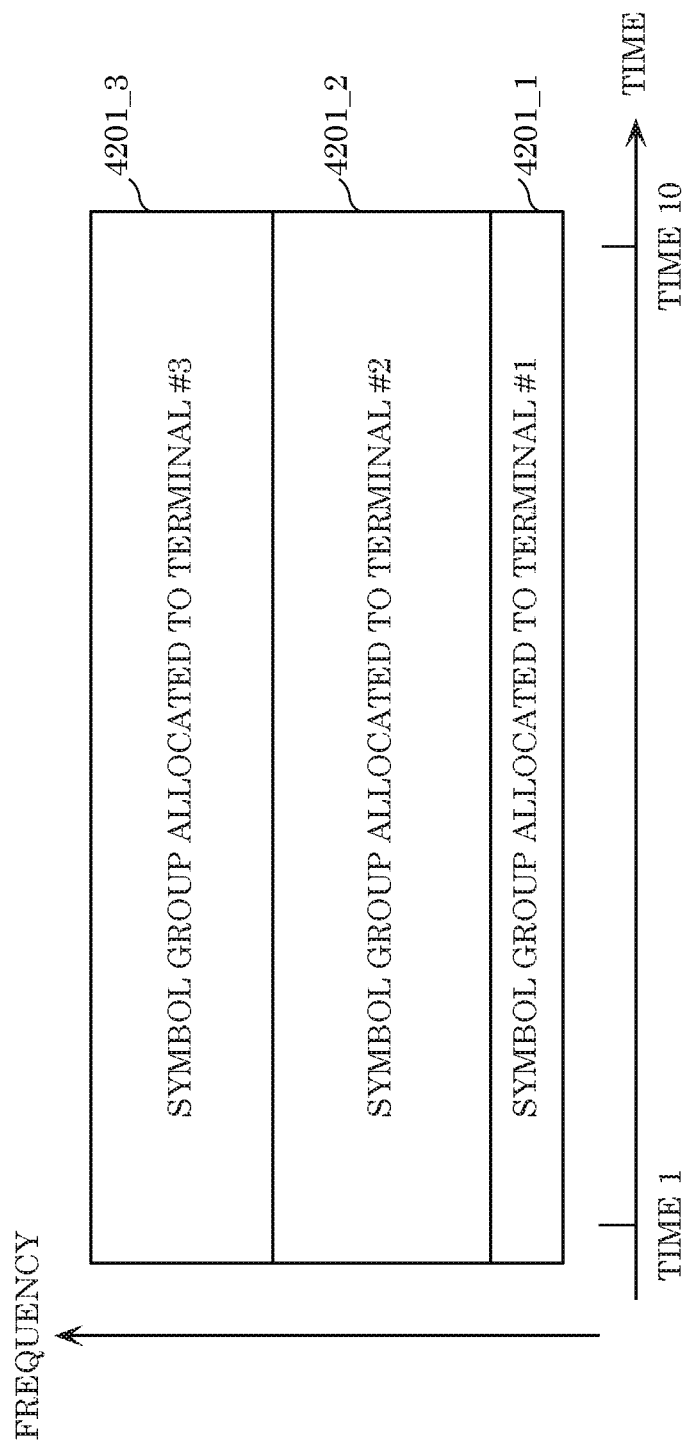
FIG. 42 illustrates an example of allocation of symbol areas to terminals.

FIG. 42 illustrates an example of allocation of "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" to terminals. Note that in FIG. 42, the horizontal axis indicates time, and the vertical axis indicates frequency (carrier).

As illustrated in FIG. 42, for example, "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" are subjected to frequency division, and allocated to the terminals. 4201_1 is a symbol group allocated to terminal #1, 4201_2 is a symbol group allocated to terminal #2, and 4201_3 is a symbol group allocated to terminal #3.

For example, the base station (700) communicates with terminal #1, terminal #2, and terminal #3, and when the base station transmits data to terminal #1, the base station transmits data to terminal #1, using "symbol group 4201_1 allocated to terminal #1" in FIG. 42. When the base station transmits data to terminal #2, the base station transmits data to terminal #2 using "symbol group 4201_2 allocated to terminal #2" in FIG. 42. When the base station transmits data to terminal #3, the base station transmits data to terminal #3 using "symbol group 4201_3 allocated to terminal #3" in FIG. 42.

Note that the method of allocating symbol groups to terminals is not limited to the method in FIG. 42, and thus the frequency band (the carrier number) may be changed with time or may be set in any manner. Furthermore, the method of allocating symbol groups to terminals may be changed with time.

Figure 43:
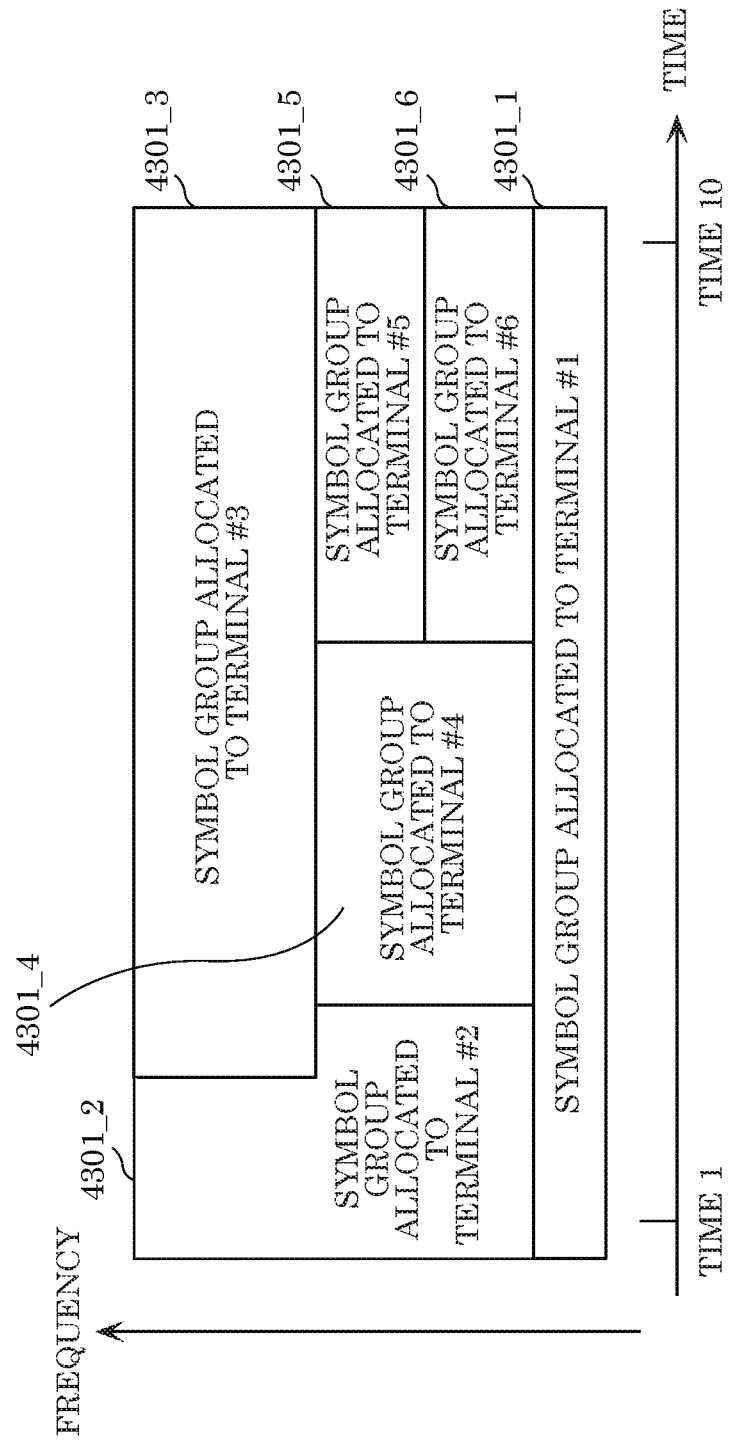
FIG. 43 illustrates an example of allocation of symbol areas to terminals.

FIG. 43 illustrates an example of allocation of "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" to terminals, which is different from the allocation in FIG. 42. Note that in FIG. 43, the horizontal axis indicates time, and the vertical axis indicates frequency (carrier).

As illustrated in FIG. 43, for example, "symbol areas 3801_1 and 3801_2 for stream 1 in FIG. 38, symbol areas 3901_1 and 3901_2 for stream 2 in FIG. 39, symbol areas 4001_1 and 4001_2 for modulated signal 1 in FIG. 40, and symbol areas 4101_1 and 4102_2 for modulated signal 2 in FIG. 41" are subjected to time and frequency division, and allocated to the terminals. Then, 4301_1 is a symbol group allocated to terminal #1, 4301_2 is a symbol group allocated to terminal #2, 4301_3 is a symbol group allocated to terminal #3, 4301_4 is a symbol group allocated to terminal #4, 4301_5 is a symbol group allocated to terminal #5, and 4301_6 is a symbol group allocated to terminal #6.

For example, the base station (700) communicates with terminal #1, terminal #2, terminal #3, terminal #4, terminal #5, and terminal #6, and when the base station transmits data to terminal #1, the base station transmits data to terminal #1, using "symbol group 43011 allocated to terminal #1" in FIG. 43. Then, when the base station transmits data to terminal #2, the base station transmits data to terminal #2 using "symbol group 4301_2 allocated to terminal #2" in FIG. 43. When the base station transmits data to terminal #3, the base station transmits data to terminal #3 using "symbol group 4301_3 allocated to terminal #3" in FIG. 43. When the base station transmits data to terminal #4, the base station transmits data to terminal #4 using "symbol group 4301_4 allocated to terminal #4" in FIG. 43. When the base station transmits data to terminal #5, the base station transmits data to terminal #5 using "symbol group 4301_5 allocated to terminal #5" in FIG. 43. When the base station transmits data to terminal #6, the base station transmits data to terminal #6 using "symbol group 4301_6 allocated to terminal #6" in FIG. 43.

Note that the method of allocating symbol groups to terminals is not limited to the method in FIG. 43, and thus the frequency band (the carrier number) and the time width may be changed or may be set in any manner. Furthermore, the method of allocating symbol groups to terminals may be changed with time.

Figure 44:
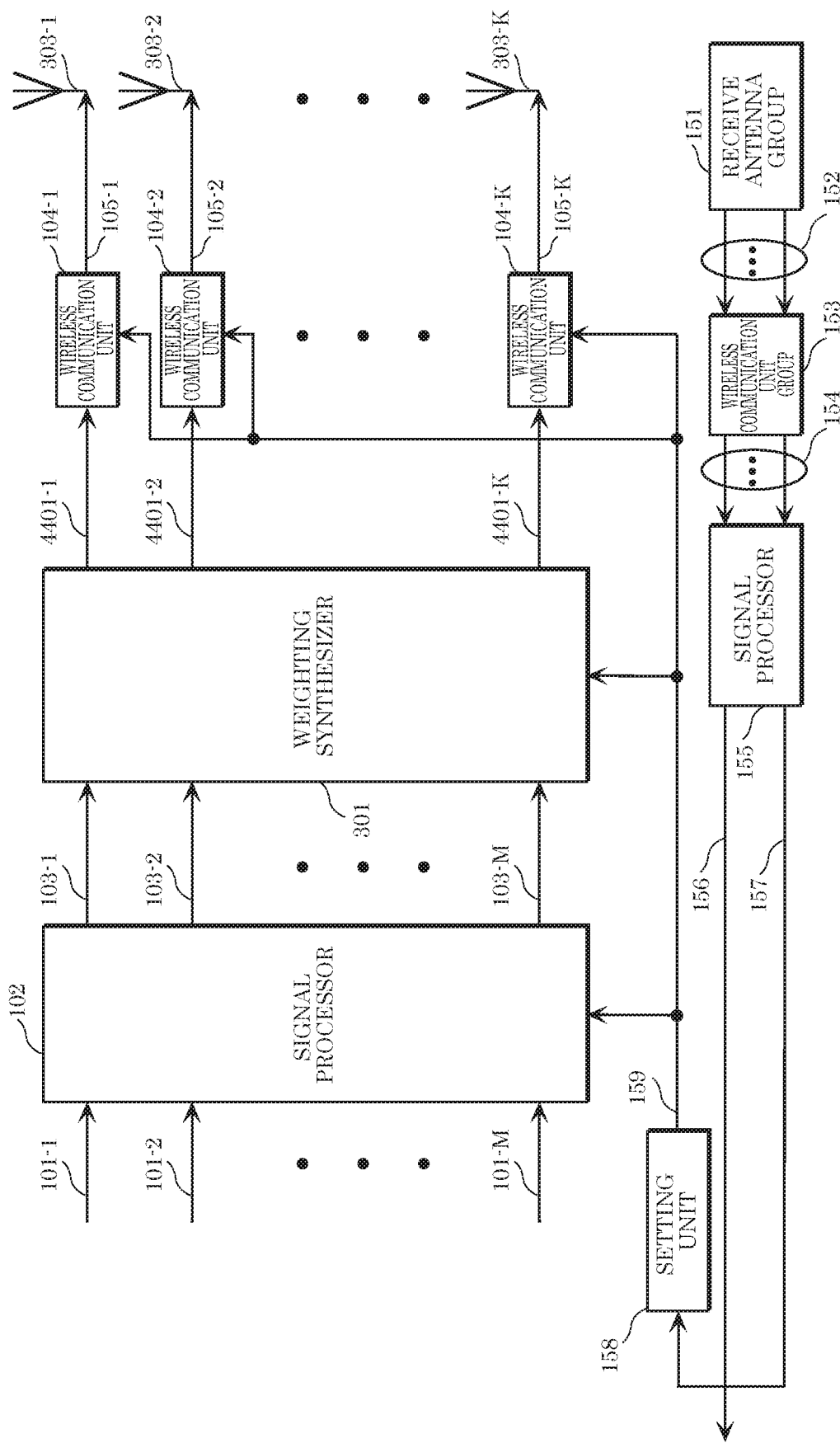
FIG. 44 illustrates an example of a configuration of the base station.

Further, different weighting synthesis may be performed for each carrier in the symbol areas for stream 1, the symbol areas for stream 2, the symbol areas for modulated signal 1, the symbol areas for modulated signal 2 in FIGS. 38, 39, 40, and 41, respectively, and a weighting-synthesis method may be determined for a unit of a plurality of carriers. As illustrated in FIGS. 43 and 44, a weighting synthesis parameter may be set for each allocated terminal. Setting of the weighting synthesis method for carriers is not limited to these examples.

Through the above implementation, in multicast and broadcast data transmission, the base station transmits data symbols and control information symbols using a plurality of transmission beams, and a terminal selectively receives a beam with good quality among the plurality of transmission beams and receives data symbols based on the received transmission beam, thus achieving advantageous effects that the terminal can achieve high data receiving quality.

Embodiment 7

In this specification, the configurations of base stations 700 in FIGS. 7, 12, 17, 18, 19, 20, and 22 and the configurations of the base stations described in other embodiments may each be a configuration as illustrated in FIG. 44.

The following describes operation of the base station in FIG. 44. Elements which operate in the same manner as those in FIGS. 1 and 3 are assigned the same reference numerals in FIG. 44, and a description thereof is omitted.

Weighting synthesizer 301 receives inputs of signals 103_1, 103_2, ..., and 103_M obtained as a result of signal processing, and control signal 159, performs weighting synthesis on the signals based on control signal 159, and outputs weighting-synthesis signals 4401_1, 4401_2, ..., and 4401_K. Note that M is an integer of 2 or more, and K is an integer of 2 or more.

For example, if signal 103_i obtained as a result of the signal processing (i is an integer of 1 or more and M or less) is represented by ui(t) (t is time) and signal 4401_g (g is an integer of 1 or more and K or less) obtained as a result of the weighting synthesis is represented by vg(t), vg (t) can be represented by the following expression.

[Math. 7]

$$v_g(t) = Q_{g1} \times u_1(t) + Q_{g2} \times u_2(t) + \ldots + Q_{gM} \times u_M(t) = \sum_{j=1}^{M} Q_{gi} \times u_j(t)$$

Expression (7)

Wireless communication unit 104g receives inputs of signal 4401g obtained as a result of the weighting synthesis and control signal 159, performs predetermined processing on the signal based on control signal 159, and generates and outputs transmission signal 105_g. Then, transmission signal 105_g is transmitted from antenna 303_1.

Note that the transmission method which the base station supports may be a multi-carrier method such as OFDM or a single carrier method. Furthermore, the base station may support both the multi-carrier method and the single carrier method. At this time, there are methods for generating modulated signals to be transmitted according to the single carrier method, and signals generated according to any of the methods can be transmitted. Examples of the single carrier method include "discrete Fourier transform (DFT)-spread orthogonal frequency division multiplexing (OFDM)", "trajectory constrained DFT-spread OFDM", "OFDM based single carrier (SC)", "single carrier (SC)-frequency division multiple access (FDMA)", and "guard interval DFT-spread OFDM".

Expression (7) is indicated by the function of time, yet Expression (7) may be a function of frequency in addition to time in the case of a multi-carrier method such as the OFDM method.

For example, according to the OFDM method, different weighting synthesis may be performed for each carrier, and a weighting-synthesis method may be determined for a unit of a plurality of carriers. Setting of the weighting synthesis method for carriers is not limited to these examples.

Supplementary Note 6

As a matter of course, the present disclosure may be carried out by combining a plurality of the exemplary embodiments and other contents such as supplementary notes described herein.

As the configuration of the base station, the examples of the configuration are not limited to those in FIGS. 1 and 3, and as long as the base station includes a plurality of transmission antennas and generates and transmits a plurality of transmission beams (transmission directivity beams), the present disclosure can be carried out with such a base station.

Moreover, the exemplary embodiments are mere examples. For example, while a "modulating method, an error correction coding method (an error correction code, a code length, a coding rate and the like to be used), control information and the like" are exemplified, it is possible to carry out the present disclosure with the same configuration even when other types of "a modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, APSK (such as 16APSK, 64APSK, 128APSK, 256APSK, 1024APSK, and 4096APSK), PAM (such as 4PAM, 8PAM, 16PAM, 64PAM, 128PAM, 256PAM, 1024PAM and 4096PAM), PSK (such as BPSK, QPSK, 8PSK, 16PSK, 64PSK, 128PSK, 256PSK, 1024PSK and 4096PSK), and QAM (such as 4QAM, 8QAM, 16QAM, 64QAM, 128QAM, 256QAM, 1024QAM and 4096QAM) may be applied, or in each modulating method, uniform mapping or non-uniform mapping may be performed. Moreover, a method for arranging signal points, such as 2 signal points, 4 signal points, 8 signal points, 16 signal points, 64 signal points, 128 signal points, 256 signal points, and 1024 signal points on an I-Q plane (a modulating method having signal points such as 2 signal points, 4 signal points, 8 signal points, 16 signal points, 64 signal points, 128 signal points, 256 signal points, and 1024 signal points) is not limited to a signal point arranging method of the modulating methods described herein.

Herein, it can be considered that communication/broadcast apparatuses, such as a broadcast station, a base station, an access point, a terminal, and a mobile phone, each include the transmitting device. In this case, it can be considered that communication apparatuses, such as a television, a radio, a terminal, a personal computer, a mobile phone, an access point, and a base station, each include the receiving device. Moreover, it can be also considered that each of the transmitting device and the receiving device according to the present disclosure is an apparatus having communication functions and has a form connectable via any interface to devices for running applications such as a television, a radio, a personal computer, and a mobile phone. Moreover, in the present exemplary embodiment, symbols other than data symbols, for example, pilot symbols (such as preambles, unique words, postambles, and reference symbols), and control information symbols may be arranged in frames in any way. Then, these symbols are named a pilot symbol and a control information symbol here, but may be named in any way, and a function itself is important.

Moreover, the pilot symbol only needs to be a known symbol modulated by using PSK modulation in a transmitting device and a receiving device. The receiving device performs frequency synchronization, time synchronization, channel estimation of each modulated signal (estimation of CSI (Channel State Information)), signal detection, and the like by using this symbol. Alternatively, the pilot symbol may allow the receiving device to learn a symbol transmitted by the transmitting device by establishing synchronization.

Moreover, the control information symbol is a symbol for transmitting information that is used for realizing communication other than communication for data (data of an application, for instance) and that is to be transmitted to a communicating party (for example, a modulating method used for communication, an error correction coding method, a coding rate of the error correction coding method, setting information in an upper layer, and the like).

Note that the present disclosure is not limited to the exemplary embodiments, and can be carried out with various modifications. For example, the case where the present disclosure is performed as a communication device is described in the exemplary embodiments. However, the present disclosure is not limited to this case, and this communication method can also be used as software.

Note that a program for executing the above-described communication method may be stored in a ROM in advance, and a CPU may be caused to operate this program.

Moreover, the program for executing the communication method may be stored in a computer-readable storage medium, the program stored in the recording medium may be recorded in a RAM of a computer, and the computer may be caused to operate according to this program.

Then, the configurations of the above-described exemplary embodiments, for instance, may be each realized as an LSI (Large Scale Integration) which is typically an integrated circuit having an input terminal and an output terminal. The configurations may be separately formed as one chip, or all or at least one of the configurations of the exemplary embodiments may be formed as one chip. The LSI is described here, but the integrated circuit may also be referred to as an IC (Integrated Circuit), a system LSI, a super LSI, or an ultra LSI, depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used. Further, when development of a semiconductor technology or another derived technology provides a circuit integration technology which replaces the LSI, as a matter of course, functional blocks may be integrated by using this technology. Application of biotechnology, for instance, is one such possibility.

Various frame configurations have been described herein. For example, the base station (AP) which includes the transmitting device in FIG. 1 transmits a modulated signal having a frame configuration described herein, using a multi-carrier method such as an OFDM method. At this time, it is conceivable to apply a method in which when a terminal (user) communicating with the base station (AP) transmits a modulated signal, the modulated signal may be transmitted by the terminal according to a single carrier method (the base station (AP) can simultaneously transmit data symbol groups to a plurality of terminals using the OFDM method, and the terminal can reduce power consumption by using a single carrier method).

A time division duplex (TDD) method in which a terminal transmits a modulation signal, using a portion of a frequency band used for a modulated signal transmitted by the base station (AP) may be applied.

The configuration of antenna units 106-1, 106-2, . . . , and 106-M in FIG. 1 is not limited to the configurations described in the embodiments. For example, antenna units 106-1, 106-2, . . . , and 106-M may not each include a plurality of antennas, and may not receive an input of signal 159.

The configuration of antenna units 401-1, 401-2, . . . , and 401-N in FIG. 4 is not limited to the configuration described in the embodiments. For example, antenna units 401-1, 401-2, ..., and 401-N may not each include a plurality of antennas, and may not receive an input of signal 410.

Note that the transmission method which the base station and the terminals support may be a multi-carrier method such as OFDM or a single carrier method. Furthermore, the base station may support both the multi-carrier method and the single carrier method. At this time, there are methods for generating modulated signals according to the single carrier method, and signals generated according to any of the methods can be transmitted. Examples of the single carrier system include "discrete Fourier transform (DFT)-spread orthogonal frequency division multiplexing (OFDM)", "trajectory constrained DFT-spread OFDM", "OFDM based single carrier (SC)", and "single carrier (SC)-frequency division multiple access (FDMA)", and "guard interval DFT-spread OFDM".

Furthermore, at least multicast (broadcast) data is included in information #1 (101_1), information #2 (101_2), ..., and information #M (101_M) in FIGS. 1, 3, and 44. For example, in FIG. 1, if information #1 (101_1) is data for multicasting, a plurality of streams or modulated signals that include such data are generated by signal processor 102, and output from an antenna.

In FIG. 3, if information #1 (101_1) is data for multicasting, a plurality of streams or modulated signals that include such data are generated by signal processor 102 and/or weighting synthesizer 301, and output from an antenna.

In FIG. 44, if information #1 (101_1) is data for multicasting, a plurality of streams or modulated signals that include such data are generated by signal processor 102 and/or weighting synthesizer 301, and output from an antenna.

Note that the states of the streams and modulated signals are as described with reference to FIGS. 7, 9, 12, 14, 17, 18, and 19.

Furthermore, information #1 (101_1), information #2 (101_2), ..., and information #M (101_M) in FIGS. 1, 3, and 44 may include data addressed to individual terminals. With regard to this point, a description is as given in the embodiments in the specification.

Note that a configuration may be adopted in which at least one of a field programmable gate array (FPGA) and a central processing unit (CPU) can download the entirety of or a portion of software necessary to achieve the communication method described in the present disclosure by wireless communication or wire communication. Furthermore, the configuration may allow downloading the entirety of or a portion of software for update by wireless communication or wire communication. Then, the downloaded software may be stored into a storage, and at least one of an FPGA and a CPU may be operated based on the stored software, so that the digital signal processing described in the present disclosure may be performed.

At this time, a device that includes at least one of an FPGA and a CPU may be connected with a communication modem in a wireless or wired manner, and this device and the communication modem may achieve the communication method described in the present disclosure.

For example, the base station, an AP, and communication devices such as terminals described in this specification may each include at least one of an FPGA and a CPU, and the communication devices may each include an interface for receiving, from the outside, software for operating at least one of the FPGA and the CPU. Furthermore, the communication devices may include a storage for storing the software obtained from the outside, and cause the FPGA and the CPU to operate based on the stored software, thus achieving signal processing described in the present disclosure.

Hereinafter, an example of a communication system to which the wireless communication method that uses a plurality of antennas that is described in Embodiments 1 through 7 can be applied will be given. Each of the wireless communication methods that uses a plurality of antennas described in Embodiments 1 through 7 is merely one example of a wireless communication method that is applicable to the communication system to be described below. In other words, the wireless communication method used in the communication system to be described below may be one of the wireless communication methods described in Embodiments 1 through 7, and may be some other wireless communication method that uses a plurality of antennas. The wireless communication method used by the communication system to be described below may be a wireless communication method that uses a single antenna, and may be a communication method that performs communication using a device other than an antenna, such as an optical communication device, for example.

Embodiment A1

In the present embodiment, a method of constructing a network achieved by the communication system according to the present embodiment will be described.

Figure 45:
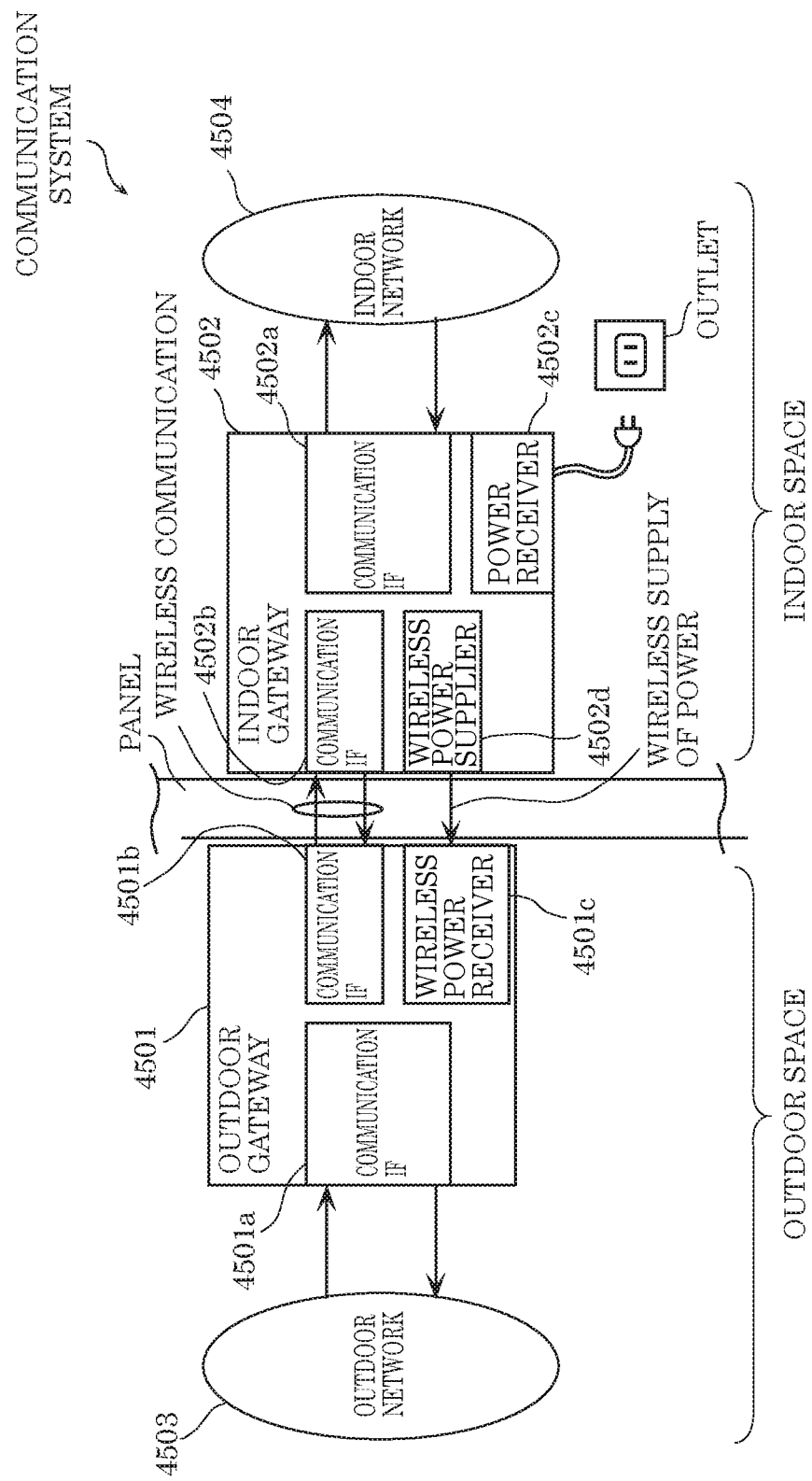
FIG. 45 illustrates one example of connections between networks and gateways.

FIG. 45 illustrates one example of connections between networks and gateways. Hereinafter, the communication system according to the present embodiment will be described with reference to FIG. 45.

As illustrated in FIG. 45, the communication system includes outdoor gateway 4501, indoor gateway 4502, outdoor network 4503, and indoor network 4504.

Outdoor gateway 4501 is a gateway device that communicably connects to outdoor network 4503. Outdoor gateway 4501 includes communication interface (IF) 4501*a*, communication IF 4501*b*, and wireless power receiver 4501*c*. Outdoor gateway 4501 can be implemented as, for example, a computer. However, outdoor gateway 4501 need not be configured as a computer. Outdoor gateway 4501 corresponds to the first communication device. Note that outdoor gateway 4501 may be a node on outdoor network 4503.

Communication IF 4501*a* is a communication interface device that is communicably connected to outdoor network 4503.

Communication IF 4501*b* is a communication interface device that is communicably connected to indoor gateway 4502.

Wireless power receiver 4501*c* is a power reception device that receives a wireless supply of power from indoor gateway 4502. The power may be supplied using a method that uses electromagnetic induction, a wireless power transmission method, or a wireless power supply method, and, more specifically, may utilize a method that conforms to the Qi standard. However, applicable methods of power transmission are not limited to these examples.

Outdoor gateway 4501 receives a communication frame from a surrounding communication device via communication IF 4501*a* and 4501*b*, and transmits the communication frame to another suitable communication device. Moreover, outdoor gateway 4501 controls what frame is transmitted by which communication IF by exchanging route information with surrounding communication devices via communication IF 4501*a* and 4501*b*.

Indoor gateway 4502 is a gateway device that communicably connects to indoor network 4504. Indoor gateway 4502 includes communication IF 4502a, communication IF 4502b, power receiver 4502c, and wireless power supplier (wireless power transmitter) 4502d. Indoor gateway 4502 can be implemented as, for example, a computer. However, indoor gateway 4502 need not be configured as a computer. Indoor gateway 4502 corresponds to the second communication device. Note that indoor gateway 4502 may be a node on indoor network 4504.

Communication IF 4502a is a communication interface device that is communicably connected to indoor network 4504.

Communication IF 4502b is a communication interface device that is communicably connected to outdoor gateway 4501.

Power receiver 4502c is a power supply terminal disposed indoors, and receives a supply of power for driving indoor gateway 4502 from, for example, a outlet or a universal serial bus (USB) connector. Power receiver 4502c is connected to an outlet via a power cord and receives, for example, a supply of AC 100V power, or is connected to a universal serial bus (USB) connector and receives a supply of power.

Wireless power supplier (wireless power transmitter) 4502d is a power supply device (power transmission device) that wirelessly supplies power to outdoor gateway 4501. The power that wireless power supplier 4502d supplies accounts for part of the power received by power receiver 4502c from the outlet. Details regarding the supply of the power are the same as described with respect to wireless power receiver 4501c.

Indoor gateway 4502 receives a communication frame from a surrounding communication device via communication IF 4502a and 4502b, and transmits the communication frame to another suitable communication device. Moreover, indoor gateway 4502 controls what frame is transmitted by which communication IF by exchanging route information with surrounding communication devices via communication IF 4502a and 4502b.

Outdoor network 4503 is a network provided, for example, in an outdoor space (also referred to as a first space). Outdoor network 4503 is a wireless network (also referred to as a first network), and, specifically, is a network that conforms to, for example, the IEEE 802.11ad and/or IEEE 802.11ay communication standards. However, this network may use a communication method that conforms to some other standard (for example, the IEEE 802.11a standard, the IEEE 802.11g standard, the IEEE 802.11n standard, the IEEE 802.11ac standard, the IEEE 802.11ax standard, and/or a cellular standard may be used).

Outdoor network 4503 may be connected to a wired network connected using, for example, optical fiber. In such cases, outdoor network 4503 fulfils the role of connecting indoor network 4504 to the wired network described above. Note that outdoor network 4503 may be a closed network that is not connected to the wired network described above.

Indoor network 4504 is a network provided, for example, in an indoor space (also referred to as a second space). Indoor network 4504 is a wireless network (also referred to as a second network), and, specifically, is a network that conforms to, for example, the IEEE 802.11ad and/or IEEE 802.11ay communication standards. However, this network may use a communication method that conforms to some other standard (for example, the IEEE 802.11a standard, the IEEE 802.11g standard, the IEEE 802.11n standard, the IEEE 802.11ac standard, the IEEE 802.11ax standard, and/or a cellular standard may be used).

Note that outdoor gateway 4501 or indoor gateway 4502 is exemplified as having the configuration illustrated in FIG. 1 (or FIG. 3 or FIG. 44). Since operations performed by each element in FIG. 1 (or FIG. 3 or FIG. 44) and operations performed by each element in FIG. 4 have already been described, repeated description thereof will be omitted.

Note that the indoor space and the outdoor space are separated by, for example, a panel. Here, communication IF 4501b and communication IF 4502b are connected by wireless communication via radio waves passing through this panel. The panel is, for example, an outer wall (for example, the outer wall of a building or a home), a pane of glass (for example, a pane of glass provided in an opening of a building or a home).

Note that when outdoor network 4503 is a wireless network, communication IF 4501a is a wireless communication interface. Moreover, when indoor network 4504 is a wireless network, communication IF 4502a is a wireless communication interface.

For example, communication IF 4501a communicates using time division multiple access (TDMA). For example, communication IF 4502a communicates using carrier sense multiple access (CSMA). However, communication IF 4501a may communicate using a method other than TDMA, and communication IF 4502a may communicate using a method other than CSMA.

Each of outdoor network 4503 and indoor network 4504 may be a wireless multihop network (a wireless mesh network). In such cases, communication IF 4501a is connected to outdoor network 4503 configured as a wireless multihop network (wireless mesh network) and communication IF 4502a is connected to indoor network 4504 configured as a wireless multihop network (wireless mesh network).

The control method used by the communication system includes connecting to outdoor network 4603 by outdoor gateway 4501, wirelessly communicating by outdoor gateway 4501, connecting to indoor network 4504 by indoor gateway 4502, and connecting to outdoor gateway 4501 by indoor gateway 4502 via wireless communication.

Figure 46:
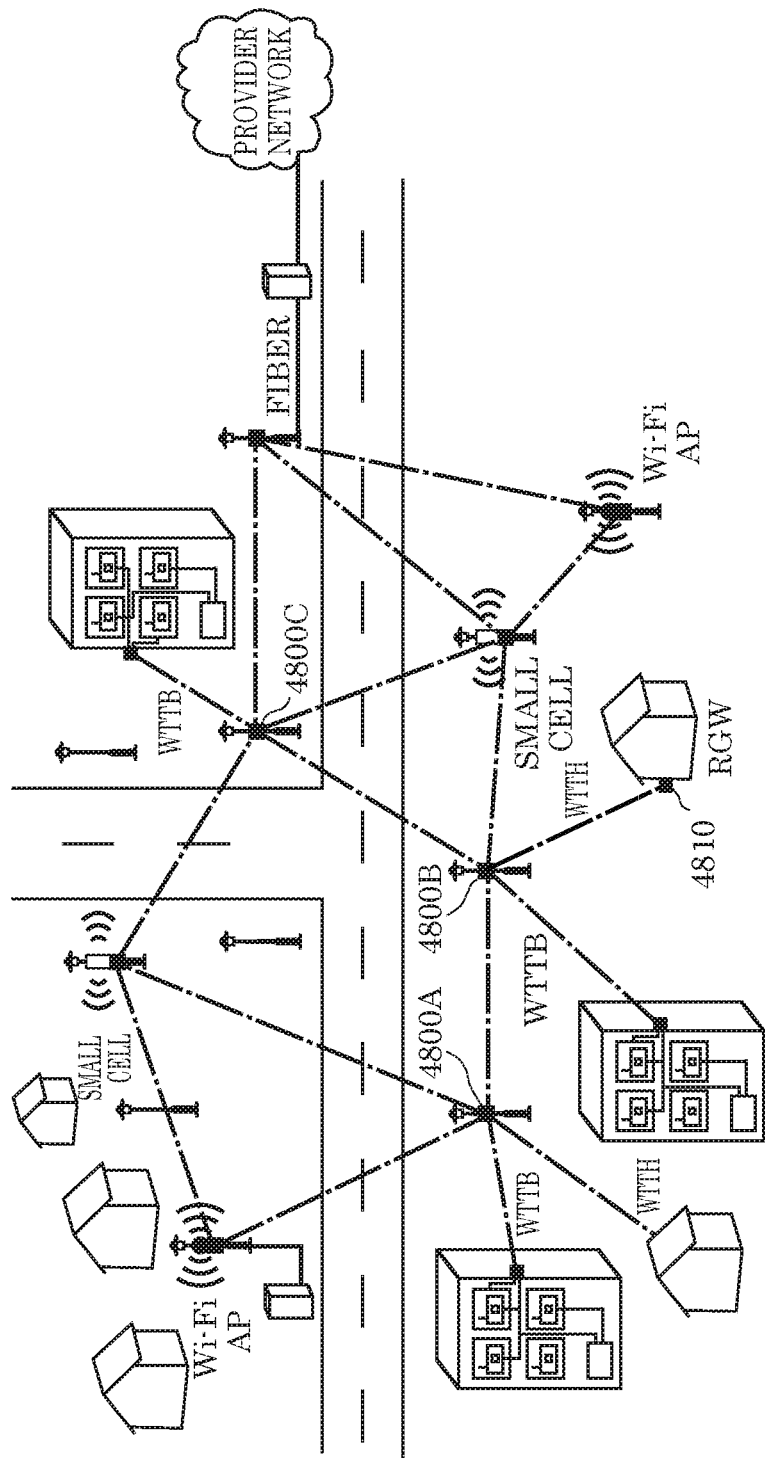
FIG. 46 illustrates one example of a configuration of a communication system.

FIG. 46 illustrates an example of a configuration of the communication system. More specifically, FIG. 46 schematically illustrates one example of a configuration of a mesh network—which is outdoor network 4503—that uses wireless signal repeaters (a wireless signal repeater is also referred to simply as a repeater).

The plurality of repeaters are disposed in a plurality of locations in a predetermined area, and collectively form the mesh wireless backhaul. For example, repeater 4800B transmits a signal received from repeater 4800A to repeater 4800C. Repeater 4800B also transmits a signal received from repeater 4800A to edge node (or node) 4810 that is connected to repeater 4800B. Edge node (or node) 4810 is a gateway device at a home. Repeater 4800B also transmits a signal received from edge node (or node) 4810 that is connected to repeater 4800B, to another repeater 4800C.

This form of wireless connection of a home from repeater 4800B is referred to as wireless to the home (WTTH). However, the naming is not limited to this example.

Moreover, an edge node (or node) may be a gateway device on a network in a building. This form of wireless connection of a building from a repeater is referred to as wireless to the building (WTTB). However, the naming is not limited to this example.

Moreover, an edge node (or node) may be, for example, a Wi-Fi access point.

Such use-cases of wirelessly connecting an edge node (or node) in outdoor network 4503 are collectively referred to as wireless to the X (WTTX).

Figure 47:
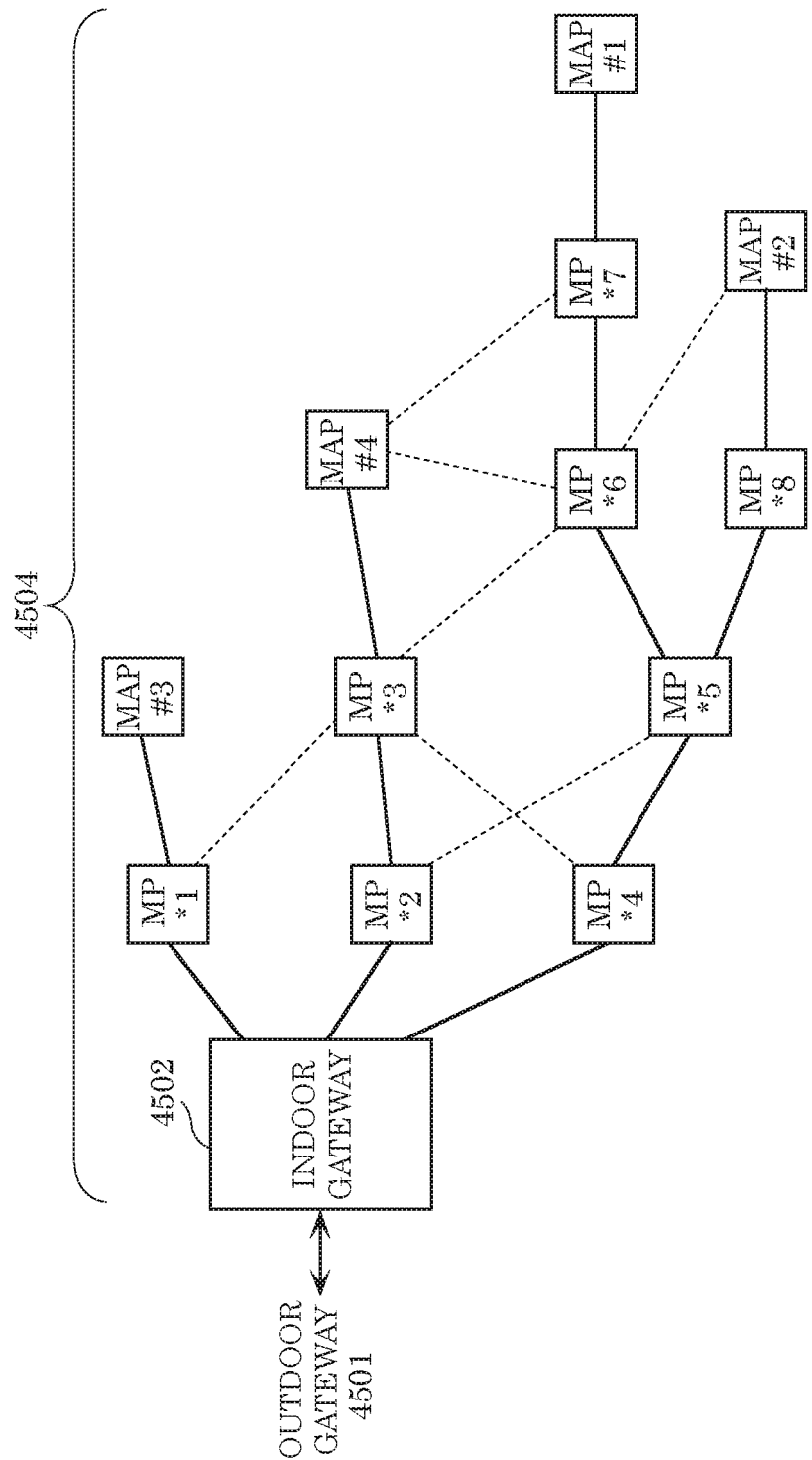
FIG. 47 illustrates one example of a configuration of an indoor network.

FIG. 47 illustrates one example of a configuration of indoor network 4504.

Indoor network 4504 illustrated in FIG. 47 forms a mesh network (multihop network), and includes: mesh point (MP) *1, MP *2, MP *3, MP *4, MP *5, MP *6, MP *7, and MP *8 (hereinafter collectively referred to as "MP *1, etc."); and mesh access point (MAP) #1, MAP #2, MAP #3, and MAP #4 (hereinafter collectively referred to as "MAP #1, etc."). Note that in this example, indoor gateway 4502 is described as a node on the mesh network. Note that MP *1, etc., or MAP #1, etc., are exemplified as having the configuration illustrated in FIG. 1 (or FIG. 3 or FIG. 44). Since operations performed by each element in FIG. 1 (or FIG. 3 or FIG. 44) and operations performed by each element in FIG. 4 have already been described, repeated description thereof will be omitted.

The broken lines that connect MPs and/or MAPs indicate that the MP and/or MAP connected by the broken line are communicably connected, and solid lines that connect MPs and/or MAPs indicate that the communication link that connects the MP and/or MAP is selected as a communication route in the mesh network.

For example, indoor gateway 4502 and MP *1 connected by a solid line are capable of communicating, and the communication link connecting indoor gateway 4502 and MP *1 is selected as a communication route. Moreover, MP *3 and MP *4 connected by a broken line are capable of communicating, but the communication link connecting MP *3 and MP *4 is not selected as a communication route. Moreover, MP *3 and MAP #3, which are neither connected by a solid line nor a broken line, are not capable of communicating.

Each of MP *1, etc., is a node on the mesh network. Each of MP *1, etc., includes a routing table. By transmitting packets in accordance with the routing table, each of MP *1, etc., enables communication between a terminal connected to the mesh network and another communication device. The routing table may be a routing table that is statically configured (a static routing table), and may be a routing table that is dynamically configured by MP *1, etc., exchanging information via routing protocols (a dynamic routing table).

Each of MAP #1, etc., is, for example, a node on the mesh network, and further includes functionality as a base station (access point) that provides wireless access to terminals that are indoors. The functionality that allows MAP #1, etc., to form a mesh network is the same as that of MP *1, etc. Moreover, the functionality that allows each of MAP #1, etc., to function as a base station is the same as a typical base station. Each of MAP #1, etc., includes functionality as a 2.4 GHz, 5 GHz, 60 GHz, etc., wireless local area network (IAN) base station (access point), for example.

In order to enable a terminal connected to MAP #1, etc., to communicate with indoor gateway 4502 via the mesh network, MP *1, etc., and MAP #1, etc., perform (1) initialization operations for forming the mesh network, (2) operations for forming the mesh network (specifically, processes for determining communication routes, etc.), and (3) operations for the forwarding of packets by MP *1, etc., and MAP #1, etc.

Hereinafter, operations (1) through (3) described above will be described in greater detail.

(1) Initialization Operations for Forming the Mesh Network

Each of indoor gateway 4502, MP *1, etc., and MAP #1, etc., searches for an adjacent node. Note that a node is any one of indoor gateway 4502, MP *1, etc., and MAP #1, etc. As a result, it is known that, for example, MP *3 is capable of communicating with MP *1, MP *2, MP *4, and MP *6. At this time, for example, MP *3 may also perform beamforming training.

Note that the indoor gateway does not search for devices provided outdoors (for example, an outdoor gateway, an outdoor MP, or an outdoor MAP; none of these are illustrated in the drawings).

More specifically, indoor gateway 4502, MP *1, etc., and MAP #1, etc., notifies surrounding nodes that they belong to an indoor network by frame transmission. Similarly, outdoor gateway 4501, outdoor MPs, and outdoor MAPs notify surrounding nodes that they belong to an outdoor network by frame transmission.

Accordingly, information about the network that each node belongs to is included in the transmitted frame. Moreover, the transmitted frame described above includes control information indicating whether the information included in the transmitted frame is broadcast (multicast) information or unicast information. The transmitted frame described above further includes information indicating whether the node that was the source of transmission is a gateway (specifically, indoor gateway 4502 or outdoor gateway 4501), an MP (specifically, any one of indoor MP *1, etc., or an outdoor MP), or a MAP (specifically, indoor MAP #1 or an outdoor MAP).

Next, each node shares connection information. Here, connection information is broadcast (multicast) to the surrounding area. Indoor gateway 4502, MP #1, etc., MAP *1, etc., obtain surrounding node connection information.

For example, MP *3 recognizes that it is capable of communicating with MP *1. Accordingly, MP *3 transmits information indicating that MP *3 is capable of communicating with MP *1 to other nodes (indoor gateway 4502, indoor MP #1, and indoor MAP *1).

Accordingly, for example, MP *3 transmits information indicating that MP *3 is capable of communicating with MP *1 to MP *1, MP *2, MP *4, MP *6, and MAP #4. MP *6 transmits information indicating that MP *3 is capable of communicating with MP *1 to MP *7, MP *5, and MAP #2. Each of MP *1, MP *2, MP *4, and MAP #4 also transmits information indicating that MP *3 is capable of communicating with MP *1.

Here, after any one of indoor gateway 4502, MP *1, etc., and MAP #1 receives data that is the same as data received in the past, the node needs to have a function that prevents it from broadcasting (multicasting) (i.e., transmitting) the data again.

For example, MAP #4 first receives information indicating that MP *3 is capable of communicating with MP *1 from MP *3. MAP #4 then transmits the information indicating that MP *3 is capable of communicating with MP *1 to MP *1, etc., and MAP #1, etc. Next, MAP #4 receives information indicating that MP *3 is capable of communicating with MP *1 from MAP #4. This time, MAP #4 does not transmit the information indicating that MP *3 is capable of communicating with MP *1 to MP *1, etc., and MAP #1, etc. However, the broadcast (multicast) is only performed on the indoor network.

Figure 48:
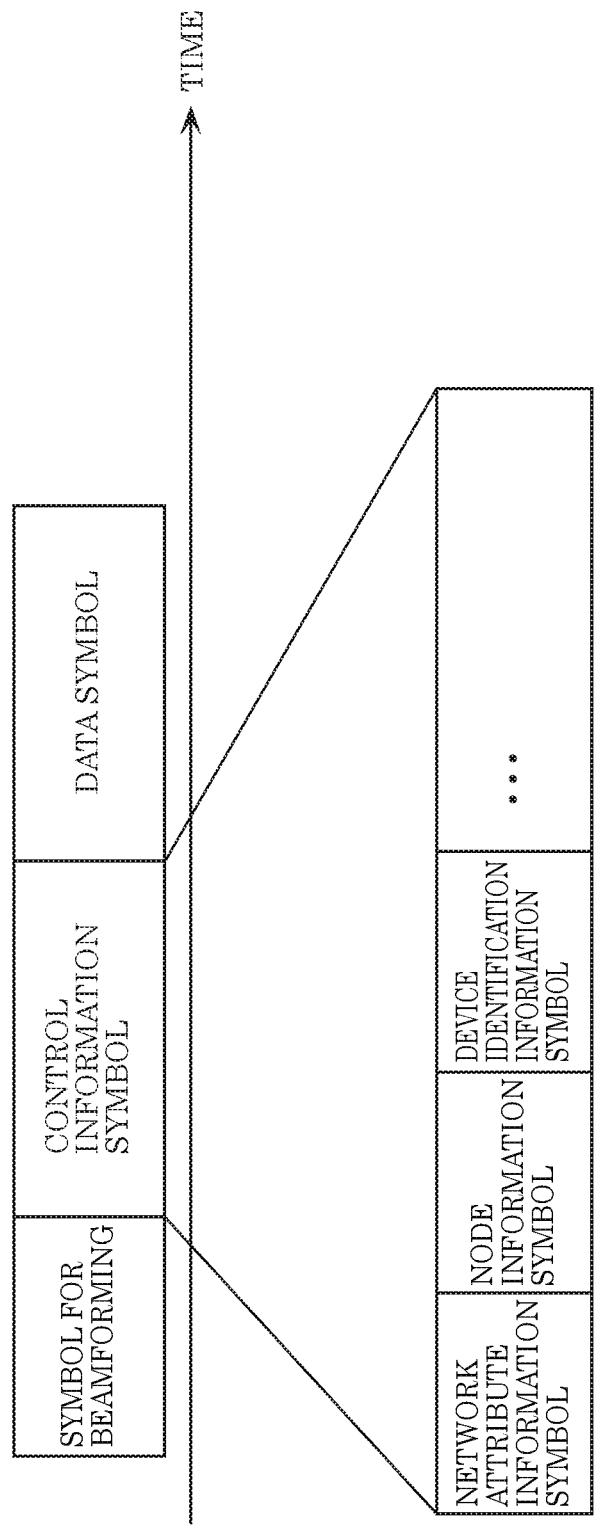
FIG. 48 illustrates one example of a frame configuration.

Upon performing the above operations, each node transmits a frame including, for example, a symbol for beamforming, a control information symbol, and a data symbol. One example of such a frame is illustrated in FIG. 48. FIG.

48 illustrates a configuration of the above-described frame. Time is represented on the horizontal axis. Hereinafter, an example in which a first node transmits a frame having the configuration illustrated in FIG. 48 will be given.

The symbol for beamforming is a symbol for determining the signal processing method for the transmission beamforming and the signal processing method for the reception beamforming, which are used upon the first node communicating with a communication partner node. Note that the communication partner node may be a plurality of nodes.

The control information symbol includes one or more of a network attribute information symbol, a node information symbol, and a device identification information symbol.

The network attribute information symbol is information about the network that the first node belongs to. For example, the network attribute information symbol is a symbol for notifying either that the first node belongs to the indoor network or that the first node belongs to the outdoor network.

The node information symbol is information about the node that the first node belongs to. For example, the node information symbol is a symbol for notifying any one of that the first node is a gateway, that the first node is an MP, and that the first node is a MAP.

The device identification information symbol is a symbol for notifying another node of a unique number used to identify the first node.

Figure 49:
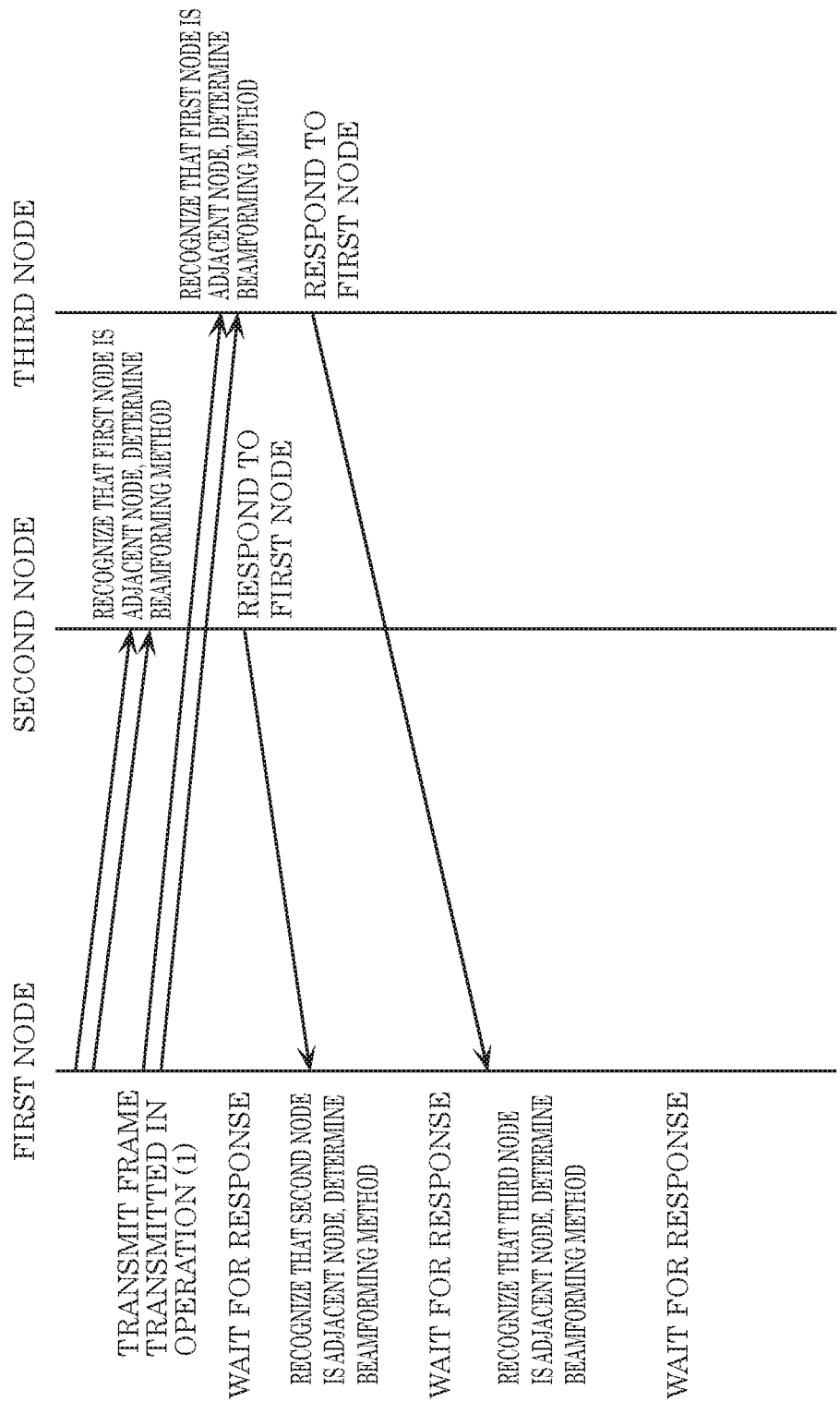
FIG. 49 illustrates one example of a communication sequence.

Hereinafter, initialization operations for forming the mesh network will be described with reference to FIG. 49 and FIG. 50. FIG. 49 illustrates the flow of communication between the first node and other nodes, after the frame is transmitted in operation (1).

As illustrated in FIG. 49, first, the first node transmits the frame transmitted in operation (1) to a second node and a third node. This frame may be transmitted one or more times. Then, in response to receiving the frame, each of the second node and the third node transmits a frame to respond to the first node.

Figure 50:
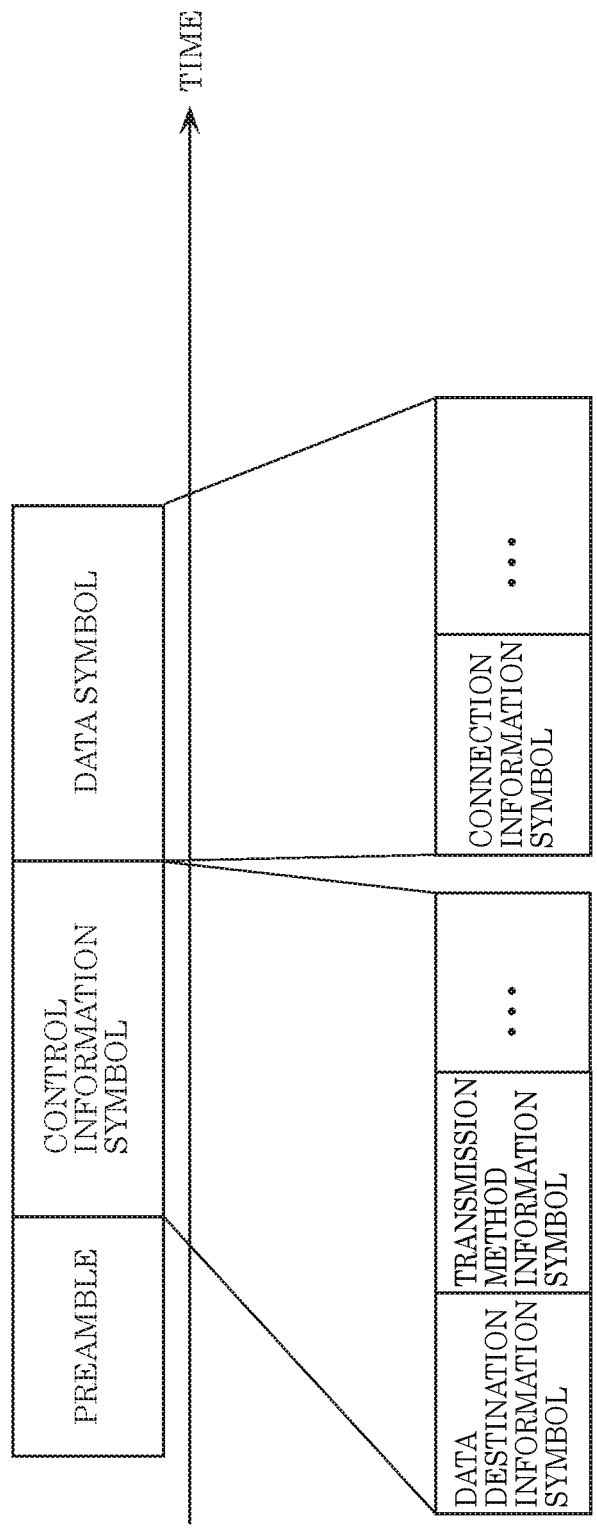
FIG. 50 illustrates one example of a frame configuration.

FIG. 50 illustrates a configuration of a frame used to transmit connection information for the first node to connect to another node. In FIG. 50, time is represented on the horizontal axis.

As illustrated in FIG. 50, this frame includes a preamble, a control information symbol, and a data symbol.

The preamble is a symbol for performing, for example, time synchronization, frame synchronization, and frequency synchronization between the first node and the communication partner of the first node. For example, the control information symbol includes a data destination information symbol and a transmission method information symbol.

The data destination information symbol is information about the destination of the frame transmitted by the first node. For example, when the first node transmits this frame to the second node, the data destination information symbol is information indicating that the frame is to be transmitted to the second node.

The transmission method information symbol is a symbol for transmitting information about the transmission method of the frame transmitted by the first node. Since this frame is a frame for broadcast (multicast), the transmission method information symbol includes information indicating that the frame is a frame for multicast. Note that when the transmitted frame is a frame for unicast, the transmission method information symbol may include information indicating that the frame is for unicast. Moreover, the transmission method information symbol may include information about the transmission method such as the error correction coding method or modulation method used to generate the data symbol, and/or information about the number of streams transmitted.

The data symbol is a symbol including data carried by the frame. For example, the data symbol includes a connection information symbol.

The connection information symbol is a symbol for transmitting information about the node(s) that the first node is connected to. For example, since the first node is connected to the second node and the third node, the connection information symbol includes information indicating that the first node is connected to the second node and information indicating that the first node is connected to the third node. Note that this symbol may include identification/unique information for the first node, identification/unique information for the second node, and identification/unique information for the third node.

The description above presents an example of a frame for broadcast (multicast). Accordingly, the second node that receives this frame transmits the connection information symbol to other nodes. The third node also transmits the connection information symbol to other nodes.

In other words, a node that receives a connection information symbol transmits a frame including the connection information symbol. However, as described above, once a node receives a connection information symbol and transmits a frame including the connection information symbol, if the node receives the connection information symbol again, the node does not transmit a frame including the connection information symbol.

In this way, each node can know the configuration of the mesh network.

(2) Processes for Forming the Mesh Network

Two methods regarding the processes for forming the mesh network will be described. The first method involves indoor gateway 4502 creating a route map for each MAP. The second method also involves indoor gateway 4502 creating a route map for each MAP, but the route map is not shared. Hereinafter, these methods will be described in greater detail.

(2-1) First Method

Figure 51:
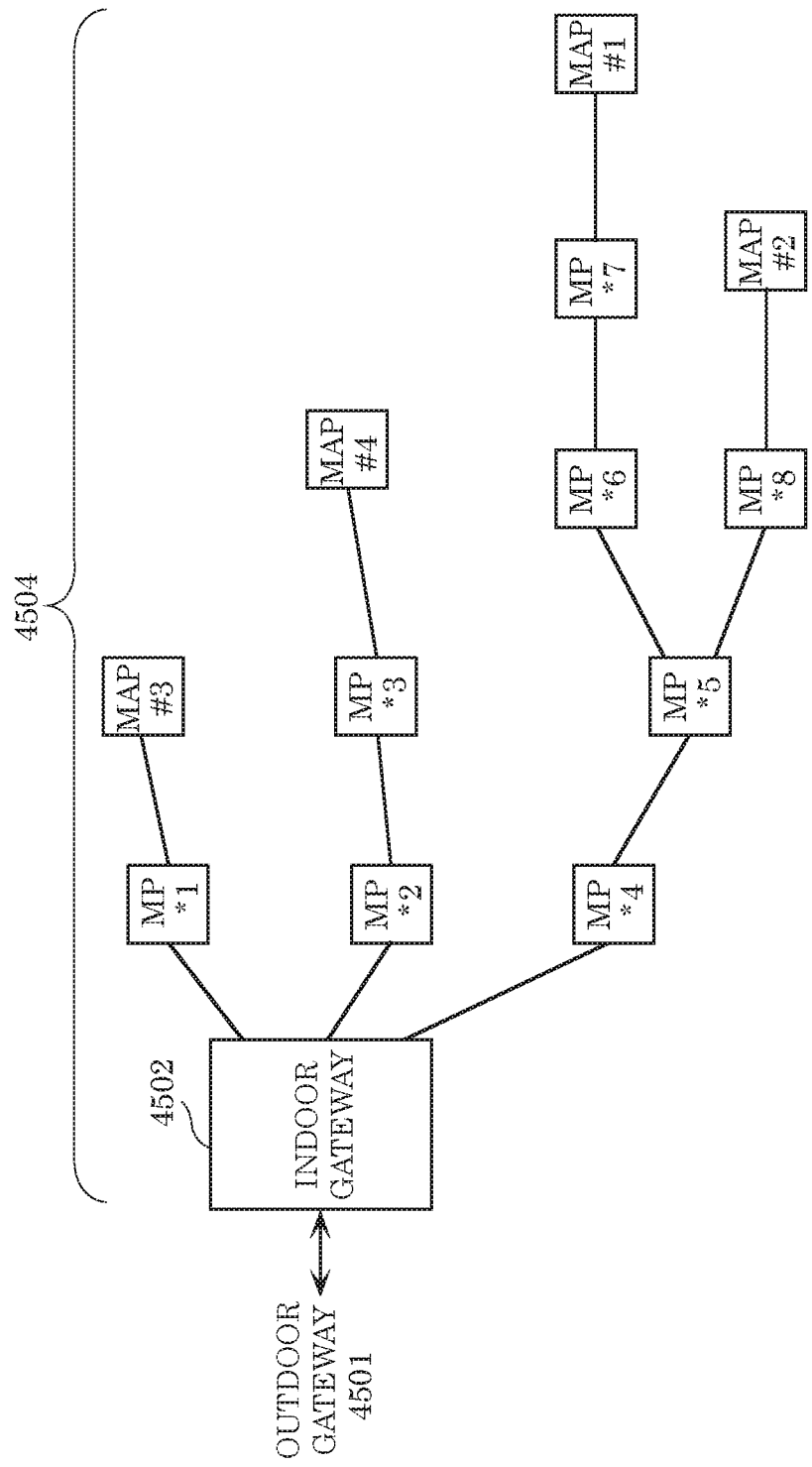
FIG. 51 illustrates one example of a configuration of an indoor network.

In the first method, indoor gateway 4502 creates a route map for each MAP. Note that the mesh network formed as a result of the creation of the route map is, for example, the network illustrated in FIG. 51.

Indoor gateway 4502 creates a route map for MAP #1. This route map indicates that indoor gateway 4502 can transmit data to MAP #1, by, (a), indoor gateway 4502 transmitting data to MP *4, MP *4 transmitting the data to MP *5, MP *5 transmitting the data to MP *6, MP *6 transmitting the data to MP *7, and MP *7 transmitting the data to MAP #1. This route map also indicates that MAP #1 can transmit data to indoor gateway 4502, by, (b), MAP #1 transmitting data to MP *7, MP *7 transmitting the data to MP *6, MP *6 transmitting the data to MP *5, MP *5 transmitting the data to MP *4, and MP *4 transmitting the data to indoor gateway 4502.

In order to share this route map with MAP #1, indoor gateway 4502 transmits a frame including this route map information to MAP #1. The frame including the route map information also includes node route information as control information. Each node that transmits this frame references the control information included in the frame to know the transmission destination of the frame.

(3) Packet Transmission Operations

Subsequently, when indoor gateway 4502 transmits information to MAP #1, data is transmitted based on the route map is performed. In other words, indoor gateway 4502 transmits node route control information based on the route map. Each node sequentially transmits frames based on the transmitted control information.

When MAP #1 transmits information to indoor gateway 4502, data is transmitted based on the route map is performed. In other words, MAP #1 transmits node route control information based on the route map. Each node sequentially transmits frames based on the transmitted control information.

Figure 52:
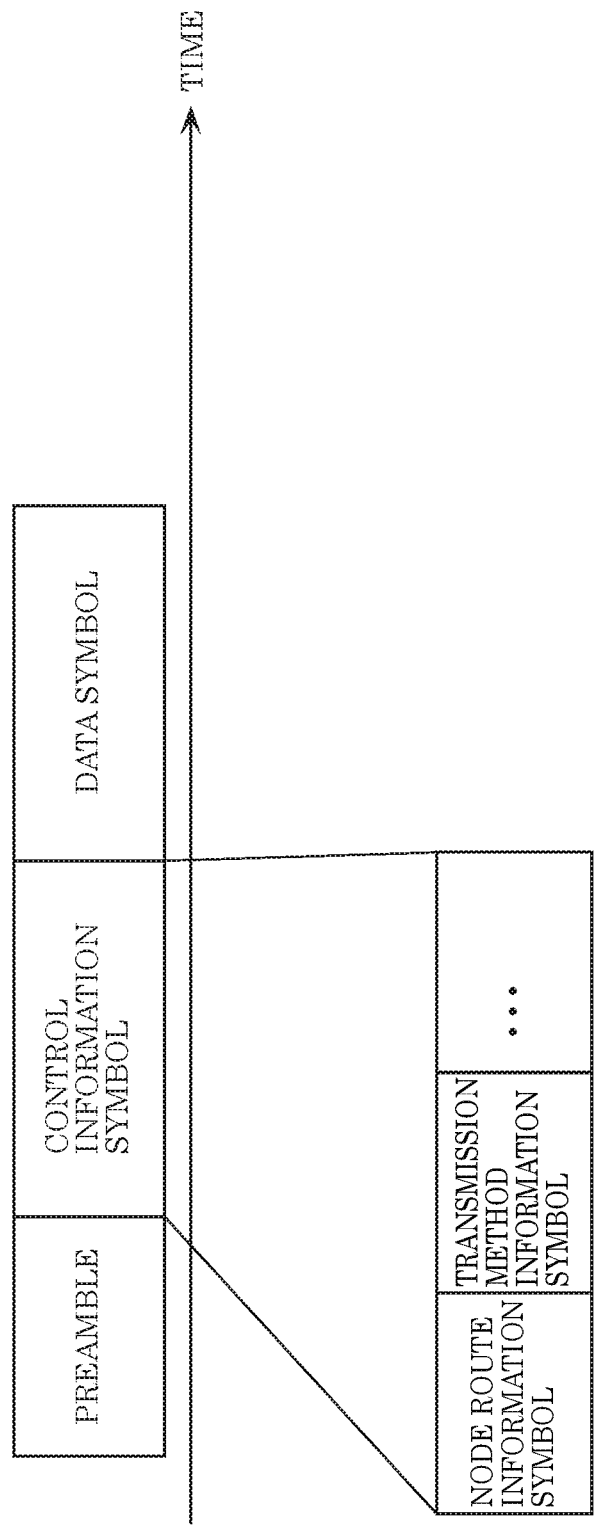
FIG. 52 illustrates one example of a frame configuration.

FIG. 52 illustrates one example of a frame configuration. FIG. 52 illustrates one example of a frame configuration when, for example, indoor gateway 4502 transmits information to MAP #1. Time is represented on the horizontal axis in FIG. 52.

For example, indoor gateway 4502 transmits a preamble. Note that the preamble is a symbol for MP *4 to perform, for example, time synchronization, frame synchronization, and frequency synchronization at the time of reception of the modulated signal of the frame (the preamble may be used for signal detection).

The control information symbol includes a node route information symbol and a transmission method information symbol. The data symbol is a symbol that includes data for indoor gateway 4502 to transmit data to MAP #1.

The node route information symbol is a symbol for transmitting information about the route map used when indoor gateway 4502 transmits the frame to MP *4.

The transmission method information symbol is a symbol for transmitting information about the transmission method of the frame transmitted by indoor gateway 4502. The transmission method information symbol may include, for example, information indicating either broadcast data or unicast data, information about the transmission method such as the error correction coding method or modulation method used to generate the modulated signal of the data symbol, and/or information about the number of streams transmitted.

The data symbol is a symbol that includes data for the indoor gateway to transmit data to MAP #1, and is a symbol that is transmitted by the indoor gateway to MP *4.

When MP *4 transmits a modulated signal to MP *5, when MP *5 transmits a modulated signal to MP *6, when MP *6 transmits a modulated signal to MP *7, and when MP *7 transmits a modulated signal to MAP #1 as well, by configuring the frame configuration as described above, the data transmitted by indoor gateway 4502 can be transmitted to MAP #1.

Note that this frame configuration may be considered to be a frame for when MAP #1 transmits information to indoor gateway 4502.

For example, MAP #1 transmits a preamble. Note that the preamble is a symbol for MP *7 to perform, for example, time synchronization, frame synchronization, and frequency synchronization at the time of reception of the modulated signal of the frame (the preamble may be used for signal detection).

The control information symbol includes a node route information symbol and a transmission method information symbol. The data symbol is a symbol that includes data for MAP #1 to transmit data to indoor gateway 4502.

The node route information symbol is a symbol for transmitting information about the route map used when MAP #1 transmits the frame to MP *7.

The transmission method information symbol is a symbol for transmitting information about the transmission method of the frame transmitted by MAP #1. The transmission method information symbol may include, for example, information indicating either broadcast data or unicast data, information about the transmission method such as the error correction coding method or modulation method used to generate the modulated signal of the data symbol, and/or information about the number of streams transmitted.

The data symbol is a symbol that includes data for MAP #1 to transmit data to indoor gateway 4502, and is a symbol that is transmitted by MAP #1 to MP *7.

When MP *7 transmits a modulated signal to MP *6, when MP *6 transmits a modulated signal to MP *5, when MP *5 transmits a modulated signal to MP *4, and when MP *4 transmits a modulated signal to the indoor gateway as well, by configuring the frame configuration as described above, the data transmitted by MAP #1 can be transmitted to indoor gateway 4502.

(2-2) Second Method

In the second method, indoor gateway 4502 creates a route map for each MAP, but does not share the route map.

Figure 53:
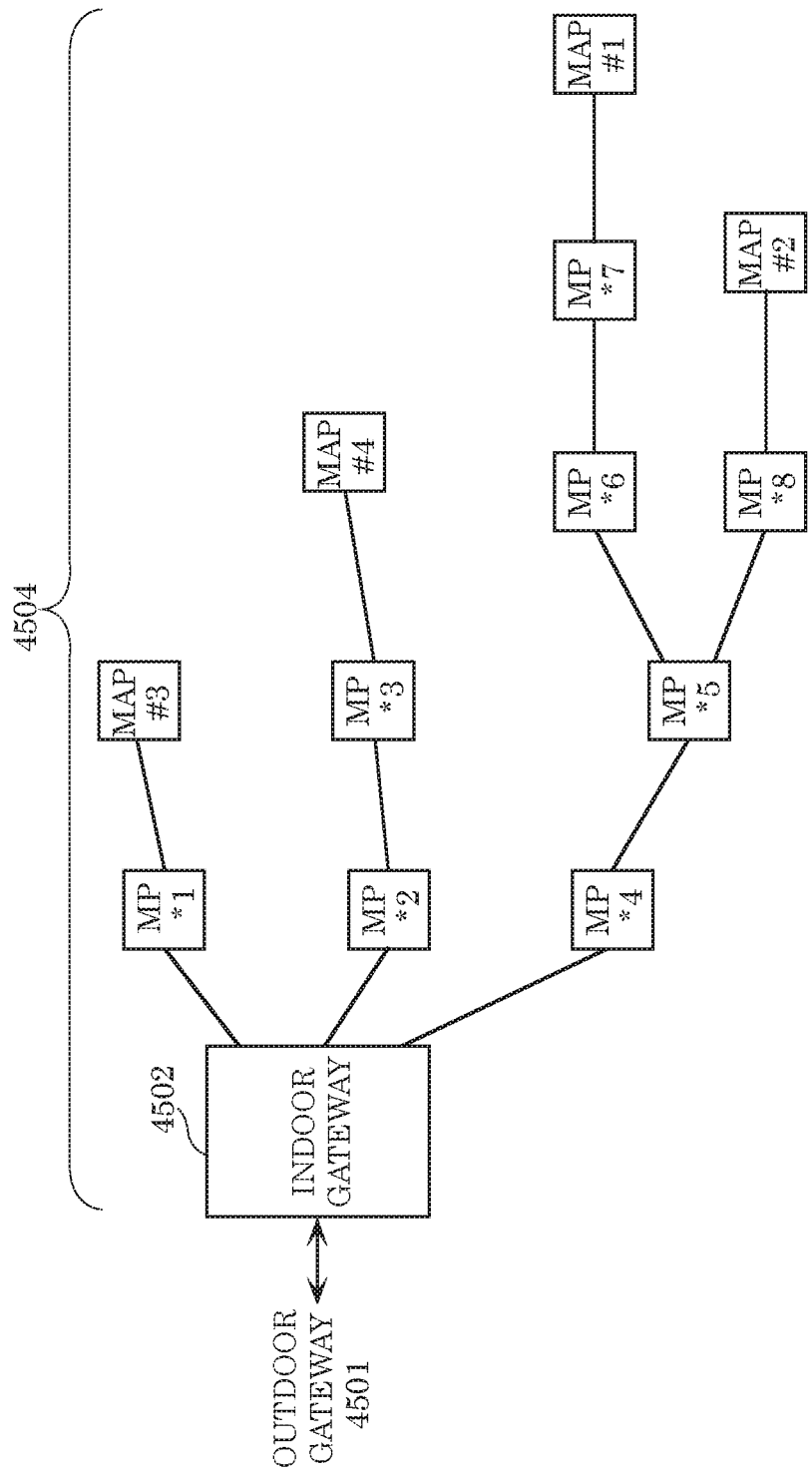
FIG. 53 illustrates one example of a configuration of an indoor network.

FIG. 53 illustrates one example of a configuration of an indoor network. Note the mesh network formed as a result of the creation of the route map is, for example, the network illustrated in FIG. 53.

Indoor gateway 4502 creates a route map for MAP #1. This route map indicates that indoor gateway 4502 can transmit data to MAP #1, by, (a), indoor gateway 4502 transmitting data to MP *4, MP *4 transmitting the data to MP *5, MP *5 transmitting the data to MP *6, MP *6 transmitting the data to MP *7, and MP *7 transmitting the data to MAP #1. This route map also indicates that MAP #1 can transmit data to indoor gateway 4502, by, (b), MAP #1 transmitting data to MP *7, MP *7 transmitting the data to MP *6, MP *6 transmitting the data to MP *5, MP *5 transmitting the data to MP *4, and MP *4 transmitting the data to the indoor gateway 4502.

(3) Packet Transmission Operations

Indoor gateway 4502 transmits information based on this route map information. Upon transmitting this information, indoor gateway 4502 also transmits control information including node route information. Accordingly, each node knows the transmission destination of the frame based on the transmitted control information.

Similarly, MAP #1 creates a route map for indoor gateway 4502. MAP #1 then transmits information based on this route map information. Upon transmitting this information, MAP #1 also transmits control information including node route information. Accordingly, each node knows the transmission destination of the frame based on the transmitted control information.

The configuration of the frame and the examples of operations are the same as those described with reference to FIG. 52.

As described above, the communication from indoor gateway 4502 to the terminal can be implemented wirelessly, which makes it possible to achieve the advantageous effect that it is possible to provide an environment with little wiring for transmitting data indoors. Moreover, it is also possible to connect the indoor network and the outdoor network via wireless data communication, which makes it possible to achieve the advantageous effect that it is possible to provide an environment with little wiring for transmitting data.

Next, two cases—a first case and a second case—regarding the timing at which operation (1) described above is performed will be described (see FIG. 54). In the first case, operation (1) and operation (2) are performed at a given time interval. In the second case, operation (1) is performed once again when an MP or MAP is added to the indoor network.

The first case has already been described. Hereinafter, the second case will be described.

Figure 55:
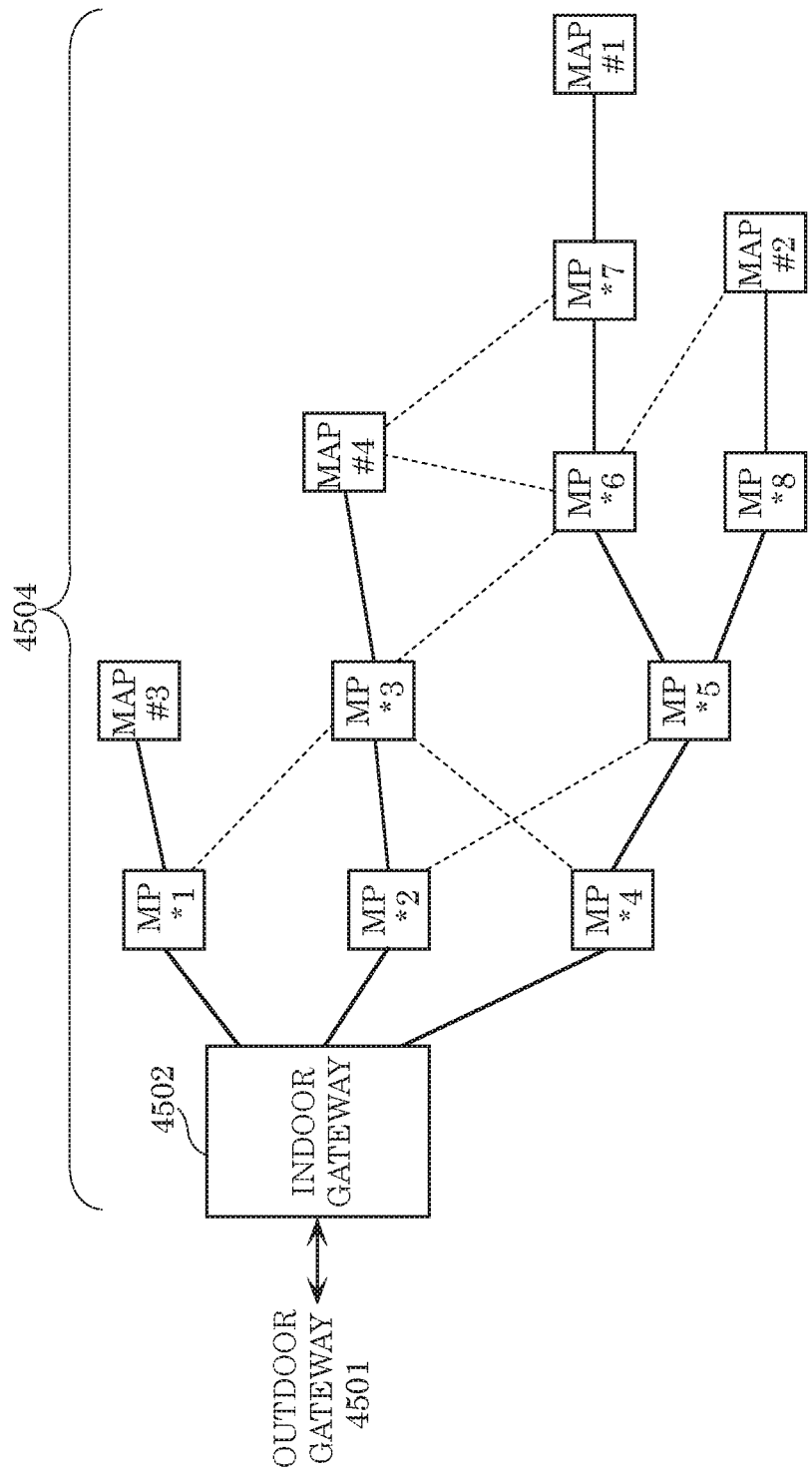
FIG. 55 illustrates one example of a configuration of an indoor network.
Figure 56:
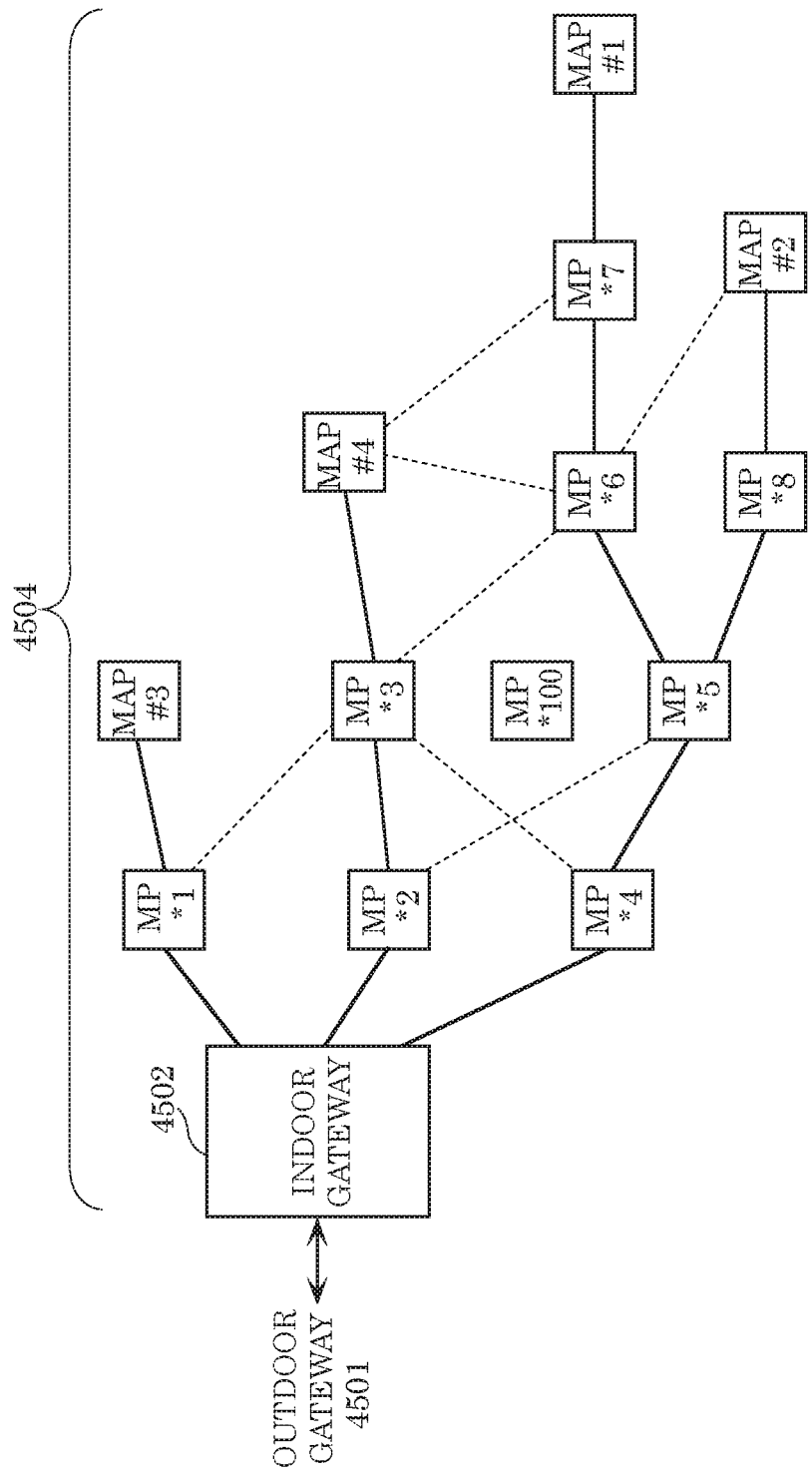
FIG. 56 illustrates one example of a configuration of an indoor network.
Figure 57:
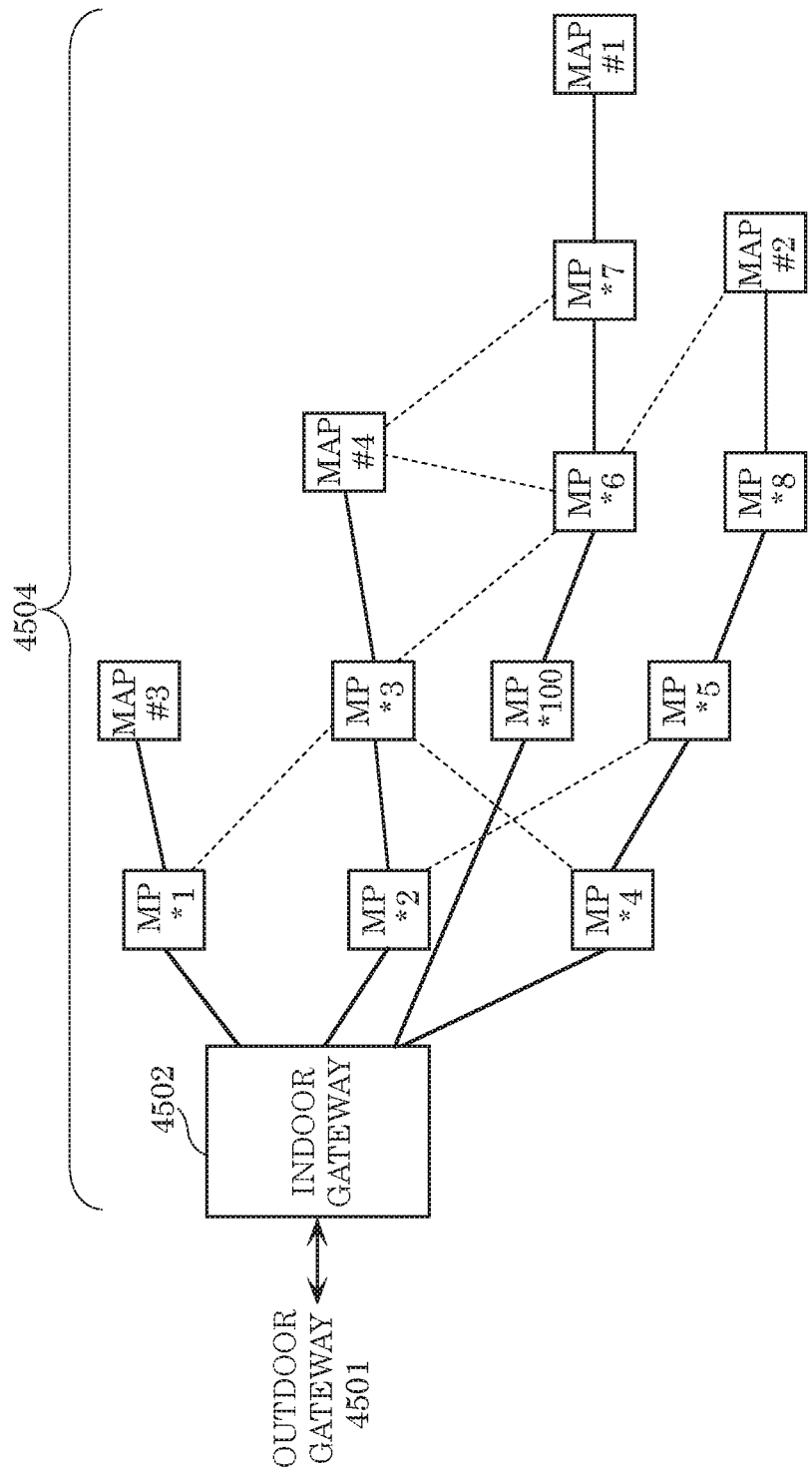
FIG. 57 illustrates one example of a configuration of an indoor network.

Here, consider a case in which the network configuration illustrated in FIG. 55 is altered to the network configuration illustrated in FIG. 56. Note that since the network configuration illustrated in FIG. 55 has already been described, repeated description thereof will be omitted. The network configuration illustrated in FIG. 56 differs from the network configuration illustrated in FIG. 55 in regard to the addition of MP *100. The configuration of indoor network 4504 after MP *100 has been added is illustrated in FIG. 57.

Figure 58:
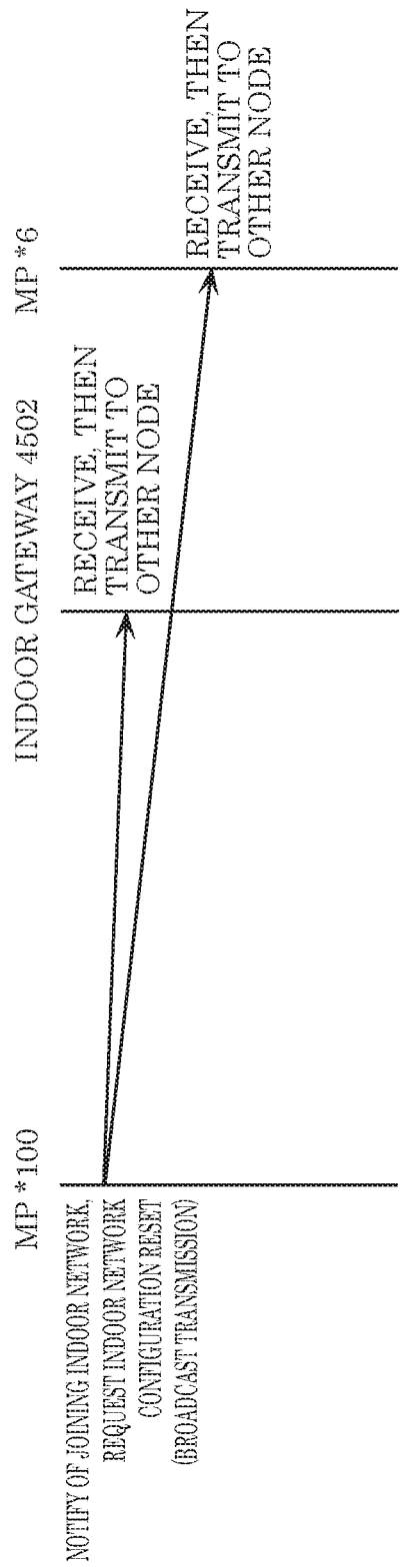
FIG. 58 illustrates one example of a communication sequence.

Processes performed when MP *100 is added to indoor network 4504 will be described with reference to FIG. 58.

First, MP *100 notifies nodes on indoor network 4504 that MP *100 is going to join indoor network 4504. At this time, MP *100 broadcasts (multicasts) a notification that it will join the indoor network.

In actuality, the above-described notification is only transmitted to nodes adjacent to MP *100. As illustrated in FIG. 57, nodes adjacent to MP *100 include the indoor gateway and MP *6, so the above-described notification is received by indoor gateway 4502 and MP *6.

MP *100 also broadcasts (multicasts) a request for the indoor network configuration to be reset. The request for the indoor network configuration to be reset is also received by the indoor gateway and MP *6.

Next, indoor gateway 4502 and MP *6 broadcast (multicast) the notification that MP *100 will join the indoor network and the request for the indoor network configuration to be reset. Thereafter, other nodes also broadcast (multicast) the notification that MP *100 will join the indoor network and the request for the indoor network configuration to be reset; an example of the regulations regarding the broadcast (multicast) is as has already been described.

Note that in the above example, an MP is exemplified as being added to indoor network 4504, but a MAP may be added to indoor network 4504. In such cases, the operations that are described above as being performed by the MP can be rewritten as being performed by the MAP to achieve the same implementation.

Subsequently, operations (1) and (2) are performed, whereby operation (3) can be performed.

With this, by configuring indoor network 4504 so that new MPs or MAPs can be added, it is possible to improve the indoor communication environment. This achieves the advantageous effect that it is possible to improve data transmission quality and improve data transfer speeds.

Note that in the above description, the terminology "indoor network" is used, but indoor gateway 4502, MP *1, etc., and MAP #1, etc., may be provided outdoors. In other words, the location in which indoor gateway 4502, MP *1, etc., and MAP #1, etc., are provided is not limited to being indoors.

Moreover, MP *1, etc., includes functionality as a repeater (data forwarding function), but MP *1, etc., may include functionality as an access point for communicating with terminals. Similarly, indoor gateway 4502 may include functionality as an access point for communicating with terminals.

Moreover, indoor gateway 4502, MP *1, etc., and MAP #1, etc., may include a device that generates data, such as a camera or a sensor. Moreover, indoor gateway 4502, MP *1, etc., and MAP #1, etc., may include an interface for connecting with a device that generates data, such as a camera or a sensor, and may include functionality as a repeater (data forwarding function) described in the present embodiment for transmitting data generated by such a device to a terminal or indoor gateway 4502.

Supplementary Note A1

In FIG. 45, indoor gateway 4502 receives power from an alternating current (AC) power source or a direct current (DC) power source via power receiver 4502c, by, for example, wire. This makes it possible to achieve the advantageous effect that power is further stably supplied to indoor gateway 4502.

Outdoor gateway 4501, on the other hand, does not include a power receiver that receives power by wire from an AC power source or a DC power source, but instead, as is illustrated in FIG. 45, receives a wireless supply of power from indoor gateway 4502. More specifically, wireless power receiver 4501c in outdoor gateway 4501 wirelessly receives a supply of power (transmitted power) from wireless power supplier 4502d in indoor gateway 4502. This configuration reduces the possibility of a short occurring in the power receiver that receives power by wire from an AC power source or a DC power source caused by rainfall or a lightning strike. This achieves the advantageous effect that it is easy to implement protection against moisture and drops of water.

Indoor gateway 4502 and outdoor gateway 4501 illustrated in FIG. 45, FIG. 46, or FIG. 47, the Wi-Fi APs and the repeaters illustrated in FIG. 46, and the MPs and MAPs illustrated in FIG. 47 may include wireless communication functionality in a single frequency band and, alternatively, may include wireless communication functionality in two or more frequency bands.

As used herein, "include wireless communication functionality in a single frequency band" may mean "include wireless communication functionality in the 60 GHz band".

Moreover, "include wireless communication functionality in two or more frequency bands" may mean "include wireless communication functionality in the 2.4 GHz band and include wireless communication functionality in the 60 GHz band", may mean "include wireless communication functionality in the 5 GHz band and include wireless communication functionality in the 60 GHz band", and may mean "include wireless communication functionality in the 2.4 GHz band, include wireless communication functionality in the 5 GHz band, and include wireless communication functionality in the 60 GHz band".

Note that the specific meaning of "include wireless communication functionality in two or more frequency bands" is not limited to the above examples. For example, "include wireless communication functionality in two or more frequency bands" may mean "include wireless communication functionality in an A (Hz) frequency band and include wireless communication functionality in a B (Hz) frequency band, where A is a real number that is greater than or equal to 0, B is a real number that is greater than or equal to 0, and $A \neq B$".

In another example, "include wireless communication functionality in two or more frequency bands" may mean "include wireless communication functionality in an A (Hz) frequency band, include wireless communication functionality in a B (Hz) frequency band, and include wireless communication functionality in a C (Hz) frequency band, where A is a real number that is greater than or equal to 0, B is a real number that is greater than or equal to 0, C is a real number that is greater than or equal to 0, $A \neq B$, $A \neq C$, and $B \neq C$".

Indoor gateway 4502 and outdoor gateway 4501 illustrated in FIG. 45, FIG. 46, or FIG. 47, the Wi-Fi APs and the repeaters illustrated in FIG. 46, and the MPs and MAPs illustrated in FIG. 47 may include optical communication functionality, may form the mesh network (multihop network) described in the present specification via optical communication, and relay frames via optical communication. This method can also achieve the same advantageous effects as described above.

Moreover, when an object that transmits light, such as a glass window (e.g., a pane of glass) is disposed between indoor gateway 4502 and outdoor gateway 4501 illustrated in FIG. 45, optical communication can be used for the communication between indoor gateway 4502 and outdoor gateway 4501.

Consider an example in which a WTTH network formed using outdoor gateway 4501 is formed by wireless communication via radio waves, and indoor network 4504 formed using indoor gateway 4502 is also formed by wireless communication via radio waves. In such cases, communication between indoor gateway 4502 and outdoor gateway 4501 may be optical communication, may be wireless communication via radio waves, and communication may be switched between optical communication and wireless communication via radio waves depending on the situation. Moreover, communication between indoor gateway 4502 and outdoor gateway 4501 may be switched between optical communication and wireless communication via radio waves depending on the material of the object between the indoor gateway and the outdoor gateway.

Embodiment A2

Figure 59:
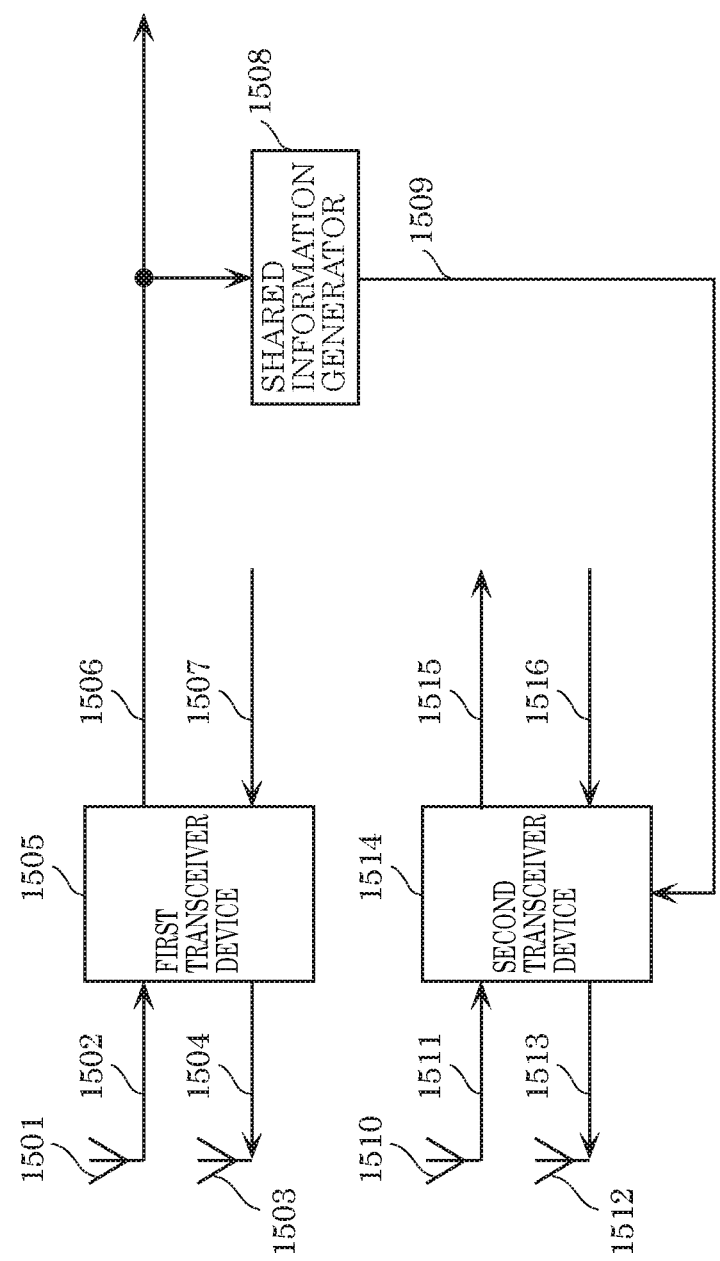
FIG. 59 illustrates one example of a configuration of an indoor gateway.

FIG. 59 illustrates one example of a configuration of nodes illustrated in FIG. 47 (i.e., any one of indoor gateway 4502, MP *1, etc., and MAP #1, etc.). The configuration illustrated in FIG. 59 illustrates, among all functionality of the node, the functionality related to the transmission and reception of frames.

First transceiver device 1505 is a transceiver device for a first wireless communication method that operates in an A (Hz) frequency band. Second transceiver device 1514 is a transceiver device for a second wireless communication method that operates in a B (Hz) frequency band. In this example, A is a real number that is greater than or equal to 0, B is a real number that is greater than or equal to 0, and A>B. For example, the first wireless communication method operates in the 60 GHz (A=60G) frequency band, and the second wireless communication method operates in the 2.4 GHz (B=2.4G) frequency band.

Although the example in FIG. 59 illustrates a configuration of a node that uses two frequency bands, the node may use three or more frequency bands. In such cases, the node includes as many transceiver devices as required to communicate using the three or more frequency bands.

First transceiver device 1505 receives an input of received signal 1502 received by antenna 1501, performs processing such as demodulation and error correction decoding, and outputs received data 1506. Note that received signal 1502 is a signal conforming to the first wireless communication method that operates in the A (Hz) frequency band.

Moreover, first transceiver device 1505 receives an input of received signal 1502, performs communication environment estimation, and outputs reception state signal 1599.

First transceiver device 1505 receives an input of transmission data 1507, performs processing such as error correction coding, mapping, and frequency conversion, and generates and outputs transmission signal 1504. Antenna 1503 then outputs transmission signal 1504 as radio waves.

Note that transmission signal 1504 is a signal conforming to the first wireless communication method that operates in the A (Hz) frequency band.

Shared information generator 1508 receives an input of received data 1506 and reception state signal 1599, and generates and outputs information 1509 to be shared. This will be described in greater detail later.

Second transceiver device 1514 receives an input of received signal 1511 received by antenna 1510, performs processing such as demodulation and error correction decoding, and outputs received data 1515. Note that received signal 1511 is a signal conforming to the second wireless communication method that operates in the B (Hz) frequency band.

Second transceiver device 1514 receives an input of transmission data 1516 and information 1509 to be shared, performs processing such as error correction coding, mapping, and frequency conversion, and generates and outputs transmission signal 1513. Antenna 1512 then outputs transmission signal 1513 as radio waves. Note that transmission signal 1513 is a signal conforming to the second wireless communication method that operates in the B (Hz) frequency band.

Figure 60:
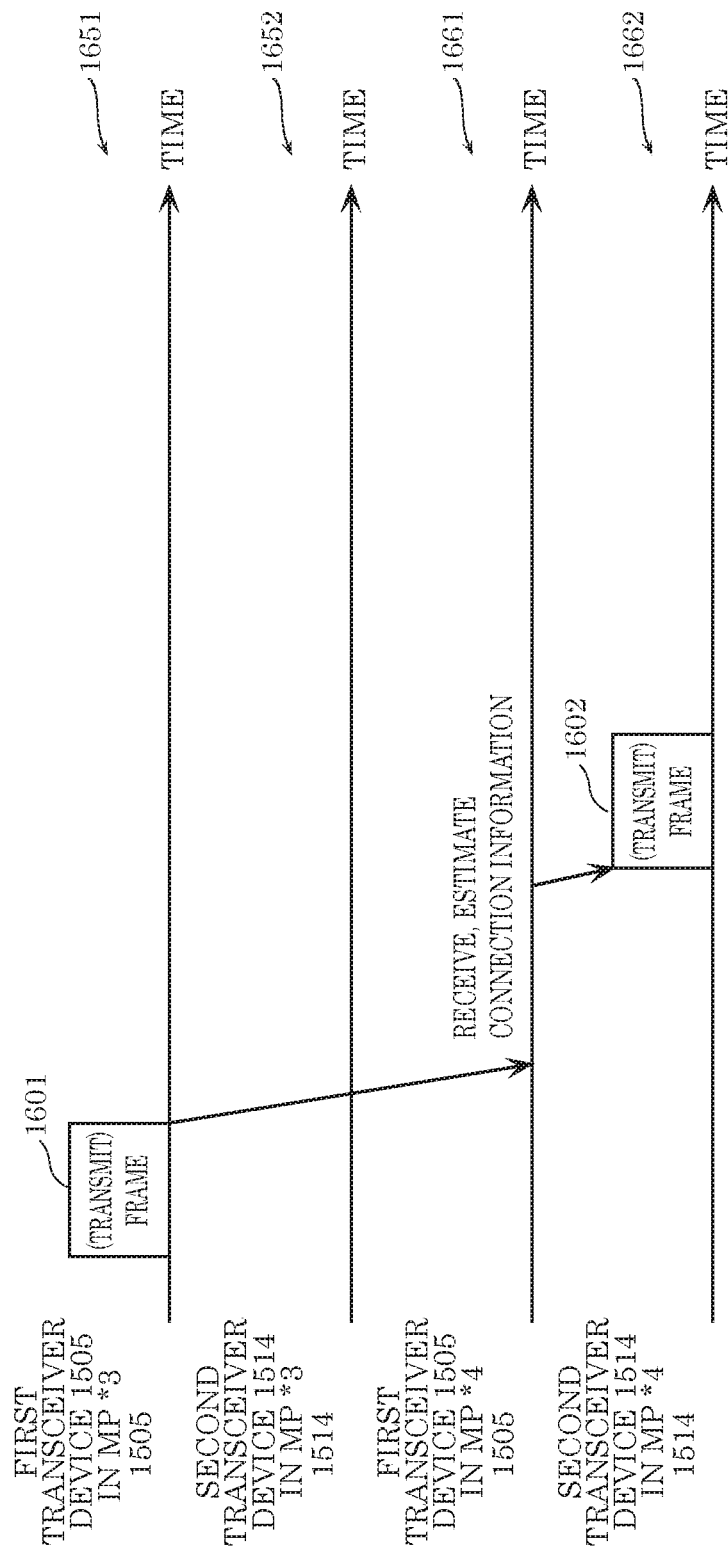
FIG. 60 illustrates one example of frame transmission and reception.

FIG. 60 illustrates an example of communication between MP *3 and MP *4 illustrated in FIG. 47. Note that here, each of MP *3 and MP *4 is a device that has configuration illustrated in FIG. 59.

In FIG. 60, graph 1651 illustrates the flow of communication performed by first transceiver device 1505 included in MP *3. Graph 1652 illustrates the flow of communication performed by second transceiver device 1514 included in MP *3. Graph 1661 illustrates the flow of communication performed by first transceiver device 1505 included in MP *4. Graph 1662 illustrates the flow of communication performed by second transceiver device 1514 included in MP *4. In graphs 1651, 1652, 1661, and 1662, time is represented on the horizontal axis.

First, as illustrated in FIG. 60, first transceiver device 1505 included in MP *3 transmits frame 1601. Note that one example of the configuration of frame 1601 is the configuration illustrated in FIG. 48. Moreover, frame 1601 is a frame that conforms to the first wireless communication method that operates in the A (Hz) frequency band.

Next, for example, first transceiver device 1505 included in MP *4 receives frame 1601. After receiving frame 1601, first transceiver device 1505 included in MP *4 estimates the reception state at the time that first transceiver device 1505 included in MP *3 transmitted the modulated signal. First transceiver device 1505 included in MP *4 knows that the device that transmitted the modulated signal is MP *3 as a result of obtaining the device identification information from the device identification information symbol.

Then, second transceiver device 1514 included in MP *4 transmits frame 1602. Note that frame 1602 is a frame that conforms to the second wireless communication method that operates in the B (Hz) frequency band.

Figure 61:
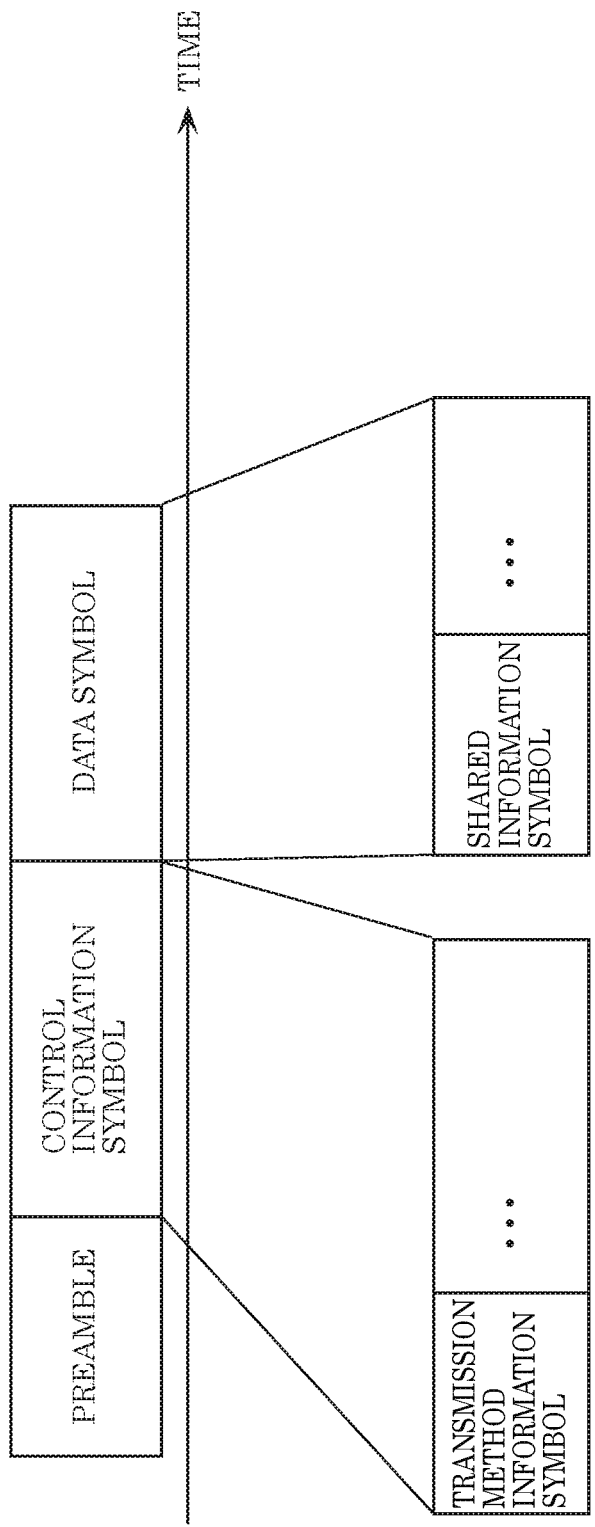
FIG. 61 illustrates one example of a frame configuration.

One example of frame 1602 is illustrated in FIG. 61. Time is represented on the horizontal axis. For example, frame 1602 includes a preamble, a control information symbol, and a data symbol.

The preamble in FIG. 61 is a symbol for the communication partner to perform, for example, time synchronization and frequency synchronization (signal detection may be performed). Note that in this example, the communication partner includes one or more devices, or two or more devices. Here, a "device" is any one of indoor gateway 4502, MP #1, etc., and MAP *1, etc.

The control information symbol included in FIG. 61 includes a transmission method information symbol. The transmission method information symbol includes information indicating whether frame 1602 is to be broadcast (multicast) or to be unicast. Note that frame 1602 is a frame to be broadcast (multicast). Moreover, the transmission method information symbol may include information about the transmission method such as the error correction coding method or modulation method used to generate the data symbol, and/or information about the number of streams transmitted.

The data symbol in FIG. 61 includes a shared information symbol. When performing communication like illustrated in FIG. 60, the shared information symbol includes information indicating an estimation of the reception state at the time that first transceiver device 1505 included in MP *3 transmitted the modulated signal, and information indicating that the device that transmitted the modulated signal is MP *3.

Subsequently, one or more devices or two or more devices receive frame 1602 transmitted by second transceiver device 1514 included in MP *4, whereby each device obtains the information indicating an estimation of the reception state at the time that first transceiver device 1505 included in MP *3 transmitted the modulated signal, and information indicating that the device that transmitted the modulated signal is MP *3. Note that in the example illustrated in FIG. 47, frame 1602 is received by indoor gateway 4502, MP *1, MP *2, MP *3, MP *5, MP *6, MP *7, MP *8, MAP #1, MAP #2, MAP #3, and MAP #4.

This is easily achieved due to A being greater than B. The reason being that the distance over which communication via relatively low frequencies is possible is longer.

This makes it possible to achieve the advantageous effect that one or more or two or more devices can easily achieve the communication state between MP *3 and MP *4. This achieves the advantageous effects that it easier for each node to know the mesh network configuration and that it is possible to easily create a route map in the mesh network.

Although a method of sharing the communication state between MP *3 and MP *4 with other devices has been described in this example, a method of sharing a communication state between devices other than MP *3 and MP *4 with other devices can be implemented in the same manner.

Moreover, for example, the first wireless communication method may operate in the 60 GHz (A=60G) frequency band, and the second wireless communication method may operate in the 5 GHz (B=5G) frequency band. However, this example is not limiting.

Moreover, in the present example, the network is exemplified as, but not limited to being indoors. For example, if indoor gateway 4502 is replaced with outdoor gateway 4501 in FIG. 47 and the operations described in the above example are carried out accordingly, the same advantageous effects can be achieved.

Note that the information to be shared that is included in the shared information symbol is not limited to the example given in the present embodiment. For example, information that needs to be shared in order to form the mesh network (multihop network) may be included in the shared information symbol.

Embodiment A3

Figure 62:
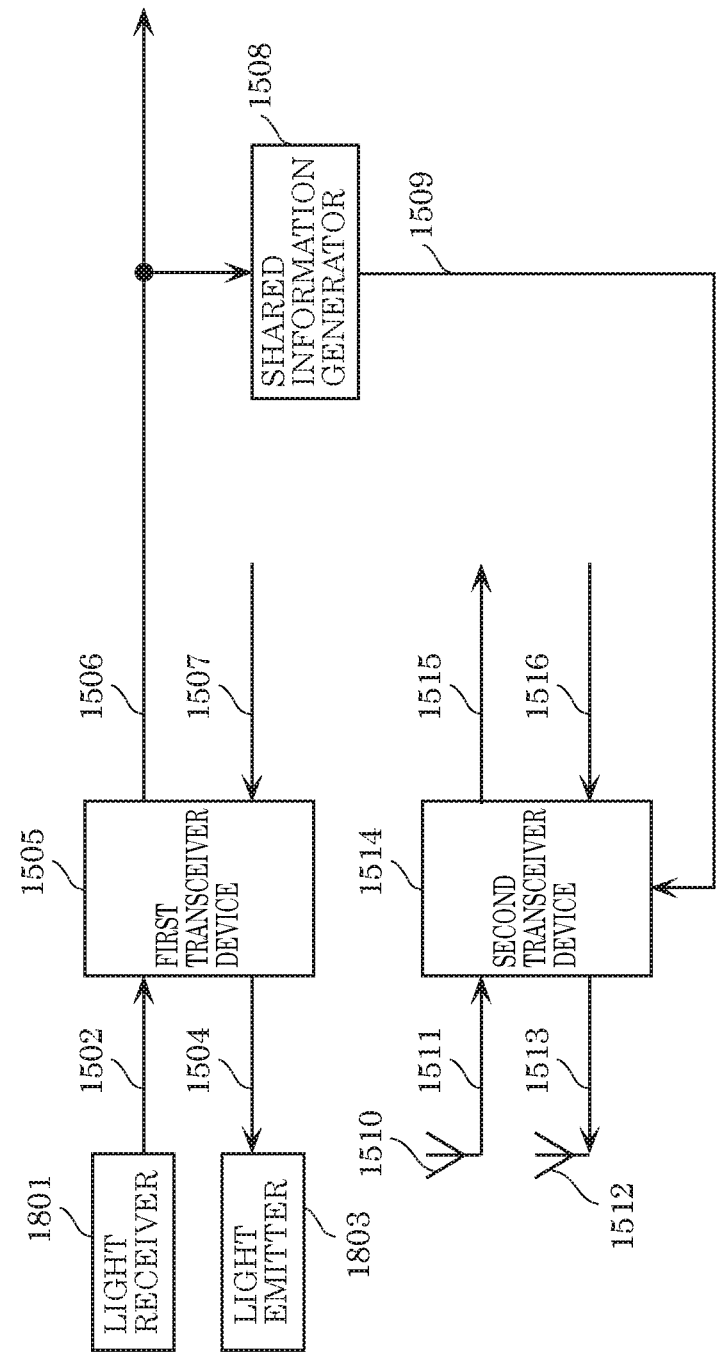
FIG. 62 illustrates one example of a configuration of an indoor gateway.

FIG. 62 illustrates one example of a configuration of any one of indoor gateway 4502, MP *1, etc., and MAP #1, etc., illustrated in FIG. 47. First transceiver device 1505 is a transceiver device for a first wireless communication method for optical communication, and second transceiver device 1514 is a transceiver device for a second wireless communication method that operates in a B (Hz) frequency band, where B is a real number that is greater than or equal to 0. Although the example illustrated in FIG. 62 includes two transceiver devices, three or more transceiver devices may be included.

First transceiver device 1505 receives an input of received signal 1502 received by light receiver 1801, performs processing such as demodulation and error correction decoding, and outputs received data 1506. Note that light receiver 1801 can be implemented as, for example, a photodiode, a complementary metal oxide semiconductor (CMOS) image sensor, or an organic CMOS sensor.

Moreover, first transceiver device 1505 receives an input of received signal 1502, performs communication environment estimation, and outputs reception state signal 1599.

First transceiver device 1505 receives an input of transmission data 1507, performs processing such as error correction coding, mapping, and frequency conversion, and generates and outputs transmission signal 1504. Light emitter 1803 then outputs transmission signal 1504. Note that light emitter 1803 can be implemented as, for example, a light emitting diode (LED).

Shared information generator 1508 receives an input of received data 1506 and reception state signal 1599, and generates and outputs information 1509 to be shared. This will be described in greater detail later.

Second transceiver device 1514 receives an input of received signal 1511 received by antenna 1510, performs processing such as demodulation and error correction decoding, and outputs received data 1515. Note that received signal 1511 is a signal conforming to the second wireless communication method that operates in the B (Hz) frequency band.

Second transceiver device 1514 receives an input of transmission data 1516 and information 1509 to be shared, performs processing such as error correction coding, mapping, and frequency conversion, and generates and outputs transmission signal 1513. Antenna 1512 then outputs transmission signal 1513 as radio waves. Note that transmission signal 1513 is a signal conforming to the second wireless communication method that operates in the B (Hz) frequency band.

FIG. 60 illustrates an example of communication between MP *3 and MP *4 illustrated in FIG. 47. Note that here, each of MP *3 and MP *4 is a device that has the configuration illustrated in FIG. 62.

In FIG. 60, graph 1651 illustrates the flow of communication performed by first transceiver device 1505 included in MP *3. Graph 1652 illustrates the flow of communication performed by second transceiver device 1514 included in MP *3. Graph 1661 illustrates the flow of communication performed by first transceiver device 1505 included in MP *4. Graph 1662 illustrates the flow of communication performed by second transceiver device 1514 included in MP *4. In graphs 1651, 1652, 1661, and 1662, time is represented on the horizontal axis.

First, as illustrated in FIG. 60, first transceiver device 1505 included in MP *3 transmits frame 1601. Note that one example of the configuration of frame 1601 is the configuration illustrated in FIG. 48. Note that frame 1601 is an optical communication frame.

Next, for example, first transceiver device 1505 included in MP *4 receives frame 1601. After receiving frame 1601, first transceiver device 1505 included in MP *4 estimates the reception state at the time that first transceiver device 1505 included in MP *3 transmitted the modulated signal. First transceiver device 1505 included in MP *4 knows that the device that transmitted the modulated signal is MP *3 as a result of obtaining the device identification information from the device identification information symbol.

Then, second transceiver device 1514 included in MP *4 transmits frame 1602. Note that frame 1602 is a frame that conforms to the second wireless communication method that operates in the B (Hz) frequency band.

One example of frame 1602 is illustrated in FIG. 61. Time is represented on the horizontal axis. For example, frame 1602 includes a preamble, a control information symbol, and a data symbol.

The preamble in FIG. 61 is a symbol for the communication partner to perform time synchronization and frequency synchronization. Note that in this example, the communication partner includes one or more devices, or two or more devices. Here, a "device" is any one of indoor gateway 4502, MP #1, etc., and MAP *1, etc.

The control information symbol included in FIG. 61 includes a transmission method information symbol. The transmission method information symbol includes information indicating whether frame 1602 is to be broadcast (multicast) or to be unicast. Note that frame 1602 is a frame to be broadcast (multicast). Moreover, the transmission method information symbol may include information about the transmission method such as the error correction coding method or modulation method used to generate the data symbol, and/or information about the number of streams transmitted.

The data symbol in FIG. 61 includes a shared information symbol. When performing communication like illustrated in FIG. 60, the shared information symbol includes information indicating an estimation of the reception state at the time that first transceiver device 1505 included in MP *3 transmitted the modulated signal, and information indicating that the device that transmitted the modulated signal is MP *3.

Subsequently, one or more devices or two or more devices receive frame 1602 transmitted by second transceiver device 1514 included in MP *4, whereby each device obtains the information indicating an estimation of the reception state at the time that first transceiver device 1505 included in MP *3 transmitted the modulated signal, and information indicating that the device that transmitted the modulated signal is MP *3. Note that in the example illustrated in FIG. 47, frame 1602 is received by indoor gateway 4502, MP *1, MP *2, MP *3, MP *5, MP *6, MP *7, MP *8, MAP #1, MAP #2, MAP #3, and MAP #4.

Here, when the second wireless communication method that operates in the B (Hz) frequency band is configured as a wireless communication method achieved via radio waves, implementation is simple. This is because the range in which communication is possible with optical communication is limited due to the straight traveling properties of light.

This makes it possible to achieve the advantageous effect that one or more or two or more devices can easily achieve the communication state between MP *3 and MP *4. This achieves the advantageous effects that it easier for each node to know the mesh network (multihop network) configuration and that it is possible to easily create a route map in the mesh network.

Although a method of sharing the communication state between MP *3 and MP *4 with other devices has been described in this example, a method of sharing a communication state between devices other than MP *3 and MP *4 with other devices can be implemented in the same manner.

Moreover, in the present example, the network is exemplified as, but not limited to being indoors. For example, if indoor gateway 4502 is replaced with outdoor gateway 4501 in FIG. 47 and the operations described in the above example are carried out accordingly, the same advantageous effects can be achieved.

Note that the information to be shared that is included in the shared information symbol is not limited to the example given in the present embodiment. For example, information that needs to be shared in order to form the mesh network (multihop network) may be included in the shared information symbol.

Embodiment A4

In Embodiment A2, FIG. 59 illustrates the configuration of the nodes in FIG. 47 (i.e., any one of indoor gateway 4502, MP *1, etc., and MAP #1, etc.), where first transceiver device 1505 is a transceiver device for the first wireless communication method that operates in the A (Hz) frequency band, and second transceiver device 1514 is a transceiver device for the second wireless communication method that operates in the B (Hz) frequency band, where A is a real number that is greater than or equal to 0, B is a real number that is greater than or equal to 0, and A>B.

The communication method used by first transceiver device 1505 and the communication method used by second transceiver device 1514 under such conditions will be described.

Examples of multiplexing methods include, for example, time division multiplexing (TDM), frequency division multiplexing (FDM), carrier sense multiple access (CSMA), and carrier sense multiple access with collision avoidance (CSMA/CA).

Figure 63:
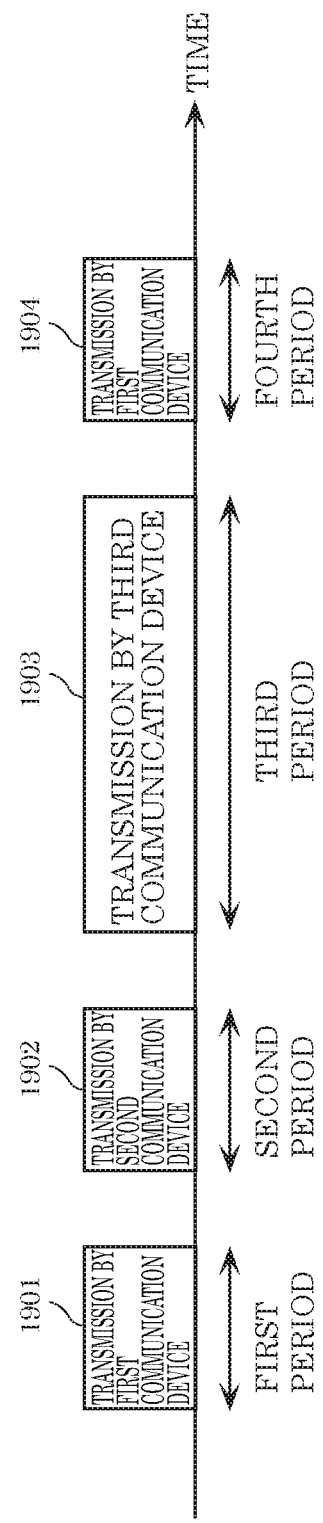
FIG. 63 illustrates one example of frame transmission time.

FIG. 63 illustrates an example of time resource allocation when TDM is implemented. Time is represented on the horizontal axis in FIG. 63.

As illustrated in FIG. 63, in the first period, transmission 1901 of a modulated signal by a first communication device is performed. In the second period, transmission 1902 of a modulated signal by a second communication device is performed. In the third period, transmission 1903 of a modulated signal by a third communication device is performed. In the fourth period, transmission 1904 of a modulated signal by the first communication device is performed.

In this way, which device transmits a modulated signal (frame) is switched via time slots. In particular, a method of achieving communication with a plurality of communication devices by changing time is referred to as time division multiple access (TDMA).

Figure 64:
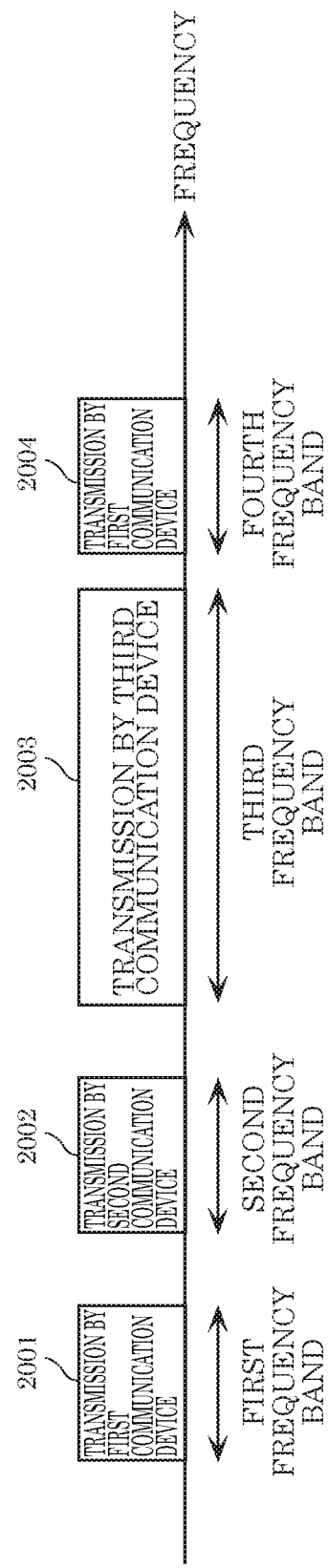
FIG. 64 illustrates one example of frame transmission time.

FIG. 64 illustrates an example of frequency resource allocation when FDM is implemented. Frequency is represented on the horizontal axis in FIG. 64.

As illustrated in FIG. 64, in the first frequency band, transmission 2001 of a modulated signal by the first communication device is performed. In the second frequency band, transmission 2002 of a modulated signal by the second communication device is performed. In the third frequency band, transmission 2003 of a modulated signal by the third communication device is performed. In the fourth frequency band, transmission 2004 of a modulated signal by the first communication device is performed.

In this way, modulated signals (frames) are switched via frequency slots. In particular, a method of achieving communication with a plurality of communication devices by changing frequency is referred to as frequency division multiple access (FDMA).

Figure 65:
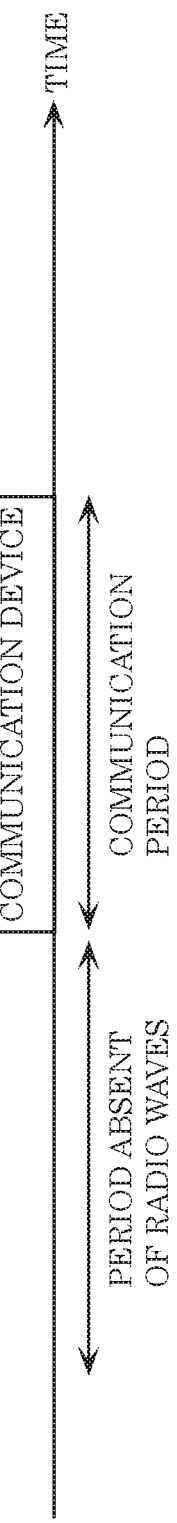
FIG. 65 illustrates one example of frame transmission time.

FIG. 65 illustrates an example of a frame on the time axis when CSMA is implemented. Time is represented on the horizontal axis in FIG. 65.

As illustrated in FIG. 65, there is a period absent of radio waves. The first communication device confirms there is a period absent of radio waves, and performs transmission 2101 of a modulated signal.

In this way, a communication device preparing to start communication checks, before starting communication, whether a surrounding communication device is emitting radio waves or not, and then starts communication. In particular, CSMA that has a collision avoidance feature is referred to as carrier sense multiple access with collision avoidance (CSMA/CA). With CSMA/CA, in order to avoid collision, if a surrounding communication device is emitting radio waves, the communication device waits for a given fixed period of time, and if no surrounding communication device is emitting radio waves, starts transmitting radio waves after a random period of time.

Figure 54:
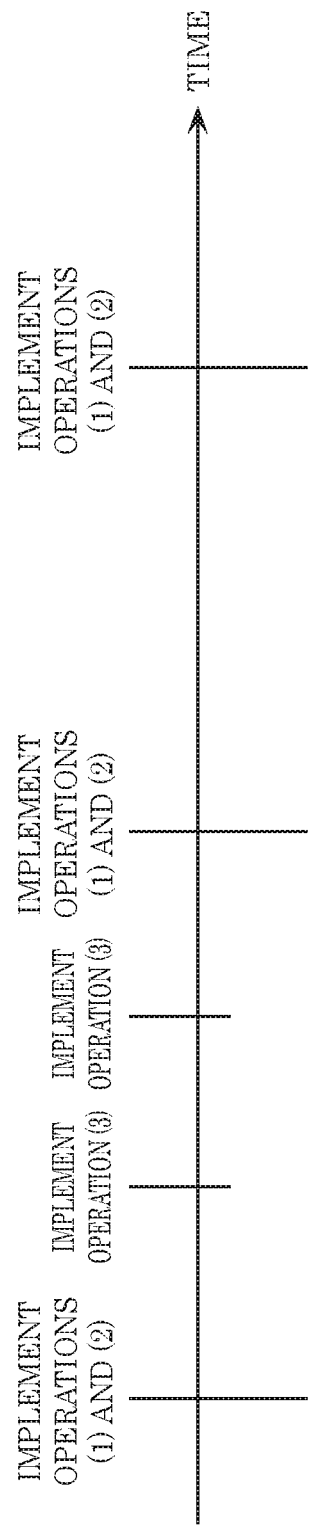
FIG. 54 illustrates one example of operation timing.

As described in Embodiment A2, MP *4 transmits frame 1602 illustrated in FIG. 54 to a plurality of communication devices. In such cases, frame 1602 is a CSMA or CSMA/CA frame. This is because, due to the timing at which frame 1602 is transmitted not being defined by a fixed period and due to frame 1602 being a frame that is broadcast (multicast), transmitting frame 1602 via CSMA or CSMA/CA makes it possible to achieve the advantageous effect that frame 1602 can be precisely received by a plurality of communication devices. This also achieves the advantageous effect that a communication device for controlling whether FDM/FDMA or TDM/TDMA is used not required.

On the other hand, communication in a mesh network (multihop network), may be any one of FDM/FDMA, TDM/TDMA, CSMA or CSMA/CA. In communication in a mesh network, when FDM/FDMA or TDM/TDMA is used, this has the advantage that data can be transmitted intermittently. For example, these schemes are suitable for intermittently relaying a modulated signal.

In communication in a mesh network (multihop network), when CSMA or CSMA/CA is used, this has the advantage that the power consumption of each communication device can be reduced. This can be achieved because modulated signals are transmitted only when data transmission is required.

Accordingly, for example, in the mesh network illustrated in FIG. 47, the advantages described above can be achieved by using FDM/FDMA or TDM/TDMA as the first wireless communication method, and using CSMA or CSMA/CA as the second wireless communication method (i.e., by transmitting frame 1602 using CSMA or CSMA/CA).

As another method, for example, in the mesh network illustrated in FIG. 47, both the first wireless communication method and the second wireless communication method may be CSMA or CSMA/CA.

Furthermore, for example, in the mesh network (multihop network) illustrated in FIG. 47, the advantages described above can be achieved by selecting a suitable one of (i) "FDM/FDMA or TDM/TDMA" and (i) "CSMA or CSMA/CA" as the first wireless communication method depending on the situation such as the communication situation, propagation environment, and communication mode, and using CSMA or CSMA/CA as the second wireless communication method (i.e., transmitting frame 1602 using CSMA or CSMA/CA). In particular, by selecting a suitable one of (i) "FDM/FDMA or TDM/TDMA" and (ii) "CSMA or CSMA/CA" as the first wireless communication method depending on the situation such as the communication situation, propagation environment, and communication mode, this achieves the advantageous effect that a suitable mesh network (multihop network) can be constructed in accordance with the communication environment.

Note that in the transmission of frame 1602 in FIG. 60, when a communication device for controlling whether FDM/FDMA or TDM/TDMA is used is present, frame 1602 may be transmitted using FDM/FDMA or TDM/TDMA.

Moreover, in the present example, the network is exemplified as, but not limited to being indoors. For example, if indoor gateway 4502 is replaced with outdoor gateway 4501 in FIG. 47 and the operations described in the above example are carried out accordingly, the same advantageous effects can be achieved.

Embodiment A5

As is the case in Embodiment A3, the first wireless communication method may be an optical communication method, and the second wireless communication method may be a communication method that uses radio waves in the B (Hz) frequency band.

In such cases, in the mesh network (multihop network) illustrated in FIG. 47, using CSMA or CSMA/CA for the second wireless communication method (i.e., transmitting frame 1602 using CSMA or CSMA/CA) has the advantage that the power consumption of each communication device can be reduced.

Note that in the transmission of frame 1602 in FIG. 60, when a communication device for controlling whether FDM/FDMA or TDM/TDMA is used is present, frame 1602 may be transmitted using FDM/FDMA or TDM/TDMA.

Moreover, in the present example, the network is exemplified as, but not limited to being indoors. For example, if indoor gateway 4502 is replaced with outdoor gateway 4501 in FIG. 47 and the operations described in the above example are carried out accordingly, the same advantageous effects can be achieved.

Supplementary Note A2

In the present specification, when wireless communication is performed using radio waves in particular, the number of antennas used for modulated signal transmission may be one, and may be two or more. Similarly, the number of antennas used for modulated signal reception may be one, and may be two or more. When there are two or more antennas that transmit modulated signals, multiple-input multiple-output (MIMO), which transmits a plurality of modulated signals from a plurality of antennas, may be used. Accordingly, in each embodiment in the present specification, even when MIMO is used, the embodiments can be carried out in the same manner, and the same advantageous effects can be achieved.

Embodiment A6

In the present embodiment, an access control method utilizing the network described in the present specification will be described.

Figure 66:
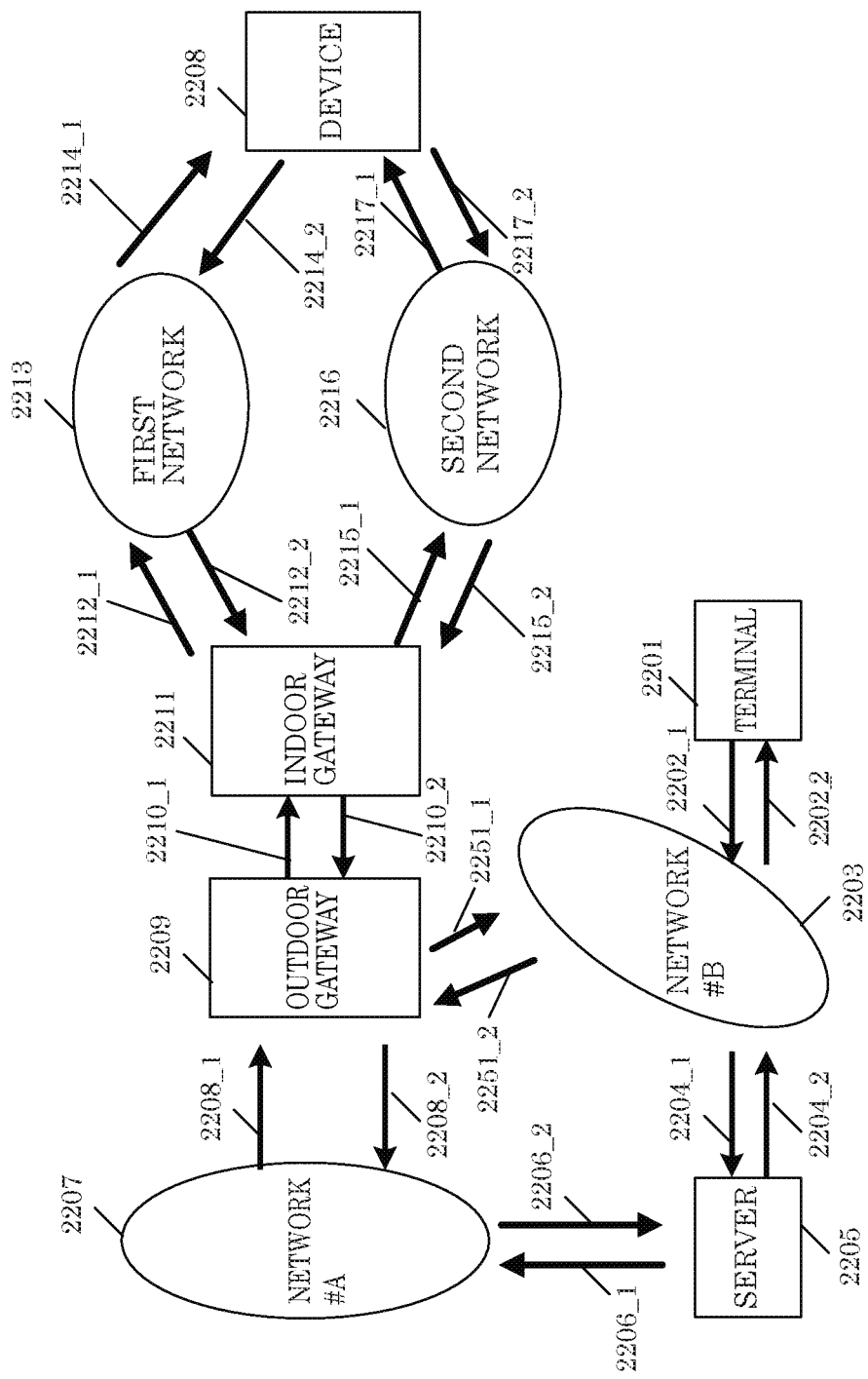
FIG. 66 illustrates one example of a system configuration.

FIG. 66 illustrates a system configuration. For example, in FIG. 66, there are two methods—a first method and a second method—in regard to the relation between first network 2213 and second network 2216.

First Method:

First network 2213 is a network that uses radio waves in the A (Hz) frequency band. Second network 2216 is a network that uses radio waves in the B (Hz) frequency band. Here, A>B.

For example, first network 2213 is a network that uses the 60 GHz (A=60G) frequency band, and second network 2216 is a network that uses the 2.4 GHz (B=2.4G) frequency band. Moreover, a condition that the maximum data transmission speed in wireless communication used in the first network is greater than the maximum data transmission speed in wireless communication used in the second network may be satisfied.

Note that first network 2213 forms a mesh network or a multihop network such as those illustrated in FIG. 47, FIG. 51, FIG. 53, FIG. 55, FIG. 56, and FIG. 57 (however, first network 2213 need not form a mesh network or a multihop network).

Second network 2216 may be formed as a mesh network or a multihop network, and may not be formed as a mesh network or a multihop network.

Second Method:

First network 2213 is a network that uses optical communication. Second network 2216 is a network that uses radio waves in the B (Hz) frequency band.

Note that first network 2213 forms a mesh network or a multihop network such as those illustrated in FIG. 47, FIG. 51, FIG. 53, FIG. 55, FIG. 56, and FIG. 57 (however, first network 2213 need not form a mesh network or a multihop network).

Second network 2216 may be formed as a mesh network or a multihop network, and may not be formed as a mesh network or a multihop network.

In FIG. 66, device 2208 is communicating with indoor gateway 2211 via first network 2213. Device 2208 is also communicating with indoor gateway 2211 via second network 2216.

Indoor gateway 2211 is communicating with outdoor gateway 2209.

Outdoor gateway 2209 is communicating with server 2205 via network #A labeled 2207.

Outdoor gateway 2209 is communicating with terminal 2201 via network #B labeled 2203.

Server 2205 is communicating with terminal 2201 via network #B labeled 2203.

Note that operations performed by the system illustrated in FIG. 66 will be described in greater detail later.

Figure 67:
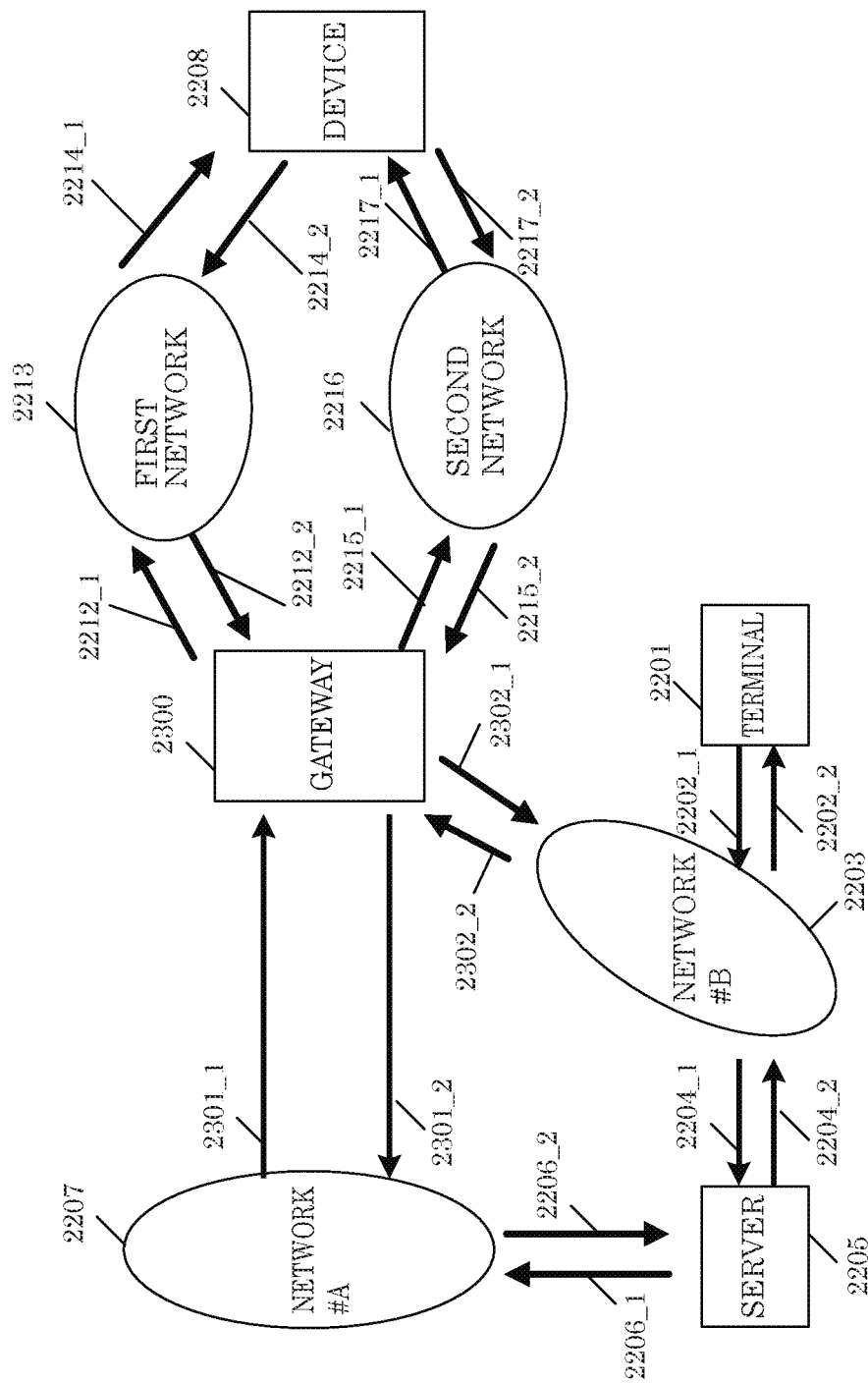
FIG. 67 illustrates one example of a system configuration.

FIG. 67 illustrates a system configuration that differs from the system illustrated in FIG. 66. FIG. 67 differs from FIG. 66 in that there is only one gateway. For example, in FIG. 67, there are two methods—a first method and a second method—in regard to the relation between first network 2213 and second network 2216. The first and second methods have already been described.

In FIG. 67, device 2208 is communicating with gateway 2300 via first network 2213. Device 2208 is also communicating with gateway 2300 via second network 2216.

Gateway 2300 is communicating with server 2205 via network #A labeled 2207.

Gateway 2300 is communicating with terminal 2201 via network #B labeled 2203.

Server 2205 is communicating with terminal 2201 via network #B labeled 2203.

Note that operations performed by the system illustrated in FIG. 67 will be described in greater detail later.

Figure 68:
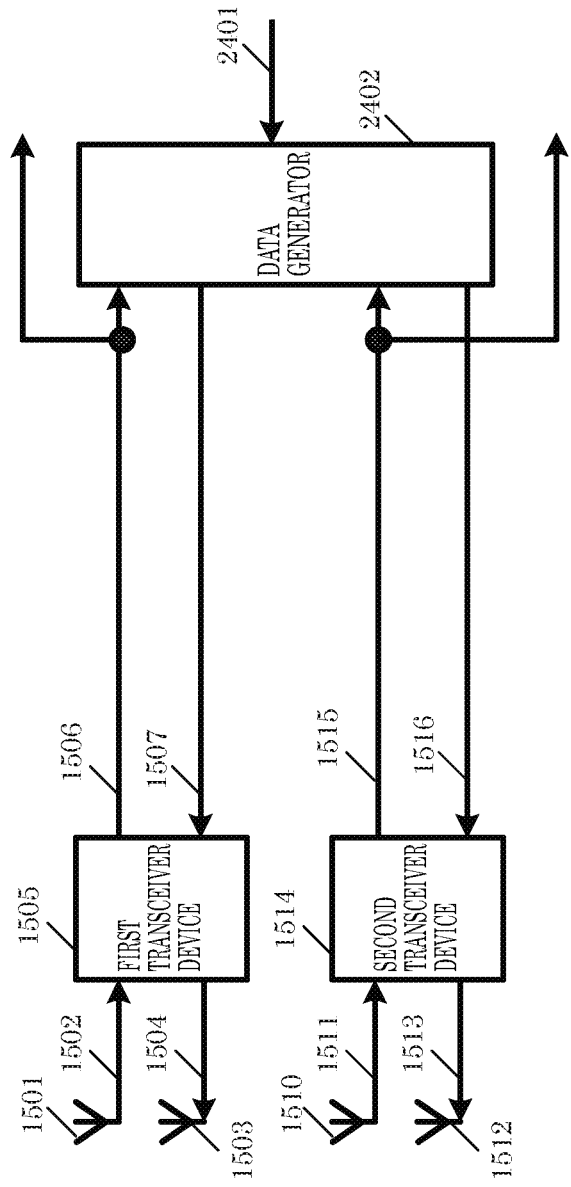
FIG. 68 illustrates one example of a device configuration.

FIG. 68 illustrates one example of a configuration of device 2208 illustrated in FIG. 66 and FIG. 67. Note that in FIG. 68, elements which operate in the same manner as those in FIG. 15 are assigned the same reference numerals.

First transceiver device 1505 receives an input of received signal 1502 that corresponds to 2214_1 in FIG. 67 and is received by antenna (light receiver in the case of optical communication) 1501 in FIG. 68, performs processing such as demodulation and error correction decoding, and outputs received data 1506.

First transceiver device 1505 receives an input of transmission data 1507, performs processing such as error correction coding and mapping, and outputs transmission signal 1504. Transmission signal 1504 is then output from antenna 1503 as radio waves (in the case of optical communication, transmission signal 1504 is emitted from light emitter 1503).

Note that first transceiver device 1505 is a transceiver device for first network 2213 in FIG. 66 and FIG. 67.

Second transceiver device 1514 receives an input of received signal 1511 corresponding to 2217_1 in FIG. 66 and FIG. 67 that is received by antenna 1510, performs processing such as demodulation and error correction decoding, and outputs received data 1515.

Second transceiver device 1514 receives an input of transmission data 1516, performs processing such as error correction coding and mapping, and outputs transmission signal 1513. Transmission signal 1513 is then output from antenna 1512 as radio waves. Accordingly, transmission signal 1513 corresponds to 2217_2 in FIG. 66 and FIG. 67.

Accordingly, second transceiver device 1514 is a transceiver device for second network 2216 in FIG. 66 and FIG. 67.

Data generator 2402 receives inputs of received data 1506, received data 1515, and information 2401, and outputs transmission data 1507 corresponding to information 2401 and/or transmission signal 1516.

Figure 69:
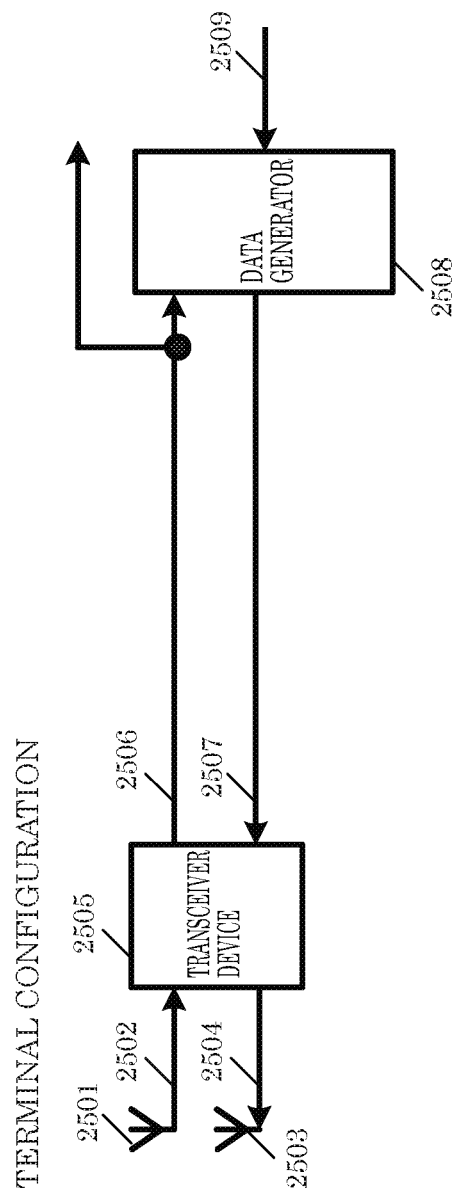
FIG. 69 illustrates one example of a terminal configuration.

FIG. 69 illustrates one example of a configuration of terminal 2201 illustrated in FIG. 66 and FIG. 67.

Transceiver device 2505 in FIG. 69 receives an input of received signal 2502 received by antenna 2501, performs processing such as demodulation and error correction decoding, and outputs received data 2506. Here, received signal 2502 corresponds to 2202_2 in FIG. 66 and FIG. 67.

Moreover, transceiver device 2505 receives an input of transmission data 2507, performs processing such as error correction coding and mapping, and outputs transmission signal 2504. Transmission signal 2504 is then output from antenna 2503 as radio waves. Here, transmission signal 2504 corresponds to 2202_1 in FIG. 66 and FIG. 67.

Data generator 2508 receives inputs of information 2509 and received data 2506, and outputs transmission data 2507 corresponding to information 2509.

Figure 70:
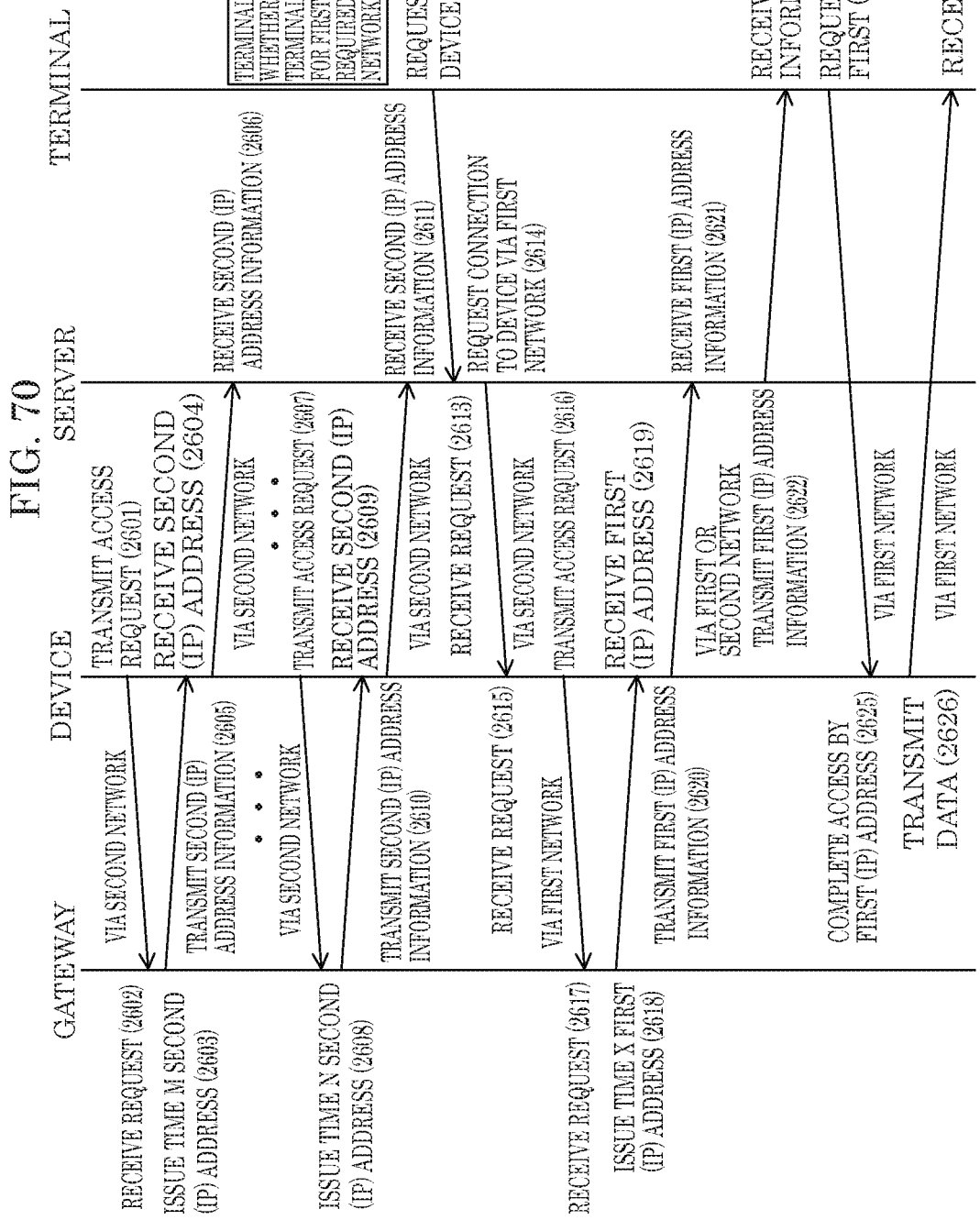
FIG. 70 illustrates one example of system operations.

FIG. 70 illustrates an example of operations performed by the system illustrated in FIG. 66 and the system illustrated in FIG. 67.

First, the operations illustrated in FIG. 70 that are performed by the system illustrated in FIG. 66 will be described. Time is represented on the vertical axis in FIG. 70.

Second transceiver device 1514 in device 2208 illustrated in FIG. 66 and FIG. 67 and having the configuration illustrated in FIG. 68 transmits access request information (2601).

Indoor gateway 2211 receives the access request information via second network 2216 (2602). In accordance with the access request, indoor gateway 2211 transmits information indicating a time M second address (for example, an internet protocol (IP) address) that device 2208 is to use for connection (2603), and device 2208 receives the time M second address information via second network 2216, thereby obtaining the time M second address information (2604). Note that the issuing of the time M second address may be performed by indoor gateway 2211, may be performed by outdoor gateway 2209, and may be performed by another device (the time M second address is an address for connection via second network 2216).

Device 2208 then transmits the time M second address information. Server 2205 then obtains the time M second address information via, for example, second network 2216, indoor gateway 2211, outdoor network 2209, and network #A labeled 2207 (2606).

Second transceiver device 1514 in device 2208 illustrated in FIG. 66 and FIG. 67 and having the configuration illustrated in FIG. 68 transmits access request information (2607).

Indoor gateway 2211 receives the access request information via second network 2216 (2608).

In accordance with the access request, indoor gateway 2211 transmits information indicating a time N second address (for example, an IP address) that device 2208 is to use for connection (2608), and device 2208 receives the time N second address information via second network 2216, thereby obtaining the time N second address information (2609). Note that the issuing of the time N second address may be performed by indoor gateway 2211, may be performed by outdoor gateway 2209, and may be performed by another device (the time N second address is an address for connection via second network 2216).

Device 2208 then transmits the time N second address information. Server 2205 then obtains the time N second address information via, for example, second network 2216, indoor gateway 2211, outdoor network 2209, and network #A labeled 2207 (2611).

Note that server 2205 may perform authentication to determine whether device 2208 may access server 2205. Note that key information for the authentication may be possessed by device 2208 and terminal 2201.

Next, terminal 2201 requests, from server 2205, connection to device 2208 via the first network. Accordingly, terminal 2201 transmits information indicating a request to connect to device 2208 via the first network (2612).

Server 2205 receives, via network #B labeled 2203, the information indicating a request to connect to device 2208 via the first network (2613).

Server 2205 then transmits the information indicating a request to connect to device 2208 via the first network (2614).

Device 2208 receives, via network #A labeled 2207, outdoor gateway 2209, indoor gateway 2211, and second network 2216, the information indicating a request to connect to device 2208 via the first network (2615). Note that this is possible because server 2205 has already received the time N second address for access to device 2208 via second network 2216.

Device 2208 then requests access via first network 2213 (2616). Accordingly, device 2208 transmits information indicating a request for access via first network 2213.

Indoor gateway 2211 receives the access request information via the first network (2617).

In accordance with the access request, indoor gateway 2211 transmits information indicating a time X first address (for example, an IP address) that device 2208 is to use for connection (2618), and device 2208 receives the time X first address information via first network 2213, thereby obtaining the time X first address information (2619). Note that the issuing of the time X first address may be performed by indoor gateway 2211, may be performed by outdoor gateway 2209, and may be performed by another device (the time X first address is an address for connection via first network 2216).

Device 2208 then transmits the time X first address information (2620). Server 2205 then obtains the time X first address information via, for example, first network 2213, indoor gateway 2211, outdoor gateway 2209, and network #A labeled 2207 (2621).

Note that server 2205 may perform authentication to determine whether device 2208 may access server 2205. Note that key information for the authentication may be possessed by device 2208 and terminal 2201.

Server 2205 then transmits the time X first address information (2622). Terminal 2201 then obtains the time X first address via network #B labeled 2203 (2623).

The terminal then accesses device 2208 via network #B labeled 2203, outdoor gateway 2209, indoor gateway 2211, and first network 2213, based on the time X first address information (2625).

Device 2208 transmits data (2626), and terminal 2208 obtains this data via, for example, first network 2213, indoor gateway 2211, outdoor gateway 2209, and network #B labeled 2203 (2627).

Next, operations illustrated in FIG. 70 that are performed by the system illustrated in FIG. 67 will be described. Time is represented on the vertical axis in FIG. 70.

Second transceiver device 1514 in device 2208 illustrated in FIG. 66 and FIG. 67 and having the configuration illustrated in FIG. 68 transmits access request information (2601).

Gateway 2300 receives the access request information via second network 2216 (2602). In accordance with the access request, gateway 2300 transmits information indicating a time M second address (for example, an internet protocol (IP) address) that device 2208 is to use for connection (2603), and device 2208 receives the time M second address information via second network 2216, thereby obtaining the time M second address information (2604). Note that the issuing of the time M second address may be performed by another device (the time M second address is an address for connection via second network 2216).

Device 2208 then transmits the time M second address information. Server 2205 then obtains the time M second address information via, for example, second network 2216, gateway 2300, and network #A labeled 2207 (2606).

Second transceiver device 1514 in device 2208 illustrated in FIG. 66 and FIG. 67 and having the configuration illustrated in FIG. 68 transmits access request information (2607).

Indoor gateway 2211 receives the access request information via second network 2216 (2608).

In accordance with the access request, gateway 2300 transmits information indicating a time N second address (for example, an IP address) that device 2208 is to use for connection (2608), and device 2208 receives the time N second address information via second network 2216, thereby obtaining the time N second address information (2609). Note that the issuing of the time N second address may be performed by another device (the time N second address is an address for connection via second network 2216).

Device 2208 then transmits the time N second address information. Server 2205 then obtains the time N second address information via, for example, second network 2216, gateway 2300, and network #A labeled 2207 (2611).

Note that server 2205 may perform authentication to determine whether device 2208 may access server 2205. Note that key information for the authentication may be possessed by device 2208 and terminal 2201.

Next, terminal 2201 requests, from server 2205, connection to device 2208 via the first network. Accordingly, terminal 2201 transmits information indicating a request to connect to device 2208 via the first network (2612).

Server 2205 receives, via network #B labeled 2203, the information indicating a request to connect to device 2208 via the first network (2613).

Server 2205 then transmits the information indicating a request to connect to device 2208 via the first network (2614).

Device 2208 receives, via network #A labeled 2207, gateway 2300, and second network 2216, the information indicating a request to connect to device 2208 via the first network (2615). Note that this is possible because server 2205 has already received the time N second address for access to device 2208 via second network 2216.

Device 2208 then requests access via first network 2213 (2616). Accordingly, device 2208 transmits information indicating a request for access via first network 2213.

Gateway 2300 receives the access request information via the first network (2617).

In accordance with the access request, gateway 2300 transmits information indicating a time X first address (for example, an IP address) that device 2208 is to use for connection (2618), and device 2208 receives the time X first address information via first network 2213, thereby obtaining the time X first address information (2619). Note that the issuing of the time X first address may be performed by another device (the time X first address is an address for connection via first network 2216).

Device 2208 then transmits the time X first address information (2620). Server 2205 then obtains the time X first address information via, for example, first network 2213, gateway 2300, and network #A labeled 2207 (2621).

Note that server 2205 may perform authentication to determine whether device 2208 may access server 2205. Note that key information for the authentication may be possessed by device 2208 and terminal 2201.

Server 2205 then transmits the time X first address information (2622). Terminal 2201 then obtains the time X first address via network #B labeled 2203 (2623).

The terminal then accesses device 2208 via network #B labeled 2203, gateway 2300, and first network 2213, based on the time X first address information (2625).

Device 2208 transmits data (2626), and terminal 2208 obtains this data via, for example, first network 2213, gateway 2300, and network #B labeled 2203 (2627).

Figure 71:
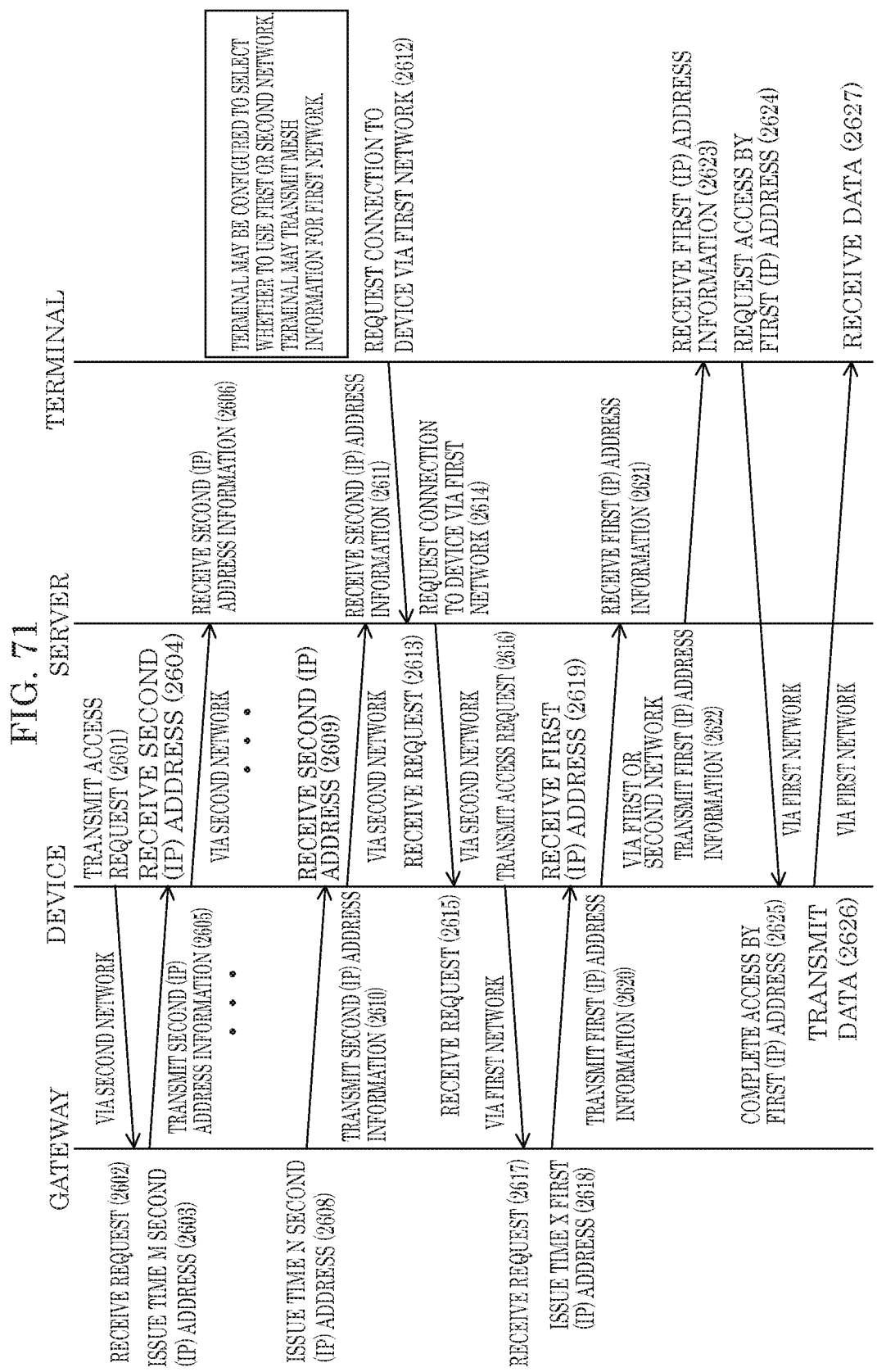
FIG. 71 illustrates one example of system operations.

FIG. 71 illustrates an example of operations performed by the system illustrated in FIG. 66 and the system illustrated in FIG. 67.

Next, operations illustrated in FIG. 71 that are performed by the system illustrated in FIG. 66 will be described. Time is represented on the vertical axis in FIG. 71. Moreover, operations in FIG. 71 that are the same as those in FIG. 70 share like reference signs. Accordingly, operations in FIG. 71 that differ from FIG. 70 will be described. FIG. 71 differs from FIG. 70 in regard to operations 2601 through 2611.

Second transceiver device 1514 in device 2208 illustrated in FIG. 66 and FIG. 67 and having the configuration illustrated in FIG. 68 transmits access request information (2601).

Indoor gateway 2211 receives the access request information via the second network 2216 (2602). In accordance with the access request, indoor gateway 2211 transmits information indicating a time M second address (for example, an IP address) that device 2208 is to use for connection (2603), and device 2208 receives the time M second address information via second network 2216, thereby obtaining the time M second address information (2604). Note that the issuing of the time M second address may be performed by indoor gateway 2211, may be performed by outdoor gateway 2209, and may be performed by another device (the time M second address is an address for connection via second network 2216).

Device 2208 then transmits the time M second address information. Server 2205 then obtains the time M second address information via, for example, second network 2216, indoor gateway 2211, outdoor network 2209, and network #A labeled 2207 (2606).

Indoor gateway 2211 then provides the second address to device 2208 at regular or irregular intervals.

Indoor gateway 2211 transmits information indicating a time N second address (for example, an IP address) that device 2208 is to use for connection (2608), and device 2208 receives the time N second address information via second network 2216, thereby obtaining the time N second address information (2609). Note that the issuing of the time N second address may be performed by indoor gateway 2211, may be performed by outdoor gateway 2209, and may be performed by another device (the time N second address is an address for connection via second network 2216).

Device 2208 then transmits the time N second address information. Server 2205 then obtains the time N second address information via, for example, second network 2216, indoor gateway 2211, outdoor network 2209, and network #A labeled 2207 (2611).

Note that server 2205 may perform authentication to determine whether device 2208 may access server 2205. Note that key information for the authentication may be possessed by device 2208 and terminal 2201.

Subsequent operations are the same as those described with reference to FIG. 70, so repeated description will be omitted.

Next, operations illustrated in FIG. 71 that are performed by the system illustrated in FIG. 67 will be described. Time is represented on the vertical axis in FIG. 71. Moreover, operations in FIG. 71 that are the same as those in FIG. 70 share like reference signs. Accordingly, operations in FIG. 71 that differ from FIG. 70 will be described. FIG. 71 differs from FIG. 70 in regard to operations 2601 through 2611.

Second transceiver device 1514 in device 2208 illustrated in FIG. 66 and FIG. 67 and having the configuration illustrated in FIG. 68 transmits access request information (2601).

Gateway 2300 receives the access request information via second network 2216 (2602). In accordance with the access request, gateway 2300 transmits information indicating a time M second address (for example, an IP address) that device 2208 is to use for connection (2603), and device 2208 receives the time M second address information via second network 2216, thereby obtaining the time M second address information (2604). Note that the issuing of the time M second address may be performed by another device (the time M second address is an address for connection via second network 2216).

Device 2208 then transmits the time M second address information. Server 2205 then obtains the time M second address information via, for example, second network 2216, gateway 2300, and network #A labeled 2207 (2606).

Gateway 2300 then provides the second address to device 2208 at regular or irregular intervals. Accordingly, gateway 2300 transmits information indicating a time N second address (for example, an IP address) that device 2208 is to use for connection (2608), and device 2208 receives the time N second address information via second network 2216, thereby obtaining the time N second address information (2609). Note that the issuing of the time N second address may be performed by another device (the time N second address is an address for connection via second network 2216).

Device 2208 then transmits the time N second address information. Server 2205 then obtains the time N second address information via, for example, second network 2216, gateway 2300, and network #A labeled 2207 (2611).

Note that server 2205 may perform authentication to determine whether device 2208 may access server 2205. Note that key information for the authentication may be possessed by device 2208 and terminal 2201.

Subsequent operations are the same as those described with reference to FIG. 70, so repeated description will be omitted.

Next, advantages of the operations performed in FIG. 70 and FIG. 71 will be described.

When the first method is used, there is a possibility that the wireless communication distance in first network 2213 will decrease due to reasons related to frequency. A mesh network or multihop network may be implemented in order to remedy this. Due to this, there is a possibility that device 2208 preferentially using second network 2216 will provide more stable communication. When necessary, device 2208 can connect to the first network to perform more stable communication, which achieves the advantageous effect that communication performed by terminal 2201 is also stable. Furthermore, in the first network, there is a possibility that wireless communication that provides fast data transmission speeds can be performed, and in such cases, communication device 2208 and terminal 2201 have the benefit of fast data transmission.

When the second method is used, there is a possibility that the communication distance is greater in the second network. Accordingly, in the first network, a mesh network or multihop network may be implemented. Due to this, there is a possibility that device 2208 preferentially using second network 2216 will provide more stable communication. When necessary, device 2208 can connect to the first network to perform more stable communication, which achieves the advantageous effect that communication performed by terminal 2201 is also stable. Furthermore, in the first network, there is a possibility that wireless communication that provides fast data transmission speeds can be performed, and in such cases, communication device 2208 and terminal 2201 have the benefit of fast data transmission.

Figure 72:
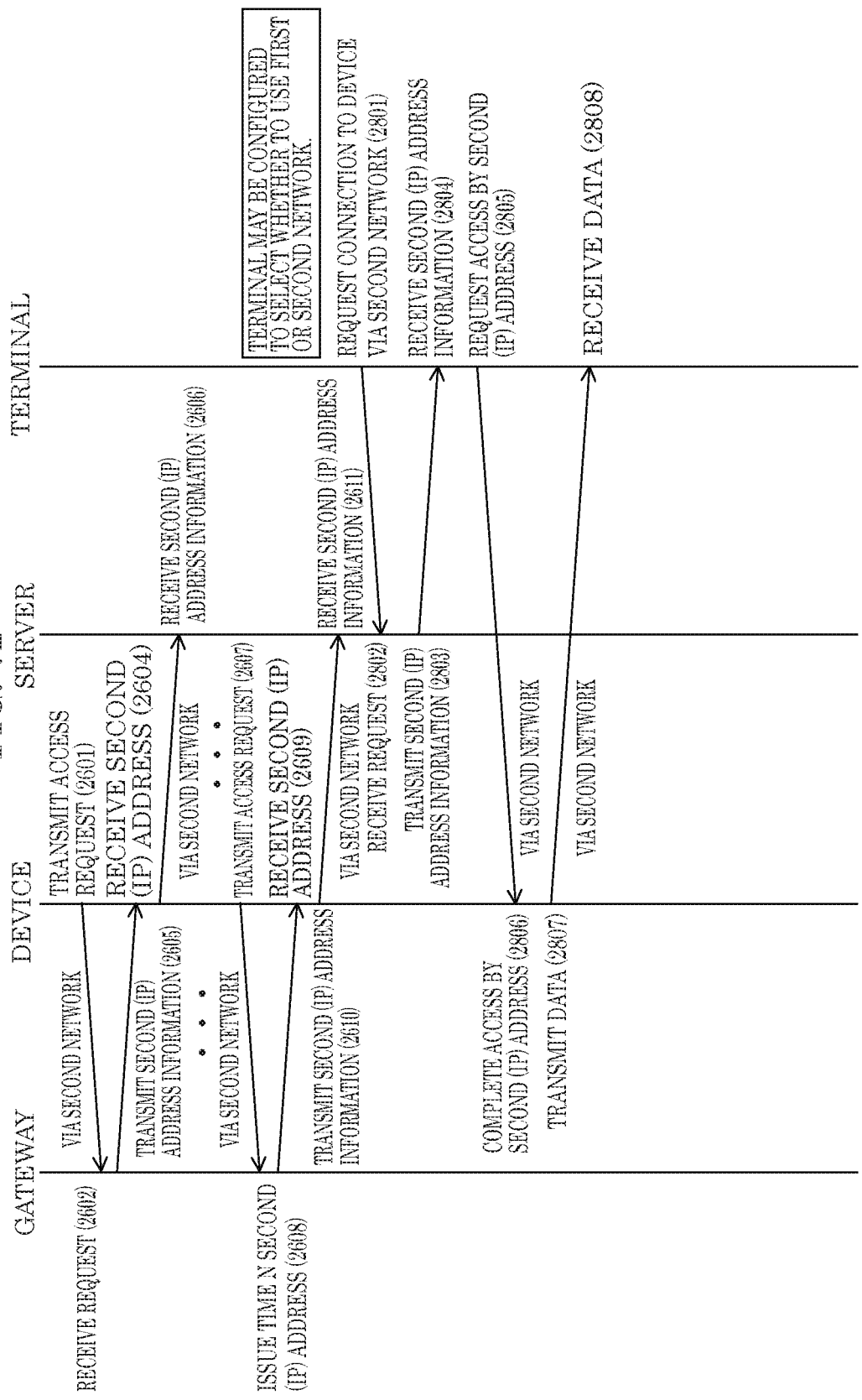
FIG. 72 illustrates one example of system operations.
Figure 73:
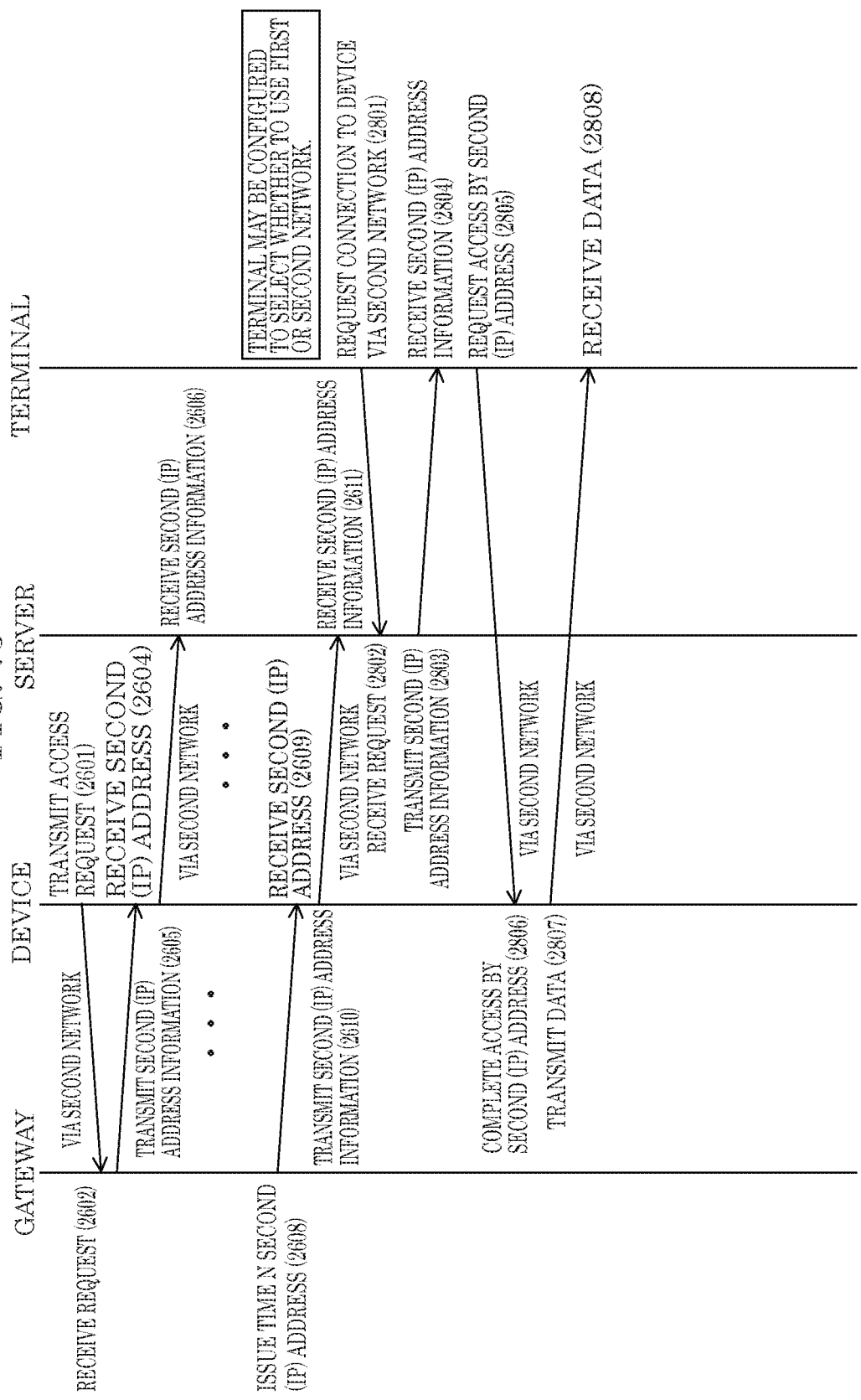
FIG. 73 illustrates one example of system operations.

In FIG. 70 and FIG. 71, device 2208 uses the first network and terminal 2201 accesses using the first network. In FIG. 72 and FIG. 73, device 2208 uses the second network and terminal 2201 accesses using the second network.

FIG. 72 illustrates an example of operations performed by the system illustrated in FIG. 66 and the system illustrated in FIG. 67.

First, operations illustrated in FIG. 72 that are performed by the system illustrated in FIG. 66 will be described. Time is represented on the vertical axis in FIG. 72. Operations in FIG. 72 that are the same as those in FIG. 70 share like reference signs. Accordingly, operations in FIG. 72 that differ from FIG. 70 and FIG. 71 will be described. In other words, operations from 2601 to 2611 will be omitted.

Terminal 2201 requests, from server 2205, connection to device 2208 via the second network. Accordingly, terminal 2201 transmits information indicating a request to connect to device 2208 via the second network (2801).

Server 2205 receives, via network #B labeled 2203, the information indicating a request to connect to device 2208 via the second network (2802).

Since server 2205 has already received the time N second address, server 2205 transmits the time N second address (2803). Terminal 2201 then obtains the time N second address via network #B labeled 2203 (2804).

The terminal then accesses device 2208 via network #B labeled 2203, outdoor gateway 2209, indoor gateway 2211, and second network 2216, based on the time N second address information (2806).

Device 2208 transmits data (2807), and terminal 2208 obtains this data via, for example, second network 2216, indoor gateway 2211, outdoor gateway 2209, and network #B labeled 2203 (2808).

Note that server 2205 may perform authentication to determine whether device 2208 may access server 2205. Note that key information for the authentication may be possessed by device 2208 and terminal 2201.

Next, operations illustrated in FIG. 72 that are performed by the system illustrated in FIG. 67 will be described. Time is represented on the vertical axis in FIG. 72. Operations in FIG. 72 that are the same as those in FIG. 70 share like reference signs. Accordingly, operations in FIG. 72 that differ from FIG. 70 and FIG. 71 will be described. In other words, operations from 2601 to 2611 will be omitted.

Terminal 2201 requests, from server 2205, connection to device 2208 via the second network. Accordingly, terminal 2201 transmits information indicating a request to connect to device 2208 via the second network (2801).

Server 2205 receives, via network #B labeled 2203, the information indicating a request to connect to device 2208 via the second network (2802).

Since server 2205 has already received the time N second address, server 2205 transmits the time N second address (2803). Terminal 2201 then obtains the time N second address via network #B labeled 2203 (2804).

The terminal then accesses device 2208 via network #B labeled 2203, gateway 2300, and second network 2216, based on the time N second address information (2806).

Device 2208 transmits data (2807), and terminal 2208 obtains this data via, for example, second network 2213, gateway 2300, and network #B labeled 2203 (2808).

Note that server 2205 may perform authentication to determine whether device 2208 may access server 2205. Note that key information for the authentication may be possessed by device 2208 and terminal 2201.

Next, the operations illustrated in FIG. 73 will be described. FIG. 73 illustrates an example of operations performed by the system illustrated in FIG. 66 and the system illustrated in FIG. 67.

First, operations illustrated in FIG. 73 that are performed by the system illustrated in FIG. 66 will be described. Time is represented on the vertical axis in FIG. 73. Operations in FIG. 73 that are the same as those in FIG. 70 share like reference signs. Accordingly, operations in FIG. 73 that differ from FIG. 70 and FIG. 71 will be described. In other words, operations from 2601 to 2611 will be omitted.

Terminal 2201 requests, from server 2205, connection to device 2208 via the second network. Accordingly, terminal 2201 transmits information indicating a request to connect to device 2208 via the second network (2801).

Server 2205 receives, via network #B labeled 2203, the information indicating a request to connect to device 2208 via the second network (2802).

Since server 2205 has already received the time N second address, server 2205 transmits the time N second address (2803). Terminal 2201 then obtains the time N second address via network #B labeled 2203 (2804).

The terminal then accesses device 2208 via network #B labeled 2203, outdoor gateway 2209, indoor gateway 2211, and second network 2216, based on the time N second address information (2806).

Device 2208 transmits data (2807), and terminal 2208 obtains this data via, for example, second network 2216, indoor gateway 2211, outdoor gateway 2209, and network #B labeled 2203 (2808).

Note that server 2205 may perform authentication to determine whether device 2208 may access server 2205. Note that key information for the authentication may be possessed by device 2208 and terminal 2201.

Next, operations illustrated in FIG. 73 that are performed by the system illustrated in FIG. 67 will be described. Time is represented on the vertical axis in FIG. 73. Operations in FIG. 73 that are the same as those in FIG. 70 share like reference signs. Accordingly, operations in FIG. 73 that differ from FIG. 70 and FIG. 71 will be described. In other words, operations from 2601 to 2611 will be omitted.

Terminal 2201 requests, from server 2205, connection to device 2208 via the second network. Accordingly, terminal 2201 transmits information indicating a request to connect to device 2208 via the second network (2801).

Server 2205 receives, via network #B labeled 2203, the information indicating a request to connect to device 2208 via the second network (2802).

Since server 2205 has already received the time N second address, server 2205 transmits the time N second address (2803). Terminal 2201 then obtains the time N second address via network #B labeled 2203 (2804).

The terminal then accesses device 2208 via network #B labeled 2203, gateway 2300, and second network 2216, based on the time N second address information (2806).

Device 2208 transmits data (2807), and terminal 2208 obtains this data via, for example, second network 2213, gateway 2300, and network #B labeled 2203 (2808).

Note that server 2205 may perform authentication to determine whether device 2208 may access server 2205. Note that key information for the authentication may be possessed by device 2208 and terminal 2201.

By performing the operations illustrated in FIG. 72 and FIG. 73, it is possible to achieve the advantageous effect that device 2208 can communicate using second network which is characterized by stable communication.

Note that the system illustrated in FIG. 66 or FIG. 67 may switch between (i) the operations in FIG. 70 or FIG. 71 and (ii) the operations in FIG. 72 or FIG. 73 depending on the status of the system.

In other words, in either case, terminal 2201 receives data from device 2208, but whether terminal 2201 receives the data via the first network, like in FIG. 70 or FIG. 71, or receives the data via the second network, like in FIG. 72 or FIG. 73, may be switched depending on the status of the system.

As one example, depending on the situation, terminal 2201 may either request connection to device 2208 via the first network like in 2612 in FIG. 70 or FIG. 71, or request connection to device 2208 via the second network like in 2801 in FIG. 72 or FIG. 73.

Moreover, regarding the provision of the addresses by server 2205, server 2205 may switch between providing the first address to terminal 2201 and providing the second address to terminal 2201 depending on the situation.

Implementing such a configuration makes it possible to achieve both advantageous effects of improved communication quality and improved data transmission speeds.

Supplementary Note A3

In the present specification, an application related to processes associated with transmission and reception performed by a terminal may be provided by, for example, a server, and the terminal may install this application to implement all or some of the processes associated with the transmission and the reception described in the present specification. Note that the application may be provided to the terminal by the terminal connecting to the server via a network, and the application may be provided to the terminal by another communication function included in the terminal or another communication function connected to the terminal connecting to the server via a network.

Although the terminology mesh network and multihop network are used in the present specification, these may be referred to by some other name. Note that a mesh network may be considered to be a multihop network in which terminals directly connect to one another, and transmitted data reaches the desired destination after sequentially passing through a plurality of terminals. Moreover, an embodiment relating a mesh network may be implemented in the same manner even if it relates to a multihop network instead.

Embodiment A7

In the present embodiment, operations performed by terminal 2201, device 2208, and server 2205 illustrated in FIG. 66 and FIG. 67 and described in Embodiment A6 will be described.

First, the operations performed by device 2208 illustrated in FIG. 66 and FIG. 67 will be described. FIG. 68 illustrates a configuration of device 2208.

Figure 74:
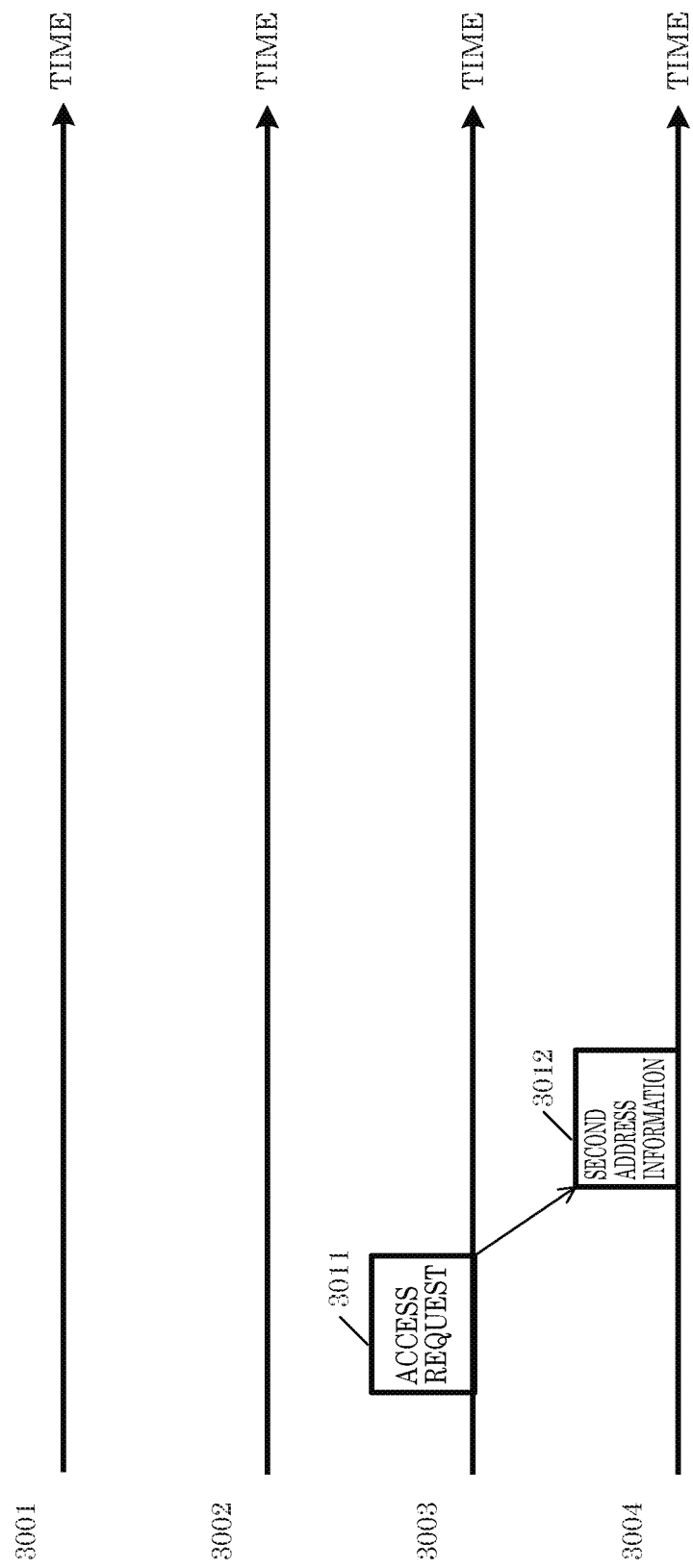
FIG. 74 illustrates one example of transmission information and reception information.

FIG. 74 illustrates the states of the transmission information and reception information of device 2208 upon device 2208 obtaining the second address via the second network (for example, 2604 and 2609) in FIG. 70 through FIG. 73.

In FIG. 74, 3001 indicates the state of transmission signal 1504 of first transceiver device 1505 illustrated in FIG. 68, and 3002 indicates the state of received signal 1502 of first transceiver device 1505 illustrated in FIG. 68. Time is represented on the horizontal axis in either case.

3003 indicates the state of transmission signal 1513 of second transceiver device 1514 illustrated in FIG. 68, and 3004 indicates the state of received signal 1511 of second transceiver device 1514 illustrated in FIG. 68. Time is represented on the horizontal axis in either case.

As illustrated in FIG. 74, second transceiver device 1514 illustrated in FIG. 68 transmits transmission signal 1513 including access request 3011 information to indoor gateway 2211 or gateway 2300 via second network 2216. Accordingly, at this time, data generator 2402 illustrated in FIG. 68 outputs access request information as transmission data 1516, based on information 2401. Second transceiver device 1514 receives an input of transmission data 1516 that includes the access request information, performs processing such as error correction coding and mapping, and outputs transmission signal 1513. Transmission signal 1513 is then output from an antenna as radio waves.

Indoor gateway 2211 illustrated in FIG. 66 or gateway 2300 illustrated in FIG. 67 receives the modulated signal including the access request 3011 information illustrated in FIG. 74. Then, indoor gateway 2211 illustrated in FIG. 66 or gateway 2300 illustrated in FIG. 67 receives access request 3011 information, and transmits a modulated signal including information indicating the second address for connection via second network 2216. Accordingly, as illustrated in 3004 in FIG. 74, second transceiver device 1514 illustrated in FIG. 68 receives the signal including second address information 3012.

Operations performed by indoor gateway 2211 illustrated in FIG. 66 or gateway 2300 illustrated in FIG. 67, and device 2208 at this time will be described.

Figure 77:
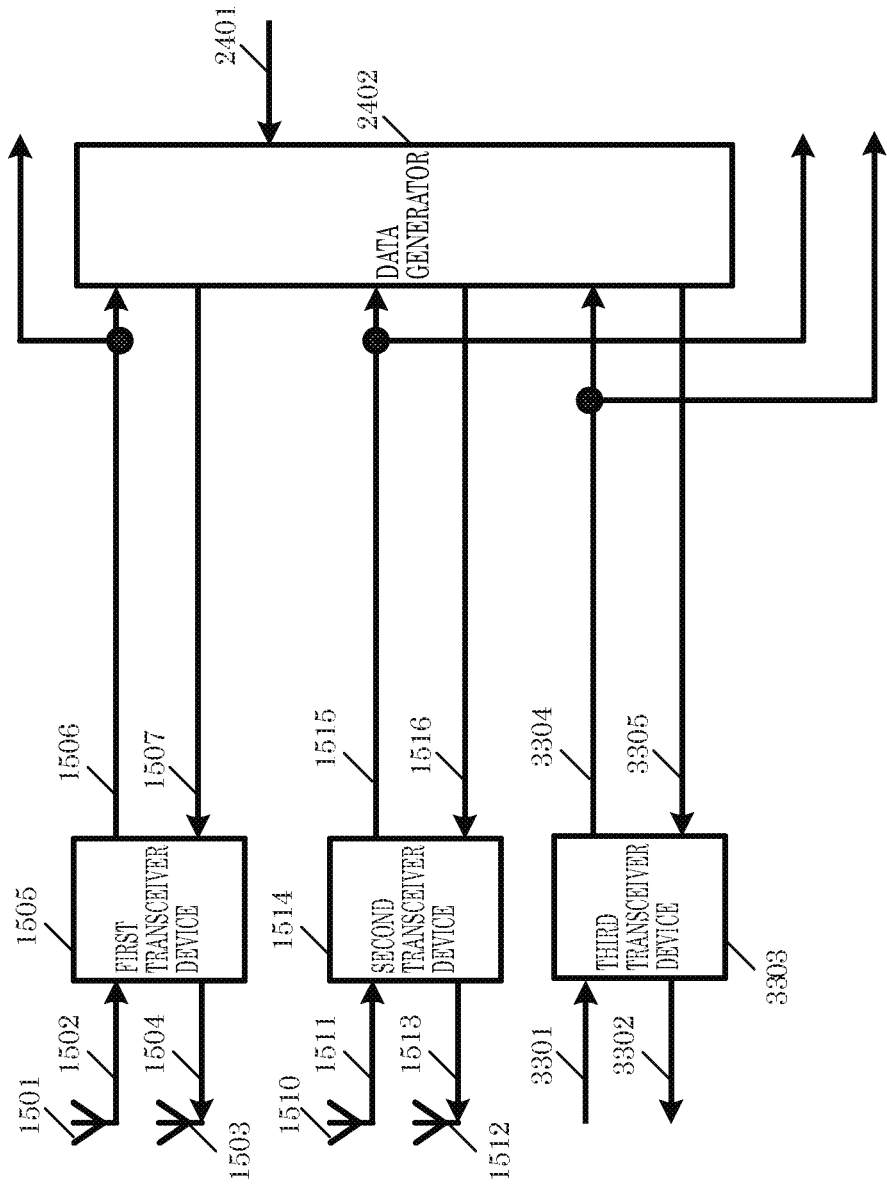
FIG. 77 illustrates one example of a gateway configuration.

FIG. 77 illustrates one example of a configuration of indoor gateway 2211 illustrated in FIG. 66 and gateway 2300 illustrated in FIG. 67. Note that in FIG. 77, elements which operate in the same manner as those in FIG. 15 and FIG. 68 are assigned the same reference numerals, and repeated description thereof is omitted. Although 1501 and 1503 indicate antennas, as described in other embodiments, when optical communication is used, 1501 is a light receiver and antenna 1503 is a light emitter.

In FIG. 77, third transceiver device 3303 is a transceiver device for communicating with outdoor gateway 2209 in FIG. 66.

Moreover, third transceiver device 3303 is a transceiver device that communicates with server 2205 via network #A labeled 2207 and illustrated in FIG. 67, and third transceiver device 3303 is also a transceiver device that communicates with, for example, server 2205 and terminal 2201 via network #B labeled 2203.

Third transceiver device 3303 receives an input of received signal 3301, performs processing such as demodulation and error correction decoding, and outputs received data 3304. Third transceiver device 3303 receives an input of transmission data 3305, performs processing such as error correction coding and mapping, and outputs transmission signal 3302.

In FIG. 77, like is illustrated in FIG. 74, the modulated signal including access request 3011 information transmitted by device 2208 (i.e., received signal 1511) is received by antenna 1510, whereby second transceiver device 1514 receives an input of received signal 1511, performs processing such as demodulation and error correction decoding, and outputs received data 1515 including access request 3011 information.

Data generator 2402 receives an input of received data 1515 including access request 3011 information, issues the second address, and outputs transmission data 1516 including second address information 3012.

Second transceiver device 1514 receives an input of transmission data 1516 that includes second address information 3012, performs processing such as error correction coding and mapping, and outputs transmission signal 1513. Transmission signal 1513 is then output from antenna 1512 as radio waves.

This enables device 2208 illustrated in FIG. 66 and FIG. 67 to obtain the second address information and communicate with indoor gateway 2211 or gateway 2300 via the second network.

Note that the device that issues the second address need not be indoor gateway 2211 illustrated in FIG. 66 or gateway 2300 illustrated in FIG. 67. In such cases, indoor gateway 2211 illustrated in FIG. 66 or gateway 2300 illustrated in FIG. 67 obtains the second address information from the device that issued the second address, and, for example, performs the above operations.

Figure 75:
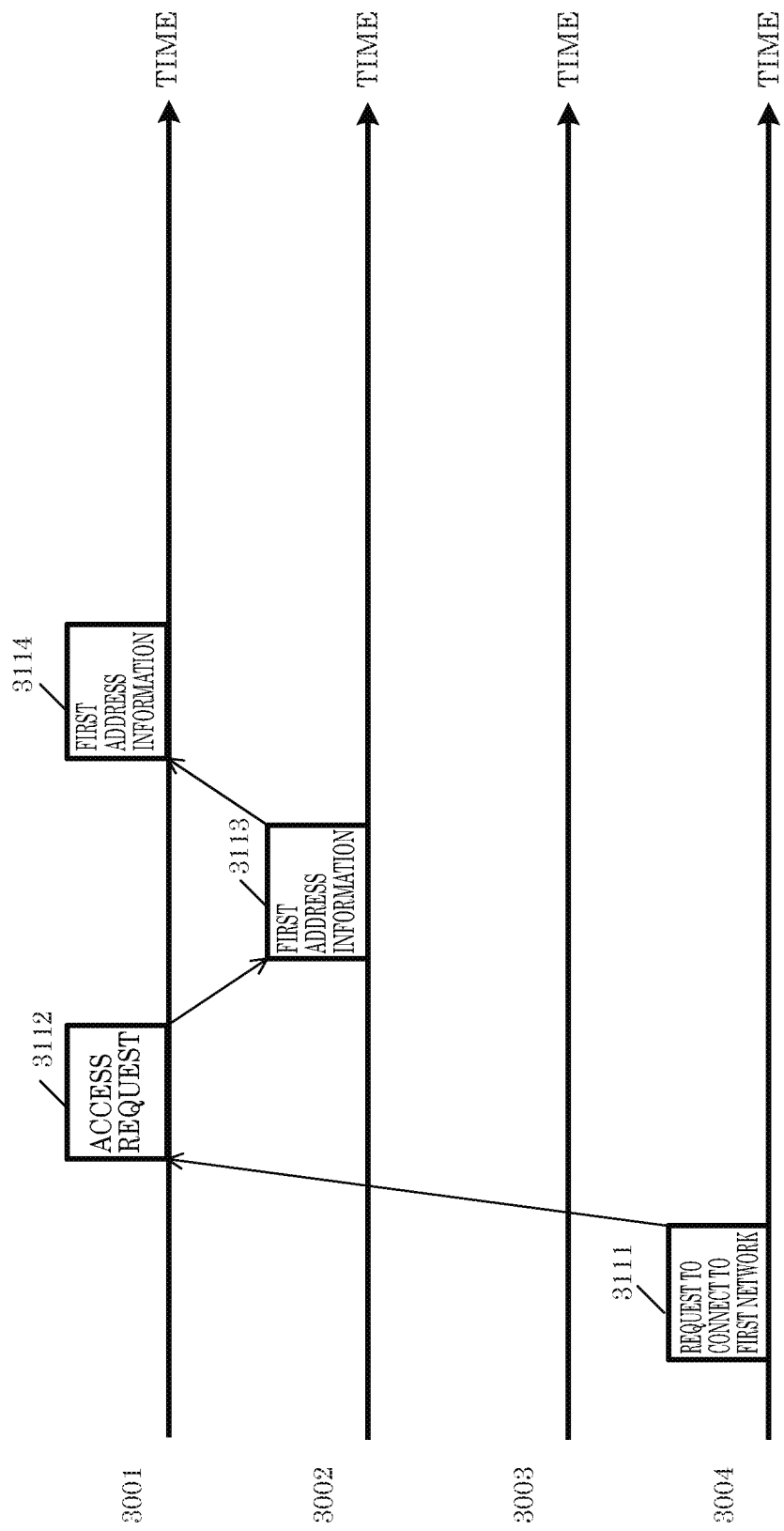
FIG. 75 illustrates one example of transmission information and reception information.

FIG. 75 illustrates the states of the transmission information and reception information of device 2208 upon device 2208, for example, obtaining the first address via the second network (2623) in FIG. 70 and FIG. 71.

In FIG. 75, 3001 indicates the state of transmission signal 1504 of first transceiver device 1505 illustrated in FIG. 68, and 3002 indicates the state of received signal 1502 of first transceiver device 1505 illustrated in FIG. 68. Time is represented on the horizontal axis in either case.

3003 indicates the state of transmission signal 1513 of second transceiver device 1514 illustrated in FIG. 68, and 3004 indicates the state of received signal 1511 of second transceiver device 1514 illustrated in FIG. 68. Time is represented on the horizontal axis in either case.

As illustrated in FIG. 75, indoor gateway 2211 illustrated in FIG. 66 or gateway 2300 illustrated in FIG. 67 receives, via network #A labeled 2207, a modulated signal including information indicating request 3111 to connect to the first network that was transmitted by server 2205. Note that subsequent processes are as described with reference to FIG. 70 and FIG. 71.

Accordingly, second transceiver device 1514 in device 2208 illustrated in FIG. 68 receives the modulated signal including the information indicating request 3111 to connect to the first network that was transmitted by the server. Accordingly, second transceiver device 1514 receives an input of received signal 1511 received by antenna 1510, performs processing such as demodulation and error correction decoding, and outputs received data 1515 including information indicating request 3111 to connect to the first network.

With this, as illustrated in FIG. 75, device 2208 requests connection via first network 2213 from indoor gateway 2211 illustrated in FIG. 66 or gateway 2300 illustrated in FIG. 67.

Accordingly, data generator 2402 illustrated in FIG. 68 receives an input of received data 1515 including information indicating request 3111 to connect to the first network, and determines to connect via first network 2213. Data generator 2402 then outputs transmission data 1507 including information indicating access request 3112 via first network 2213.

First transceiver device 1505 in device 2208 illustrated in FIG. 68 receives an input of transmission data 1507 including information indicating access request 3112, performs processing such as error correction coding and mapping, and generates and outputs transmission signal 1504, whereby transmission signal 1504 is output from antenna (or light emitter) 1503.

With this, indoor gateway 2211 illustrated in FIG. 66 or gateway 2300 illustrated in FIG. 67 receives the modulated signal transmitted by device 2208, and transmits a modulated signal including first address information 3113 for device 2208 to perform communication via first network 2213.

Accordingly, indoor gateway 2211 illustrated in FIG. 66 or gateway 2300 illustrated in FIG. 67 receives, via antenna (or light receiver) 1501 illustrated in FIG. 77, the modulated signal including the information indicating access request 3112 that was transmitted by device 2208. First transceiver device 1505 receives an input of received signal 1502 received by antenna (or light receiver) 1501, performs processing such as demodulation and error correction decoding, and outputs received data 1506 including information indicating access request 3112.

Data generator 2402 illustrated in FIG. 77 that is included in indoor gateway 2211 illustrated in FIG. 66 or gateway 2300 illustrated in FIG. 67 receives an input of received data

1506 including information indicating access request 3112, issues the first address, and outputs transmission data 1507 including first address information 3113.

First transceiver device 1505 receives an input of transmission data 1507 including first address information 3113, performs processing such as error correction coding and mapping, and outputs transmission signal 1504. Transmission signal 1504 is then output from antenna (or light emitter) 1503 as, for example, radio waves (or light).

Note that the device that issues the first address need not be indoor gateway 2211 illustrated in FIG. 66 or gateway 2300 illustrated in FIG. 67. In such cases, indoor gateway 2211 illustrated in FIG. 66 or gateway 2300 illustrated in FIG. 67 obtains the first address information from the device that issued the first address, and, for example, performs the above operations.

First transceiver device 1505 included in device 2208 illustrated in FIG. 68 receives the modulated signal including first address information 3113 that was transmitted by indoor gateway 2211 illustrated in FIG. 66 or gateway 2300 illustrated in FIG. 67. Accordingly, first transceiver device 1505 included in device 2208 illustrated in FIG. 68 receives an input of received signal 1502 received by antenna (or light receiver) 1501, performs processing such as demodulation and error correction decoding, and outputs received data 1506 including first address information 3113.

First transceiver device 1505 included in device 2208 illustrated in FIG. 68 receives the modulated signal including first address information 3113 that was transmitted by indoor gateway 2211 illustrated in FIG. 66 or gateway 2300 illustrated in FIG. 67. Accordingly, first transceiver device 1505 included in device 2208 illustrated in FIG. 68 receives an input of received signal 1502 received by antenna (or light receiver) 1501, performs processing such as demodulation and error correction decoding, and outputs received data 1506 including first address information 3113.

Data generator 2402 included in device 2208 illustrated in FIG. 68 receives an input of received data 1506 including first address information 3113, and outputs transmission data 1507 including first address information 3114 in order to transmit the first address information to server 2205.

First transceiver device 1505 included in device 2208 illustrated in FIG. 68 receives an input of transmission data 1507 including first address information 3114, performs processing such as error correction coding and mapping, and generates and outputs transmission signal 1504. Transmission signal 1504 is output from antenna (or light emitter) 1503 as, for example, radio waves (or light).

Note that a signal corresponding to this transmission signal 1504 is, in the example illustrated in FIG. 66, transmitted to server 2205 via indoor gateway 2211, outdoor gateway 2209, and network #A labeled 2207, and in the example illustrated in FIG. 67, is transmitted to the server via gateway 2300 and network #A labeled 2207.

Figure 76:
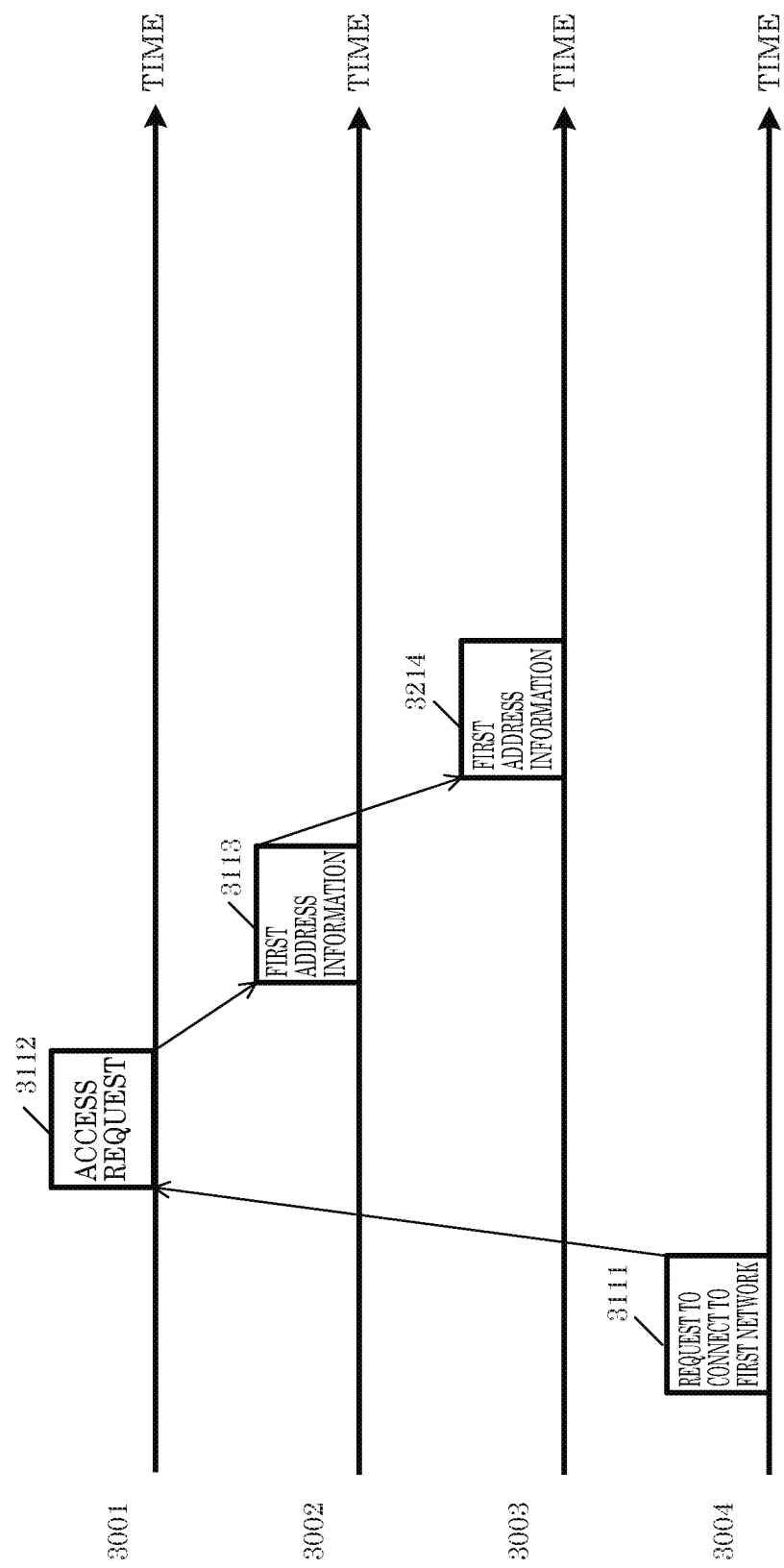
FIG. 76 illustrates one example of transmission information and reception information.

FIG. 76 illustrates the states of the transmission information and reception information of device 2208 upon device 2208, for example, obtaining the first address via the second network (2623) in FIG. 70 and FIG. 71. The example illustrated in FIG. 76 differs from the example illustrated in FIG. 75.

In FIG. 76, 3001 indicates the state of transmission signal 1504 of first transceiver device 1505 illustrated in FIG. 68, and 3002 indicates the state of received signal 1502 of first transceiver device 1505 illustrated in FIG. 68. Time is represented on the horizontal axis in either case.

3003 indicates the state of transmission signal 1513 of second transceiver device 1514 illustrated in FIG. 68, and 3004 indicates the state of received signal 1511 of second transceiver device 1514 illustrated in FIG. 68. Time is represented on the horizontal axis in either case.

As illustrated in FIG. 76, indoor gateway 2211 illustrated in FIG. 66 or gateway 2300 illustrated in FIG. 67 receives, via network #A labeled 2207, a modulated signal including information indicating request 3111 to connect to the first network that was transmitted by server 2205. Note that subsequent processes are as described with reference to FIG. 70 and FIG. 71.

Accordingly, second transceiver device 1514 in device 2208 illustrated in FIG. 68 receives the modulated signal including the information indicating request 3111 to connect to the first network that was transmitted by the server. Accordingly, second transceiver device 1514 receives an input of received signal 1511 received by antenna 1510, performs processing such as demodulation and error correction decoding, and outputs received data 1515 including information indicating request 3111 to connect to the first network.

With this, as illustrated in FIG. 75, device 2208 requests connection via first network 2213 from indoor gateway 2211 illustrated in FIG. 66 or gateway 2300 illustrated in FIG. 67.

Accordingly, data generator 2402 illustrated in FIG. 68 receives an input of received data 1515 including information indicating request 3111 to connect to the first network, and determines to connect via first network 2213. Data generator 2402 then outputs transmission data 1507 including information indicating access request 3112 via first network 2213.

First transceiver device 1505 in device 2208 illustrated in FIG. 68 receives an input of transmission data 1507 including information indicating access request 3112, performs processing such as error correction coding and mapping, and generates and outputs transmission signal 1504, whereby transmission signal 1504 is output from antenna (or light emitter) 1503.

With this, indoor gateway 2211 illustrated in FIG. 66 or gateway 2300 illustrated in FIG. 67 receives the modulated signal transmitted by device 2208, and transmits a modulated signal including first address information 3113 for device 2208 to perform communication via first network 2213.

Accordingly, indoor gateway 2211 illustrated in FIG. 66 or gateway 2300 illustrated in FIG. 67 receives, via antenna 1501 illustrated in FIG. 77, the modulated signal including the information indicating access request 3112 that was transmitted by device 2208. First transceiver device 1505 receives an input of received signal 1502 received by antenna (or light receiver) 1501, performs processing such as demodulation and error correction decoding, and outputs received data 1506 including information indicating access request 3112.

Data generator 2402 illustrated in FIG. 77 that is included in indoor gateway 2211 illustrated in FIG. 66 or gateway 2300 illustrated in FIG. 67 receives an input of received data 1506 including information indicating access request 3112, issues the first address, and outputs transmission data 1516 including first address information 3113.

Second transceiver device 1514 receives an input of transmission data 1516 that includes first address information 3113, performs processing such as error correction coding and mapping, and outputs transmission signal 1513. Transmission signal 1513 is then output from antenna 1512 as, for example, radio waves.

Note that the device that issues the first address need not be indoor gateway 2211 illustrated in FIG. 66 or gateway 2300 illustrated in FIG. 67. In such cases, indoor gateway 2211 illustrated in FIG. 66 or gateway 2300 illustrated in FIG. 67 obtains the first address information from the device that issued the first address, and, for example, performs the above operations.

Second transceiver device 1514 included in device 2208 illustrated in FIG. 68 receives the modulated signal including first address information 3113 that was transmitted by indoor gateway 2211 illustrated in FIG. 66 or gateway 2300 illustrated in FIG. 67. Accordingly, second transceiver device 1514 included in device 2208 illustrated in FIG. 68 receives an input of received signal 1511 received by antenna 1510, performs processing such as demodulation and error correction decoding, and outputs received data 1515 including first address information 3113.

In the examples illustrated in FIG. 76 and FIG. 77, in device 2208 illustrated in FIG. 68, the first address information is exemplified as being transmitted by first transceiver device 1505 or second transceiver device 1514, but this example is not limiting. In cases in which device 2208 includes another transmitting device, that transmitting device may transmit the transmission signal including the first address information in order to transmit the first address information to server 2205.

As described in Embodiment A6, device 2208 may transmit first address information to server 2205, and, alternatively, may transmit authentication information with the second address information upon transmitting the second address information. Accordingly, for example, when device 2208 has the configuration illustrated in FIG. 68, information 2401 may include authentication information. In such cases, the authentication information is included in transmission data 1507 and/or transmission data 1516. Server 2205 then obtains this information, determines whether the first address information and the second address information are valid or invalid, and when determined to be valid, stores the first address information and the second address information. Similarly, terminal 2201 transmits authentication information to server 2205, and when the authentication is successful, terminal 2201 obtains the first address information and the second address information from server 2205.

Device 2208, indoor gateway 2211, and gateway 2300 operating in this manner achieves the advantageous effects described in Embodiment A6.

Next, operations performed by terminal 2201, server 2205, and device 2208 illustrated in FIG. 66 and FIG. 67 upon implementation of: (i) communication like that in FIG. 70 and/or FIG. 71; and/or (ii) communication like that in FIG. 72 and/or FIG. 73.

Figure 79:
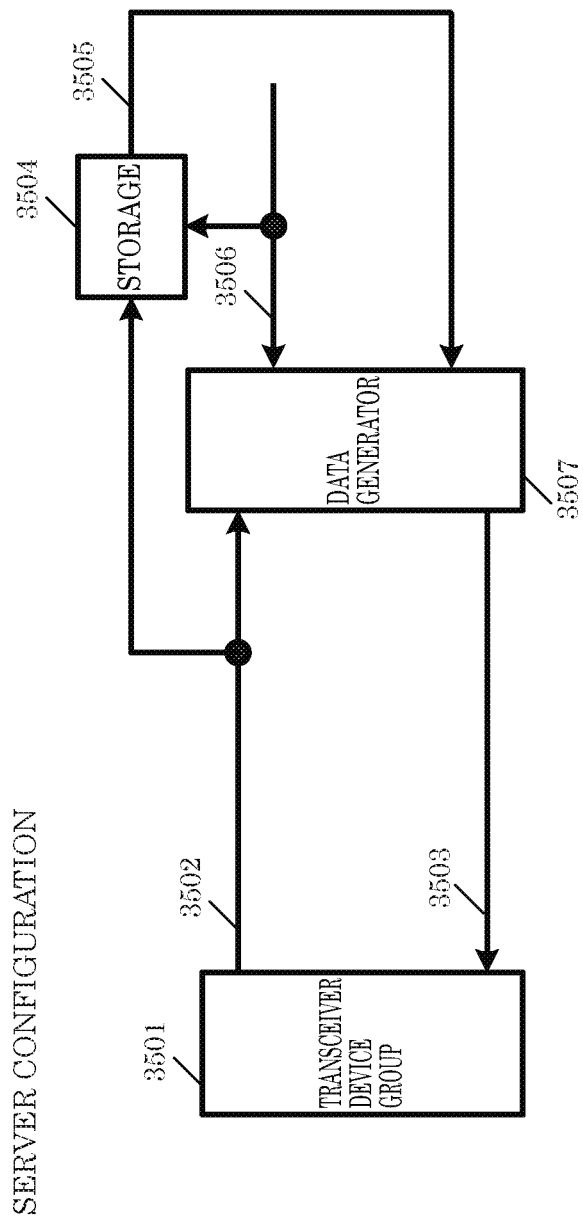
FIG. 79 illustrates one example of a server configuration.

FIG. 79 illustrates one example of a configuration of server 2205 illustrated. 3501 indicates a transceiver device group. For example, transceiver device group 3501 includes N transceiver devices. Note that N is an integer that is greater than or equal to one.

Transceiver device group 3501 receives an input of a received signal, and each transceiver device performs processing such as demodulation and error correction decoding, and outputs received data group 3502 corresponding to the N transceiver devices.

Moreover, transceiver device group 3501 receives an input of transmission data group 3503, and each transceiver device performs processing such as error correction coding and mapping, and transmits a transmission modulated signal group corresponding to the N transceiver devices.

Storage 3504 receives inputs of received data group 3505 and information 3506, and may store received data group 3505 or (partial) information 3506 data. Moreover, storage 3504 receives inputs of received data group 3505 and information 3506, and outputs stored data 3505, based on received data group 3506 or (partial) information 3506 data.

Data generator 3507 receives inputs of stored data 3505, information 3506, and received data group 3502, and based on these data, generates and outputs transmission data group 3503.

Next, operations performed by terminal 2201, server 2205, and device 2208 will be described based on FIG. 78.

Figure 78:
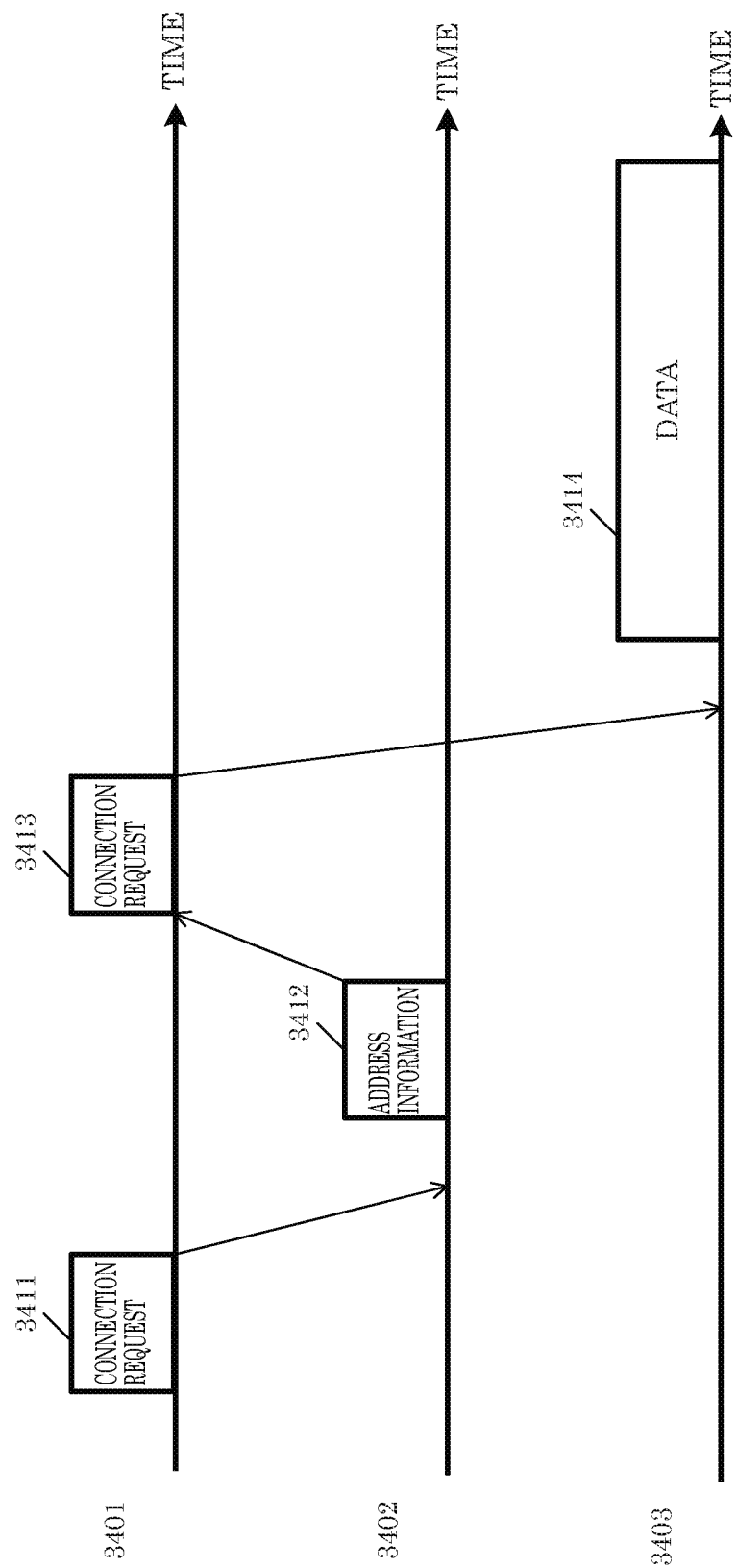
FIG. 78 illustrates one example of operations performed by a terminal, a server, and a device.

In FIG. 78, 3401 indicates a communication state of terminal 2201, 3402 indicates a communication state of server 2205, and 3403 indicates a communication state of device 2208. Time is represented on the horizontal axis in FIG. 78.

As illustrated in FIG. 78, terminal 2201 transmits information indicating connection request 3411 for requesting connection to device 2208. Note that the information indicating connection request 3411 includes information indicating whether connection is performed via first network 2213 or via second network 2216. This information need not directly indicate whether connection is performed via first network 2213 or via second network 2216.

For example, this information may indirectly indicate the above, such as by information indicating a requested transmission speed or information indicating a request that a network with stable communication be used (here, the selection of whether connection is performed via first network 2213 or via second network 2216 may be made by server 2205).

Note that in this example, at a point in time before transmission of the information indicating connection request 3411, terminal 2201 does not possess the first address information or the second address information for accessing device 2208. Moreover, in this example, server 2205 has already received, via second network 2216, at least the second address information for communicating with device 2208. Note that details regarding this point is as described above.

Next, operations pertaining to the transmission of the information indicating connection request 3411 that are performed by terminal 2201 will be described. The configuration of terminal 2201 is the terminal configuration illustrated in FIG. 69. Data generator 2508 receives an input of information 2509, and outputs transmission data 2507 including information indicating connection request 3411.

Transceiver device 2505 receives an input of transmission data 2507 including information indicating connection request 3411, performs processing such as error correction coding and mapping, and outputs transmission signal 2504 including information indicating connection request 3411. Transmission signal 2504 including information indicating connection request 3411 is output from antenna 2503 as radio waves.

Server 2205 then obtains, via network #B labeled 2203, transmission signal 2504 including information indicating connection request 3411, or a signal corresponding to this transmission signal 2504.

Accordingly, server 2205 having the configuration illustrated in FIG. 79 receives an input of a received signal including information indicating connection request 3411, performs processing such as demodulation and error correction decoding, obtains the information indicating connection request 3411, and outputs received data group 3502 including the obtained information indicating connection request 3411. Note that not all signals included in received data group 3502 need to output received data.

Operations performed by server 2205 possessing the information indicating connection request 3411 differ depending on whether terminal 2201 is to connect to device 2208 via first network 2213 or terminal 2201 is to connect to device 2208 via second network 2216. Hereinafter, operations performed by server 2205 when terminal 2201 is to connect to device 2208 via first network 2213 and operations performed by server 2205 when terminal 2201 is to connect to device 2208 via second network 2216 will be described separately.

Operations Performed by Server 2205 when Terminal 2201 is to Connect to Device 2208 Via First Network 2213

As described with reference to FIG. 70, FIG. 71, FIG. 75, and FIG. 76, server 2205 possessing the information indicating connection request 3411 needs to obtain the information indicating the first address of device 2208 in order to perform communication with device 2208 via first network 2213.

Accordingly, in server 2205 illustrated in FIG. 79, transceiver device group 3501 performs processing such as demodulation and error correction decoding on the received signal group, and outputs received data group 3502 including the information indicating connection request 3411.

Data generator 3507 receives an input of received data group 3502 including the information indicating connection request 3411, and when the information indicating connection request 3411 includes a request by terminal 2201 to connect to device 2208 via first network 2213, outputs transmission data group 3503 including information indicating the request by terminal 2201 to connect to device 2208 via first network 2213 that is included in the information indicating connection request 3411.

Transceiver device group 3501 performs processing such as error correction coding and mapping on transmission data group 3503 including the information indicating the request by terminal 2201 to connect to device 2208 via first network 2213, and outputs a transmission signal group.

Then, in the case of FIG. 66, data including the information indicating the request by terminal 2201 to connect to device 2208 via first network 2213 that is included in the transmission signal group is delivered to device 2208 via network #A labeled 2207, outdoor gateway 2209, indoor gateway 2211, and second network 2216. In the case of FIG. 67, data including the information indicating the request by terminal 2201 to connect to device 2208 via first network 2213 that is included in the transmission signal group is delivered to device 2208 via network #A labeled 2207, gateway 2300, and second network 2216.

Device 2208 thus obtains the first address information, and delivers data including the first address information to server 2205, but since that process has already been described, repeated description thereof will be omitted.

Then, as illustrated in FIG. 78, a modulated signal including address information 3412 is transmitted by server 2205. Accordingly, in server 2205 illustrated in FIG. 79, transceiver device group 3501 performs processing such as demodulation and error correction decoding on the received signal group, and outputs received data group 3502 including the first address information.

Data generator 3507 receives an input of received data group 3502 including the first address information, and outputs transmission data group 3503 including the first address information.

Transceiver device group 3501 receives an input of transmission data group 3503 including the first address information, performs processing such as error correction coding and mapping, and generates and outputs a transmission signal group. Note that the transmission signal group including the first address information corresponds to address information 3412 illustrated in FIG. 78.

Terminal 2201 having the configuration in FIG. 69 receives a signal corresponding to the transmission signal group including the first address information that was transmitted by server 2205. Transceiver device 2505 receives an input of a received signal received by antenna 2501, performs processing such as demodulation and error correction decoding, and outputs received data 2506 including the first address information.

Data generator 2508 receives inputs of information 2509 and received data 2506 including the first address information, and since data generator 2508 has obtained the first address information, outputs transmission data 2507 including connection request 3413 data including control information for accessing the first address in order to connect to device 2208.

Transceiver device 2505 receives an input of transmission data 2507 including connection request 3413 data including the control information for accessing the first address, performs processing such as error correction coding and mapping, and generates and outputs transmission signal 2504. Transmission signal 2504 is then output from antenna 2503 as radio waves.

A signal corresponding to transmission signal 2504, for example, is delivered to device 2208 via network #B labeled 2203, outdoor gateway 2209, indoor gateway 2211 (or gateway 2300 instead of outdoor gateway 2209 and indoor gateway 2211), and first network 2213.

First transceiver device 1505 included in device 2208 illustrated in FIG. 68 receives an input of received signal 1502 received by antenna (or light receiver) 1501, performs processing such as demodulation and error correction decoding, and outputs received data 1506 including connection request 3413 information. Data generator 2402 receives inputs of (i) received data 1506 including connection request 3413 information and (ii) information 2401, and generates and outputs transmission data 1507 based on received data 1506 including connection request 3413 information.

First transceiver device 1505 receives an input of transmission data 1507, performs processing such as error correction coding and mapping, and outputs transmission signal 1504. Transmission signal 1504 is then output from antenna (or light emitter) 1503 as, for example, radio waves (as light if the communication is optical communication). Here, transmission signal 1504 including transmission data 1507 corresponds to data 3414 in FIG. 78.

A signal corresponding to transmission signal 1504 transmitted by first transceiver device 1505 is then received by terminal 2201 via first network 2213, etc., whereby terminal 2201 obtains data 3414.

Operations Performed by Server 2205 when Terminal 2201 is to Connect to Device 2208 Via Second Network 2216

As described with reference to FIG. 70, FIG. 71, FIG. 75, FIG. 76, at the point in time that server 2205 obtains the connection request 3411 information, server 2205 obtains the information indicating the second address for terminal 2201 to connect to device 2208 via second network 2216.

Accordingly, transceiver device group 3501 included in server 2205 having the configuration illustrated in FIG. 79 receives an input of transmission data group 3503 including the second address information, performs processing such as error correction coding and mapping, and generates and outputs a transmission signal group. Note that the transmission signal group including the second address information corresponds to address information 3412 illustrated in FIG. 78.

Terminal 2201 having the configuration in FIG. 69 receives a signal corresponding to the transmission signal group including the second address information that was transmitted by server 2205. Transceiver device 2505 receives an input of a received signal received by antenna 2501, performs processing such as demodulation and error correction decoding, and outputs received data 2506 including the second address information.

Data generator 2508 receives inputs of information 2509 and received data 2506 including the second address information, and since data generator 2508 has obtained the second address information, outputs transmission data 2507 including connection request 3413 data including control information for accessing the second address in order to connect to device 2208.

Transceiver device 2505 receives an input of transmission data 2507 including connection request 3413 data including the control information for accessing the second address, performs processing such as error correction coding and mapping, and generates and outputs transmission signal 2504. Transmission signal 2504 is then output from antenna 2503 as radio waves.

A signal corresponding to transmission signal 2504, for example, is delivered to device 2208 via network #B labeled 2203, outdoor gateway 2209, indoor gateway 2211 (or gateway 2300 instead of outdoor gateway 2209 and indoor gateway 2211), and first second network 2216.

Second transceiver device 1514 included in device 2208 having the configuration illustrated in FIG. 68 receives an input of received signal 1511 received by antenna 1510, performs processing such as demodulation and error correction decoding, and outputs received data 1515 including connection request 3413 information. Data generator 2402 receives inputs of (i) received data 1515 including connection request 3413 information and (ii) information 2401, and generates and outputs transmission data 1516 based on received data 1515 including connection request 3413 information.

Second transceiver device 1514 receives an input of transmission data 1516, performs processing such as error correction coding and mapping, and outputs transmission signal 1513. Transmission signal 1513 is then output from, for example, antenna 1512 as radio waves. Here, transmission signal 1524 including transmission data 1526 corresponds to data 3414 in FIG. 78.

A signal corresponding to transmission signal 1516 transmitted by second transceiver device 1514 is then received by terminal 2201 via second network 2216, etc., whereby terminal 2201 obtains data 3414.

As described in Embodiment A6, terminal 2201 may, upon performing the connection request (3411), also transmit authentication information to server 2205, as illustrated by 3411 in FIG. 78. Accordingly, for example, when terminal 2201 has the configuration illustrated in FIG. 69, information 2509 may include authentication information. In such cases, the authentication information is included in transmission data 2507. Server 2205 then obtains this information, determines whether the connection request is valid or invalid information, and when determined to be valid, stores permits the connection request.

Implementing the present embodiment as described above achieves the advantageous effects described in Embodiment A6. In other words, it is possible to achieve both advantageous effects of improved communication quality and improved data transmission speeds.

Note that the method used for device 2208 to notify the first address and second address to terminal 2201 is not limited to the method exemplified in the present embodiment; any sort of network may be used to make the notification.

Supplementary Note A4

In the present specification, the transceiver device and the transceiver device group include functionality for performing signal processing for transmission and functionality for performing signal processing for reception.

Although the signal processing for transmission is exemplified as being error correction coding and mapping, the signal processing may be other signal processing. Examples include multiplexing, quadrature modulation, frequency conversion, bandlimiting, and amplification. However, the signal processing for transmission is not limited to these examples.

Although the signal processing for reception is exemplified as being demodulation and error correction decoding, the signal processing may be other signal processing. Examples include demultiplexing, frequency conversion, quadrature demodulation, frequency synchronization, time synchronization, channel estimation, and distortion estimation. However, the signal processing for reception is not limited to these examples.

Embodiment A8

In the present embodiment, in the method of configuration of the mesh network and multihop communication described in the present specification, a method of configuration of the mesh network and multihop communication that uses a server will be described.

Figure 80:
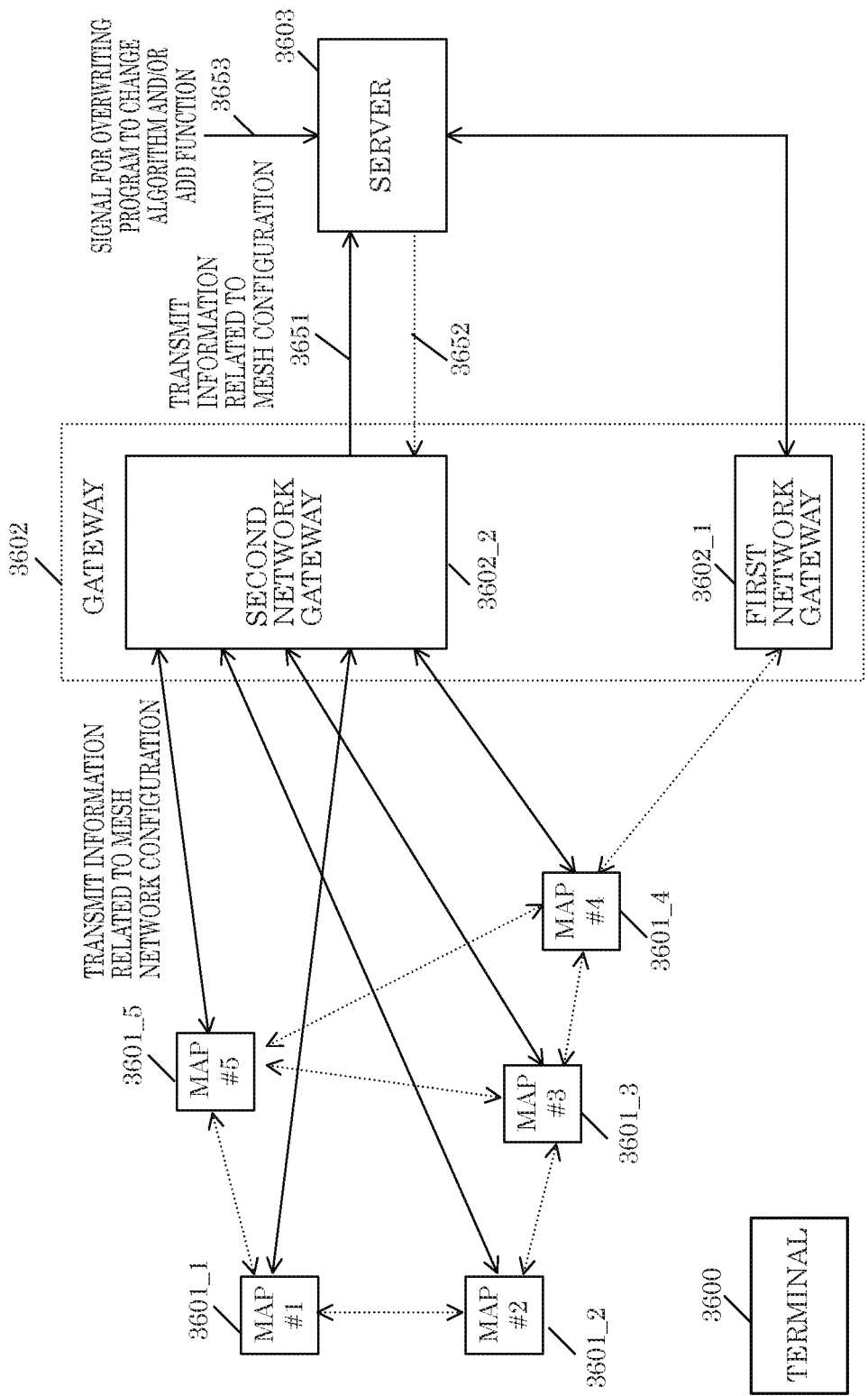
FIG. 80 illustrates one example of a network configuration.

FIG. 80 illustrates the state of a network including: terminal 3600; mesh access points (MAPs) 3601_1, 36012, 3601_3, 3601_4, and 3601_5; gateway 3602 including first network gateway 3602_1 and second network gateway 3602_2; and server 3603.

As the relation between the first network and the second network has already been described in detail in Embodiment A6, repeated description thereof will be omitted. Moreover, although MAPs are exemplified as being included in the network illustrated in FIG. 81 (and in FIG. 82), these devices may be mesh points (MPs), and moreover, access points (APs) may also be present on the network. Moreover, in this example, each of the MAPs is capable of communication via the first network and communication via the second network.

As described above in other embodiments, MAP #1 labeled 36011, MAP #2 labeled 36012, MAP #3 labeled 3601_3, MAP #4 labeled 3601_4, and MAP #5 labeled 36015 generate information related to the mesh network in the first network regarding the searching for a connectable MAP and the status, etc., of connection with a connectable MAP via the first network.

Then, as illustrated in FIG. 80, MAP #1 labeled 3601_1, MAP #2 labeled 3601_2, MAP #3 labeled 3601_3, MAP #4 labeled 3601_4, and MAP #5 labeled 3601_5 use the second network to transmit, to second network gateway 3602_2, information related to the configuration of the mesh network in the first network.

Second network gateway 3602_2 transmits, to server 3603, information 3651 related to the configuration of the mesh network in the first network that was obtained from MAP #1 labeled 3601_1, MAP #2 labeled 36012, MAP #3 labeled 36013, MAP #4 labeled 36014, and MAP #5 labeled 3601_5.

Figure 81:
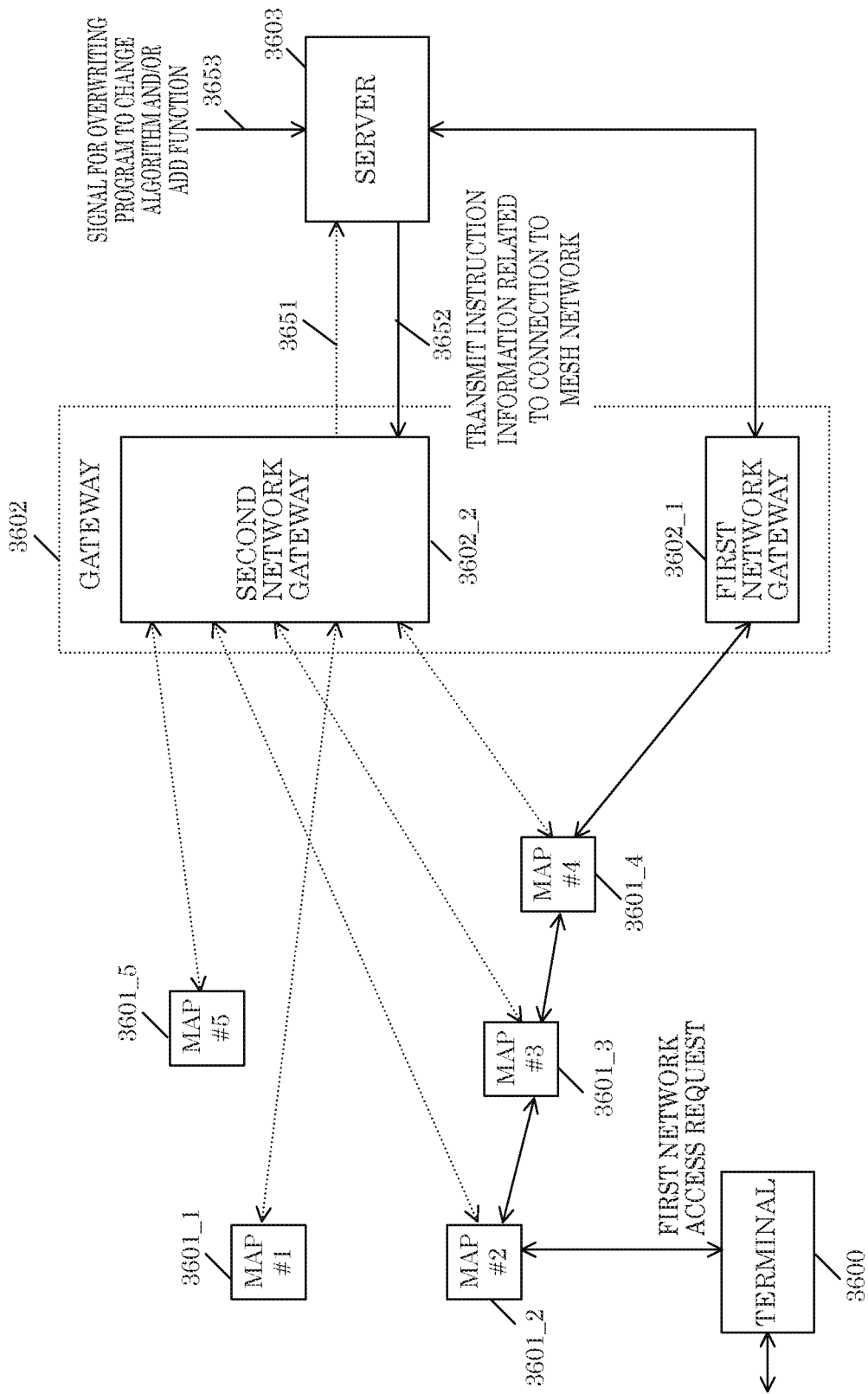
FIG. 81 illustrates one example of a network configuration.

Then, as illustrated in FIG. 81, server 3603 determines the specific method to be used to connect to the mesh network in the first network based on information 3651 related to the configuration of the mesh network in the first network, and transmits, to second network gateway 3602_2, instruction information 3652 related to connection to the mesh network in the first network.

Second network gateway 3602_2 receives an input of information 3652 related to connection to the mesh network in the first network, and transmits, to MAP #1 labeled 3601_1, MAP #2 labeled 36012, MAP #3 labeled 3601_3, MAP #4 labeled 36014, and MAP #5 labeled 3601_5, a transmission signal including information 3652 related to connection to the mesh network in the first network.

Note that the method to be used to connect to the mesh network in the first network is, for example, in the case of the example illustrated in FIG. 81, information related to the route taken when terminal 3600 transmits a modulated signal to first network gateway 36021, namely the route from MAP #2 labeled 3601_2 to MAP #3 labeled 3601_3 to MAP #4 labeled 3601_4.

Moreover, server 3603 determines the method to be used to connect to the mesh network in the first network. Here, server 3603 may receive an input of a signal for changing the processing method for determining the method to be used to connect to the mesh network in the first network, that is to say, the configuration may include signal 3653 for overwriting a program to change an algorithm and/or add a function. Note that new functions may be added to server 3603 by signal 3653 for overwriting a program to change an algorithm and/or add a function. This will be described in greater detail later with reference to FIG. 82.

In the example illustrated in FIG. 81, MAP #2 labeled 3601_2 and MAP #3 labeled 3601_3 establish communication, MAP #3 labeled 3601_3 and MAP #4 labeled 36014 establish communication, and MAP #4 labeled 36014 and first network gateway 3602_1 establish communication.

Terminal 3600 then requests access from the first network. In FIG. 81, terminal 3600 transmits, to first network to MAP #2 labeled 36012, a modulated signal including information indicating an access request to the first network. As a result, a signal corresponding to this modulated signal is delivered to the first network gateway via MAP #2 labeled 36012, MAP #3 labeled 36013, and MAP #4 labeled 3601_4.

Terminal 3600 and first network gateway 3602_1 then communicate via MAP #2 labeled 3601_2, MAP #3 labeled 3601_3, and MAP #4 labeled 3601_4. Note that first network gateway 3602_1 may transmit, to another device, all or part of the information included in the modulated signal transmitted by terminal 3600.

Figure 82:
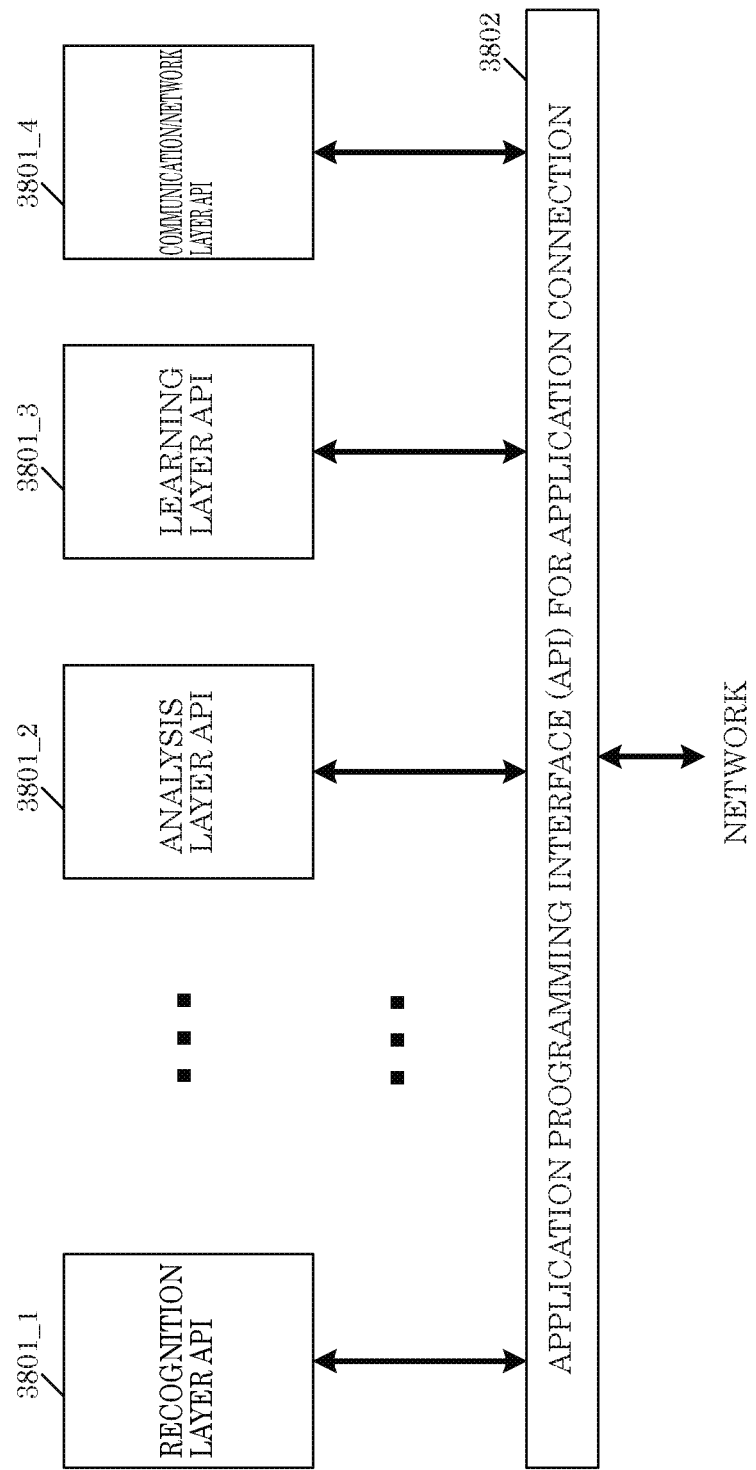
FIG. 82 illustrates one example of a server configuration.

FIG. 82 illustrates one example of a configuration of server 3603 illustrated in FIG. 80 and FIG. 81.

Server 3603 includes, as an application programming interface (API) for performing processes, recognition layer API labeled 3801_1, analysis layer API labeled 3801_2, learning layer API labeled 3801_3, and communication/network layer API labeled 3801_4, etc., and these APIs are connected to API 3802 for application connection, and processes are performed in each API, such as determining the method to be used to connect to the mesh network in the first network. API 3802 for application connection is connected to a network, and outputs a result of the processing it performs.

As described above, as the result of a MAP notifying the server of the connection state of the first network and the server determining the configuration of the mesh network in the first network, an advantageous effect whereby a terminal can easily communicate via the first network is achieved. Moreover, as a result of a MAP using the second network to provide the server with the connection state of the first network, the server can know the connection state of the first network without forming a mesh network, which makes it possible to simplify processes.

Next, another example of the above-described method of configuration of the mesh network and multihop communication that uses a server will be given.

FIG. 80 illustrates the state of a network including: terminal 3600; mesh access points (MAPs) 3601_1, 3601_2, 36013, 3601_4, and 3601_5; gateway 3602 including first network gateway 3602_1 and second network gateway 3602_2; and server 3603.

As the relation between the first network and the second network has already been described in detail in Embodiment A6, repeated description thereof will be omitted. Moreover, although MAPs are exemplified as being included in the network illustrated in FIG. 81 (and in FIG. 82), these devices may me mesh points (MPs), and moreover, access points (APs) may also be present on the network. Moreover, in this example, each of the MAPs is capable of communication via the first network and communication via the second network.

As described above in other embodiments, MAP #1 labeled 36011, MAP #2 labeled 36012, MAP #3 labeled 3601_3, MAP #4 labeled 3601_4, and MAP #5 labeled 3601_5 generate information related to the mesh network in the first network regarding the searching for a connectable MAP and the status, etc., of connection with a connectable MAP via the first network.

Then, as illustrated in FIG. 80, MAP #1 labeled 3601_1, MAP #2 labeled 36012, MAP #3 labeled 3601_3, MAP #4 labeled 3601_4, and MAP #5 labeled 3601_5 use the second network to transmit, to second network gateway 3602_2, information related to the configuration of the mesh network in the first network.

Second network gateway 3602_2 transmits, to server 3603, information 3651 related to the configuration of the mesh network in the first network that was obtained from MAP #1 labeled 3601_1, MAP #2 labeled 3601_2, MAP #3 labeled 36013, MAP #4 labeled 36014, and MAP #5 labeled 3601_5.

Figure 83:
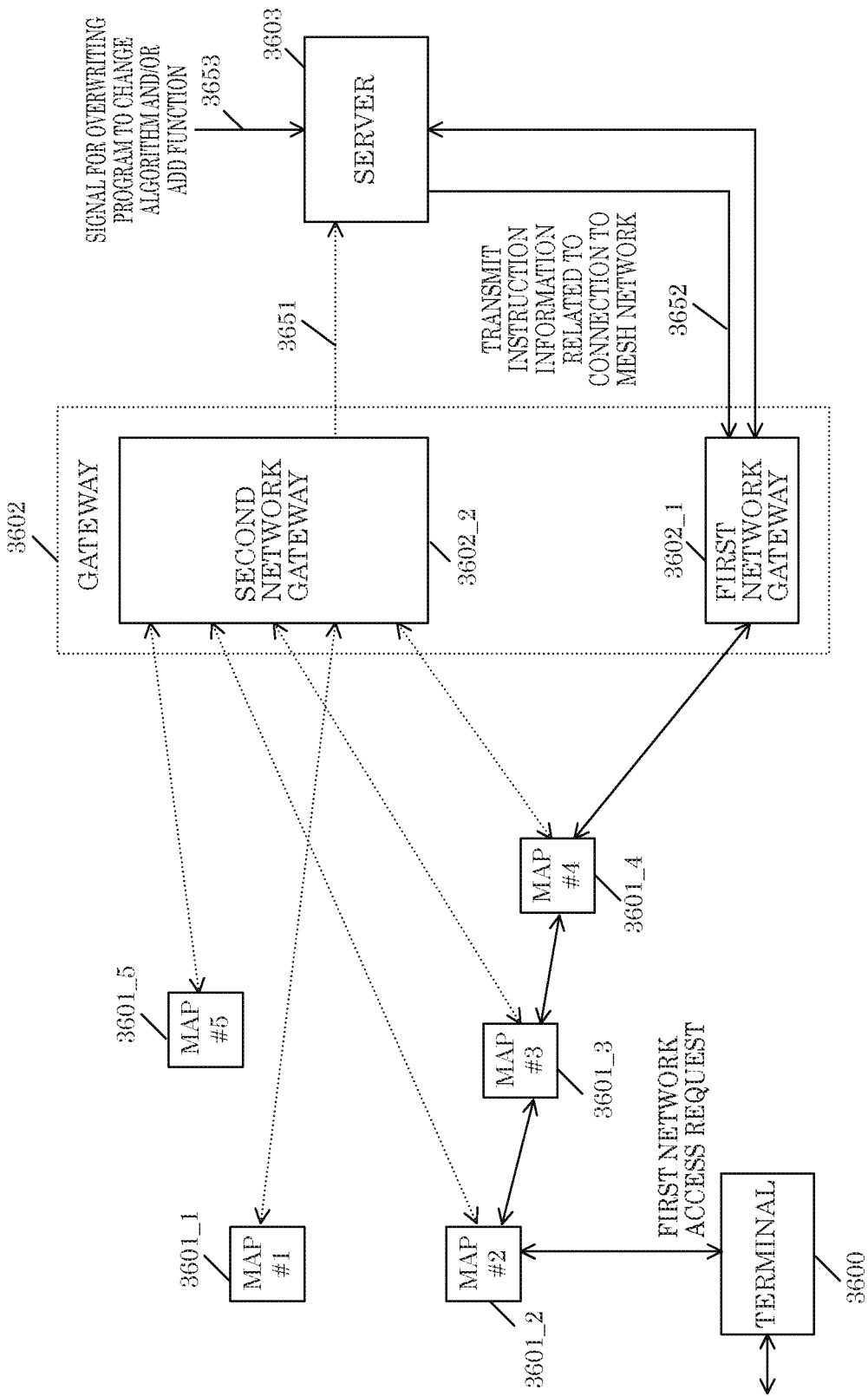
FIG. 83 illustrates one example of a network configuration.

Then, as illustrated in FIG. 83, server 3603 determines the specific method to be used to connect to the mesh network in the first network based on information 3651 related to the configuration of the mesh network in the first network, and transmits, to first network gateway 3602_1, instruction information 3652 related to connection to the mesh network in the first network.

First network gateway 3602_1 receives an input of information 3652 related to connection to the mesh network in the first network, and transmits, to, for example, MAP #4 labeled 36014, a transmission signal including information 3652 related to connection to the mesh network in the first network.

Note that the method to be used to connect to the mesh network in the first network is, for example, in the case of the example illustrated in FIG. 81, information related to the route taken when terminal 3600 transmits a modulated signal to first network gateway 3602_1, namely the route from MAP #2 labeled 3601_2 to MAP #3 labeled 3601_3 to MAP #4 labeled 3601_4.

Note that as operations performed by server 3603 have already been described with reference to FIG. 81 and FIG. 82, repeated description thereof will be omitted.

In the example illustrated in FIG. 83, MAP #2 labeled 3601_2 and MAP #3 labeled 3601_3 establish communication, MAP #3 labeled 3601_3 and MAP #4 labeled 3601_4 establish communication, and MAP #4 labeled 3601_4 and first network gateway 3602_1 establish communication. Here, first network gateway 36021 transmits a transmission signal including information 3652 related to connection to the mesh network in the first network to MAP #4 labeled 3601_4, and having received this, MAP #4 labeled 3601_4 transmits a transmission signal including information 3652 related to connection to the mesh network in the first network to MAP #3 labeled 3601_3, and having received this, MAP #3 labeled 3601_3 transmits a transmission signal including information 3652 related to connection to the mesh network in the first network to MAP #2 labeled 3601_2. With this, information 3652 related to connection to the mesh network in the first network is shared among MAP #4 labeled 3601_4, MAP #3 labeled 3601_3, and MAP #2 labeled 3601_2.

Terminal 3600 then requests access from the first network. In FIG. 83, terminal 3600 transmits, to first network to MAP #2 labeled 3601_2, a modulated signal including information indicating an access request to the first network. As a result, a signal corresponding to this modulated signal is delivered to the first network gateway via MAP #2 labeled 36012, MAP #3 labeled 3601_3, and MAP #4 labeled 3601_4.

Terminal 3600 and first network gateway 3602_1 then communicate via MAP #2 labeled 3601_2, MAP #3 labeled 3601_3, and MAP #4 labeled 3601_4. Note that first network gateway 3602_1 may transmit, to another device, all or part of the information included in the modulated signal transmitted by terminal 3600.

As described above, as the result of a MAP notifying the server of the connection state of the first network and the server determining the configuration of the mesh network in the first network, an advantageous effect whereby a terminal can easily communicate via the first network is achieved.

In the above description, server 3603 is exemplified as transmitting information 3652 related to connection to the mesh network in the first network to a MAP via the first network or the second network, but this example is not limiting. Server 3603 may transmit information 3652 related to connection to the mesh network in the first network to a MAP via a network other than the first network or the second network.

Supplementary Note A5

In the present specification, the terminology "mesh network" is used, but the terminology "mesh network" may be rewritten as "ad hoc network" and the embodiments may be carried out.

In the present specification, the device names "terminal", "gateway", "MAP", "MP", "AP", and "server" are used in the above embodiments, but the names of the devices are not limited to these examples. The names "device", "communication device", "base station", "wireless communication device", and "wireless station" may be used.

Note that in, for example, Embodiment A1 to A8 (in other words, the following is not limited to Embodiment A1 to A8) and, for example, Supplemental Notes A1 to A5 (in other words, the following is not limited to Supplemental Notes A1 to A5), the terminology "device identification information symbol" is used. This "device identification information symbol" may be any sort of information so long as it is information that can identify a device. For example, a symbol including address information such as the media access control (MAC) address of a communication device, repeater, node, edge node, gateway, transceiver device, access point, terminal, server, base station, wireless station, MAP, or MP may be used as the device identification information symbol.

Note that in, for example, Embodiment A1 to A8 (in other words, the following is not limited to Embodiment A1 to A8) and, for example, Supplemental Notes A1 to A5 (in other words, the following is not limited to Supplemental Notes A1 to A5), for example, the transmission method information included in the transmission method information symbol illustrated in FIG. 61 may be any sort of information so long as it is information related to the transmission method of a symbol transmitted to the communication partner, such as a data symbol or control information symbol. For example, the information included in the transmission method information symbol may be information related to a transmission method for the generation of a frame of symbols, such as information related to a multiplexing method (TDM, FDM, CSMA/CA, etc.).

Moreover, the control information symbol is described above as including one or more of a network attribute information symbol, a node information symbol, and a device identification information symbol, but the control information symbol may include information indicating a multiplexing method.

Note that in the above embodiments, a configuration using time division multiplexing (TDM) is described. One example of TDM is time division duplex (TDD), which achieves duplex communication by separating the uplink (transmission or reception) from the downlink (transmission or reception) by the multiplexing of different time slots.

Note that in the above embodiments, each element may be configured as dedicated hardware or may be realized by executing a software program suitable for the element. Each of the elements may be realized by means of a program executing unit, such as a central processing unit (CPU) and a processor, reading and executing the software program recorded on a recording medium such as a hard disk or a semiconductor memory. Here, the software program for realizing the system or device according to each of the embodiments is the program described below.

That is, the program causes the computer, which is the first communication device, to execute steps of connecting to the first network and wirelessly communicating. The program also causes the computer, which is the second communication device, to execute steps of connecting to the second network and connecting to the first communication device via wireless communication.

Hereinbefore, a communication system according to one or more aspects has been described based on exemplary embodiments, but the present disclosure is not limited to the above exemplary embodiments. Various modifications of the exemplary embodiments as well as embodiments resulting from combinations of elements from different exemplary embodiments that may be conceived by those skilled in the art are intended to be included within the scope of the one or more aspect as long as these do not depart from the novel teachings and advantages of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable in the construction of networks.

What is claimed is:

1. A communication system, comprising:
a first communication device; and
a second communication device,
wherein
the first communication device is disposed in a first space outdoors,
the first communication device includes: a first communication interface that connects to a first network; and a second communication interface that communicates wirelessly,
the second communication device is disposed in a second space indoors, the second space being separated from the first space by a panel,
the second communication device includes: a third communication interface that connects to a second network; and a fourth communication interface that connects, via wireless communication, to the second communication interface included in the first communication device,
the second communication interface and the fourth communication interface connect by wireless communication via radio waves through the panel,
the second communication device includes: a power receiver that receives power for driving the second communication device from a power supply terminal disposed in the second space; and a wireless power supplier that wirelessly supplies power to the first communication device, and
the first communication device includes a wireless power receiver that wirelessly receives, from the wireless power supplier through the panel, a supply of power for driving the first communication device.

2. The communication system according to claim 1,
wherein the first communication interface communicates using time division multiple access (TDMA), and the third communication interface communicates using carrier sense multiple access (CSMA).

3. The communication system according to claim 1,
wherein the first communication interface is a wireless communication interface that connects to the first network, the first network being a wireless network, and
the third communication interface is a wireless communication interface that connects to the second network, the second network being a wireless network.

4. The communication system according to claim 3,
wherein the first communication interface connects to the first network, the first network being a wireless multihop network, and
the third communication interface connects to the second network, the second network being a wireless multihop network.

5. A control method for a communication system including a first communication device disposed in a first space outdoors and a second communication device disposed in a second space indoors, the second space being separated from the first space by a panel, the control method comprising:
connecting to a first network by a first communication interface of the first communication device;
wirelessly communicating by a second communication interface of the first communication device;
connecting to a second network by a third communication interface of the second communication device; and
connecting to the second communication interface of the first communication device by a fourth communication interface of the second communication device via wireless communication through the panel,
receiving, by a power receiver of the second communication device, power for driving the second communication device from a power supply terminal disposed in the second space,
wirelessly supplying power by a wireless power supplier of the second communication device to the first communication device,
wirelessly receiving, by a wireless power receiver of the first communication device, a supply of power for driving the first communication device.

* * * * *